US005079723A

United States Patent [19]

Herceg et al.

[11] Patent Number: 5,079,723

[45] Date of Patent: Jan. 7, 1992

[54] TOUCH DIALOGUE USER INTERFACE FOR REPRODUCTION MACHINES

[75] Inventors: Thomas J. Herceg, Pittsford; Alan J. Perey, Rochester; James B. Williams, Jr., Rochester; Nancy B. Williamson, Rochester, all of N.Y.

[73] Assignee: Xerox Corporation, Stamford, Conn.

[21] Appl. No.: 164,365

[22] Filed: Mar. 4, 1988

[51] Int. Cl.[5] .................... G06F 15/40

[52] U.S. Cl. .................... 395/156; 340/747; 340/790; 340/717; 395/155

[58] Field of Search .............. 364/519, 521, 712, 518; 178/18; 355/14 R, 14 C; 340/747, 750, 789, 790, 717, 706

[56] References Cited

U.S. PATENT DOCUMENTS

| | | | |
|---|---|---|---|
| 3,757,037 | 9/1973 | Bialek | 178/6.6 A |
| 4,267,443 | 5/1981 | Carroll et al. | 250/221 |
| 4,521,870 | 6/1985 | Babbel et al. | 364/900 |
| 4,528,636 | 7/1985 | Robinson, III | 364/521 |
| 4,566,001 | 1/1986 | Moore et al. | 340/711 |
| 4,601,003 | 7/1986 | Yoneyama et al. | 364/518 |
| 4,646,250 | 2/1987 | Childress | 364/518 |
| 4,649,499 | 3/1987 | Sutton et al. | 364/518 |
| 4,710,806 | 12/1987 | Iwai et al. | 364/521 X |
| 4,731,609 | 3/1988 | Reynolds et al. | 340/747 |
| 4,731,742 | 3/1988 | Nishi et al. | 364/521 |
| 4,755,956 | 7/1988 | Porawski | 364/518 |
| 4,763,356 | 8/1988 | Day, Jr. et al. | 379/368 |
| 4,937,036 | 6/1990 | Beard et al. | 340/706 |

*Primary Examiner*—Gary V. Harkcom
*Assistant Examiner*—Phu K. Nguyen
*Attorney, Agent, or Firm*—Frederick E. McMullen

[57] ABSTRACT

Touch dialogue User Interface (U.I.) for programming a reproduction machine using a touch control CRT screen with display providing a message area, U.I. state selections, and plural tabbed file folders, each file folder when opened in turn displaying a smaller card file of tabbed cards with adjacent work area, each card in the card file when opened providing a display of icons representing first level machine programming selections for touch selection, each icon when touched displaying further icons representing second level programming selections in the work area for touch selection.

10 Claims, 54 Drawing Sheets

TOUCH DIALOGUE USER INTERFACE FOR REPRODUCTION MACHINES

BACKGROUND OF THE INVENTION

1. Field of the Invention

The invention relates to a system for programming reproduction machines such as copiers and printers, and more particularly, to touch dialogue User Interface for programming such reproduction machines.

As reproduction machines such as copiers and printers become more complex and versatile in the jobs they do, the user interface between the machine and the operator or user, which in essence permits the dialogue (i.e., the ability to talk) between operator and machine, must necessarily be expanded if full and efficient utilization of the machine is to be realized. A suitable interface must not only provide the controls, displays, and messages necessary to activate, program, monitor, and maintain the machine, but must do so in an efficient, relatively simple, and straightforward way. For if the user interface fails in this respect, the abilities that were designed and built into the machine and which the machine owner pays for, may never be realized.

Additionally, in more complex machines, various operator skill levels must typically be provided form. At one extreme is the dedicated user; that is, the user whose principal task is to run copying jobs and/or supervising others who do. This type of operator typically requires extensive and costly training in order to become fully skilled in all the potential programming possibilities and operator situations that are possible. At the other extreme is the casual user whose principal task is running copies and doing relatively simple jobs such as jam clearance, consumable replacement, and the like. This latter type of operator requires only minimal training, and typically comprises the smallest group of operators for the machine. Intertwined with the need to accommodate operators of these and other skill levels and training is the need to maximize productivity and ease of use while enabling successful operation, not only in the country of origin but also in foreign countries where the machine is intended to be marketed.

One potential system for providing a user interface that will meet the needs and requirements of modern day reproduction machines is to use a soft touch control monitor, either alone or in combination with other hard touch control items, such as keyboard. However, prior touch control systems have been limited in the amount of program selections that they provide, and have been afflicted with displays that are often confusing and inadequate in attempting to accommodate all of the various machine permutations and operational modes possible. Further, prior art touch control systems usually impose a strictly operating protocol that requires the operator to step forward and backware through strict predefined selection sequences in order to program the machine, reducing programming efficiency.

2. Description of the Prior Art

In the prior art for example, a touch screen system which emulates three dimensional objects on a CRT touch screen in two dimensional form is found in U.S. Pat. No. 4,649,499 to Sutton et al. Another U.S. Pat. No. 4,521,870 to Babbel et al, discloses an arrangement for editing audio or video work in which various options are displayed on a touch screen that allows the operator to perform different editing functions by touching selected characters displayed on the screen.

U.S. Pat. No. 4,646,250 to Childress discloses a data entry screen in which information is displayed that identifies to the user or operator fields where data may or must be entered, such identification taking the form of highlighting. And, U.S. Pat. No. 3,757,037 to Bialek, discloses a catalog system displayed on a CRT with cooperating keyboard for making selections and changes, the display being stored in the form of a tape cassette or cartridge, while U.S. Pat. No. 4,566,001 to Moore et al discloses a combination CTR and keyboard with touch strips along the sides of the CRT to enable the image displayed on the CRT screen to be manipulated.

SUMMARY OF THE INVENTION

In contrast to the prior art, the present invention provides, in a reproduction machine having plural interactive sub-systems cooperable to produce copies from document originals, a screen on which a display of programming selections for programming the machine is pictured; touch responsive means to enable programming selections to be made by touch, the display simulating a card file having plural primary file cards each having an identifying touch tab which when touched opens the primary card selected to display on the screen a second card file having plural secondary file cards with adjacent work area, each secondary file card having an identifying touch tab which when touched opens the secondary card selected to display a plurality of first level touch selections for programming different machine features, touching a first level touch selection displaying a plurality of second level touch selections in the work area for use in programming by touch the machine sub-system; memory means for retaining the programming selections touched; and control means for operating the machine in response to the programming selections stored in the memory means.

The invention further relates to a process for programming a reproduction machine in which there is simulated on a touch sensitive CRT screen a first card file with plural file folders, each file folder when opened displaying for touch access a second relatively smaller card file with plural file cards together with an adjacent work area, each of the file folders and file cards having an identifying touch tab; each of the file cards when opened displaying a plurality of first level program touch selections which when opened display in the work area a job programming file with plural second level program touch selections for programming the machine, comprising the steps of: touching a selected file folder tab to open the file folder associated with the tab and display the second card file associated with the file folder on the screen; touching a selected file card tab displayed on the screen to open the file card associated with the tab and display the first level program touch selections and work area associated with the card file; touching a selected first level program touch selection to display in the work area the second level program touch selections associated with the selected first level program touch selection; and touching selected ones of the second level program touch selections in the work are to provide program input for the machine.

DESCRIPTION OF THE PREFERRED EMBODIMENT

While the present invention will hereafter be described in connection with a preferred embodiment thereof, it will be understood that it is not intended to limit the invention to that embodiment. On the contrary, it is intended to cover all alternatives, modifications, and equivalents, as may be included within the spirit and scope of the invention as defined by the appended claims.

Figure 1:
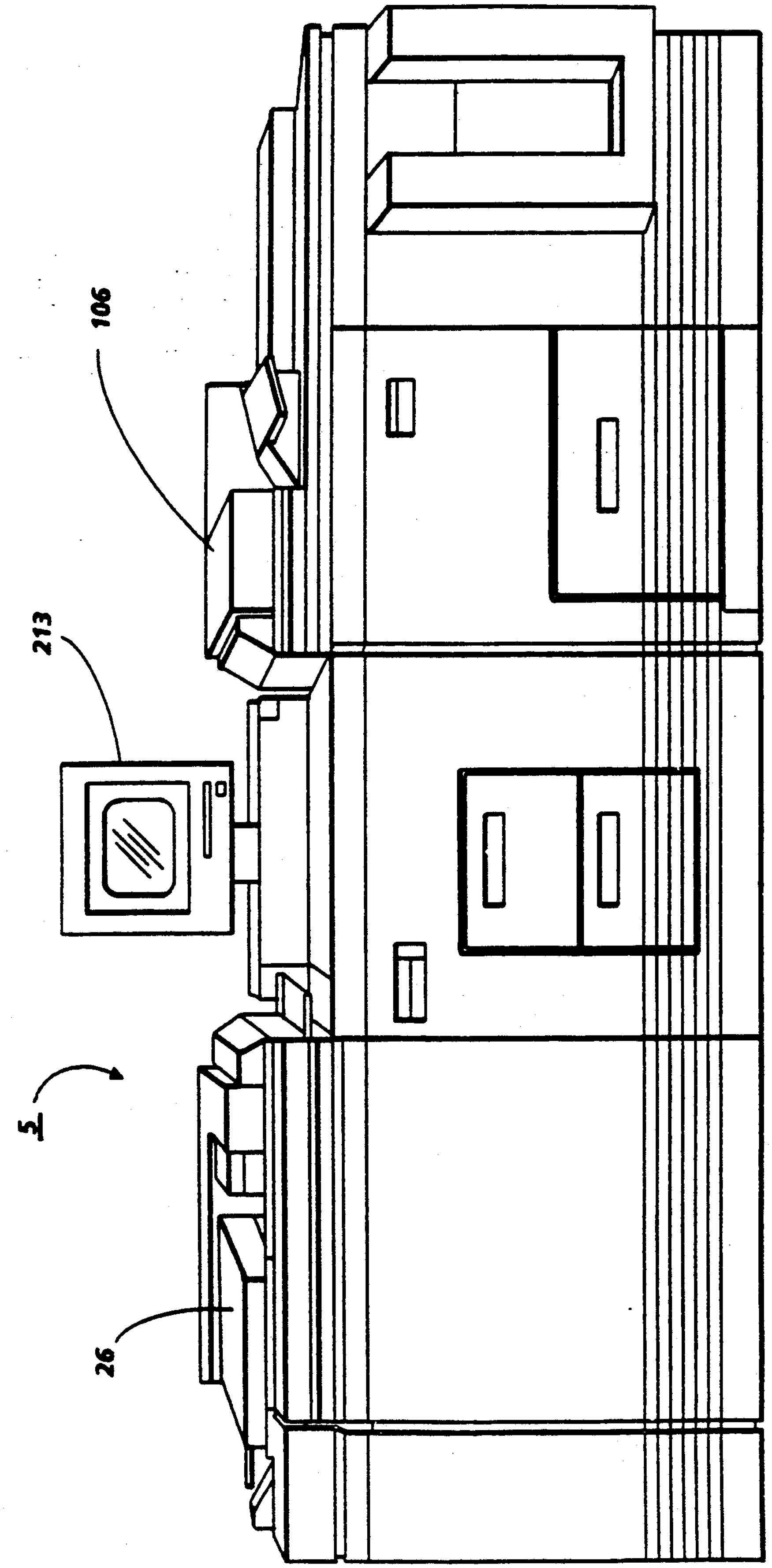
FIG. 1 is an isometric view of an illustrative reproduction machine incorporating the touch dialogue User Interface (U.I.) of the present invention.
Figure 2:
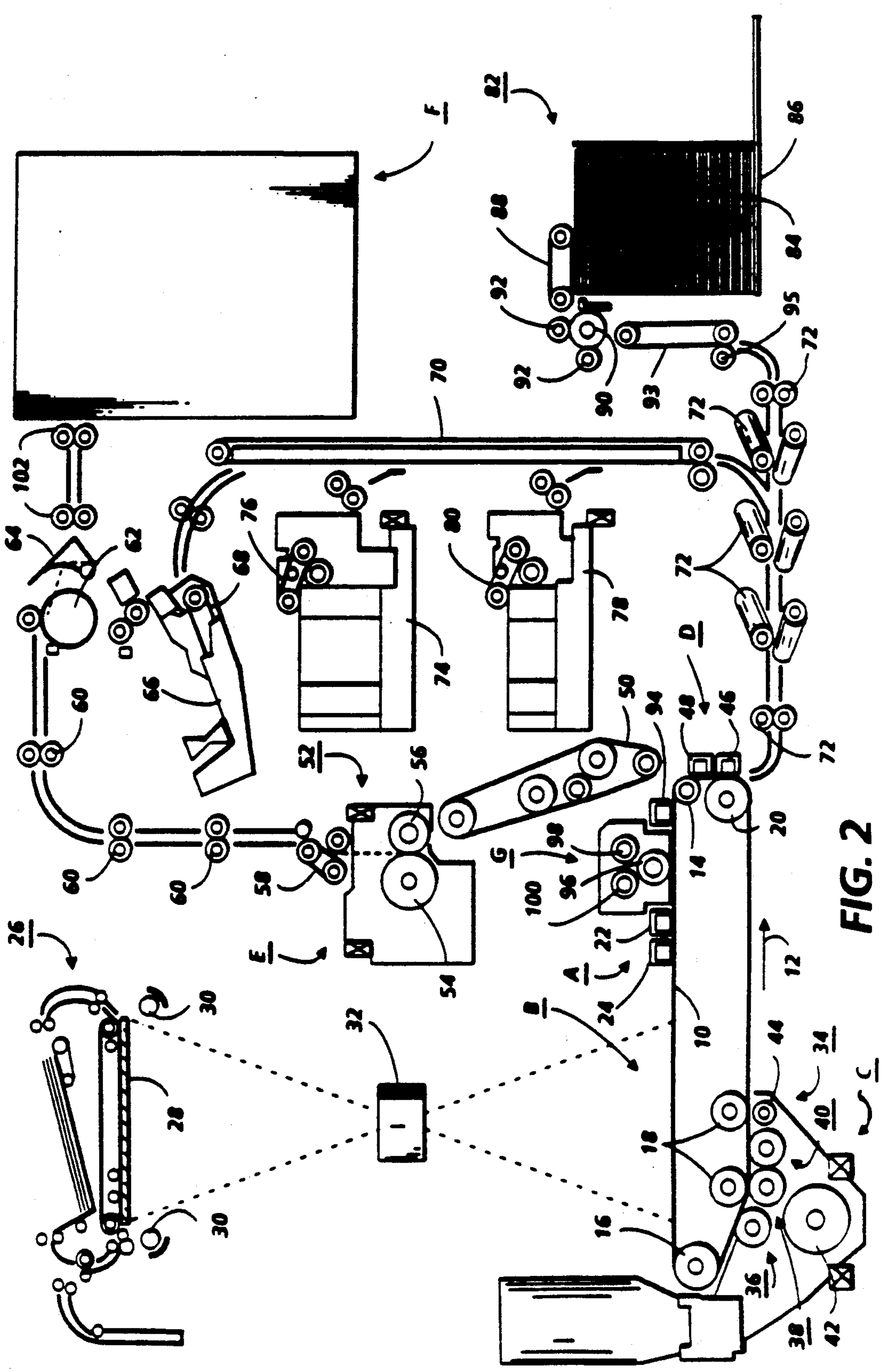
FIG. 2 is a schematic elevational view depicting various operating components and sub-systems of the machine shown in FIG. 1.
Figure 3:
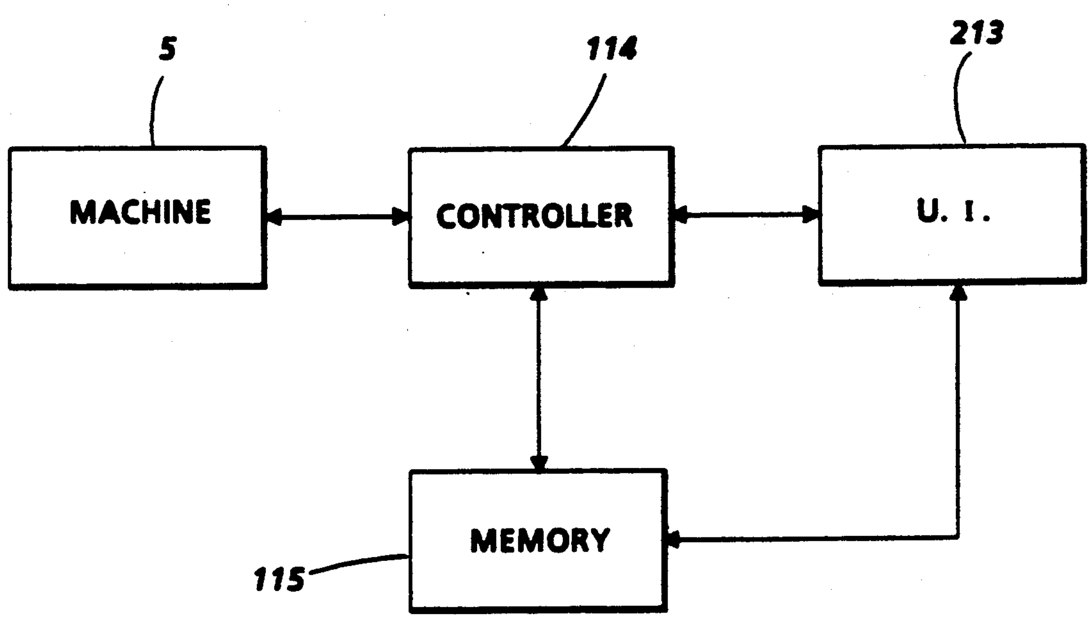
FIG. 3 is a block diagram of the operating control systems and memory for the machine shown in FIG. 1.

For a general understanding of the features of the present invention, reference is made to the drawings. In the drawings, like reference numerals have been used throughout to identify identical elements. Referring to FIGS. 1, 2 and 3, there is shown an electrophotographic reproduction machine 5 composed of a plurality of programmable components and sub-systems which cooperate to carry out the copying or printing job programmed through the touch dialogue User Interface (U.I.) of the present invention. It will become evident from the following discussion that the touch dialogue U.I. of the present invention may be employed in a wide variety of devices and is not specifically limited in its application to the particular embodiment depicted herein.

Machine 5 employs a photoconductive belt 10. Belt 10 is entrained about stripping roller 14, tensioning roller 16, idler rollers 18, and drive roller 20. Drive roller 20 is rotated by a motor coupled thereto by suitable means such as a belt drive. As roller 20 rotates, it advances belt 10 in the direction of arrow 12 through the various processing stations disposed about the path of movement thereof.

Initially, the photoconductive surface of belt 10 passes through charging station A where two corona generating devices, indicated generally by the reference numerals 22 and 24 charge photoconductive belt 10 to a relatively high, substantially uniform potential. Next, the charged photoconductive belt is advantaced through imaging station B. At imaging station B, a document handling unit 26 sequentially feeds documents from a stack of documents in a document stacking and holding tray into registered position on platen 28. A pair of Xenon flash lamps 30 mounted in the optics cavity illuminate the document on platen 28, the light rays reflected from the document being focused by lens 32 onto belt 10 to expose and record an electrostatic latent image on photoconductive belt 10 which corresponds to the informational areas contained within the document currently on platen 28. After imaging, the document is returned to the document tray via a simplex path when either a simplex copy or the first pass of a duplex copy is being made or via a duplex path when a duplex copy is being made.

The electrostatic latent image recorded on photoconductive belt 10 is developed at development station C by a magnetic brush developer unit 34 having three developer rolls 36, 38 and 40. A paddle wheel 42 picks up developer material and delivers it to the developer rolls 36, 38. Developer roll 40 is a cleanup roll while a magnetic roll 44 is provided to remove any carrier granules adhering to belt 10.

Following development, the developed image is transferred at transfer station D to a copy sheet. There, the photoconductive belt 10 is exposed to a pre-transfer light from a stamp (not shown) to reduce the attraction between photoconductive belt 10 and the toner powder image. Next, a corona generating device 46 charges the copy sheet to the proper magnitude and polarity so that the copy sheet is tacked to photoconductive belt 10 and the toner powder image attracted from the photoconductive belt to the copy sheet. After transfer, corona generator 48 charges the copy sheet to the opposite polarity to detack the copy sheet from belt 10.

Following transfer, a conveyor 50 advances the copy sheet bearing the transferred image to fusing station E where a fuser assembly, indicated generally by reference numeral 52 permanently affixes the toner powder image to the copy sheet. Preferably, fuser assembly 52 includes a heated fuser roller 54 and a pressure roller 56 with the powder image on the copy sheet contacting fuser roller 54.

After fusing, the copy sheets are fed through a decurler 58 to remove any curl. Forwarding rollers 60 then advance the sheet via duplex turn roll 62 to gate 64 which guides the sheet to either finishing station F or to duplex tray 66, the latter providing an intermediate or buffer storage for those sheets that have been printed on one side and on which an image will be subsequently printed on the second, opposed side thereof. The sheets are stacked in duplex tray 66 face down on top of one another in the order in which they are copied.

To complete duplex copying, the simplex sheets in tray 66 are fed, in seriatim, by bottom feeder 68 back to transfer station D via conveyor 70 and rollers 72 for transfer of the second toner powder image to the opposed sides of the copy sheets. The duplex sheet is then fed through the same path as the simplex sheet to be advanced to finishing station F.

Copy sheets are supplied from a secondary tray 74 by sheet feeder 76 or from the auxiliary tray 78 by sheet feeder 80. Sheet feeders 76, 80 are friction retard feeders utilizing a feed belt and take-away rolls to advance successive copy sheets to transport 70 which advances the sheets to rolls 72 and then to transfer station D.

A high capacity feeder 82 is the primary source of copy sheets. Tray 84 of feeder 82, which is supported on an elevator 86 for up and down movement, has a vacuum feed belt 88 to feed successive uppermost sheets from the stack of sheets in tray 84 to a take away drive roll 90 and idler rolls 92. Rolls 90, 92 guide the sheet onto transport 93 which in cooperation with idler roll 95 and rolls 72 move the sheet to transfer station station D.

After transfer station D, photoconductive belt 10 passes beneath corona generating device 94 which charges any residual toner particles remaining on belt 10 to the proper polarity. Thereafter, a precharge erase lamp (not shown), located inside photoconductive belt 10, discharges the photoconductive belt in preparation for the next charging cycle. Residual particles are removed from belt 10 at cleaning station G by an electrically biased cleaner brush 96 and two de-toning rolls 98 and 100.

The various functions of machine 5 are regulated by a controller 114 which preferably comprises one or more programmable microprocessors. The controller provides a comparison count of the copy sheets, the number of documents being recirculated, the number of copy sheets selected by the operator, time delays, jam corrections, etc. As will appear, programming and operating control over machine 5 is accomplished through a U.I. 213. Operating and control information, job programming instructions, etc. are stored in a suitable memory 115 which includes both ROM and RAM memory types, the latter being also used to retain jobs programmed through U.I. 213. And while a single memory is illustrated, it is understood that memory 115 may comprise a series of discrete memories. Conventional sheet path sensors or switches may be utilized to keep track of the position of the documents and the copy sheets. In addition, the controller regulates the various positions of the gates depending upon the mode of operation selected.

Figure 4:
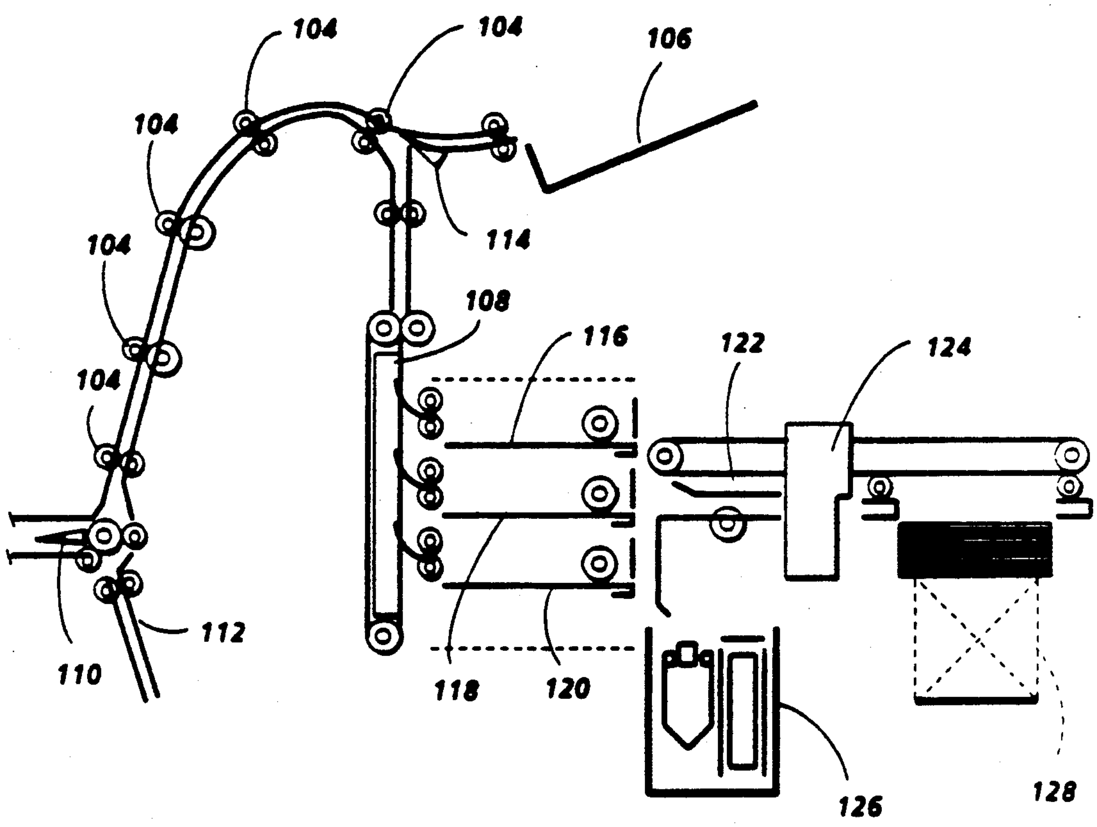
FIG. 4 is a schematic elevational view showing the finishing sub-system of the machine shown in FIG. 1.

Referring now to FIG. 4, finishing station F receives fused copies from rolls 102 (FIG. 2) and delivers them to gate 110. Gate 110 diverts the copy sheet to either registration rolls 104 or inverter 112. Copy sheets diverted to rolls 104 are advanced to gate 114 which diverts the sheets to either the top tray 106 or to a vertical transport 108. Transport 108 transports sheets to any one of three bins 116, 118 or 120 which are used to compile and register sheets into sets. The bins are driven up or down by a bidirectional motor adapted to position the proper bin at the unloading position where a set transport 122 having a pair of set clamps is used to grasp and transport sets from the bins to either sheet stapling apparatus 124 when it is desired to staple the sets, or to binder 126 when it is desired to bind the sets, or to stacker 128 when unfinished sets are desired.

Figure 5:
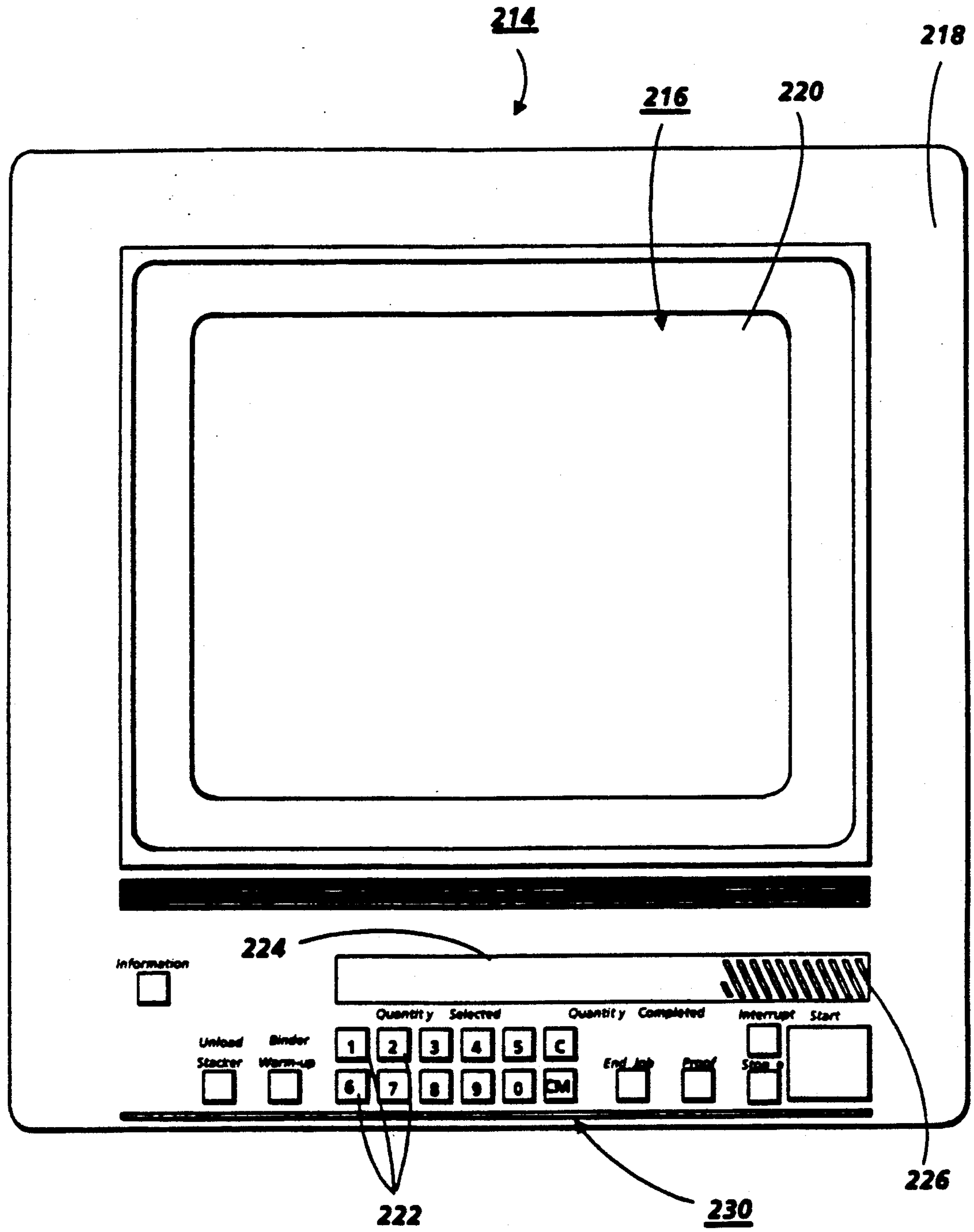
FIG. 5 is a front view of the U.I. color touch monitor showing the soft button display screen and hard button control panel.

Referring to FIG. 5, there is shown the color touch monitor 214 for the touch dialogue U.I. 213 of the present invention. As will appear, monitor 214 provides an operator user interface with hard and soft touch control buttons enabling communication between operator and machine 10. Monitor 214 comprises a suitable color cathode ray tube 216 of desired size and type having a peripheral framework forming a decorative bezel 218 thereabout. Bezel 218 frames a rectangular video display screen 220 on which soft touch buttons in the form of icons or pictograms (seen for example in FIG. 17) and messages are displayed as will appear together with a series of hard control buttons 222 and 10 seven segment displays 224 therebelow. Displays 224 provide a display for copy "Quantity Selected", copy "Quantity Completed", and an area 226 for other information.

Hard control buttons 222 comprise "0–9" buttons providing a keypad 230 for programming copy quantity, code numbers, etc.; a clear button "C" to reset display 224; a "Start" button to initiate print; a clear memory button "CM" to reset all dialogue mode features to default and place a "1" in the least significant digit of display 224; an "Unload Stacker" button requesting transfer of the contents of stacker 128; a "Stop" button to initiate an orderly shutdown of machine 5; a "Binder Warm-up" button to initiate warm-up binder 126; an "Interrupt" button to initiate a job interrupt; a "Proof" button to iniate making of a proof copy; an "End Job" button to end the current job; and an "i" button to initiate a request for information.

Figure 6:
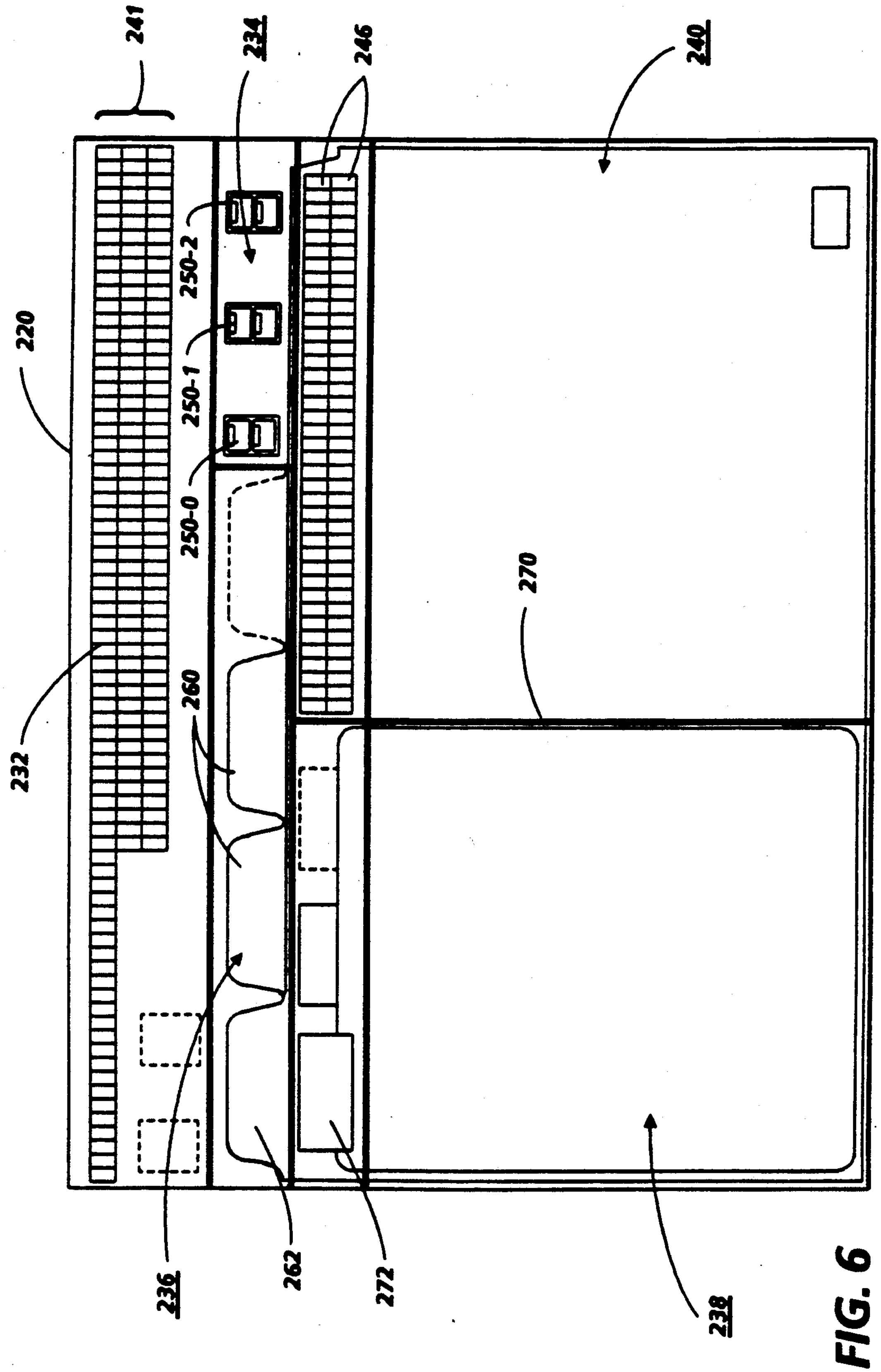
FIG. 6 is a front view of the touch monitor screen with the principal elements of the soft touch dialogue displayed.

Referring now to FIG. 6, for dialogue purposes, screen 220 of monitor 214 is separated into five basic display areas, identified as a message area 232, a dialogue mode selection area 234, a dialogue pathway selection area 236, a scorecard selection area 238, and a work selection area 240.

Message area 232 consists of 3 lines 241 located at the top of screen 220. In addition, two programming conflict message lines 246 are provided in work selection area 240. The dialogue mode selection area 234 comprises an active area containing certain top level dialogue mode controls available to the operator. The mode controls are soft touch buttons 250-0, 250-1, and 250-2 in the form of icons representing file cabinets located on the right side of the screen 220 directly below message area 232.

The dialogue pathway selection area 236 and the scorecard selection area 238 basically simulate a card within a card filing system with primary dialogue pathway file folders 260 and secondary file cards, the latter being referred to as scorecards 270. As will appear, scorecards 270 provide additional programming pathway options. File folders 260 and scorecards 270 are arranged in overlaying relation one in front of the other. The dialogue pathway file folders 260, which are located beneath message area 232 and which extend up into the dialogue mode area 234, each have an outwardly projecting touch tab 262 along the top edge identifying the dialogue pathway represented by the folder, as for example STANDARD, FANFOLD, OVERSIZED, etc. (see FIG. 17 for example). To allow the file folders 260 to be distinguished from one another without the need to reshuffle the folders each time it is desired to display a folder hidden behind the folder currently displayed, each tab 262 is offset from the other so that tabs 262 are always visible whatever folder is displayed.

Figure 17:
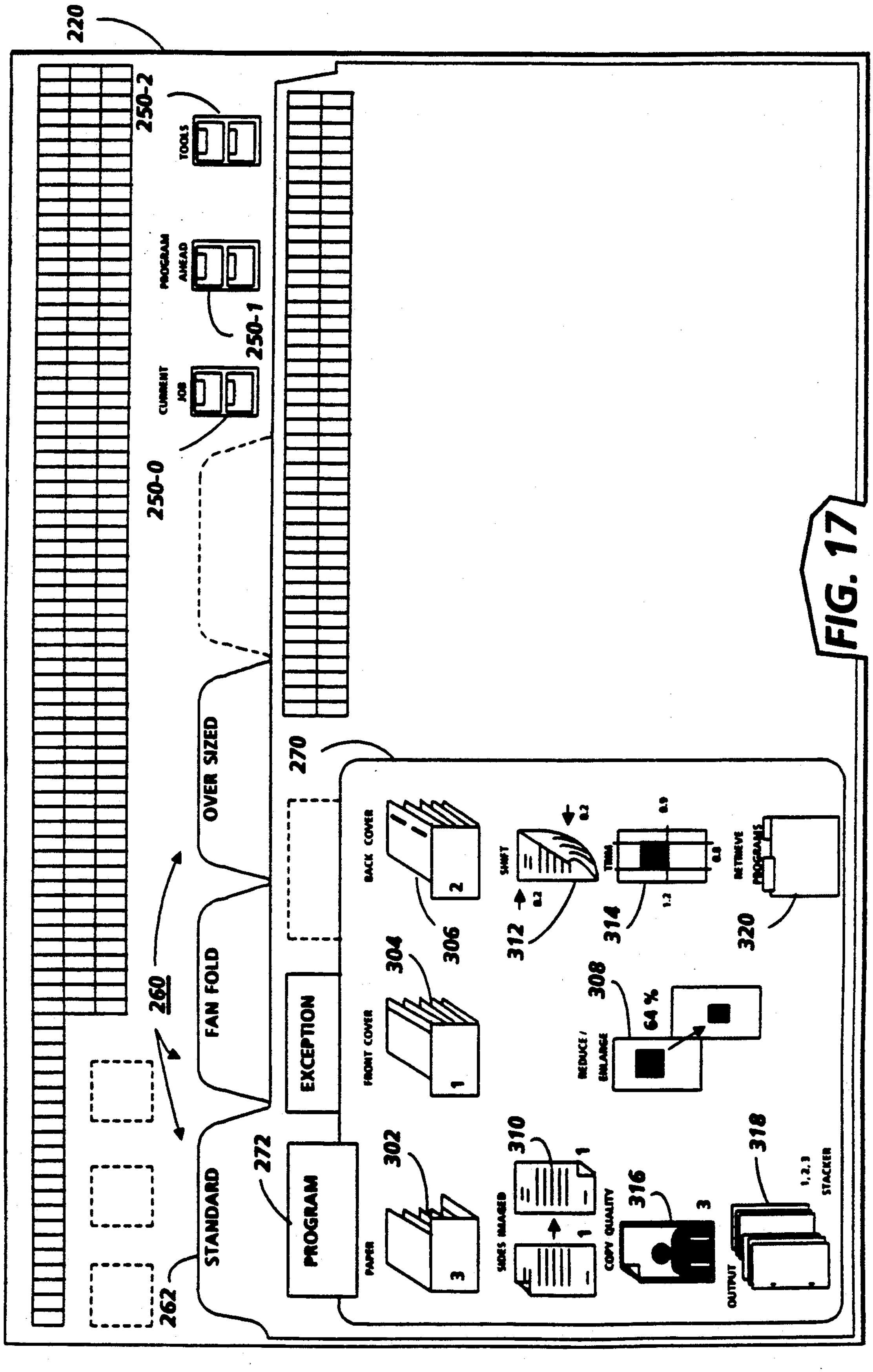
FIG. 17 is a front view depicting the touch monitor screen display in the CURRENT job mode following touch selection of the STANDARD file folder.

Scorecard selection area 238 appears in the lower left corner of screen 220 beneath dialogue selection area 234 and extends to the border of work selection area 240. Scorecard selection area 238 contains a file of scorecards 270 which present the features (first level program selections) available with each of the dialogue pathway file folders 260. As seen in FIG. 17 for example, area 238 displays the features (first level program) selections) resident with the currently selected scorecard, such selections remaining at previously selected options until either timeout or the "CM" button (FIG. 5) is pressed. Two or three scorecards 270 are typically provided, depending on the dialogue pathway file folder 260 selected. Scorecards 270 each comprise a relatively small file card arranged in overlaying relation to one another so as to simulate a second but smaller card file. Each scorecard 270 has a touch tab 272 displaying the programming pathway options available with the scorecard, such as PROGRAM, EXCEPTION, etc. Scorecard tabs 272 are offset from one another to enable the identity of each scorecard to be determined whatever its position in the scorecard file. Additionally, scorecard tabs 272 are shaped different than the dialogue pathway file folder tabs 262 to prevent confusion.

Figure 18:
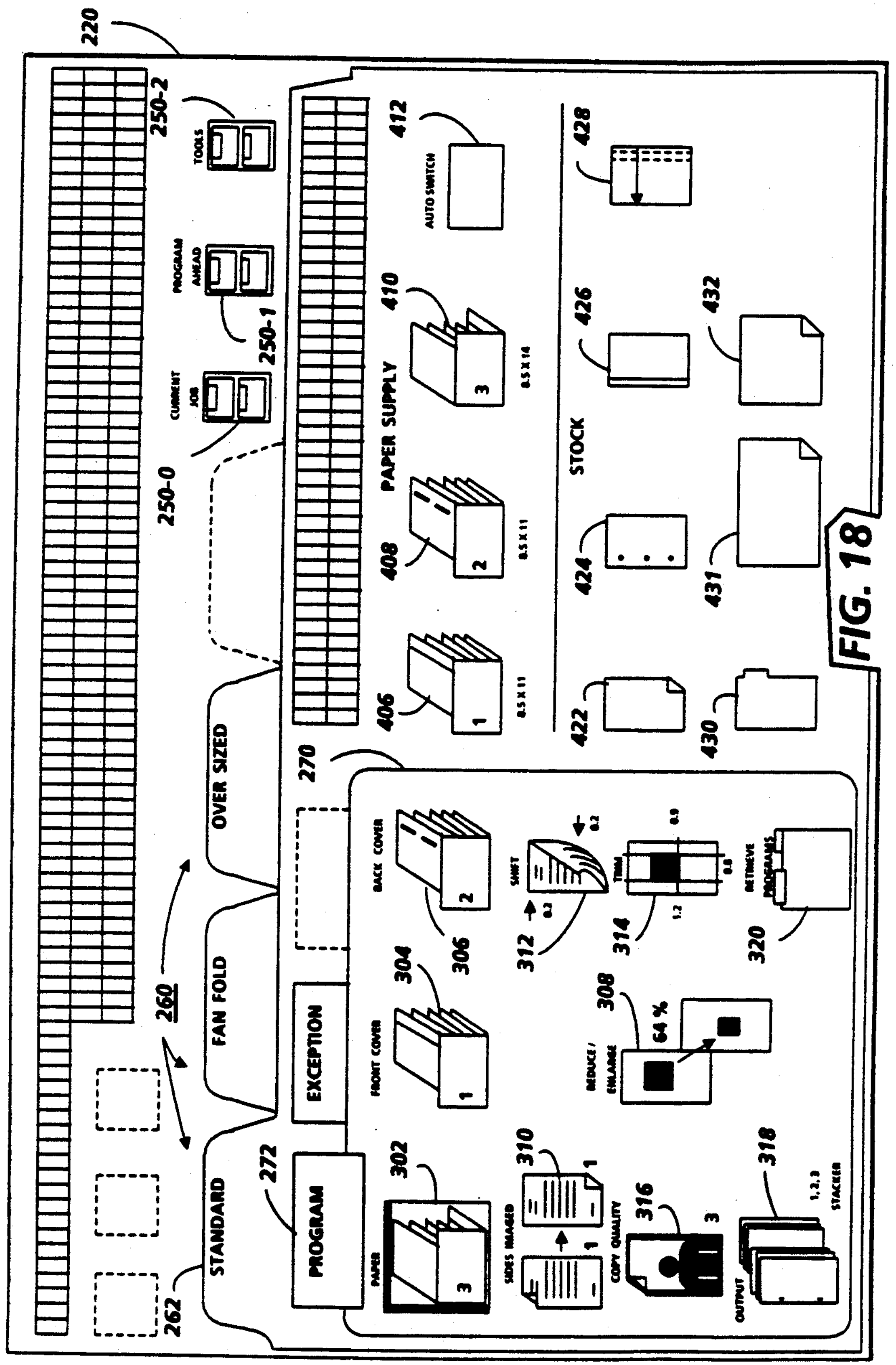
FIG. 18 is a front view of the touch monitor screen shown in FIG. 17 depicting the touch selection icons that are displayed in the work area as a result of touch selection of the PAPER icon on the PROGRAM scorecard.
Figure 19:
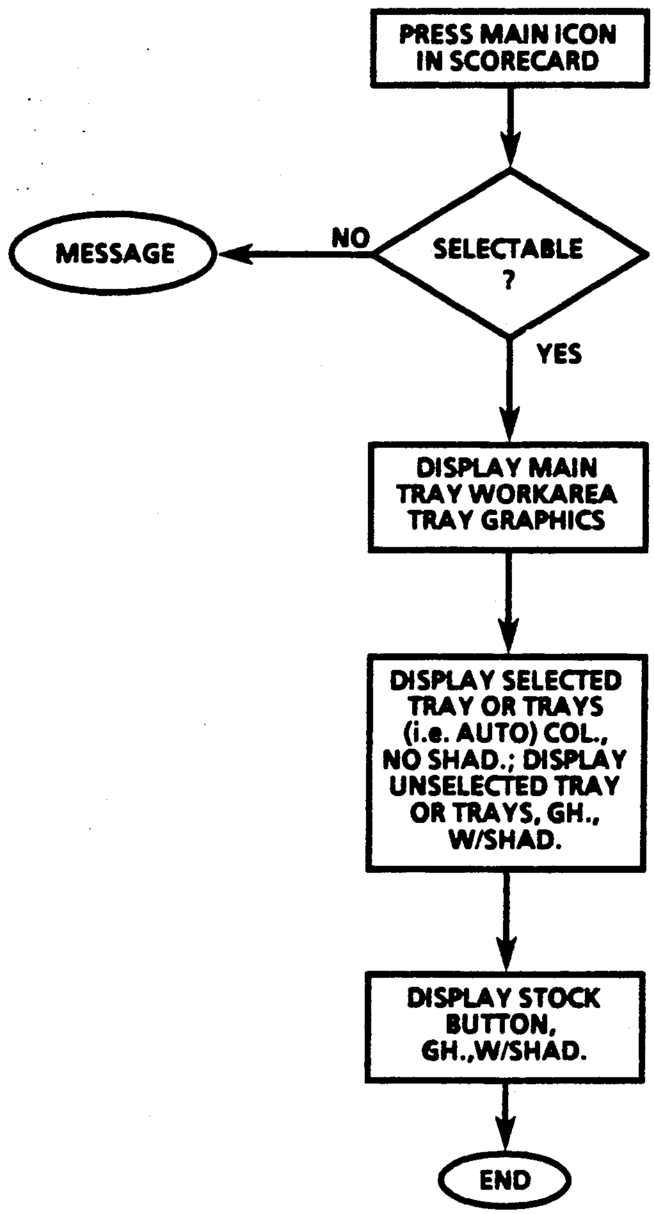
FIG. 19 is flow chart of the Top Level Entry sequence resulting from touch selection of the PAPER icon shown in FIG. 18.
Figure 20:
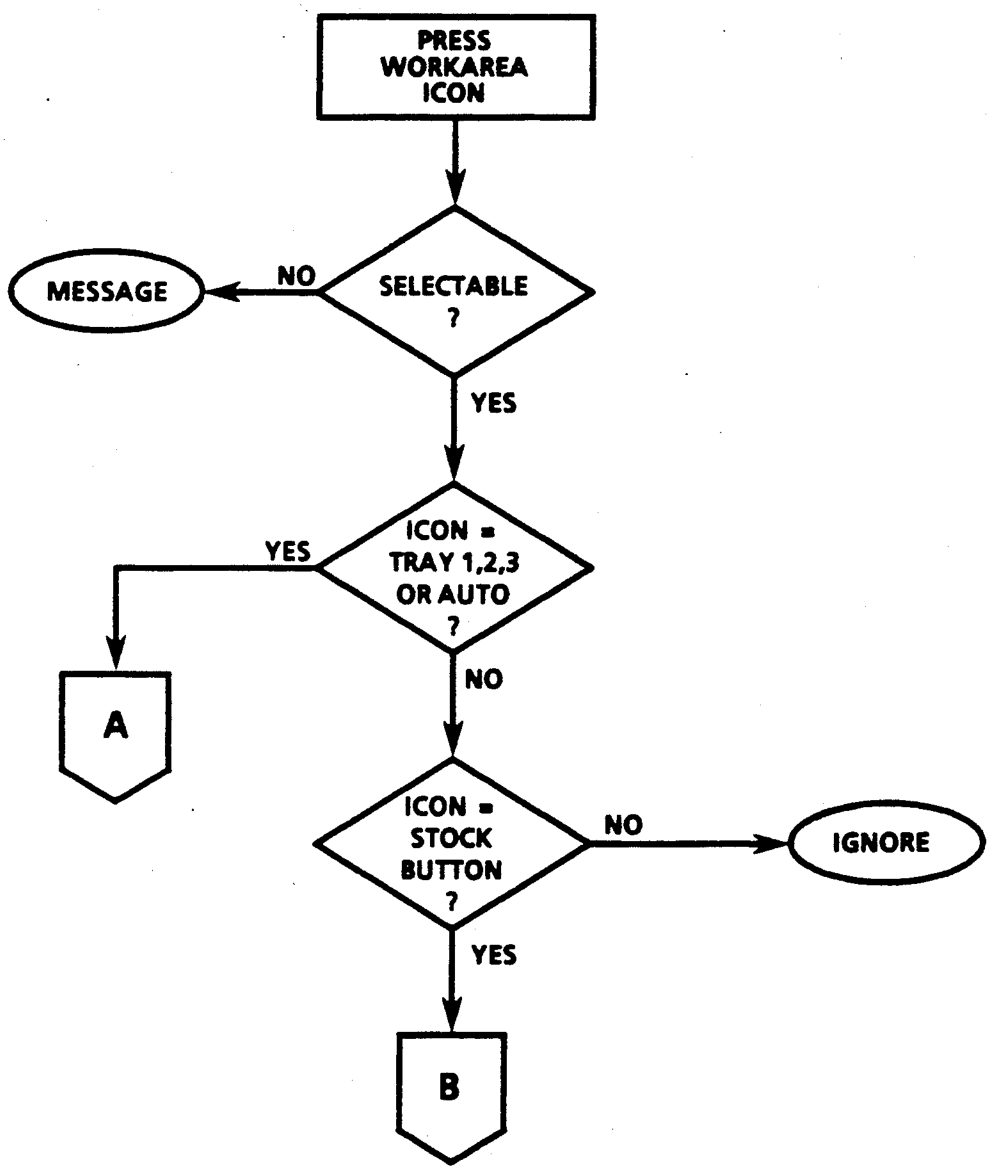
FIG. 20 is a flow chart of the Workarea Activity resulting from touch selection of a PAPER SUPPLY or STOCK icon shown in FIG. 18.
Figure 21:
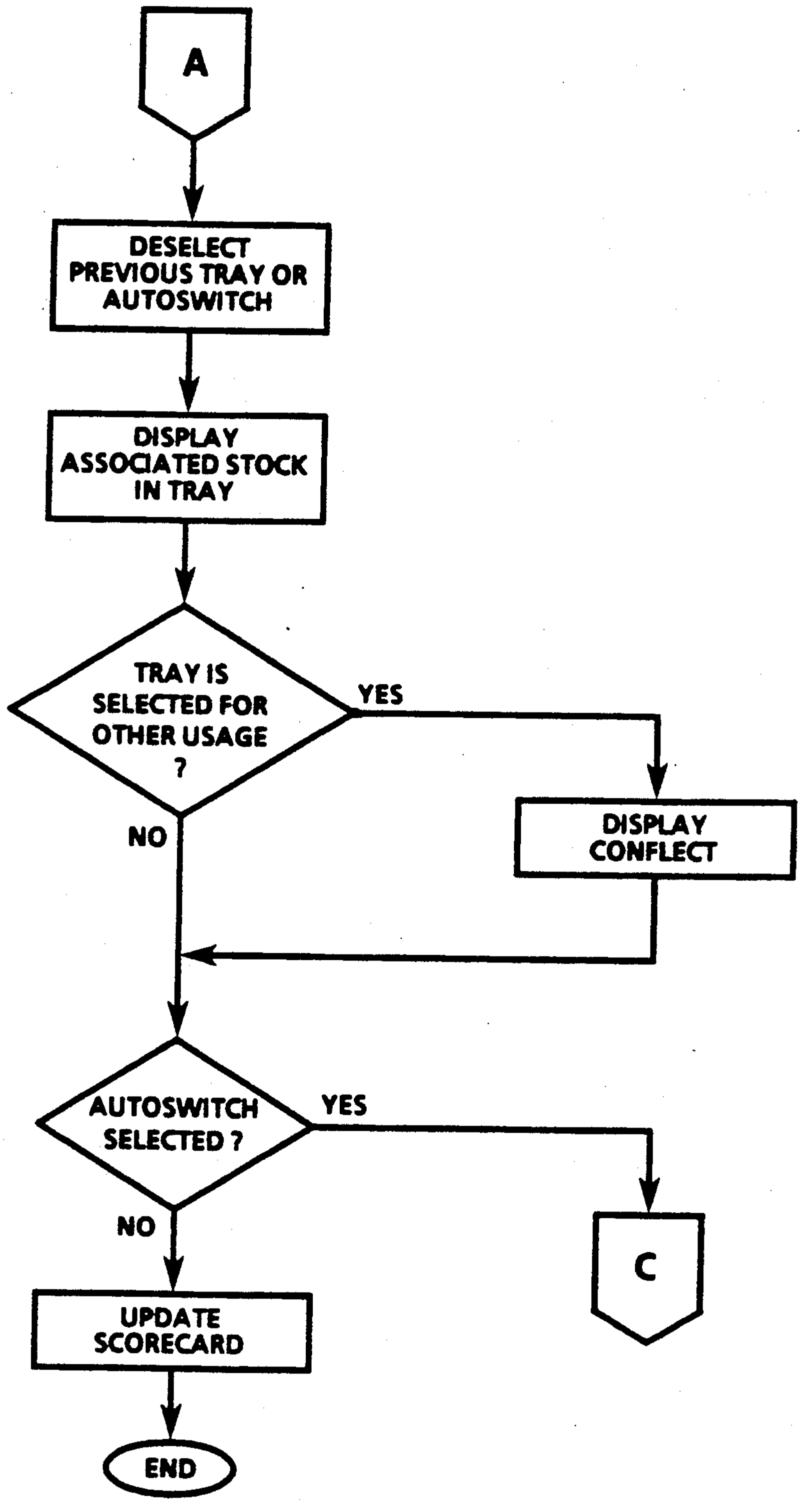
FIG. 21 is a flow chart of the Tray Selection sequence resulting from touch selection of one of the PAPER SUPPLY icons shown in FIG. 18.
Figure 22:
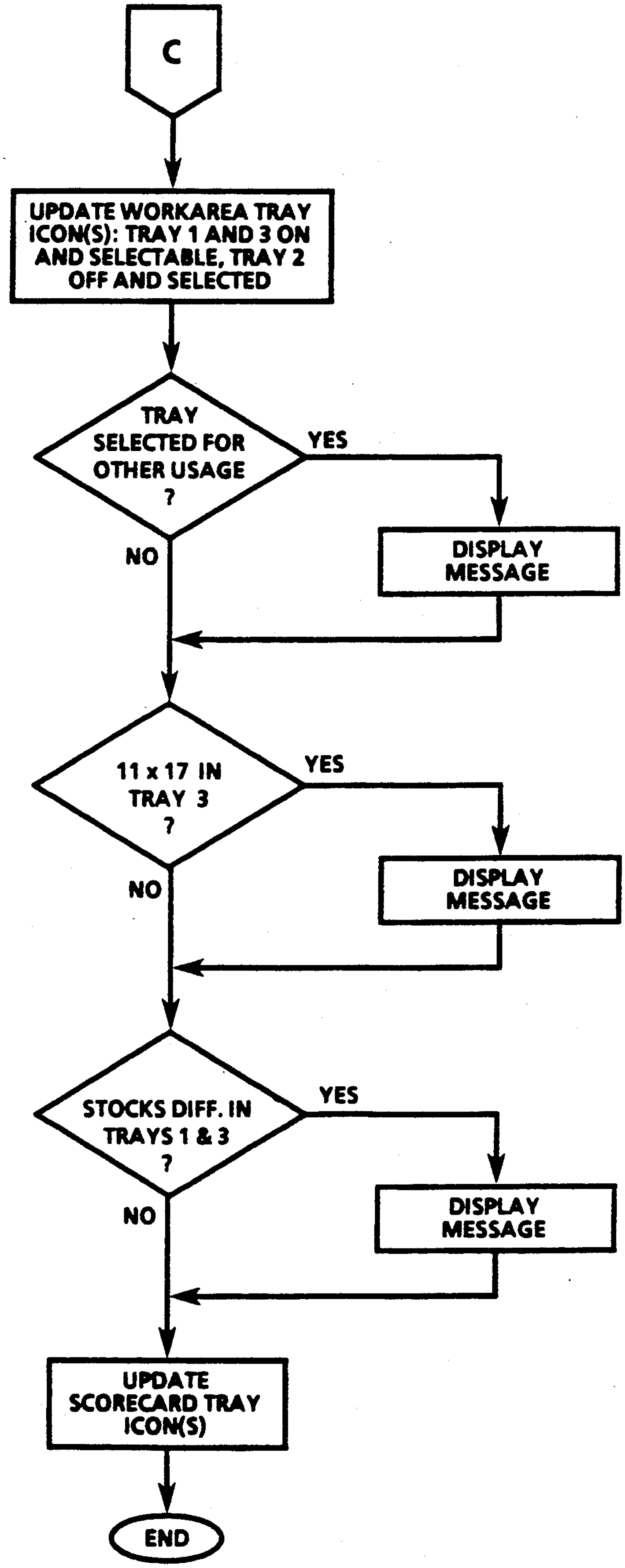
FIG. 22 is a flow chart of the Autoswitch Selection sequence resulting from touch selection of the AUTOSWITCH icon shown in FIG. 18.
Figure 23:
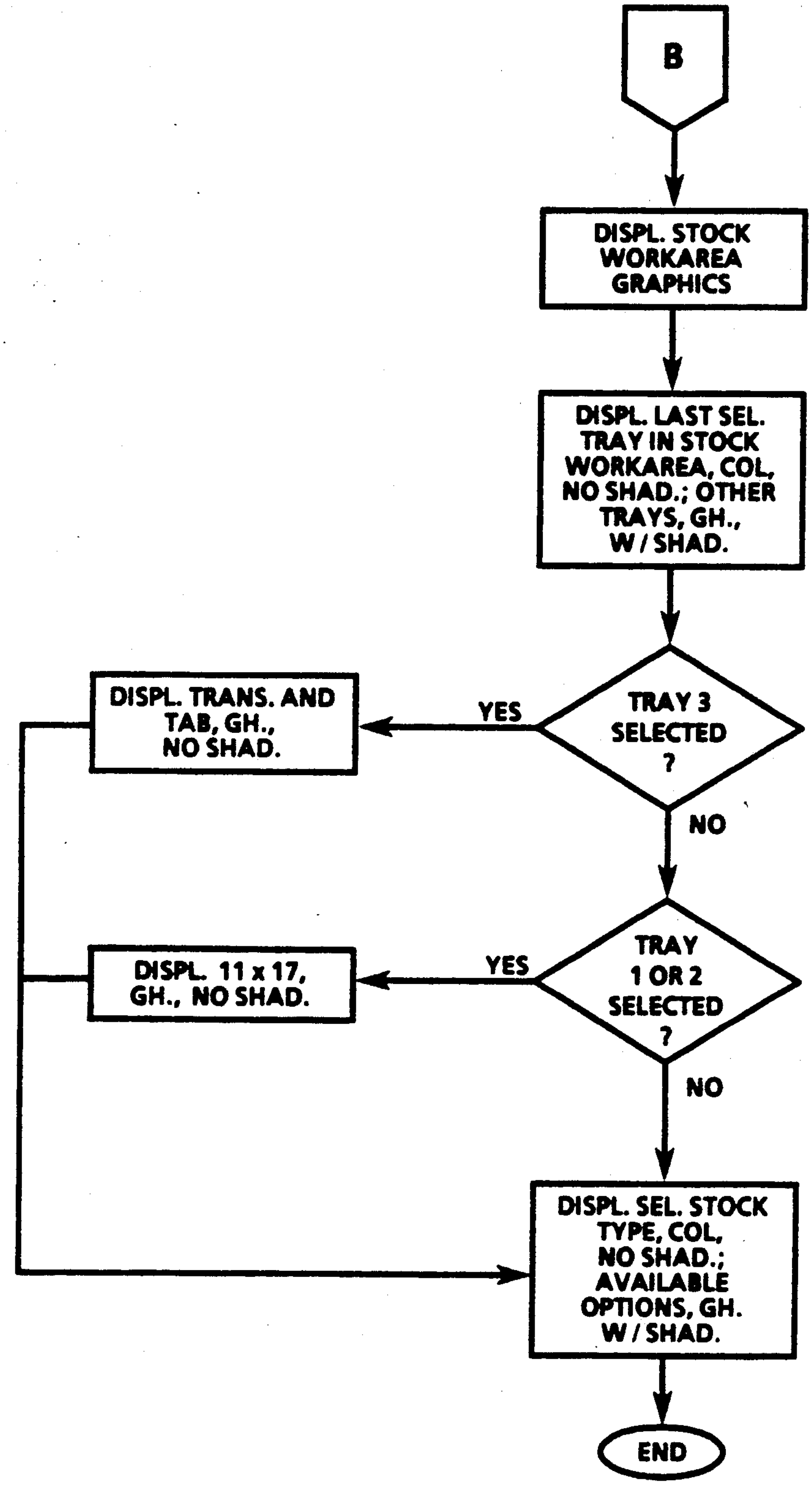
FIG. 23 is a flow chart of the Top Level Entry Display sequence resulting from touch selection of one of the STOCK icons shown in FIG. 18.
Figure 24:
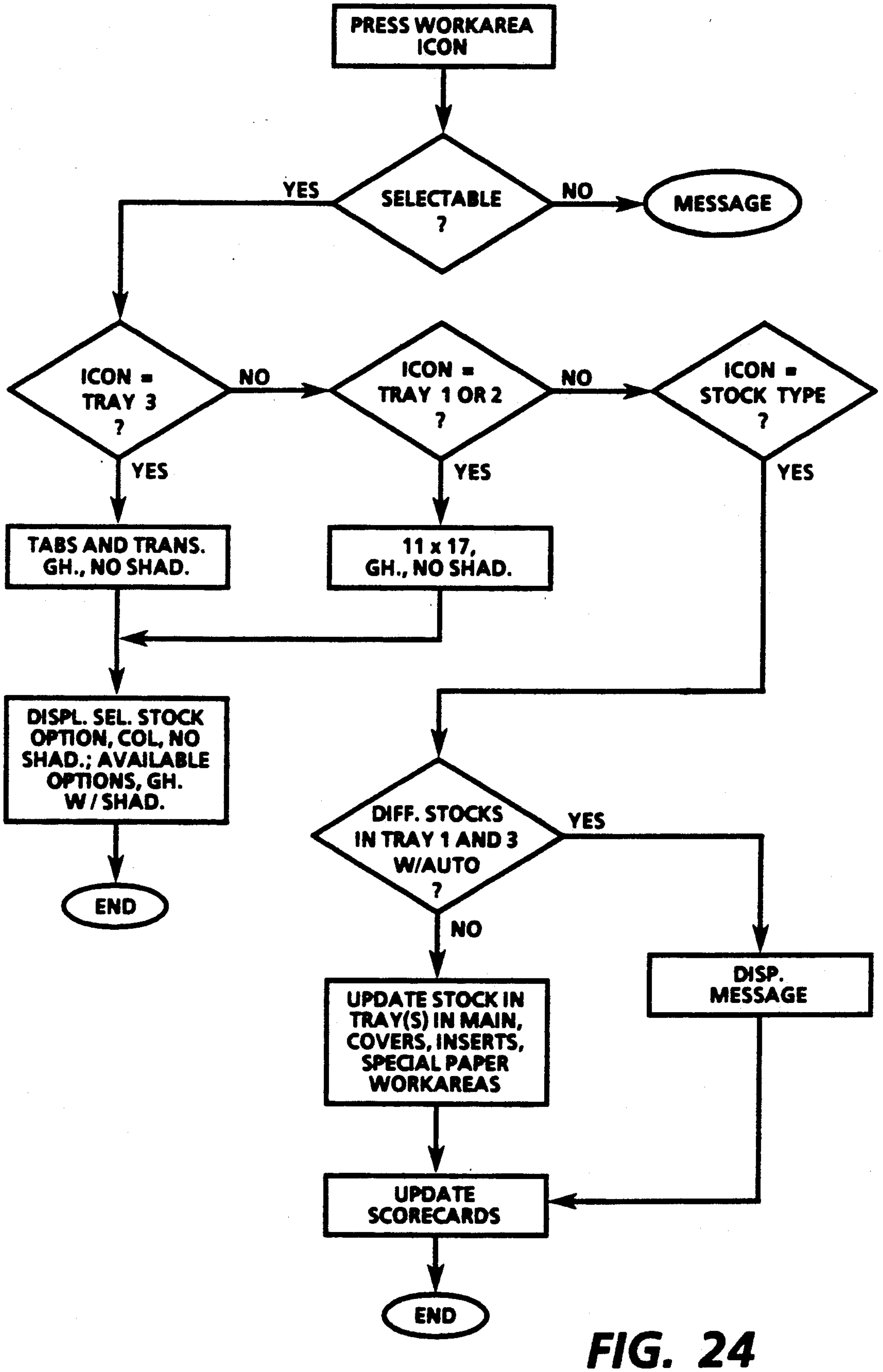
FIG. 24 is a flow chart of the Workarea activity resulting from touch selection of one of the STOCK icons shown in FIG. 18.
Figure 25:
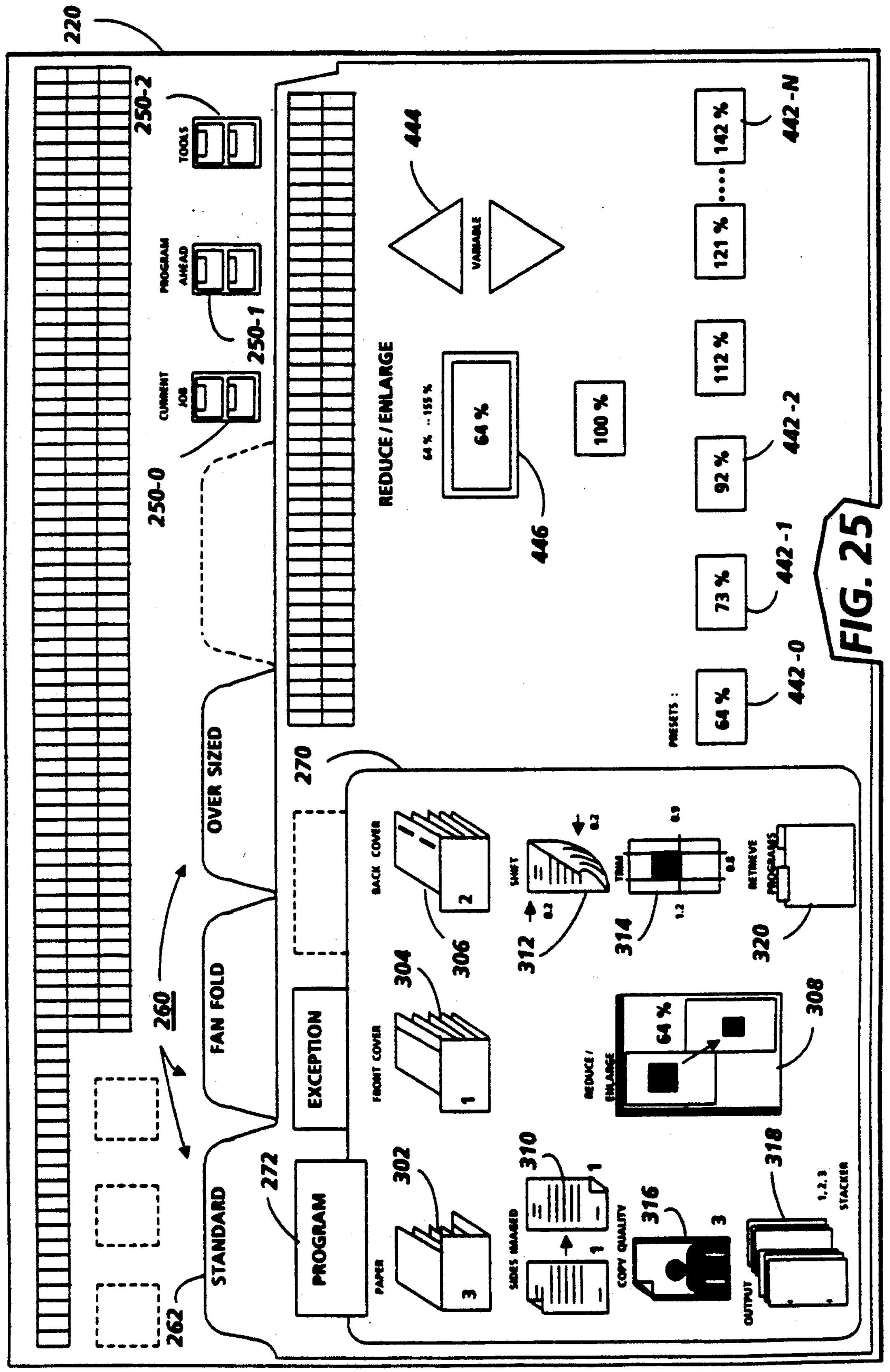
FIG. 25 is a front view of the touch monitor screen shown in FIG. 17 depicting the touch selection icons that are displayed in the work area as a result of touch selection of the REDUCE/ENLARGE icon on the PROGRAM scorecard.
Figure 26:
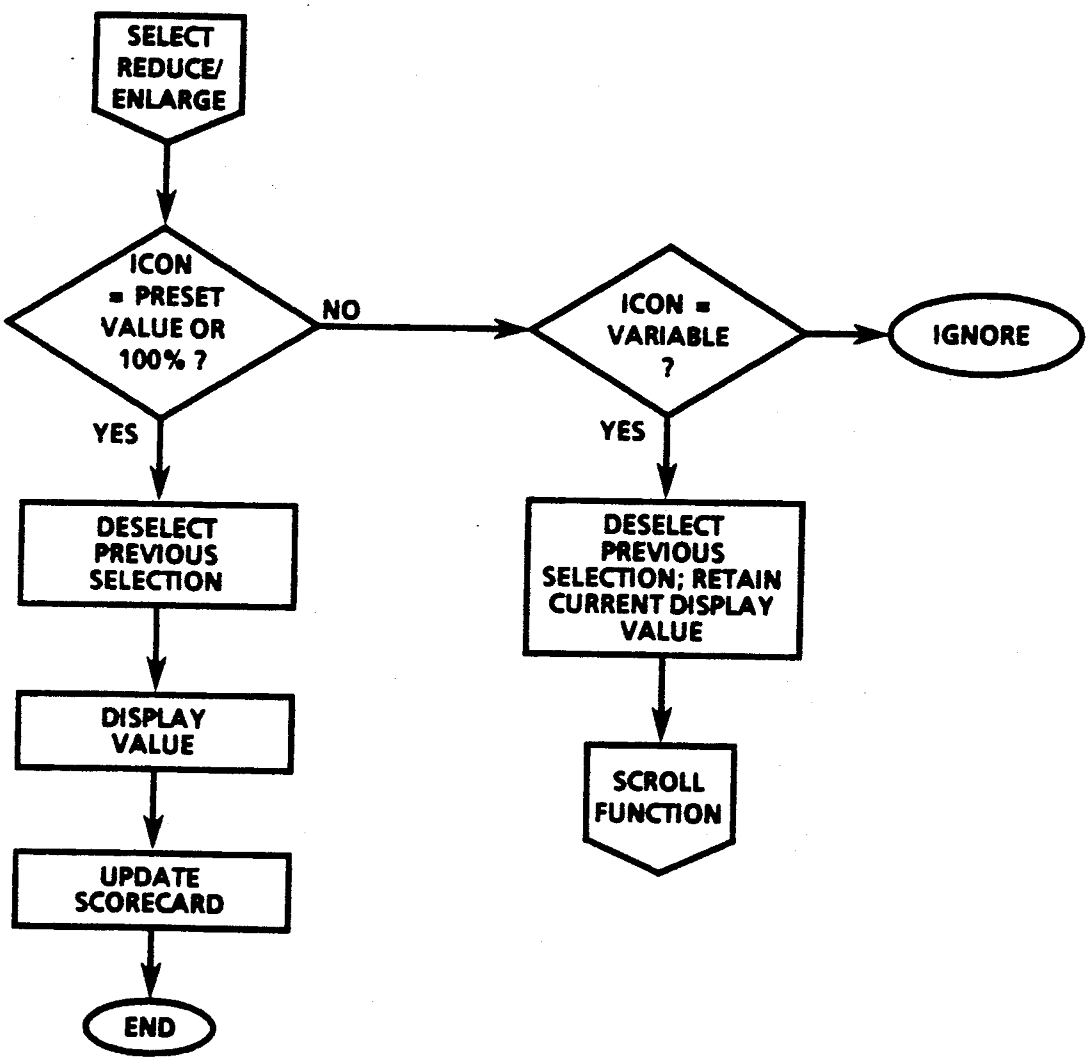
FIG. 26 is a flow chart of the workarea activity resulting from touch selection of one of the REDUCED-/ENLARGE selection icons shown in FIG. 25.
Figure 27:
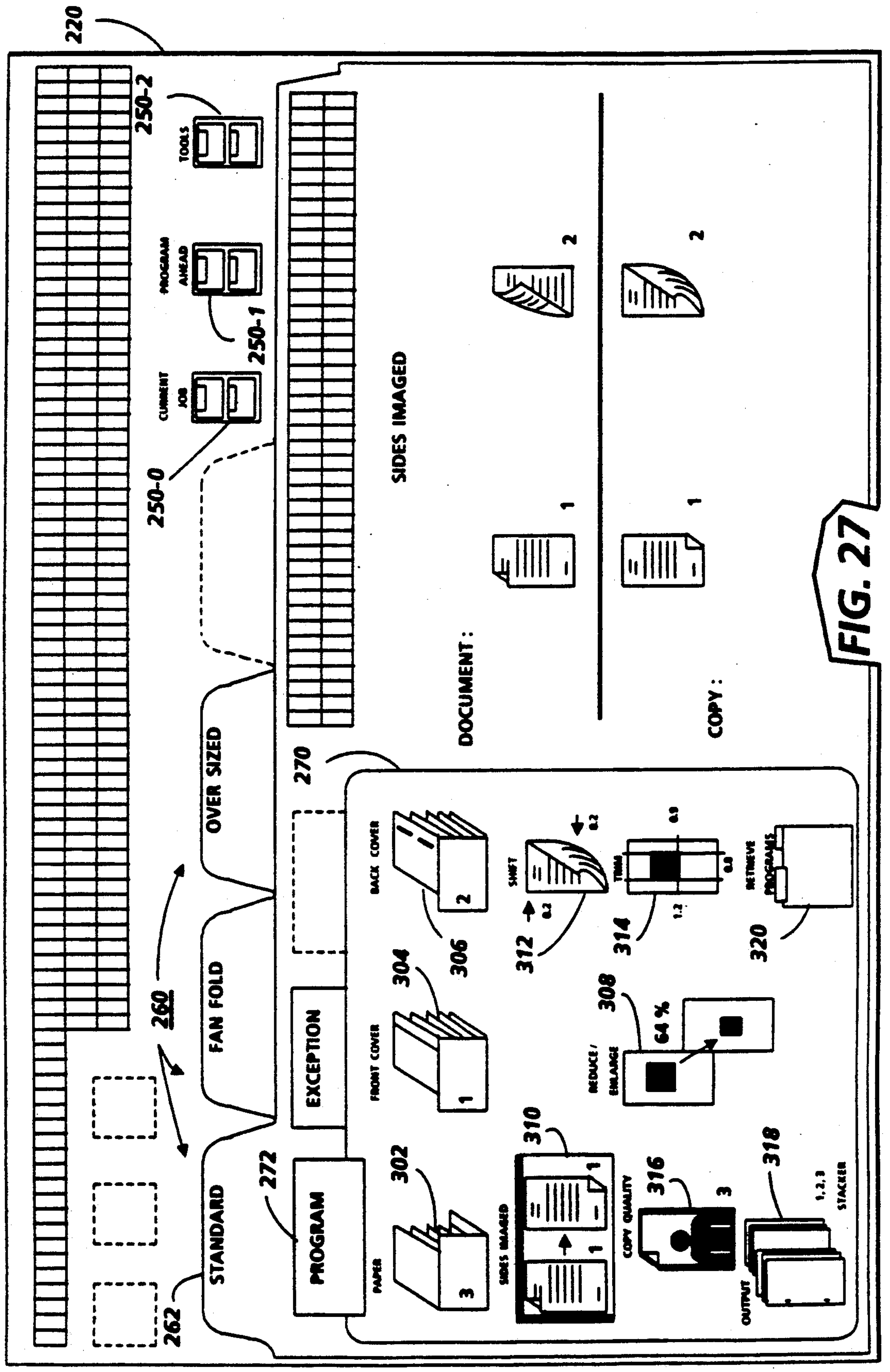
FIG. 27 is a front view of the touch monitor screen shown in FIG. 17 depicting the touch selection icons that are displayed in the work area as a result of touch selection of the SIDES IMAGED icon on the PROGRAM scorecard.
Figure 28:
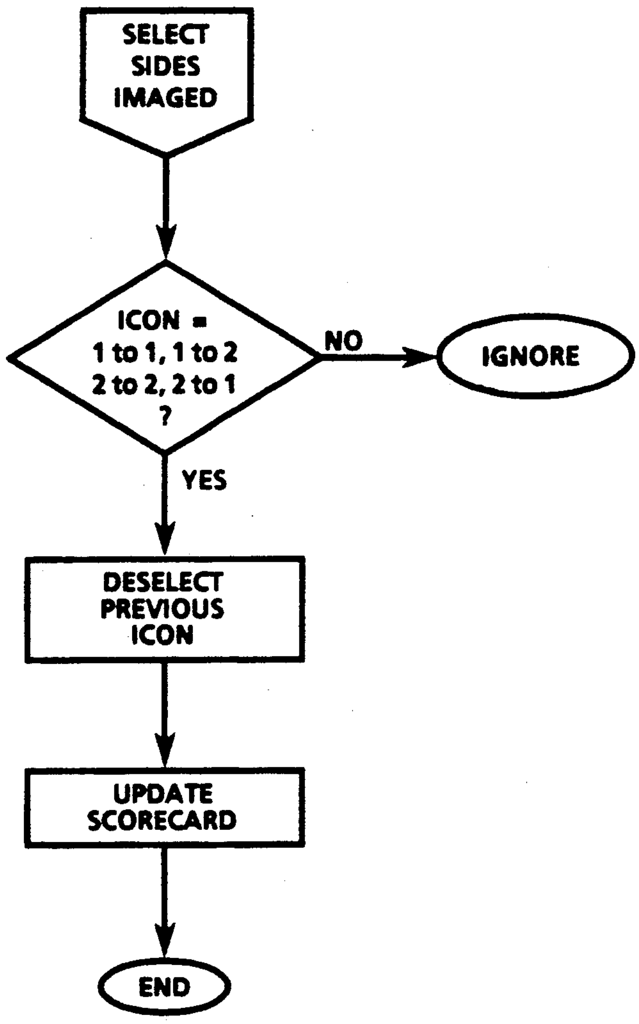
FIG. 28 is a flow chart of the Sides Imaged Selection sequence resulting from touch selection of one of the SIDES IMAGED icons shown in FIG. 27.
Figure 29:
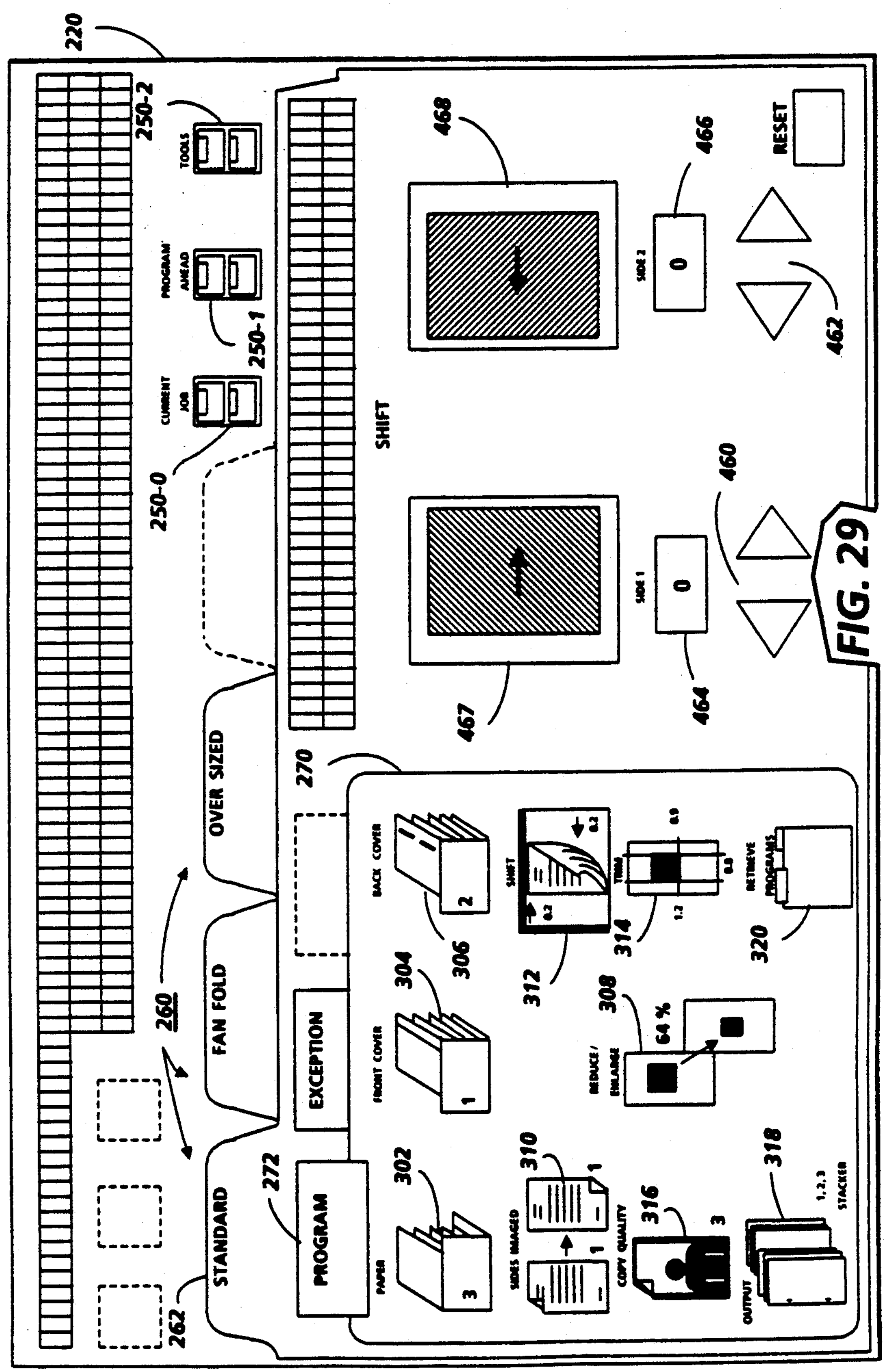
FIG. 29 is a front view of the touch monitor screen shown in FIG. 17 depicting the touch selection icons that are displayed in the work area as a result of touch selection of the SHIFT icon on the PROGRAM scorecard.
Figure 30:
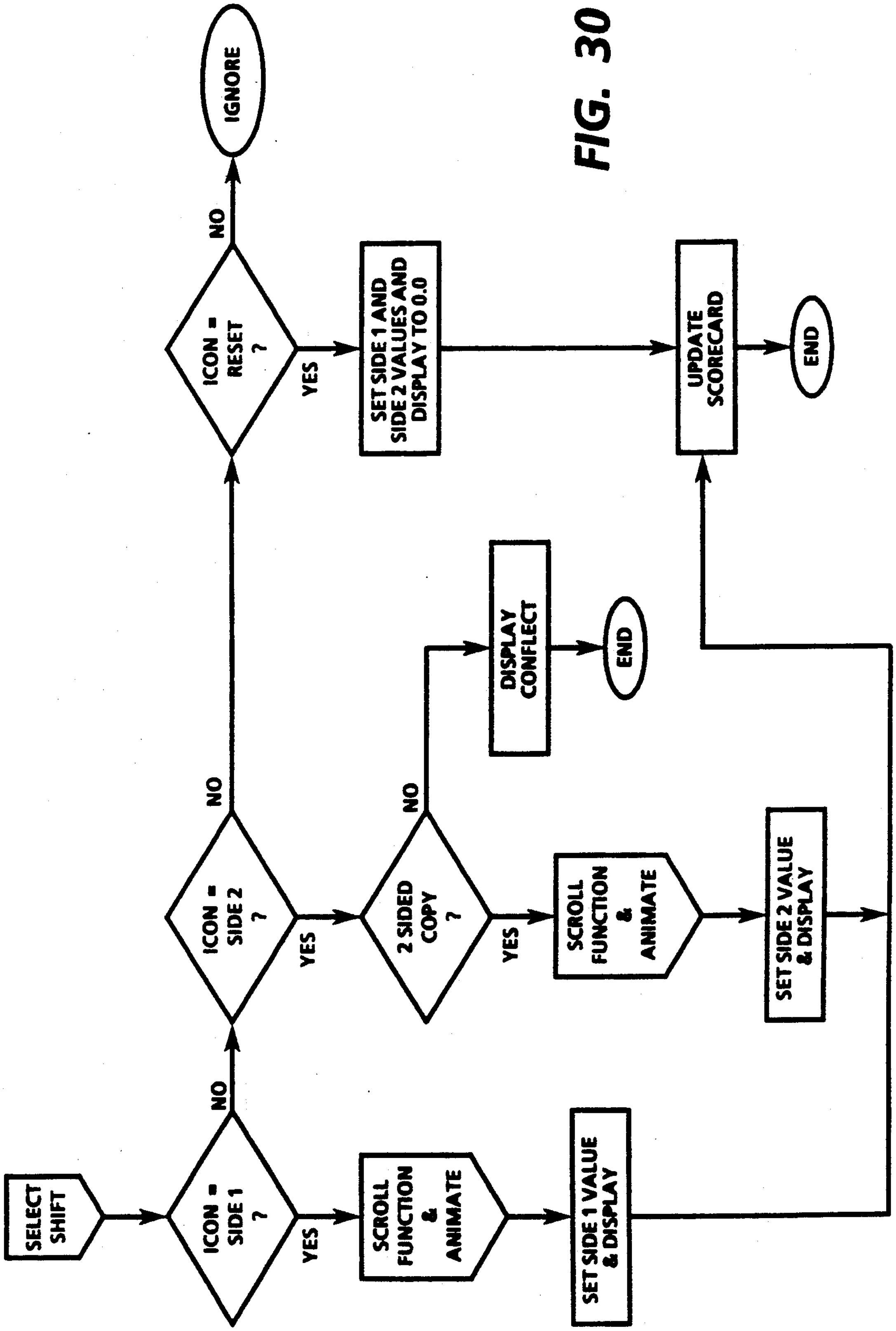
FIG. 30 is a flow chart of the SHIFT Work Area Selections resulting from touch selection of one of the SHIFT icons shown in FIG. 29.
Figure 31:
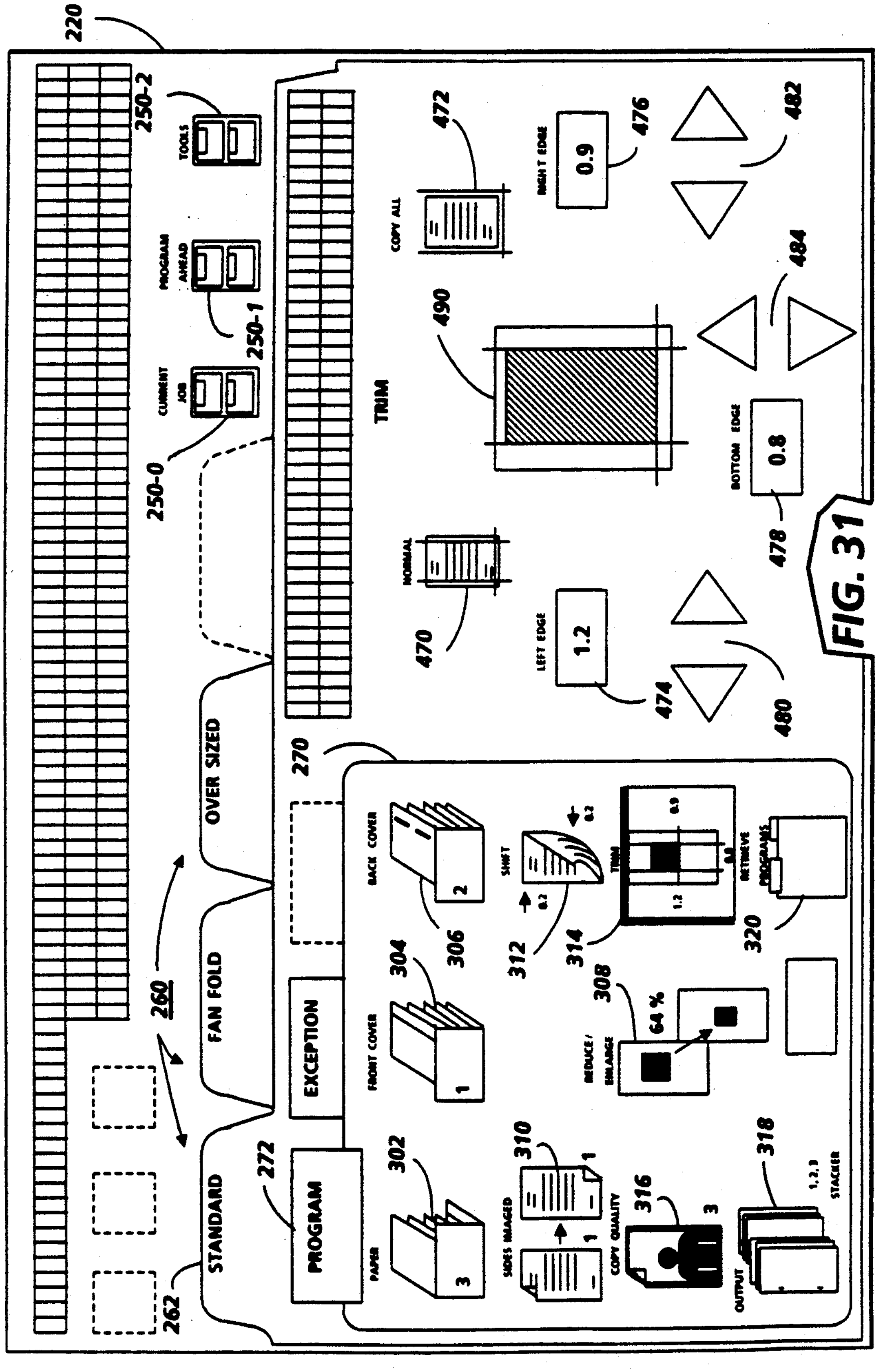
FIG. 31 is a front view of the touch monitor screen shown in FIG. 17 depicting the touch selection icons that are displayed in the work area as a result of touch selection of the TRIM icon on the PROGRAM scorecard.
Figure 32:
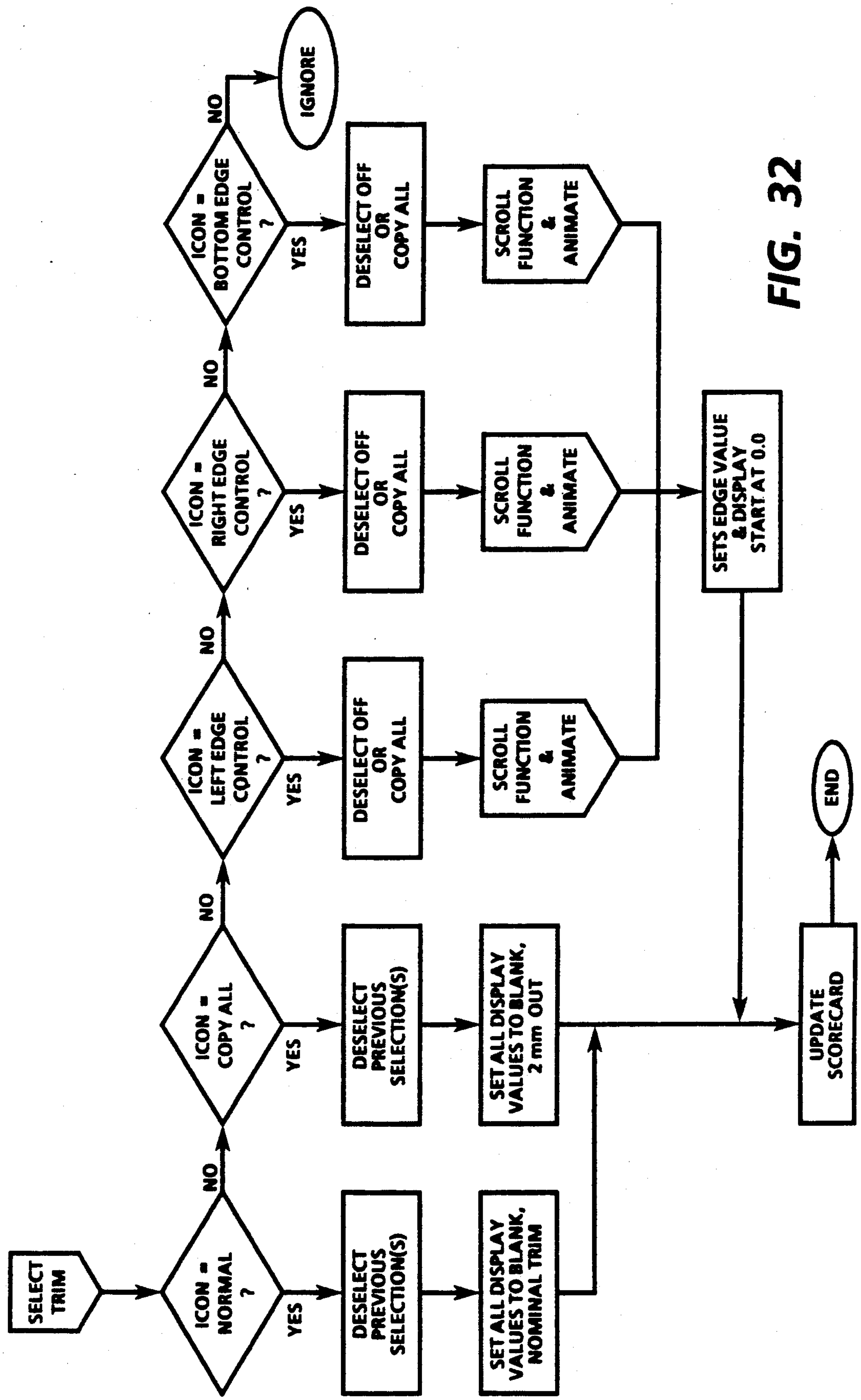
FIG. 32 is a flow chart of the TRIM Work Area Selections resulting from touch selection of one of the TRIM icons shown in FIG. 31.
Figure 33:
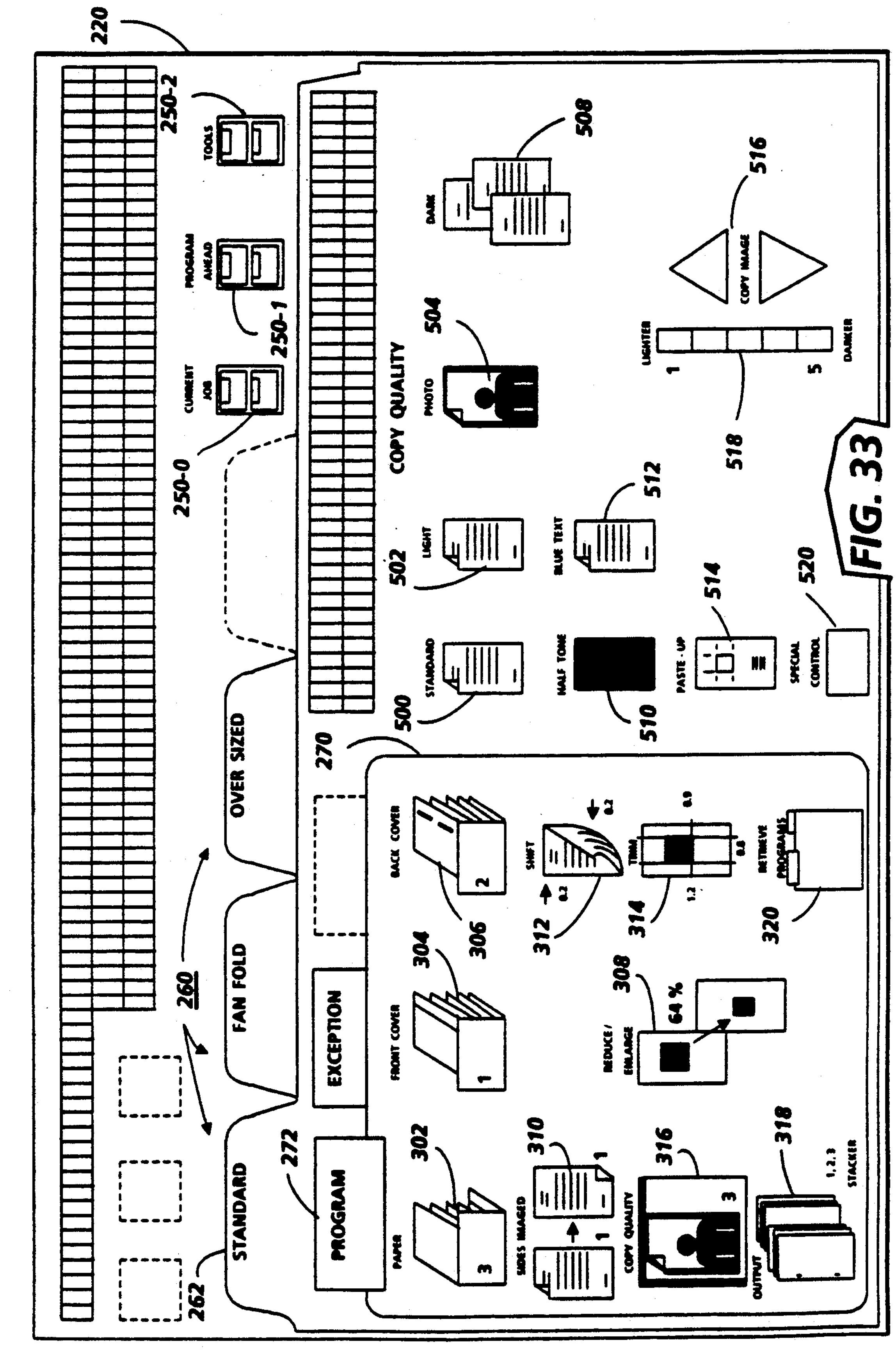
FIG. 33 is a front view of the touch monitor screen shown in FIG. 17 depicting the touch selection icons that are displayed in the work area as a result of touch selection of the COPY QUALITY icon on the PROGRAM scorecard.
Figure 34:
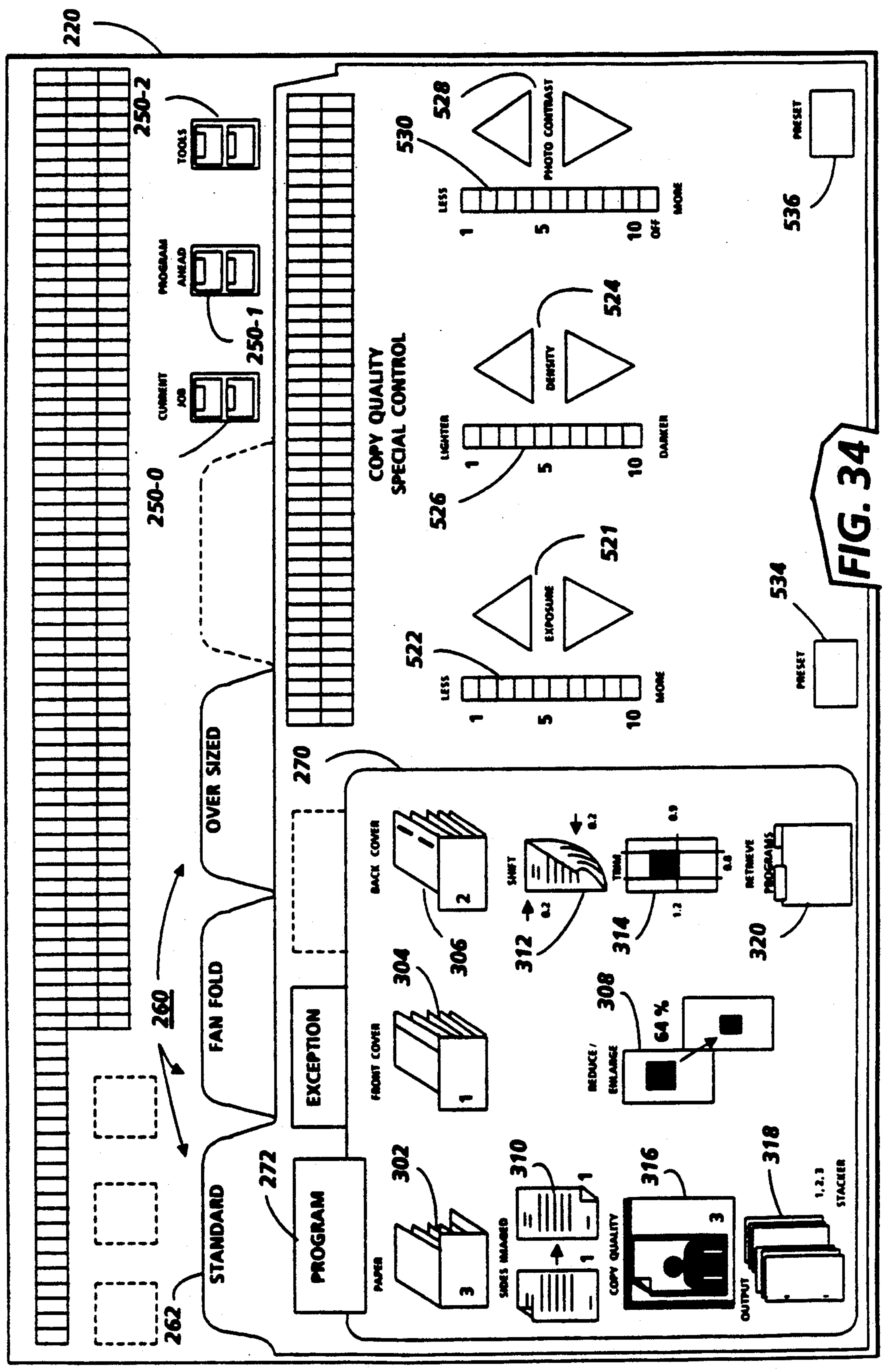
FIG. 34 is a front view of the touch monitor screen depicting the touch selection icons that are displayed in the work area as a result of touch selection of the SPECIAL CONTROL icon shown in FIG. 33.
Figure 35:
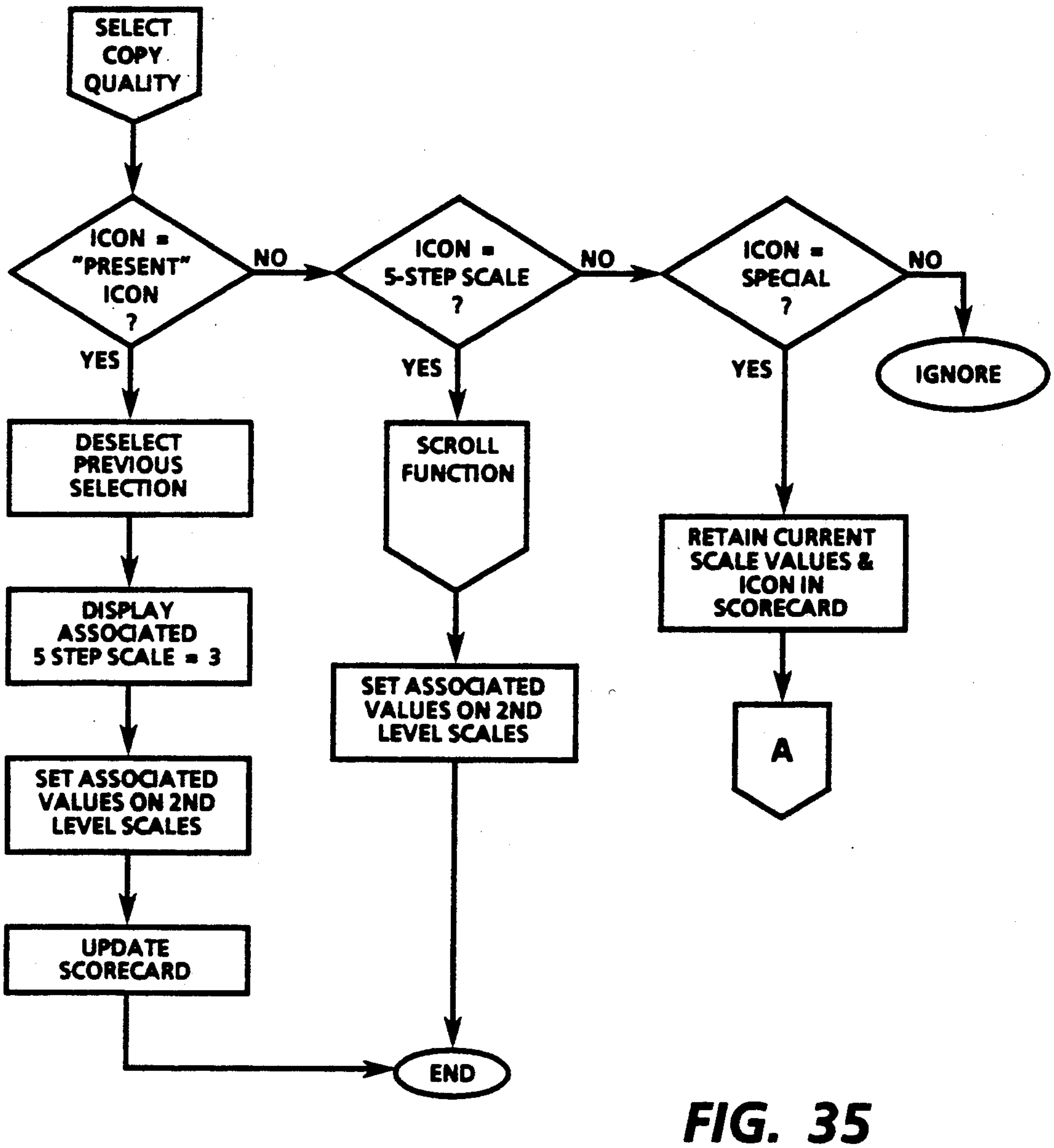
FIG. 35 is a flow chart of the Copy Quality First Level Workarea Activity resulting from touch selection of one of the COPY QUALITY:BASIC CONTROL icons shown in FIG. 33.
Figure 36:
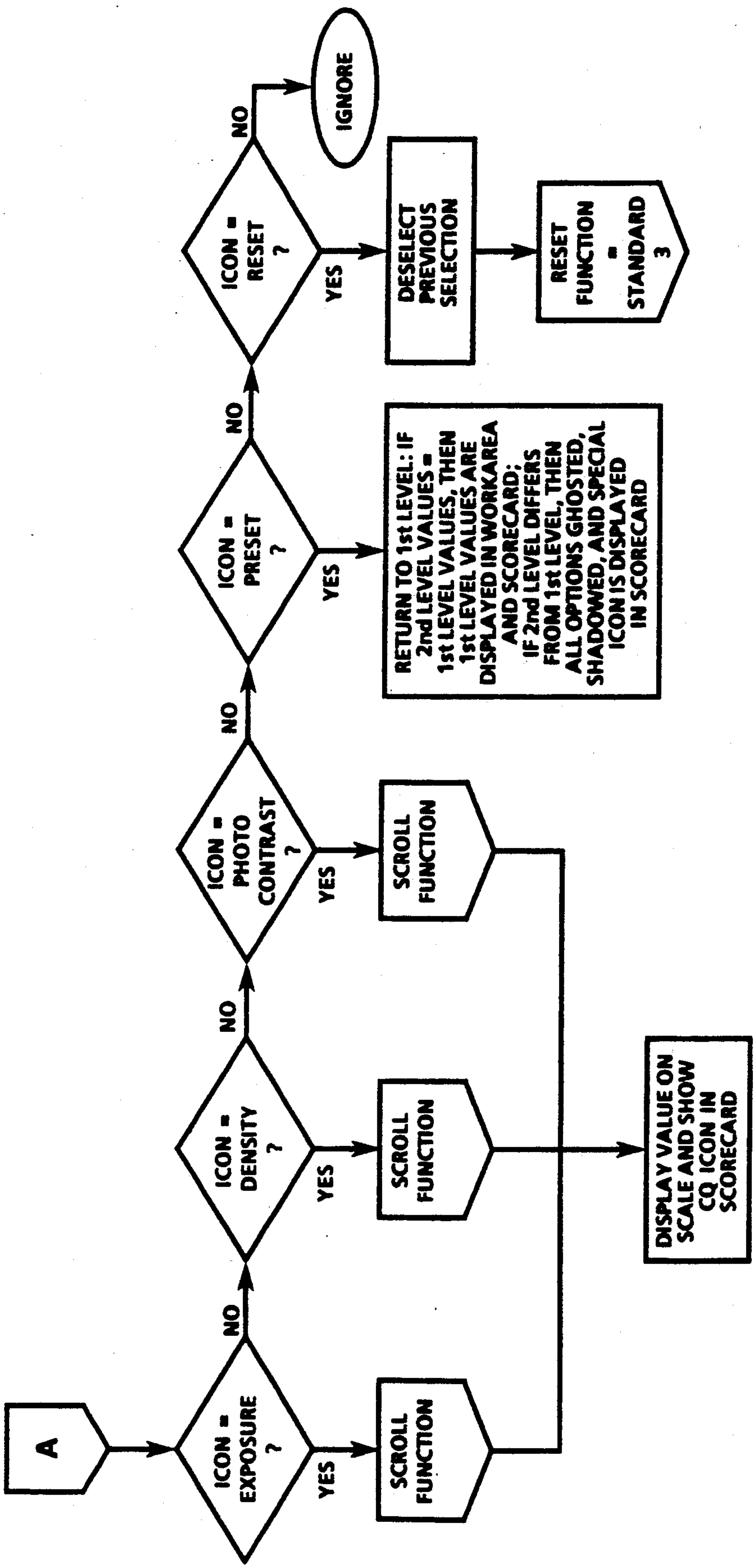
FIG. 36 is a flow chart of the Copy Quality Second Level Workspace Selections resulting from touch selection of one of the COPY QUALITY:SPECIAL CONTROL icons shown in FIG. 34.
Figure 37:
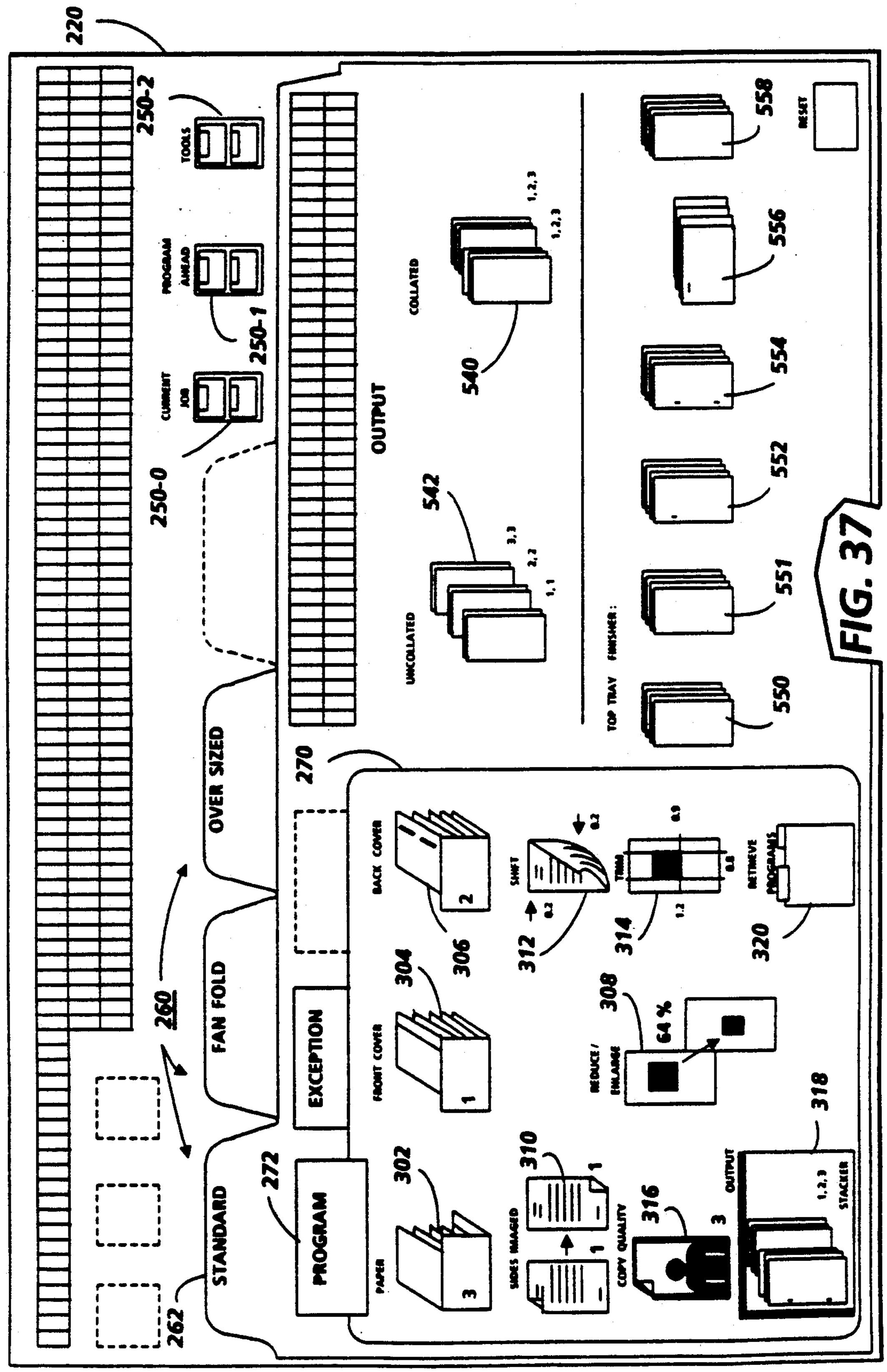
FIG. 37 is a front view of the touch monitor screen shown in FIG. 17 depicting the touch selection icons that are displayed in the work area as a result of touch selection of the OUTPUT icon on the PROGRAM scorecard.
Figure 38:
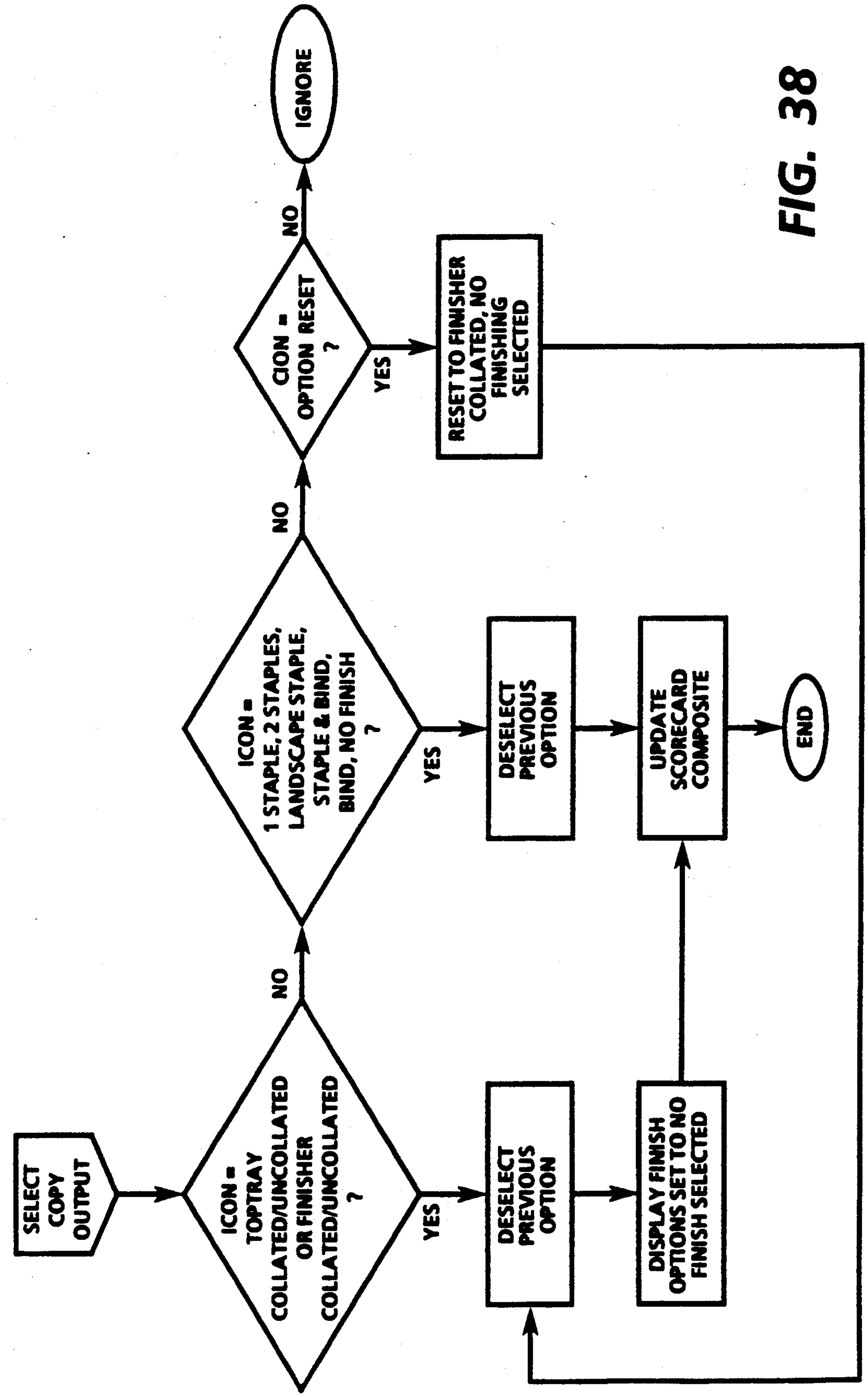
FIG. 38 is a flow chart of the Copy Output Workarea Activity resulting from touch selection of one of the OUTPUT or FINISHER icons shown in FIG. 37.
Figure 39:
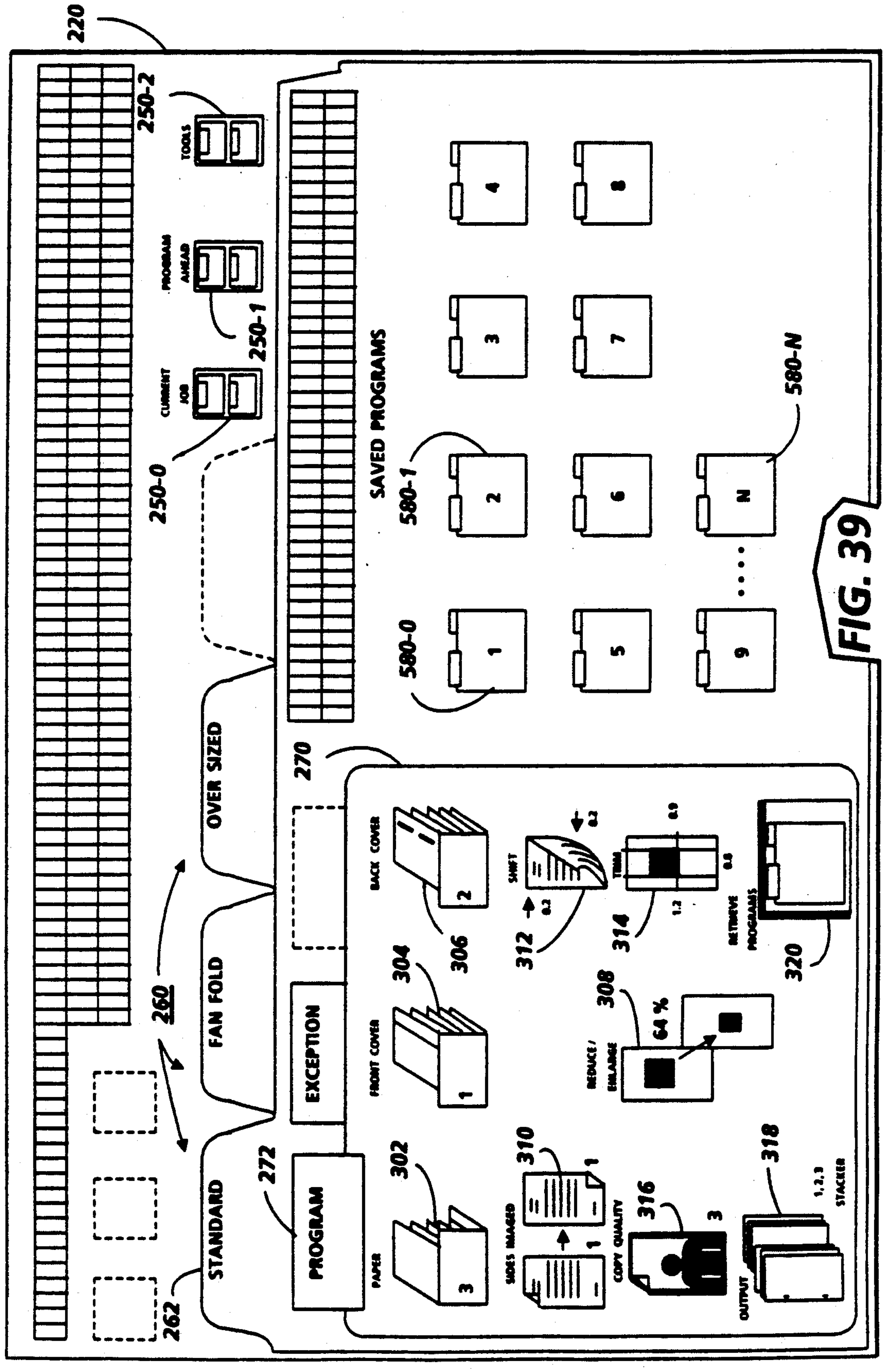
FIG. 39 is a front view of the touch monitor screen shown in FIG. 17 depicting the touch selection icons that are displayed in the work area as a result of touch selection of the RETRIEVE PROGRAMS icon on the PROGRAM scorecard.
Figure 40:
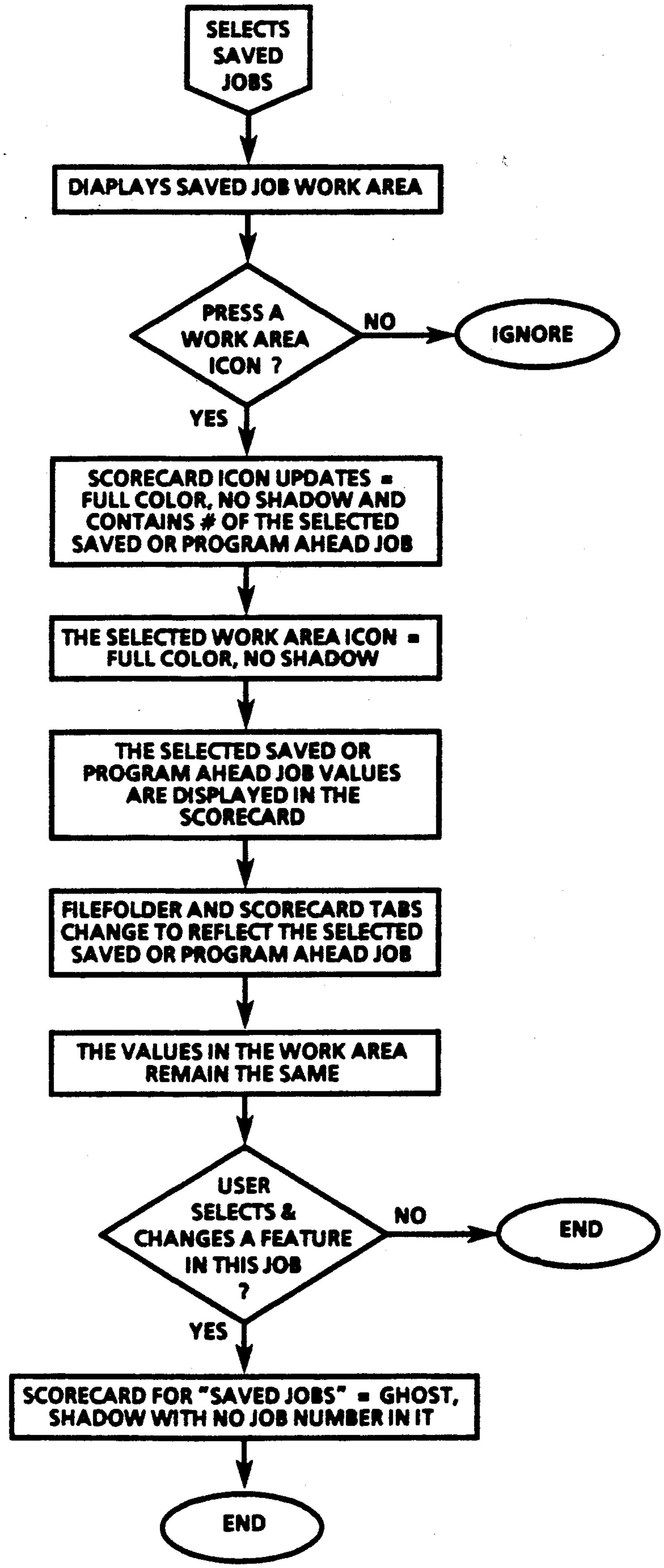
FIG. 40 is a flow chart of the Saved Jobs Work Area sequence resulting from touch selection of one of the RETRIEVE PROGRAMS icons shown in FIG. 39.
Figure 41:
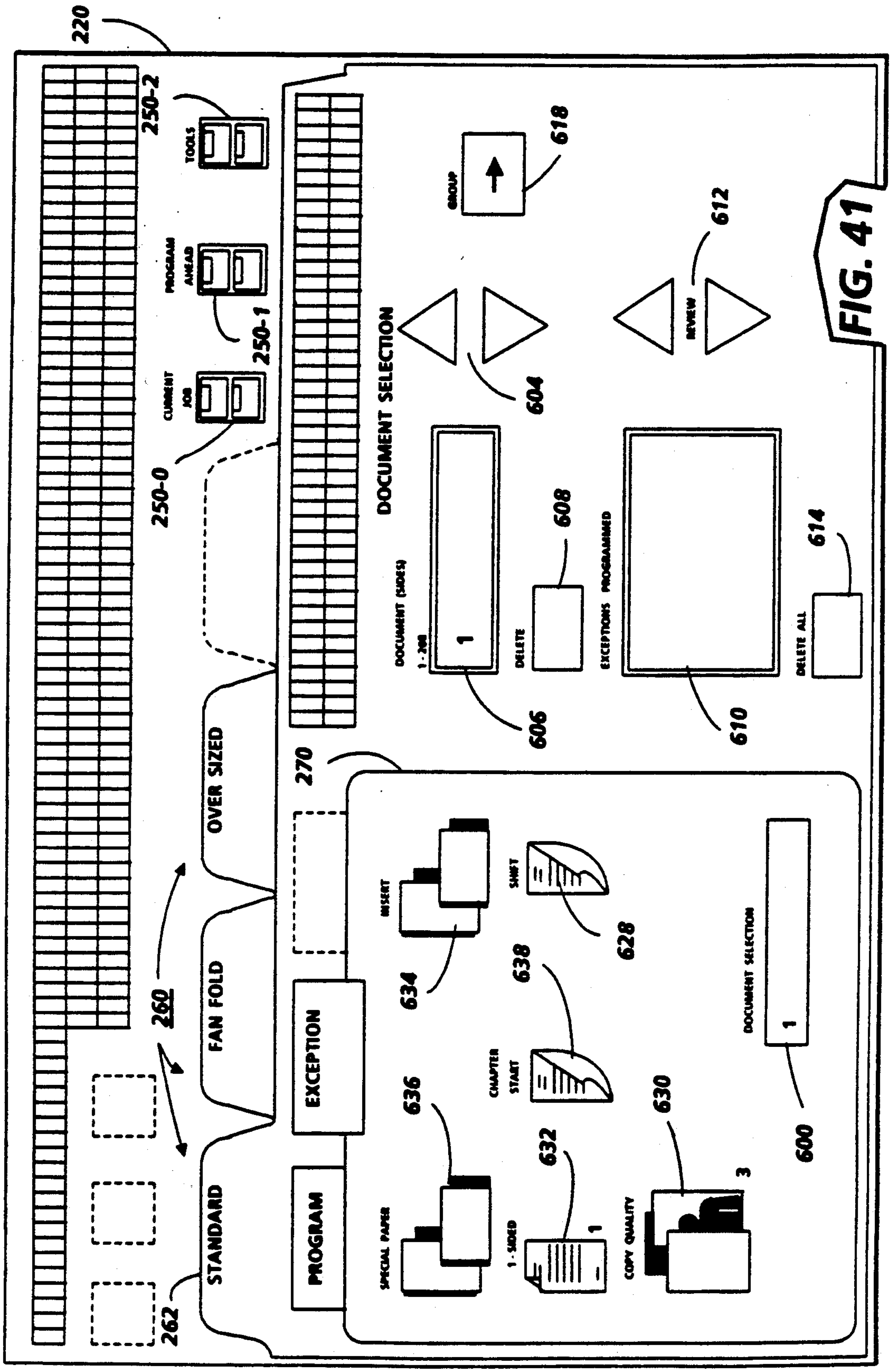
FIG. 41 is a front view of the touch monitor screen shown in FIG. 17 depicting the touch selection exception programming icons that are displayed on selection of the EXCEPTION scorecard.
Figure 42:
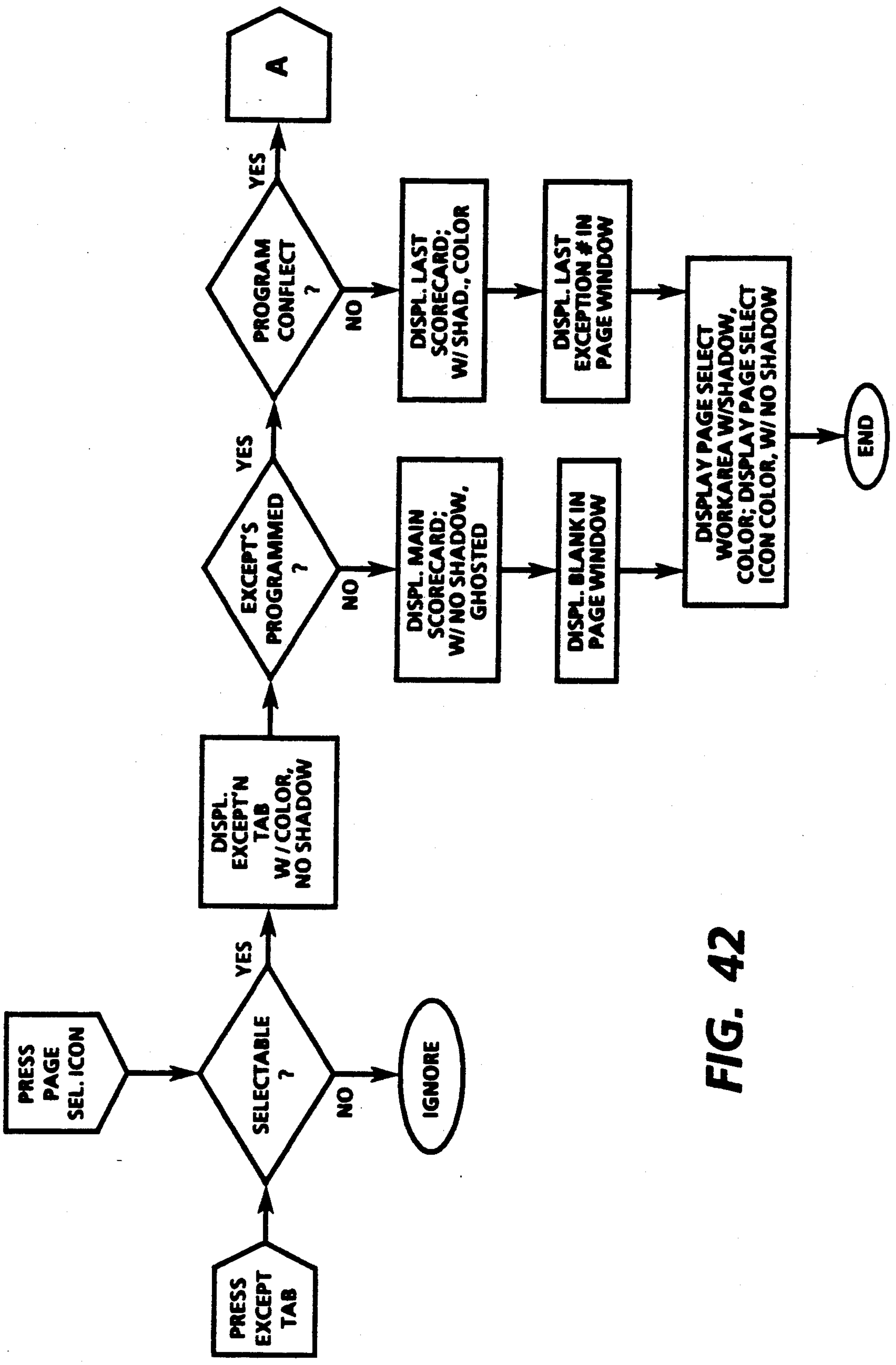
FIG. 42 is a flow chart of the Top Level Entry sequence resulting from touch selection of the EXCEPTION scorecard touch tab.
Figure 43:
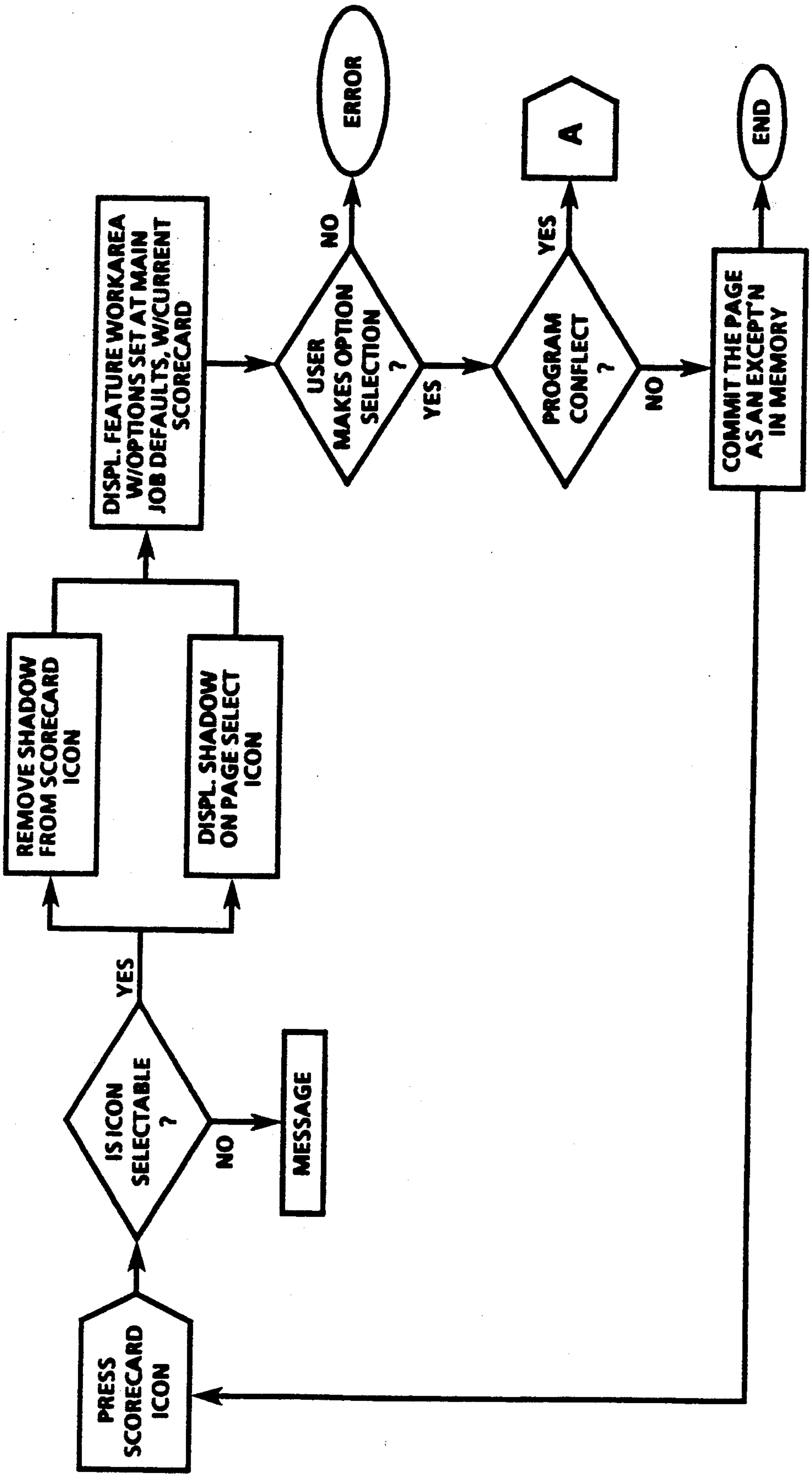
FIG. 43 is a flow chart to the Feature Workarea Entry sequence resulting from touch selection of one of the exception programming icons on the EXCEPTION scorecard.
Figure 44:
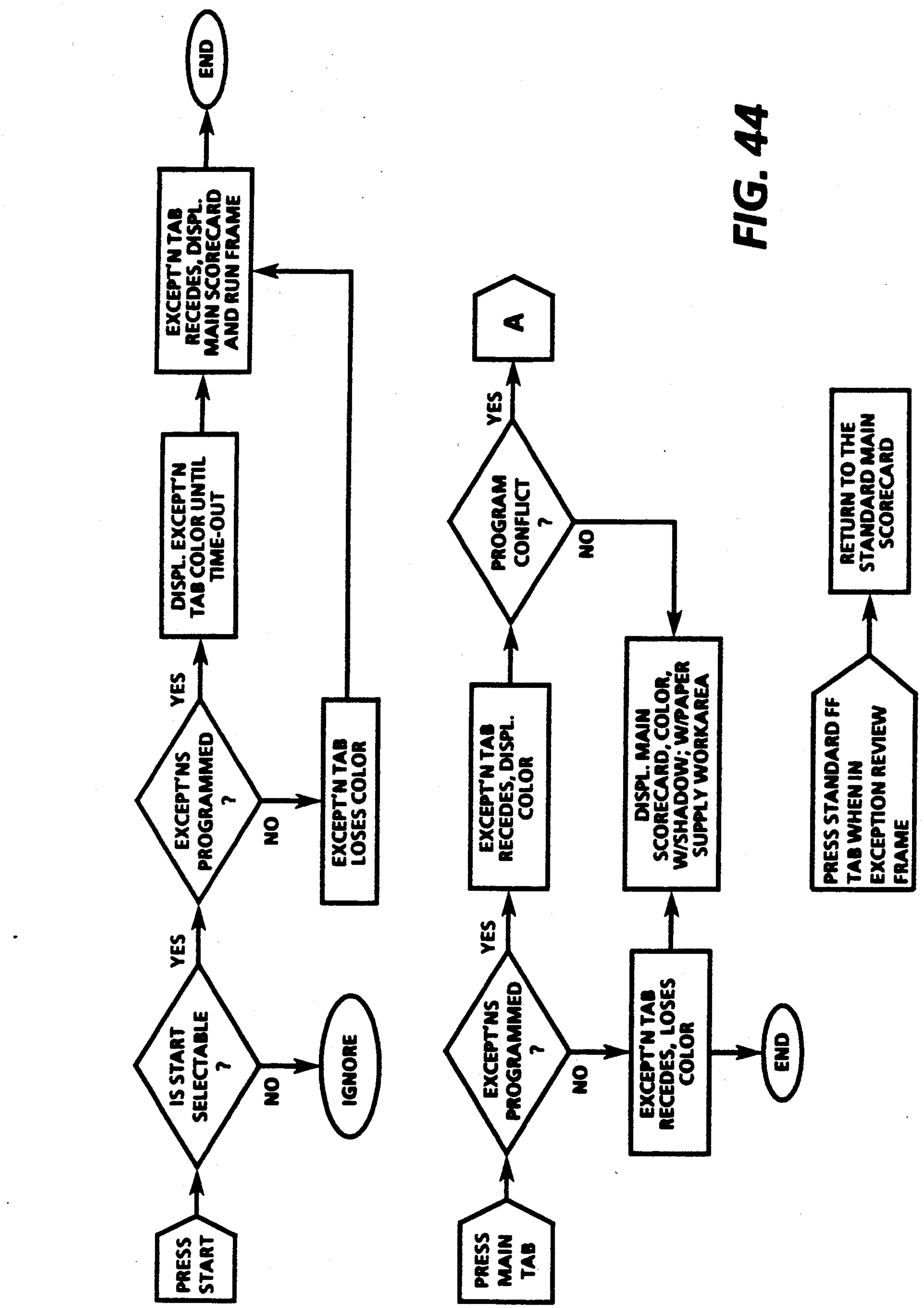
FIG. 44 is a flow chart of the exception programming Exit sequence.
Figure 45:
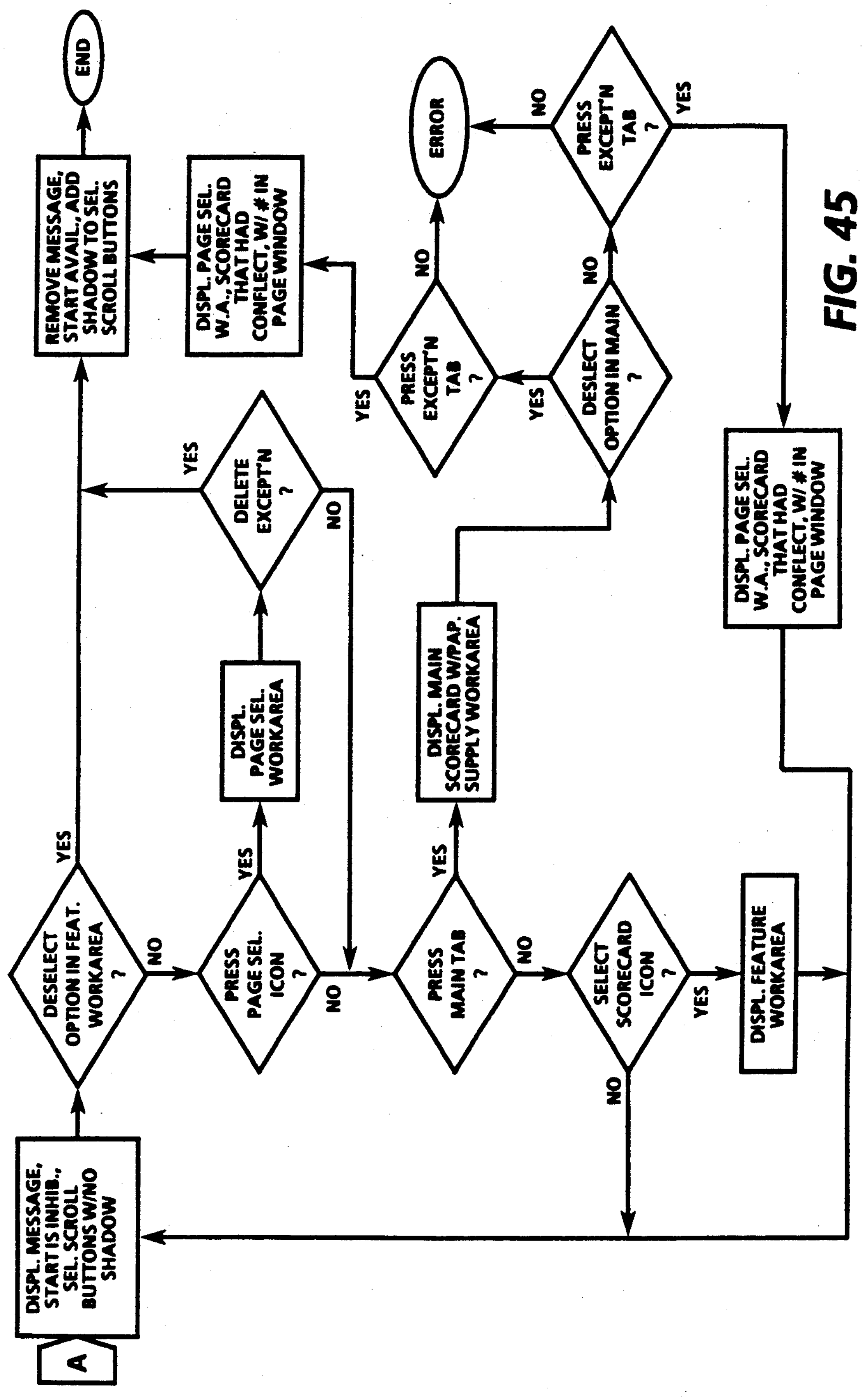
FIG. 45 is a flow chart of the Programming Conflict In Feature Work area sequence during exception programming.
Figure 46:
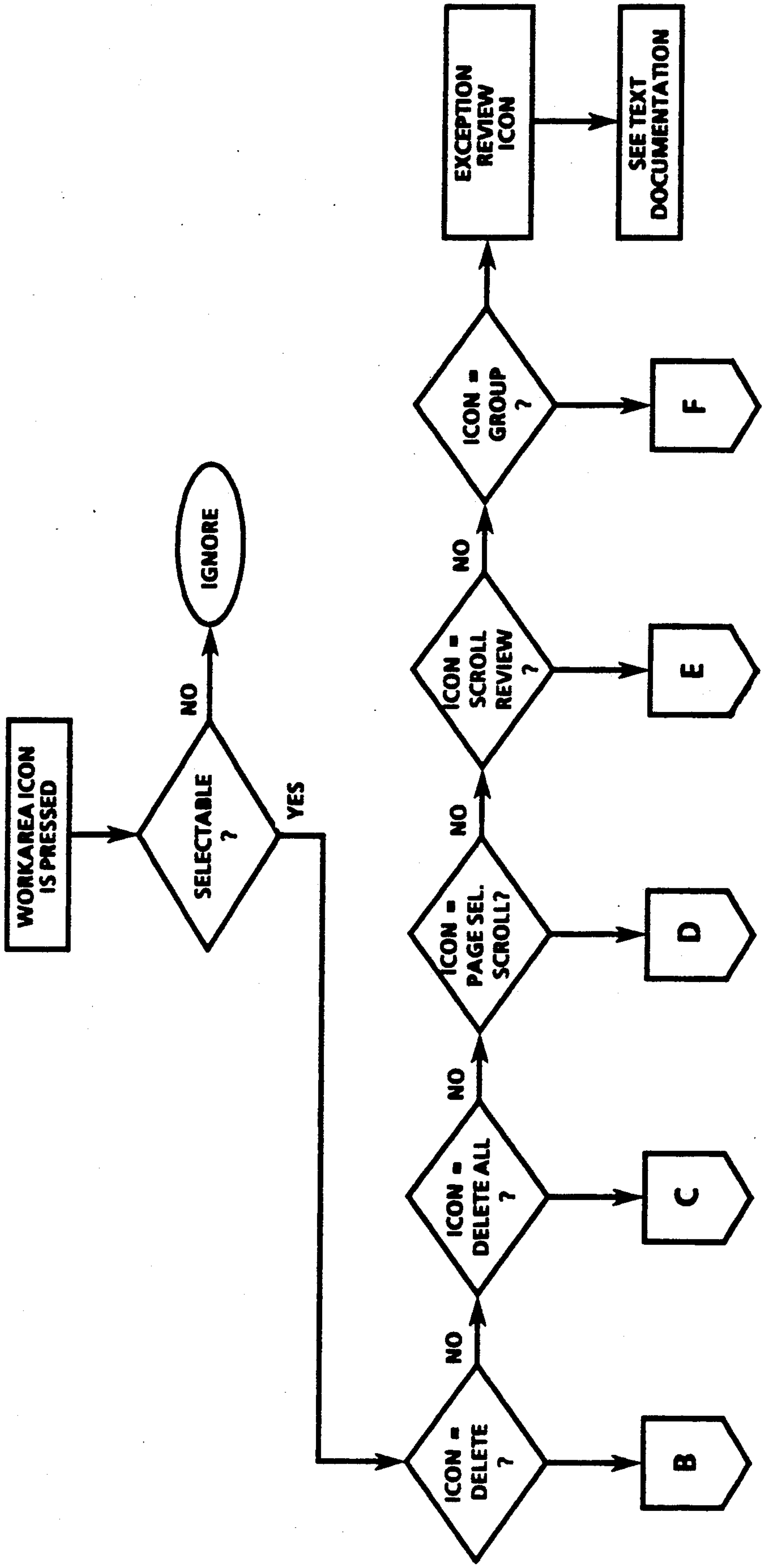
FIG. 46 is a flow chart of the Page Selection Workarea Activity resulting from touch selection of one of the exception programming icons shown in FIG. 41.
Figure 47:
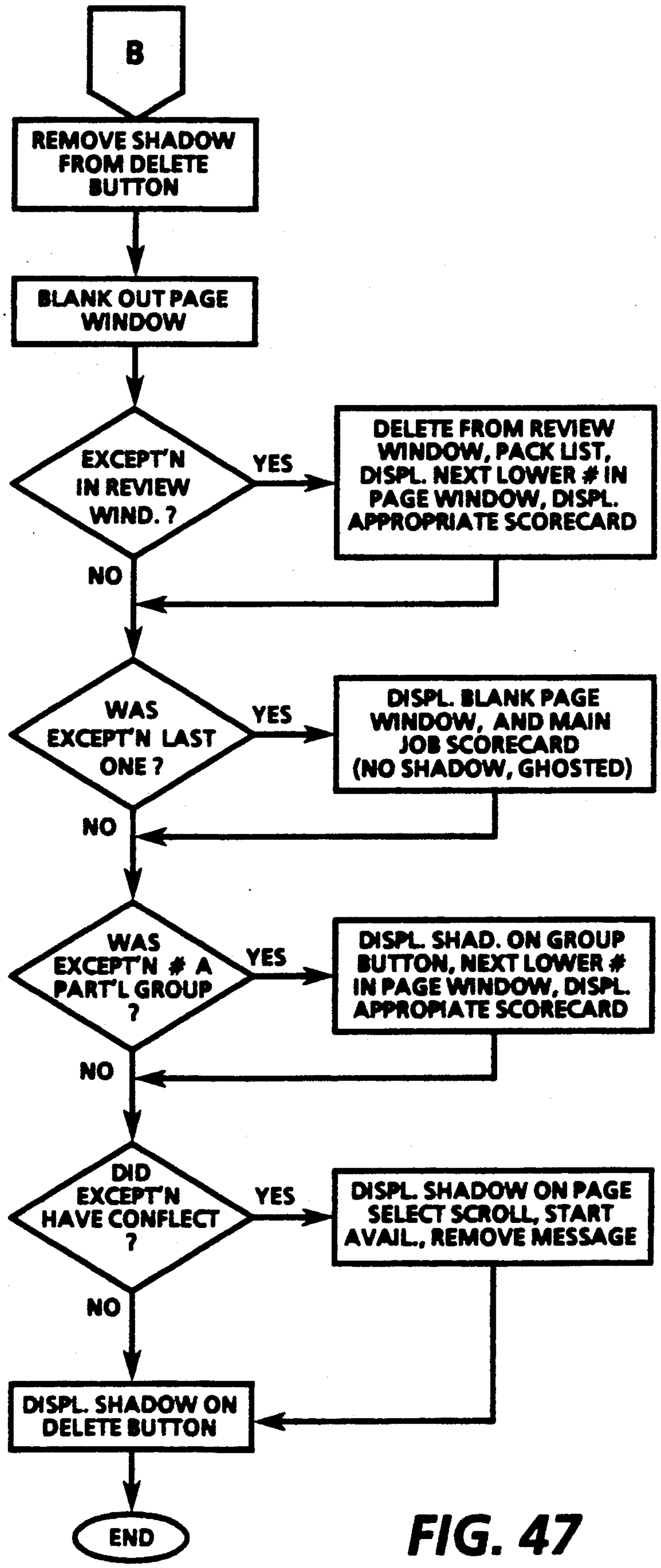
FIG. 47 is a flow chart of the Page Selection Workarea Activity resulting from touch selection of the exception programming Delete Button shown in FIG. 41.
Figure 48:
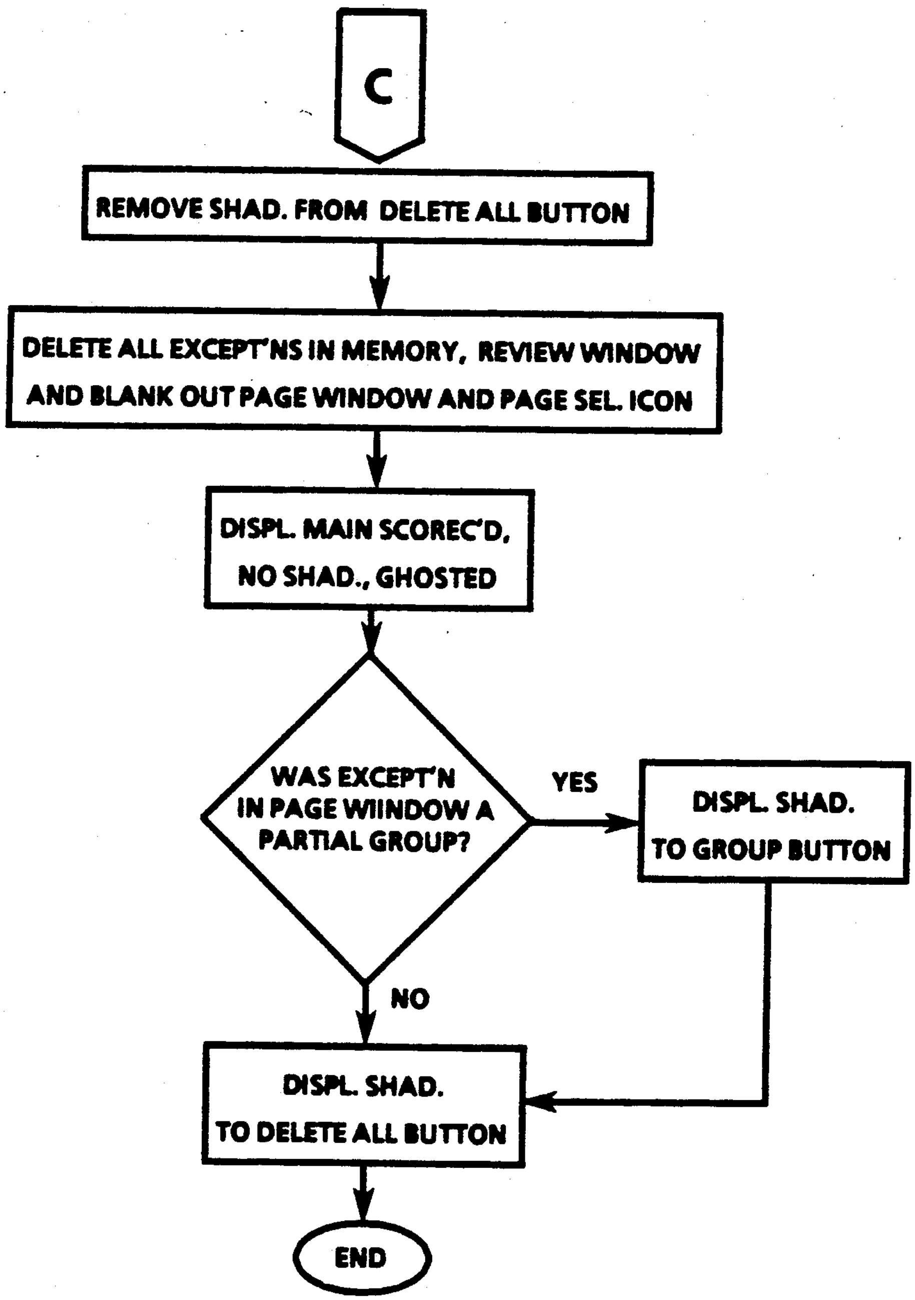
FIG. 48 is a flow chart of the Document Selection Workarea Activity resulting from touch selection of the exception programming Delete All Button shown in FIG. 41.
Figure 49:
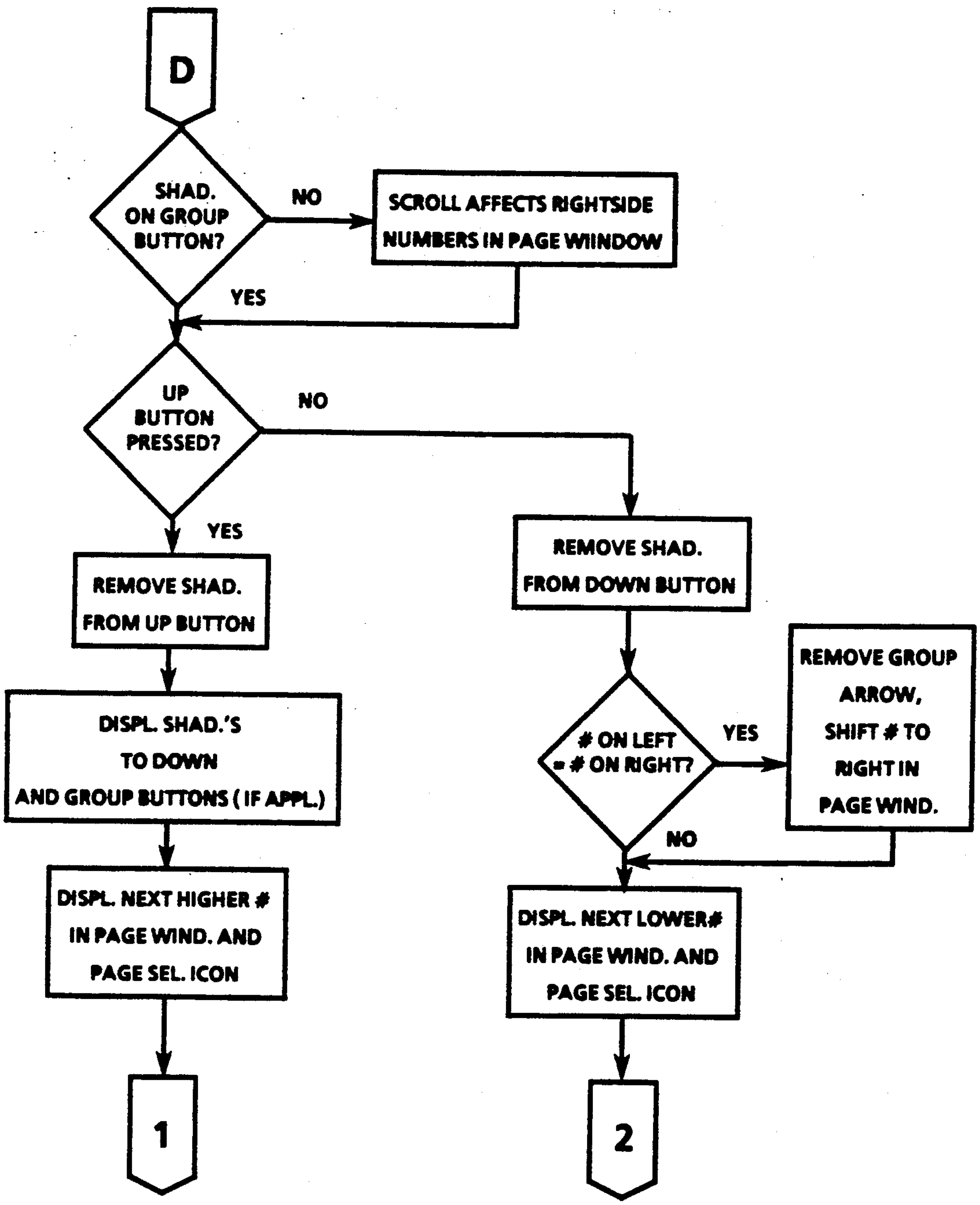
FIGS. 49–50 are flow charts of the Document Selection Workarea Activity resulting from touch selection of the exception programming Document Selection Scroll icon shown in FIG. 41.
Figure 50:
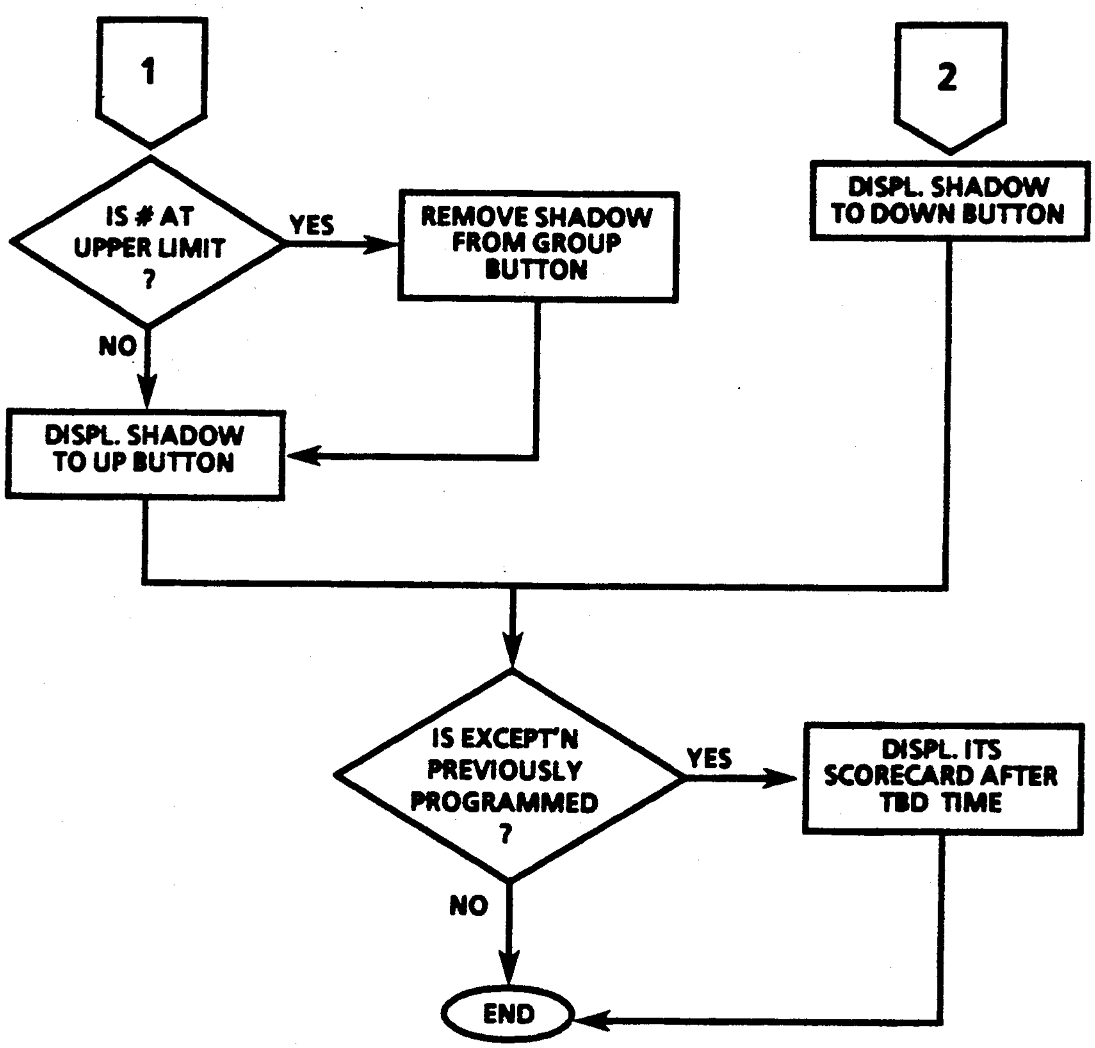
Figure 51:
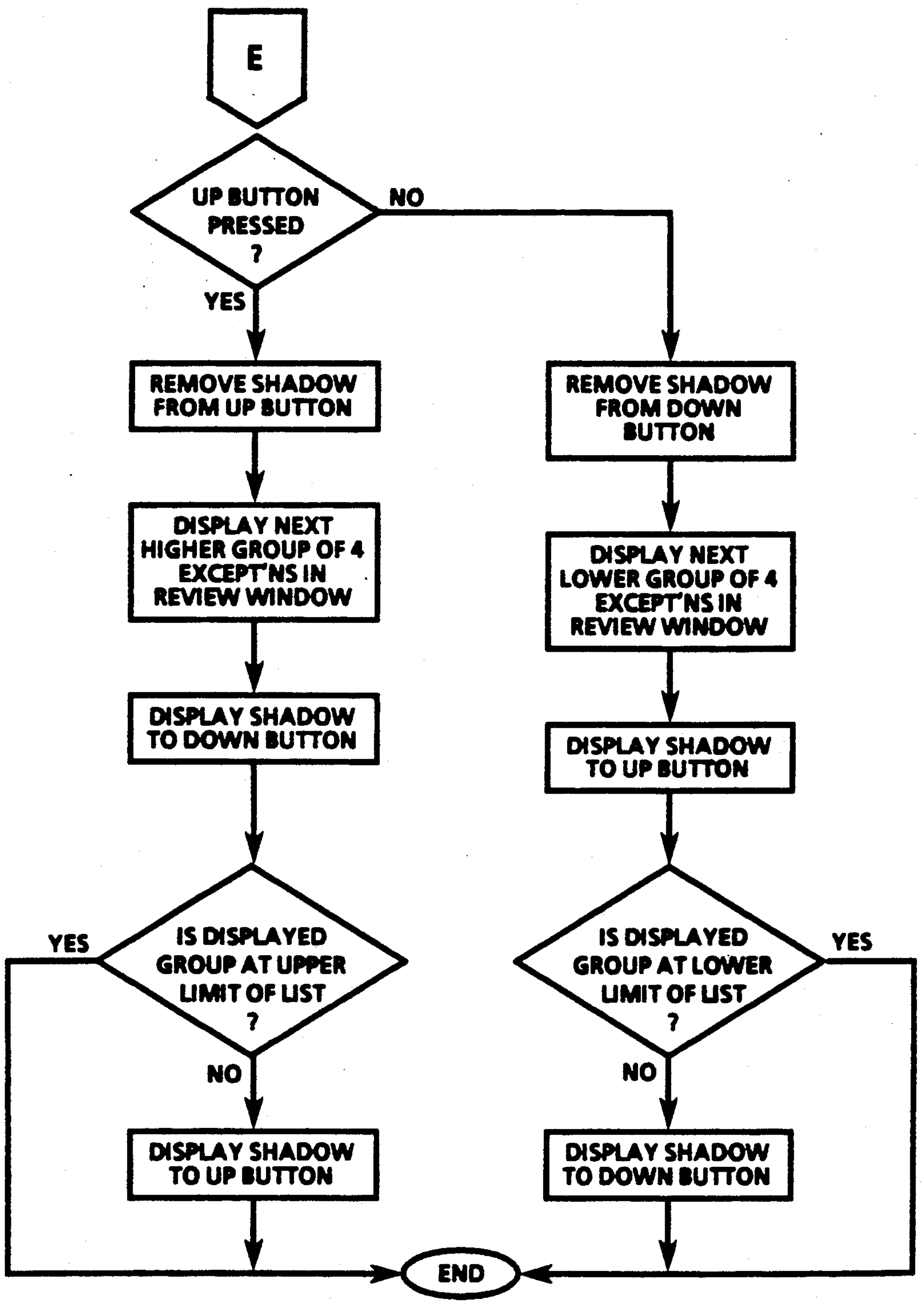
FIG. 51 is a flow chart of the Document Selection Workarea Activity resulting from touch selection of the Exception Review Scroll icon shown in FIG. 41.
Figure 52:
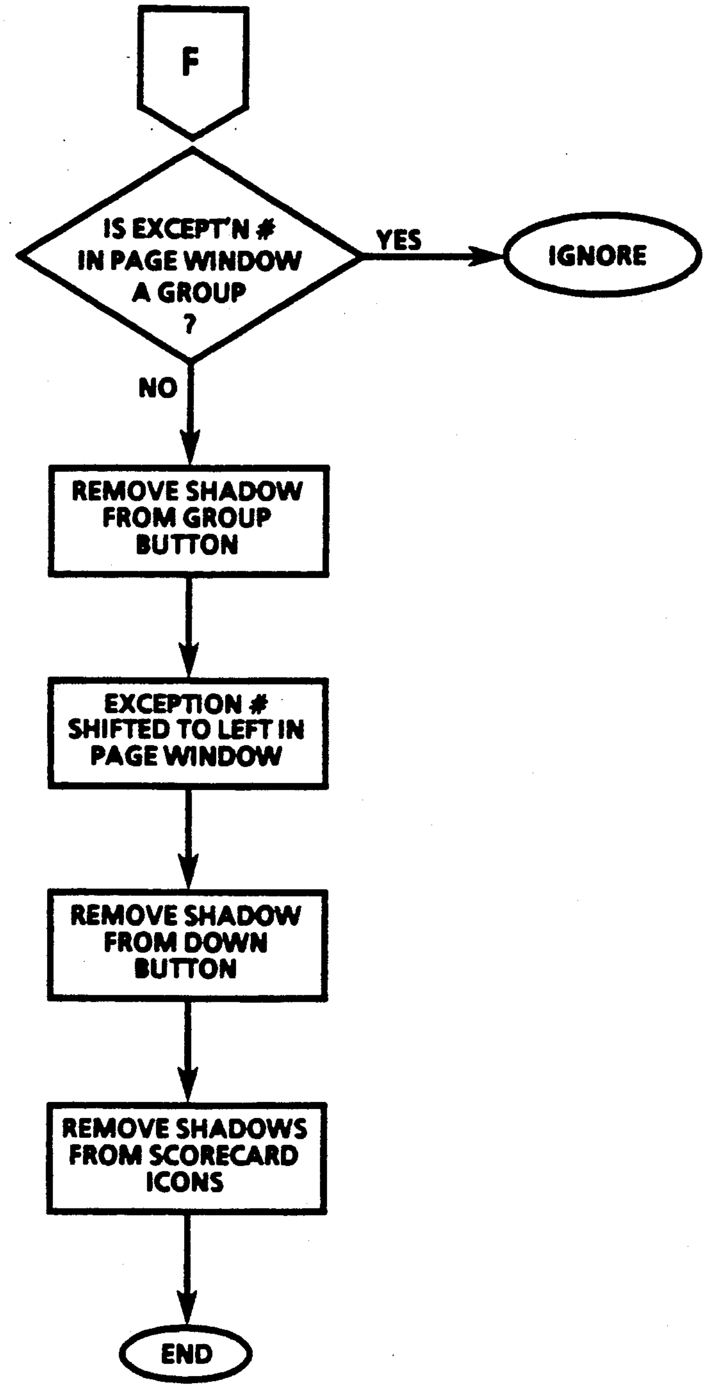
FIG. 52 is a flow chart of the Document Selection Workarea Activity resulting from touch selection of the Group Button icon shown in FIG. 41.

Work selection area 240 appears in the lower right portion of screen 220, area 240 being beneath the dialogue pathway area 236 and extending from the edge of scorecard selection area 238 to the right side of screen 220. The top two lines 246 of the work selection area 240 are reserved for programming conflicts and prompts with the remaining area used for displaying the feature options (second level program selections) available with the first level program selection that is touched on the scorecard currently selected, an example of which is seen in FIG. 18. As will appear, the operator can scan and make a selection within the work area or pick another scorecard item.

Figure 7:
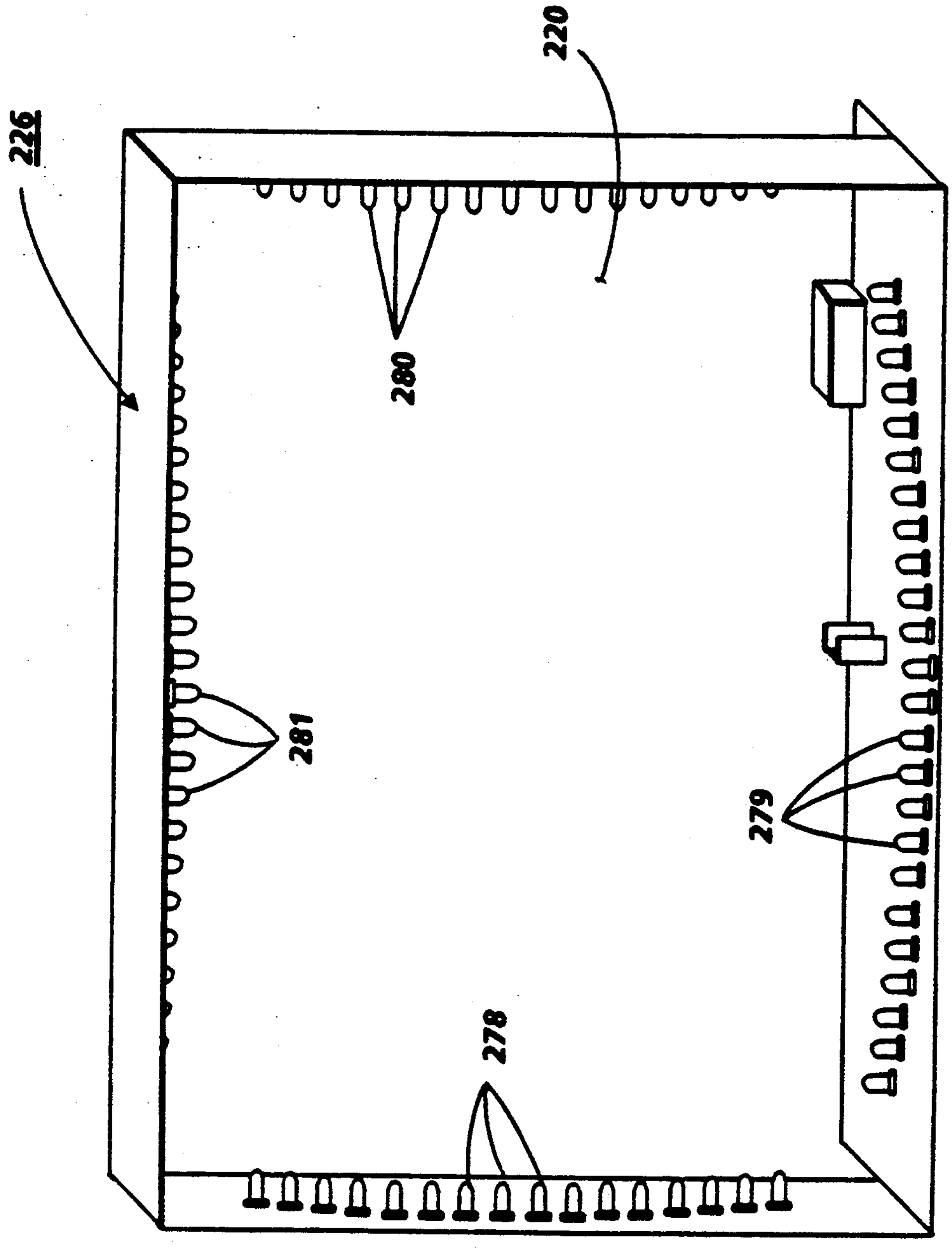
FIG. 7 is an isometric view showing the touch control LED and photodiode pwb's bordering the monitor screen.
Figure 8:
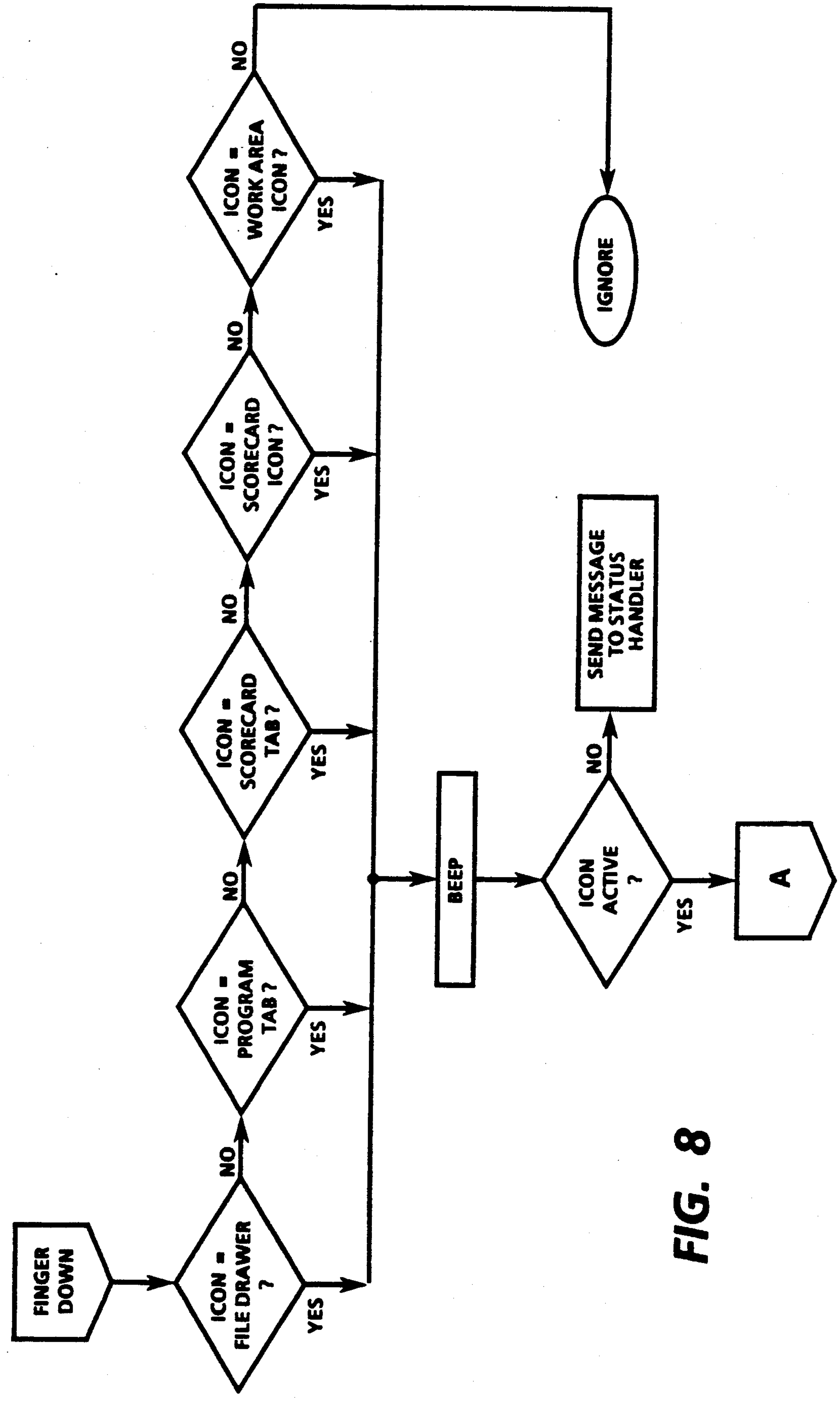
FIGS. 8-9 are flow charts of touch screen operation in response to "finger down"
Figure 9:
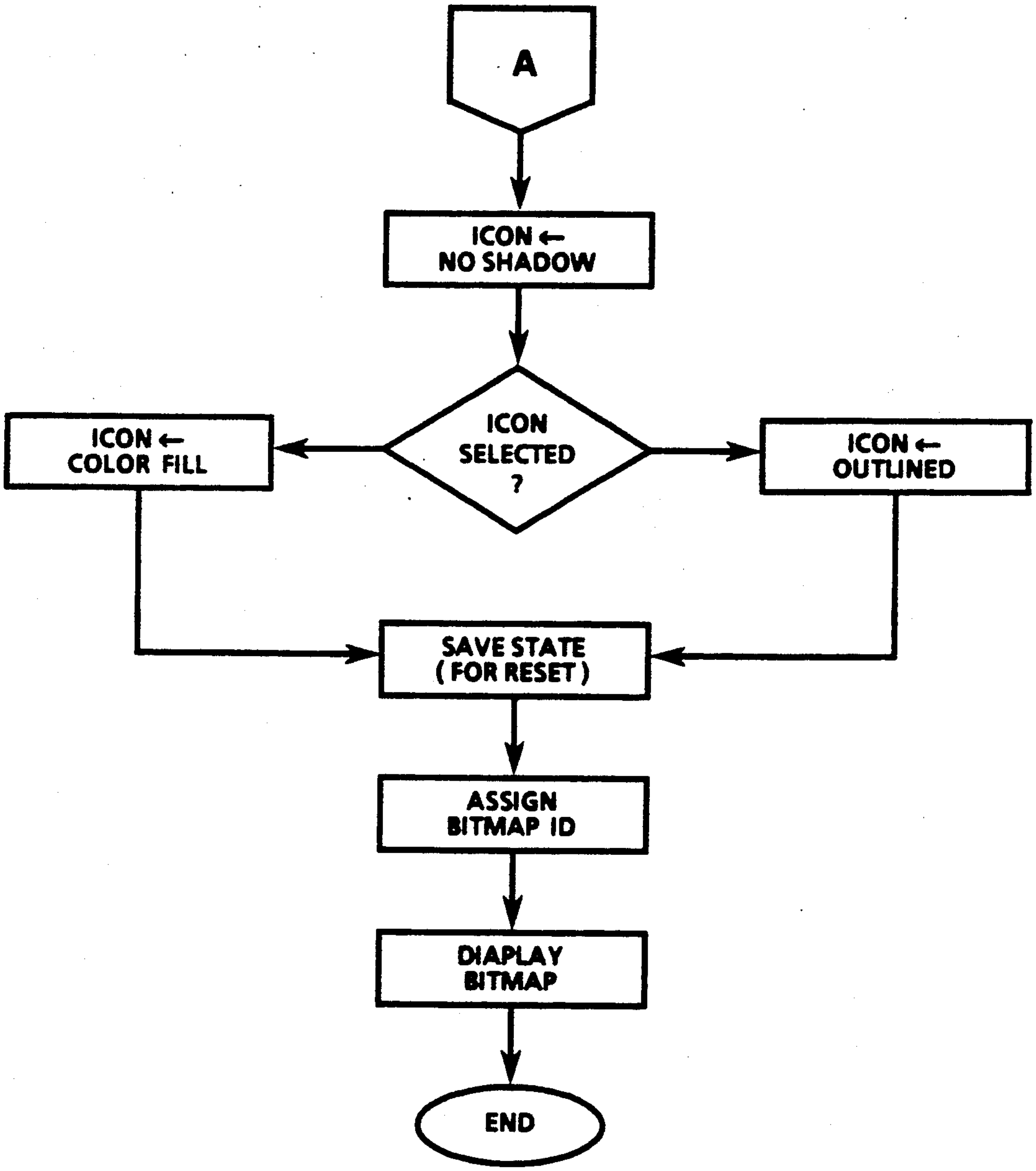

Referring particularly to FIG. 7, mounted around the periphery of display screen 220 behind bezel 218 is a touch input system 226 which provides a pattern of invisible interruptable beams across the face of the screen 220 using light emitting diodes (LEDs) and photodetectors (PDs). In the example shown, two rows of LEDs 278, 279 are provided on separate Printed Wiring Boards (PWBs) along two adjoining sides of display screen 220. Two corresponding rows of PDs 280, 281 are provided on PWBs positioned on the remaining two sides of the display screen 220, the number of PDs 280, 281 being equal in number to and in opposed relationship to LEDs 278, 279. LEDs 278, 279 emit infrared rays which extend in generally parallel fashion across the face of the display screen 220 to the PDs 280, 281 opposite thereto.

LEDs 278, 279 and PDs 280, 281 cooperate to establish an X-Y coordinate system of invisible beams or rays across the face of the display screen 220 so that, when an operator touches a particular location on the screen 220, one or more of the beams are interrupted. Suitable control logic such as shown in U.S. Pat. No. 4,267,443 to Carroll et al. determines the average X and Y locations of the beams that are broken to identify the particular location on screen 220 touched by the operator.

While a specific touch input system 226 has been shown and described, other touch systems which are capable of providing an output signal indicating an area touched on a display screen may be envisioned.

In order for the soft touch buttons (i.e., icons) on screen 220 to provide information regarding both their current selection state and their current status, a display convention is provided that will allow the operator to quickly scan the display and determine current feature selections. Referring to Table 1, unselected features that are selectable are indicated by an outlined icon with a shadowed background while selected features that are selectable are indicated by a colorfilled icon with a shadowed background. Unselected features that are not selectable are indicated by an outlined icon without a shadowed background while selected features that are not selectable are indicated by a colorfilled icon without a shadowed background.

TABLE I

| | SELECTABLE | NOT SELECTABLE |
|---|---|---|
| SELECTED | COLORFILLED | COLORFILLED |
| | SHADOW | NO SHADOW |
| UNSELECTED | OUTLINED | OUTLINED |
| | SHADOW | NO SHADOW |

In cases where an unselected feature that is not selectable is touched, a message will be displayed in the programming conflict area 246 of screen 220.

Referring particularly to FIGS. 8, 9 and 11–15, if an operator touches a selectable icon, a visual change of the selected icon occurs as well as an audio tone (BEEP). If the finger is withdrawn from the region, the selection will be accepted and the icon will change again to indicate the selection as described above. If the operator touches an unselectable region, an audio tone and warning message occurs upon exit. Where an operator touches screen 220 in two places, the system will accept the first touch encountered. In the case where the operator breaks more than 3 consecutive sensor beams in one touch in either the X or Y axis, no selection will be indicated or accepted. Further, to prohibit the queueing of several selections before they are acknowledged to the operator, subsequent selections will not be accepted until initial selections are accepted and completed.

Figure 10:
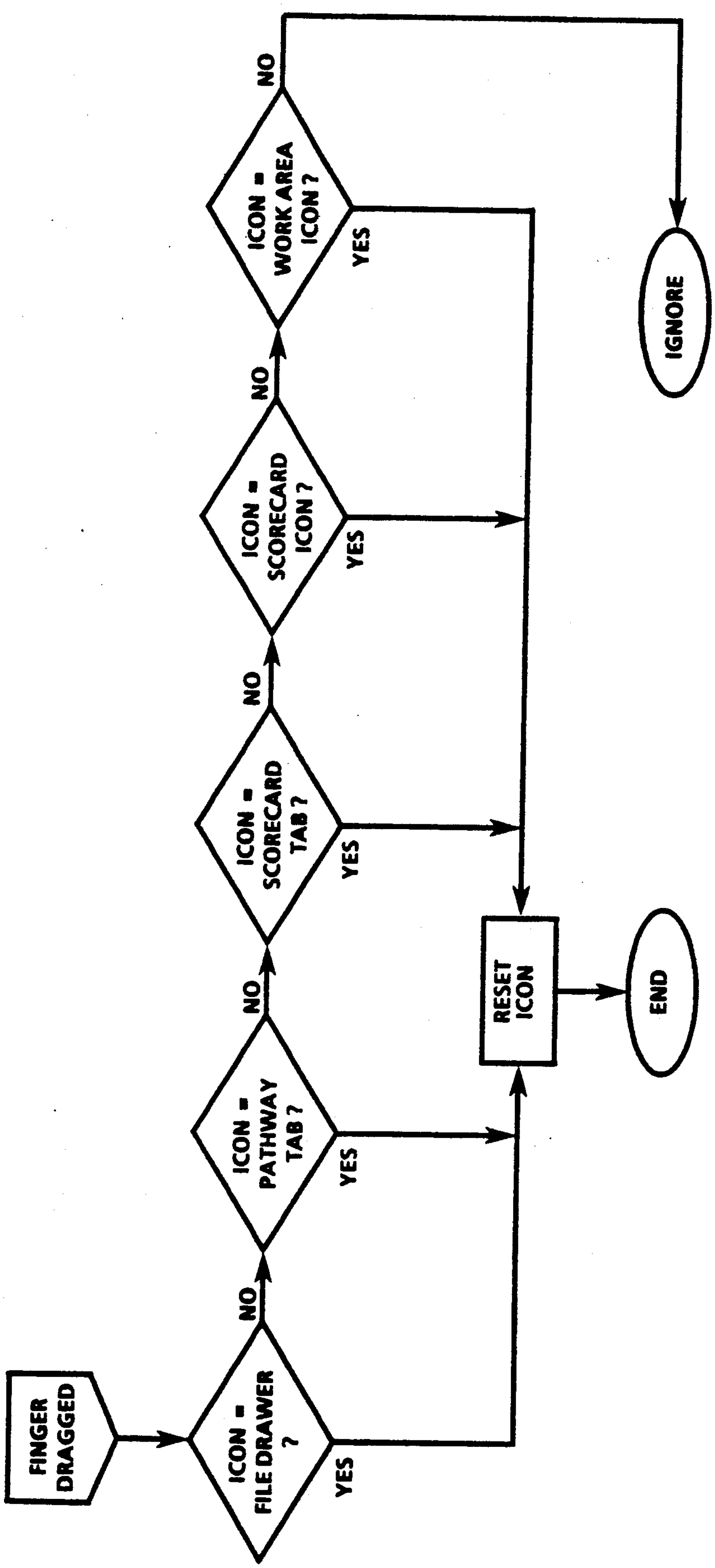
FIG. 10 is a flow chart of touch screen operation in response to "finger dragged"
Figure 11:
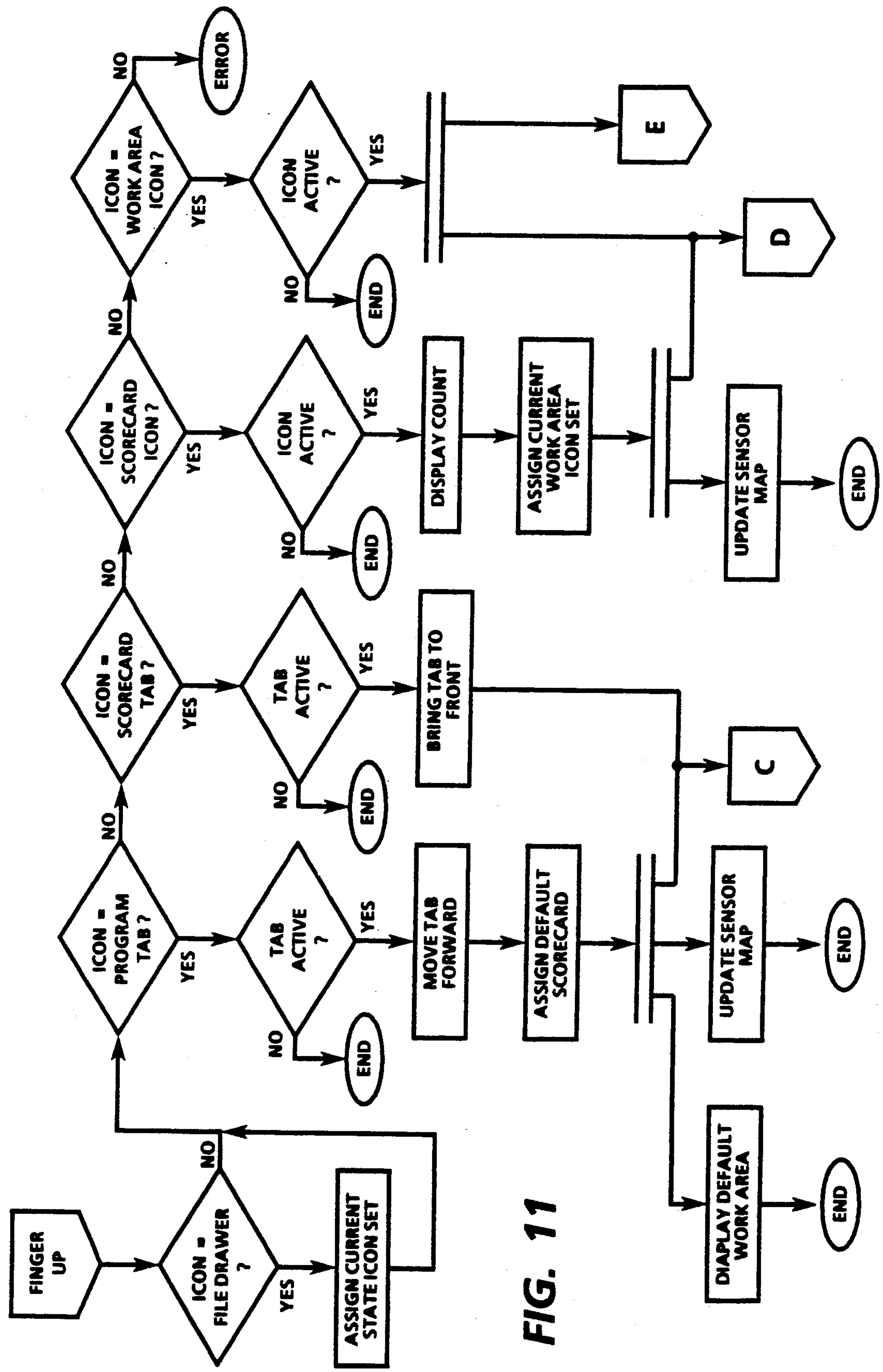
FIGS. 11-13 are flow charts of touch screen operation in response to "remove finger"
Figure 12:
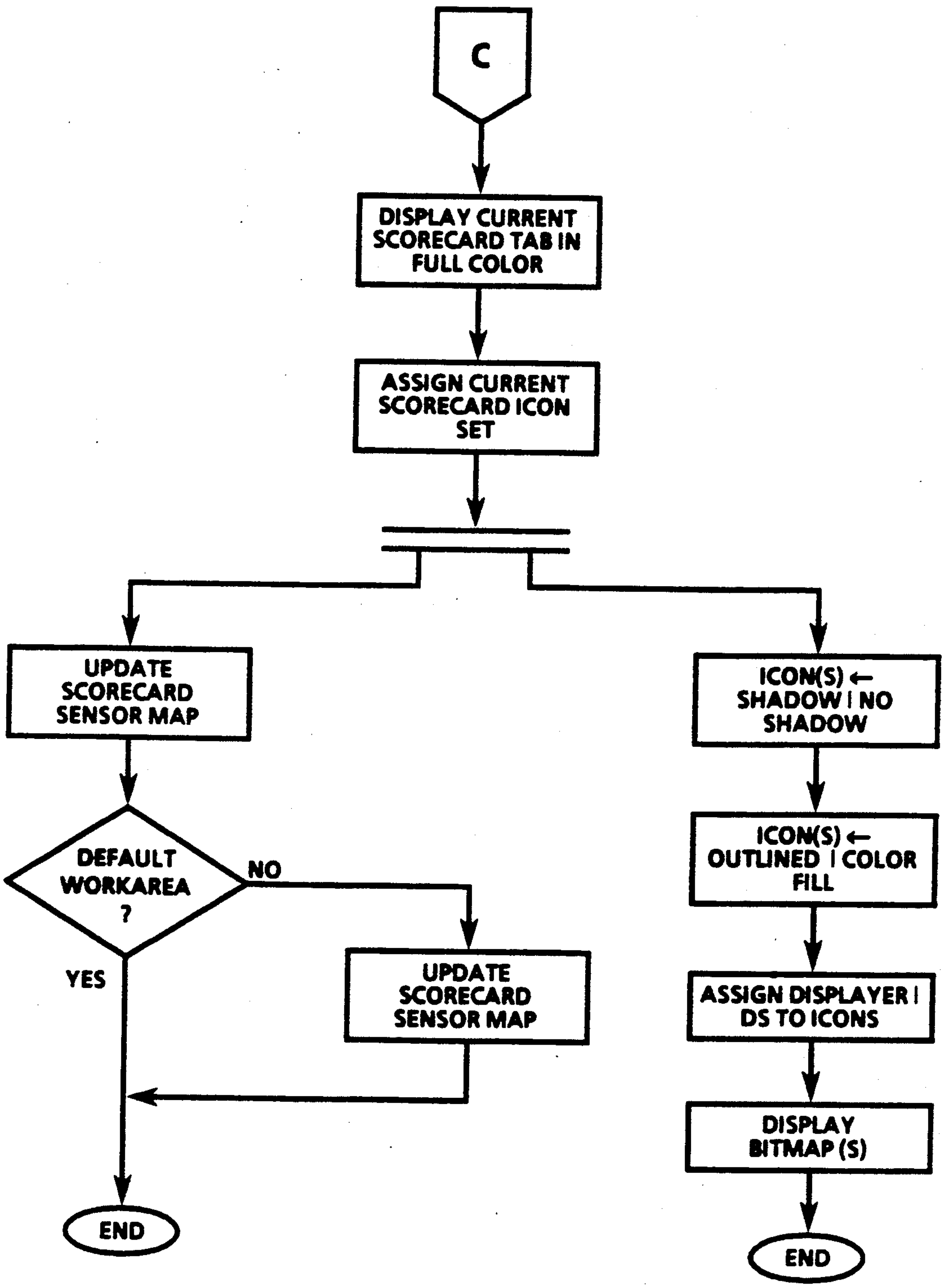
Figure 13:
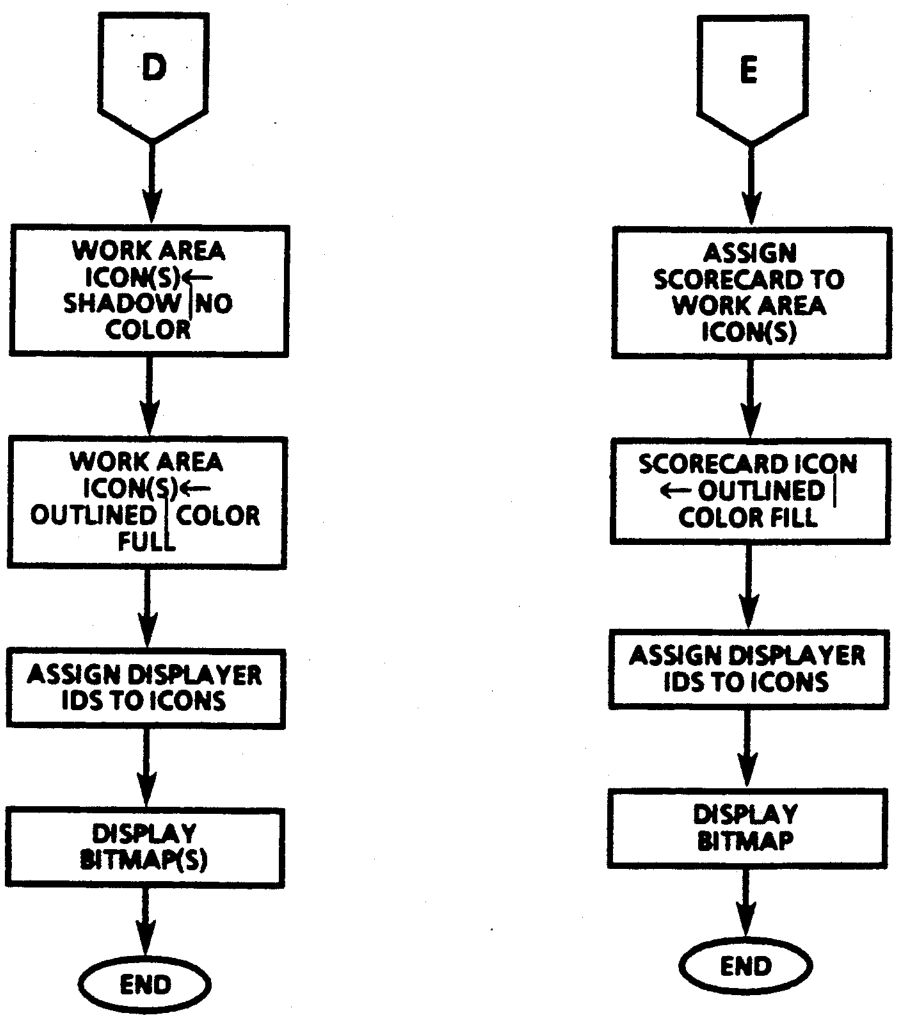
Figure 14:
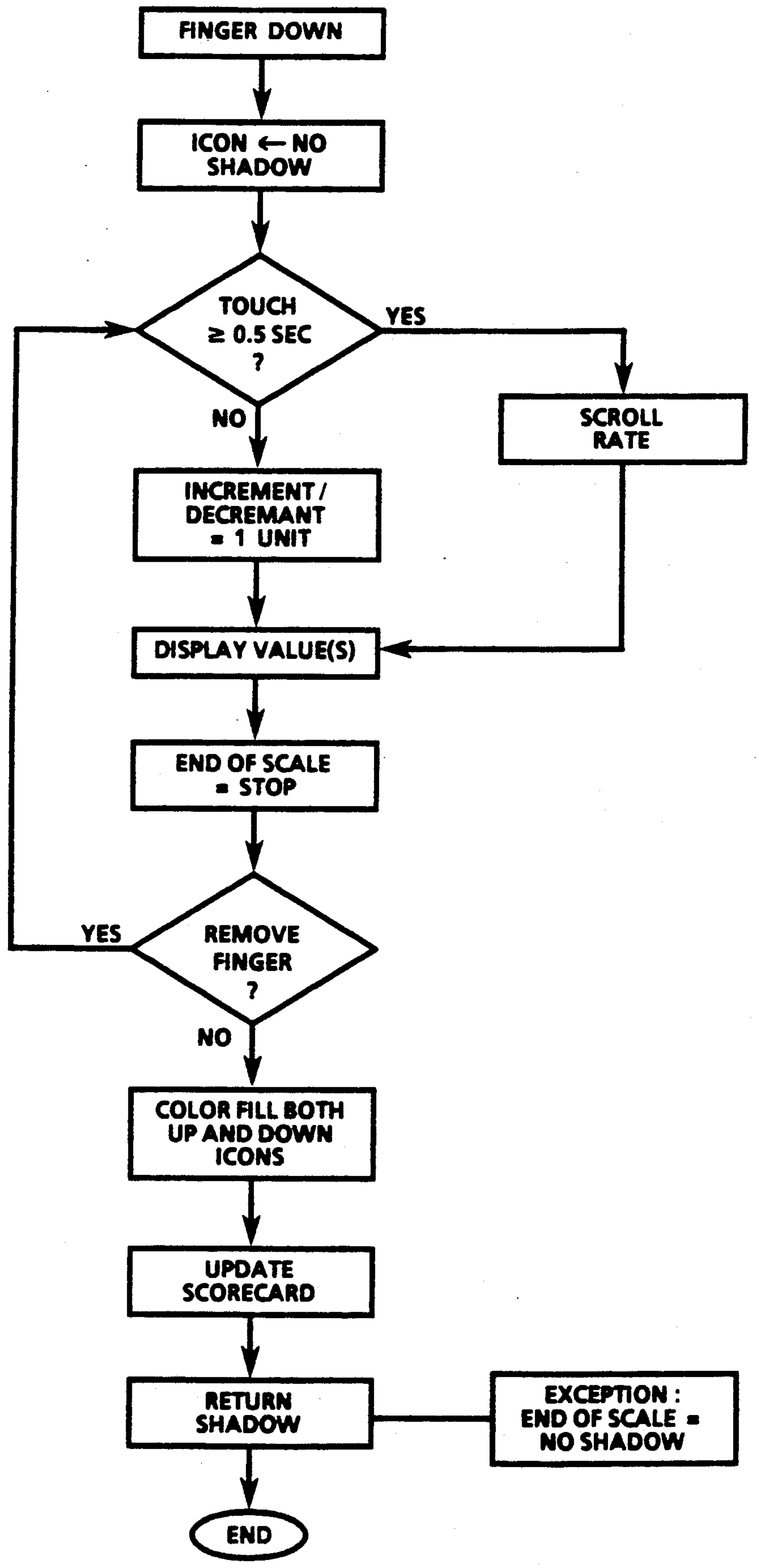
FIG. 14 is a flow chart depicting "active behavior" of the soft touch scroll buttons.
Figure 15:
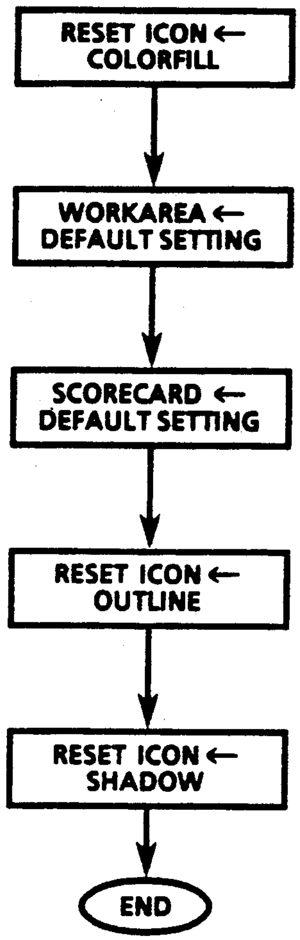
FIG. 15 is a flow chart depicting reset icon operation in response to "remove finger"

Referring particularly to FIG. 10, if the operator enters the region of a selectable icon, but drags his finger outside the region, the icon within the region will be SELECTED. If the operator enters the region of another selectable icon, a tone will again be emitted and the icon will change. Withdrawing the finger will now cause the new selection to be accepted and the icon will change again to indicate the selection as described above.

If the operator touches the region of a selectable icon and then moves outside the region and withdraws his finger, the selection will be accepted. If a normally active region is rendered inactive, a message will temporarily appear when the region is entered.

Figure 16:
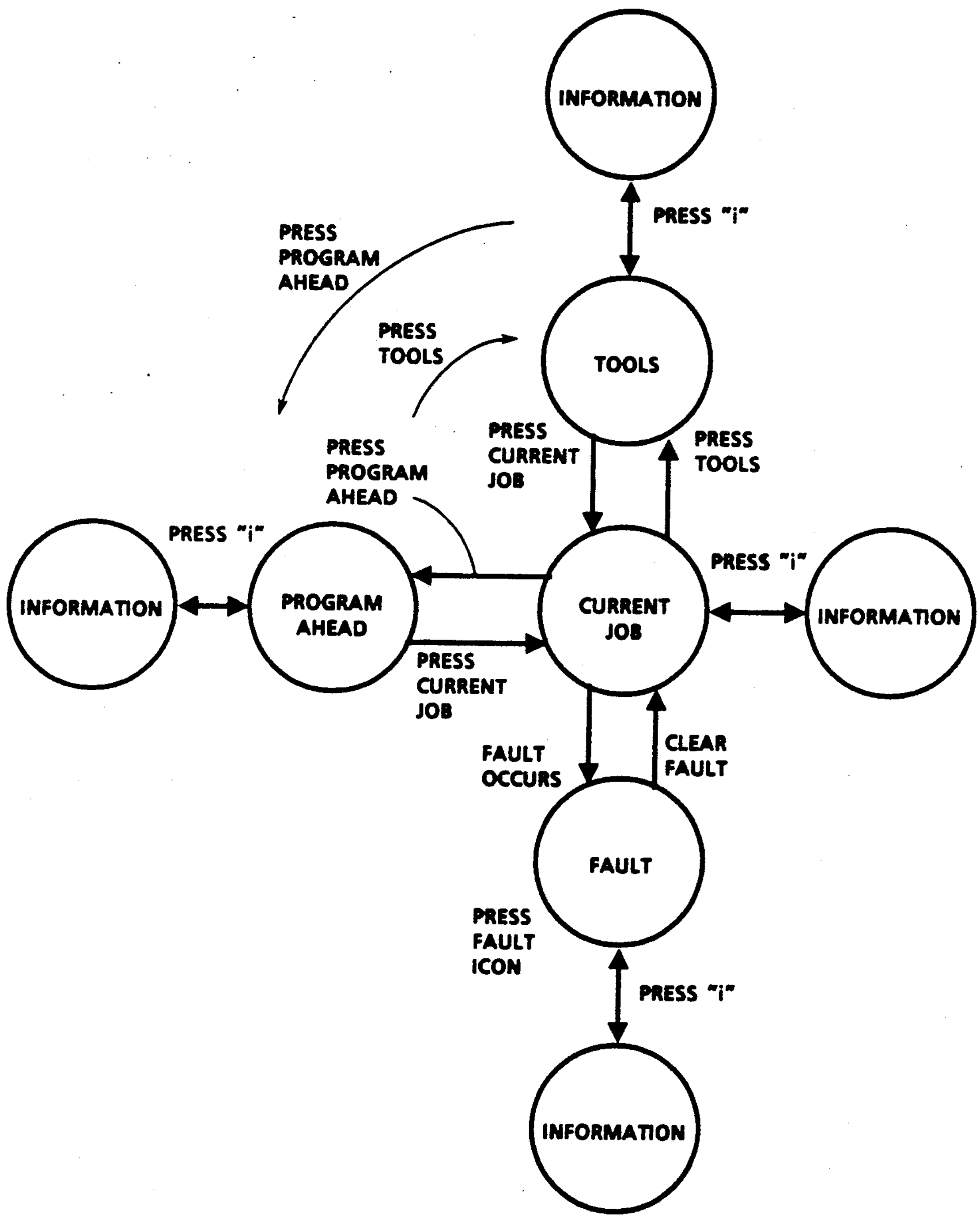
FIG. 16 is a flow chart depicting the U.I. operating states.

Referring particularly to FIG. 16, the five operating states for U.I. 213 consist of (1) CURRENT JOB, (2) PROGRAM AHEAD (3) TOOLS, (4) FAULTS, and (5) INFORMATION. The solid line arrows of FIG. 16 define the acceptable paths between the various states. The INFORMATION state is entered by means of the hard control button "i" on bezel 218 while the FAULTS state is in the form of a file card that overlays the file cards currently displayed in the event of a fault. The CURRENT JOB, PROGRAM AHEAD, and TOOLS states are entered by pressing the soft touch buttons 250-0, 250-1 and 250-2 respectively displayed on screen 220 in the Dialogue Mode Selection area 234.

In the ensuing discussion, U.I. 213 is presumed to be in the CURRENT JOB state as a result of actuation of soft touch button 250-0. The functions of this state are to inform the operator of the daily tasks that are necessary to keep machine 5 in good working order, to allow the operator to program feature selections for the current job, and to allow the operator to run a copying job. The CURRENT JOB state is sub-divided into three cases: (1) "Job Complete", (2) "Print", and (3) "Job Incomplete" "Job Complete" implies that a job is not in progress and has been completed, "printer" refers to a job in progress, and "Job Incomplete" refers to a job in progress that has either voluntarily or involuntarily been stopped or interrupted. "Job Complete" is defaulted to except for the "Print" case.

The CURRENT JOB state can exit to the PROGRAM AHEAD state by touching the PROGRAM AHEAD button 250-1 in any of the "Job Complete", "Job Incomplete" or "Print" cases; or can exit to the INFORMATION state by pressing the "i" hard button on bezel 218; or can exit to the TOOLS state by touching the TOOLS soft touch button 250-2 in either the "Job Complete" or "Job Incomplete" cases. In addition the CURRENT JOB state will automatically enter the FAULT state when a fault occurs.

When entered in the CURRENT JOB state, the dialogue pathway file folders 260 tabbed STANDARD, OVERSIZED, and FANFOLD are displayed providing various dialogue pathway selections in the form of scorecards 270. The function and the behavior of these tabbed file folders within the dialogue pathway selection area 236 for the Job Complete", "Job Incomplete", and "Print" cases are as follows:

STANDARD: In the "Job Complete" Case, this file folder provides standard programming options. As seen in FIG. 17, the PROGRAM scorecard 270 is displayed with the following icons presented for selection to the operator: PAPER 302, FRONT COVER 304, BACK COVER 306, REDUCE/ENLARGE 308, TRIM 310, SHIFT 312, SIDES IMAGED 314, COPY QUALITY 316, OUTPUT 318, and RETRIEVE PROGRAMS 320. The EXCEPTION scorecard is also available with this file folder. The "Job Incomplete" and "Print" cases are inactive.

Figure 53:
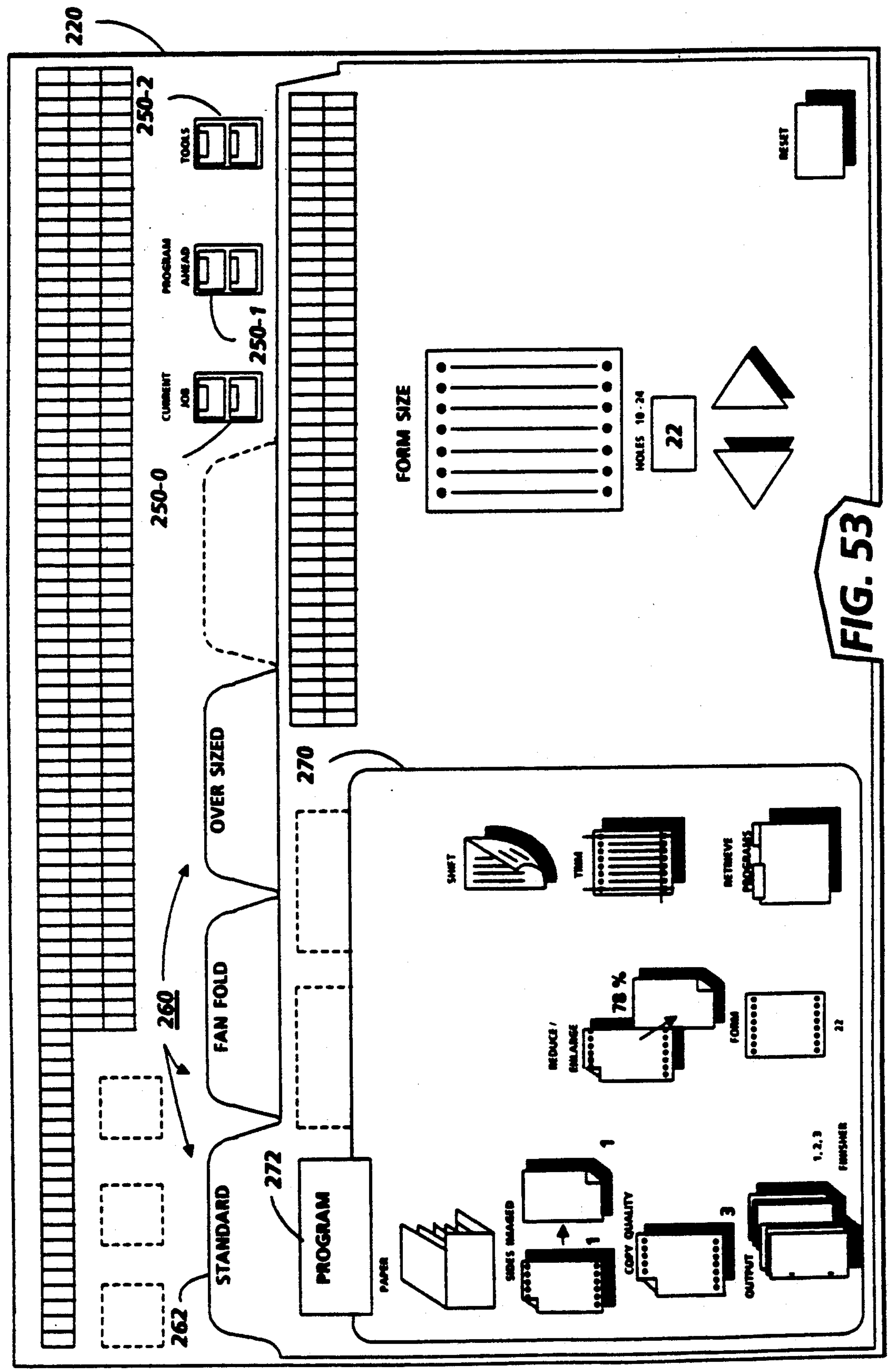
FIG. 53 is a front view depicting the touch monitor screen display in the CURRENT job mode following touch selection of the FANFOLD file folder.

FANFOLD: As seen in FIG. 53, in the "Job Complete" case, this file folder enables Computer Forms Feeding (CFF) input. This folder displays a scorecard tabbed PROGRAM having the following fanfold representing icons for selection by the operator: MAIN PAPER, REDUCE/ENLARGE, TRIM, SHIFT, SIDES IMAGED (1 - 1, 1 - 2 only), COPY QUALITY, FORM, OUTPUT, and RETRIEVE PROGRAMS. The "Job Incomplete" and "Print" cases are inactive.

Figure 54:
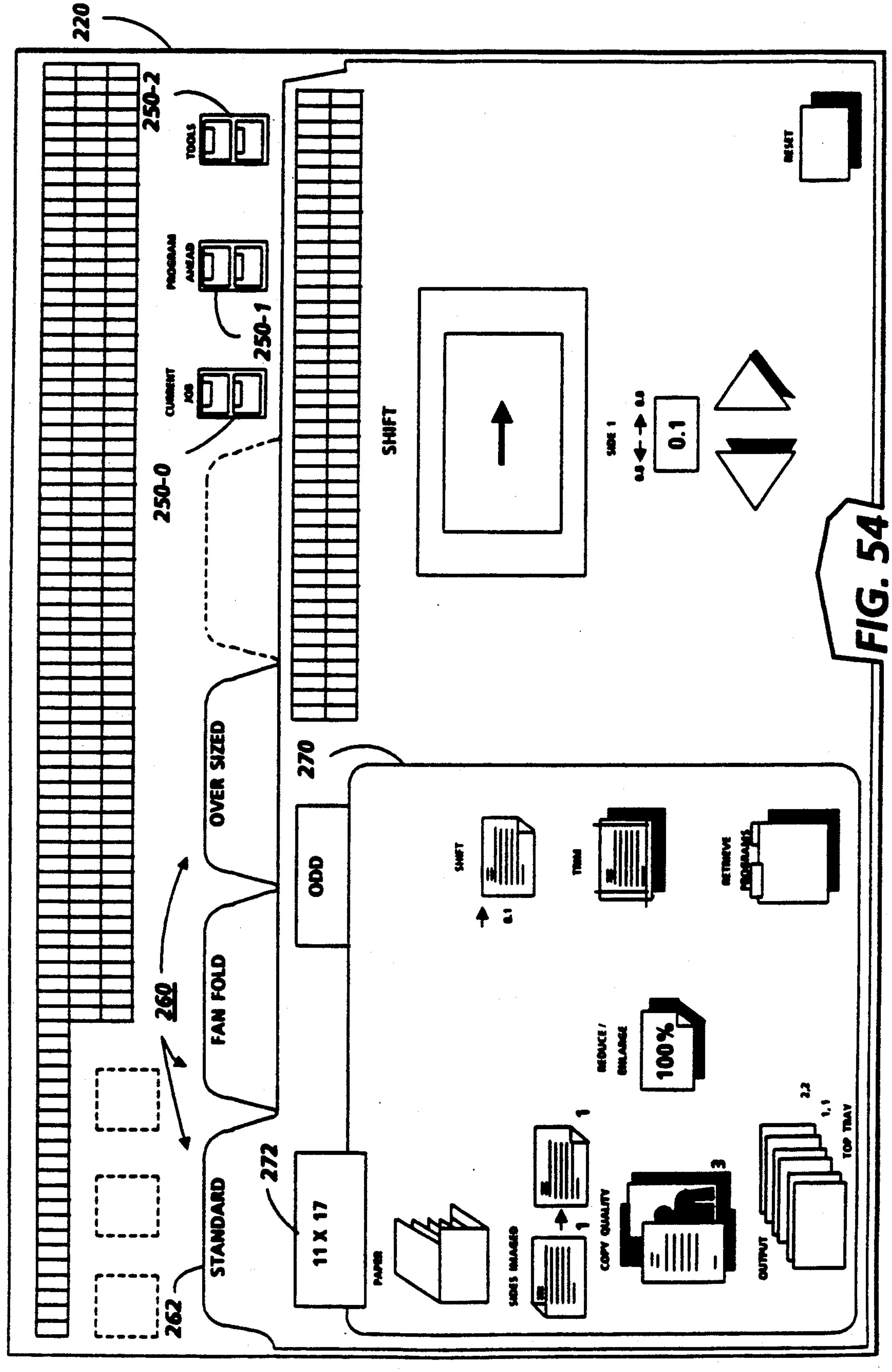
FIG. 54 is a front view depicting the touch monitor screen display in the CURRENT job mode following touch selection of the OVERSIZED file folder.

OVERSIZED: As seen in FIG. 54, in the "Job Complete" case, this file folder enables a special 3 - pitch operating mode for copies exceeding 9 inches in width. This file folder displays scorecards tabbed 11×17 and ODD having selections allowing the operator to choose from special program dialogues for 17" output greater than 9" but less than 17" and for odd size paper. The "job Incomplete" and "Print" cases are inactive.

In the ensuing description, it is presumed that the STANDARD dialogue pathway file folder 260 has been selected by touching the tab "STANDARD". It will, however, be understood that a different one of the dialogue pathway file folders available during operation in the CURRENT JOB state may be selected by touching the tab of the file folder desired. Further, it will be understood that each of the file folders 260 includes one of more scorecards 270 with programming selections in the form of icons, some or all of which may be the same or different from the ones discussed hereinbelow.

Referring now to FIGS. 17-52, selecting the STANDARD dialogue pathway file folder displays the PROGRAM scorecard 270 with the following selections (i.e., first level program selections) for the machine operator.

MAIN PAPER icon 302: (FIGS. 17-23): selection of this icon in the "Job Complete" case displays, in work selection area 240, icons 406, 408, 410, and 412 representing the machine paper trays 74 (#1), 78(#2), and 82 (#3), and "Auto Switch" (i.e. Trays 1 and 3). By selecting one of the tray icons, the operator chooses the tray from which paper will be fed for the main body of the job. Selections in the "Job Incomplete" and "Print" cases are the same.

Additionally, various paper stocks may be displayed in work selection area 240 through actuation of a STOCK BUTTON icon (not shown). In the example shown in FIG. 17, the stock types that are displayed are "standard" (icon 422), "drilled" (icon 424), "transparent" (icon 426), 8.7 to 9 inches (icon 428), "tabs" (icon 430), "11×17" (icon 431), and "odd" (icon 432). The stock type selection applies to the paper tray icon 406, 408, or 410 that is currently displayed in full color. The "Job Incomplete" case is the same while the "Print" case" is limited to changing the stock for trays not in use.

FRONT COVER icon 304: selection of this icon in the "Job Complete" case displays the paper tray icons 408 and 410 in work selection area 240 to allow the operator to select the paper tray (i.e., #2, or 3) from which the stock will be fed for the Front Cover. Selection of paper tray #1 is inhibited. The operator can also specify the number of sides of the cover to be imaged by selecting SIDES IMAGED icon 314. This selection is unavailable during the "Job Incomplete" and "Print" cases.

BACK COVER icon 306: selection of this icon is the same as that of the FRONT COVER icon described above.

REDUCE/ENLARGE icon 308: (FIGS. 25-27): Selection of this icon in the "Job Complete" case displays, in work selection area 240, a series of PRESET buttons 442-0, 442-1, 442-2, . . . 442-n (representing preset reductions of enlargements), and VARIABLE control 444 (permitting variable size selection). The reduction selected will be reflected as a percentage in a display window 446. The operator can use VARIABLE control 444 to alter a selected PRESET value, pressing VARIABLE control 444 de-selecting the PRESET button that has been selected. This selection is the same in the "Job Incomplete" case and unavailable in the "Print" case.

SIDES IMAGED icon 310: (FIGS. 27, 28): selection of this icon in the "Job Complete"case displays various side imaging options available in the form of 1 sided or 2 sided (DOCUMENT) and 1 sided or 2 sided (COPY). These icons allow the operator to select 1 or 2 sided copies. This selection is unavaliable in either the "Job Incomplete" or "Print" cases.

SHIFT icon 312: (FIGS. 29, 30): selection of this icon in the "Job Complete" case displays the various image shift options available to the operator for 1-sided and/or 2-sided copies in the work selection area 240. Bi-directional scroll functions 460, 462 are displayed for side 1 and/or side 2 shift, with windows 464, 466 for displaying the actual amount by which the image is shifted. Animated picture displays 467, 468 show the relative direction and amount of shift. This selection is the same in the "Job Incomplete" case and unavailable in the "Print" case.

TRIM icon 314: (FIGS. 31, 32): selection of this icon in the "Job Complete" case displays the image trimming options available to the operator in work selection area 240. These include NORMAL and COPY ALLicons 470, 472 respectively, together with LEFT EDGE, RIGHT EDGE, and BOTTOM EDGE displays 474, 476, 478 respectively for displaying the amount of the trim. LEFT, RIGHT, and BOTTOM bi-directional scrolling controls 480, 482, 484 respectively are provided to effect the trimming operation, with an animated picture 490 to indicate the relative direction and amount of trim. This selection is the same in the "Job Incomplete" and unavailable in the "Print" case.

COPY QUALITY icon 316: (FIGS. 33–36): selection of this icon in the "Job Complete" case displays a series of preset values in the form of images, identified here as STANDARD (icon 500), LIGHT (icon 502), PHOTO (icon 504), DARK (icon 508), HALFTONE (icon 510), BLUE TEXT (icon 512), and PASTE UP (icon 514). An exposure control 516 (COPY IMAGE) with associated scale representation 518 and SPECIAL CONTROL button 520 are also shown to allow adjustments by the operator. Actuation of the SPECIAL CONTROL button 520 displays in work selection area 240 special copy controls in the form of COPY LINES control 521 with an associated scale 522, a COPY SOLIDS control 524 with an associated scale 526, and a PHOTO:COPY TONES control 528 with an associated scale 530 together with PRESET and RESET buttons 534, 536 respectively. Buttons 534, 536 display currently selected values and in cooperation with controls 521, 524, 528 permit changes to be made by the operator to exposure, contrast, and photo contrast. This selection is the same in both the "Job Incomplete" and "Print" cases.

OUTPUT icon 318: (FIGS. 37, 38): selection of this icon in the "Job Complete" case divides the work selection area 240 into COLLATED/UNCOLLATED and TOP TRAY/FINISHER areas. In the COLLATED/UNCOLLATED area, there is displayed stacker collated and uncollated icons 540, 542. In the TOP TRAY/FINISHER area, there are various finishing options, illustrated here by icon 550 representing "top tray", and icon 551 representing "no finish", 552 representing "1 staple", icon 554 representing "2 staples", icon 556 representing "landscape staple", and icon 558 representing "bind". This selection is the same int he "Job Incomplete" case and unavailable in the "Print case".

RETRIEVED PROGRAMS icon 320: (FIGS. 39, 40): selection of this icon in the "Job Complete" case provides the operator with the method to return previously Saved Programs to the scorecard to be reviewed or modified. On selection of icon 320, the current program values remain on the scorecard and plural icons 580-1, 580-1, 580-2, . . . 580-n are displayed. When one of the icons 580-1, 580-1, 580-2, . . . 580-n is pressed, the last job saved in the selected icon enters the scorecard, displaying the last file folder tab/scorecard tab programmed while icon 320 displays the selected icon number. Programming previously in the scorecard is lost if not a SAVED PROGRAM. The copy quantity keyboard 230 (FIG. 5) is used to adjust previous selections made in the Saved Program. This selection is unavailable int he "Job Incomplete" and "Print" cases.

Referring to FIGS. 41–52, a second scorecard 270 tabbed EXCEPTION is also included with the STANDARD dialogue pathway file folder 260. This scorecard permits unique programming, referred to herein as exception programming, for individual pages or groups of pages within a job. The Exception Programming features are accessed by pressing the EXCEPTION tab which causes both the EXCEPTION scorecard to appear in the features selection area 238 of screen 222 and a Document Selection Work Area to appear in work selection area 240. (This work area also appears if the DOCUMENT SELECTION Icon 600 on the EXCEPTION scorecard is pressed while in a Feature work area).

The Document Selection work area provides the following displays:

Document Selection scroll Buttons 604: these allow the operator to select a desired page number, the selected page number being shown in DOCUMENT (SIDE) Window 606.

DELETE Button 608: permits the operator to delete the selected page number.

DELETE ALL Button 614: permits the operator to delete all exception pages.

REVIEW SCROLL Buttons 612: permits the operator to review pages in the EXCEPTIONS PROGRAMMED window 610 or to review the programming of all the documents which contain exceptions. The operator can also scroll through a wrap-around list of pages with associated sides, which in duplex will wrap from 1 up to the maximum number of pages including all side 2's that can be accomplished by the machine document handler 26. When in simplex, only side 1's are displayed.

GROUP Button 618: permits the operator, after a page number is entered, to expand to a group of pages. When button 618 is pressed, an arrow appears in page window 606 and the scroll buttons 604 now act upon numbers in the right side of the window.

The EXCEPTION programming scorecard displays the following programming selections to the operator.

DOCUMENT SELECTION icon 600: selection of this icon in the "Job Complete" case provides the operator with access to the Document Selection workarea and displays the number of the page currently being displayed in the scorecard. This icon is unavailable in the "Job Incomplete" and "Print" cases.

SHIFT icon 628: same as SHIFT icon 312 in the PROGRAM scorecard.

COPY QUALITY icon 630: same as COPY QUALITY icon 316 in the PROGRAM scorecard. This icon is unavailable in the "Job Incomplete" and "Print" cases.

1 SIDED icon 632: functions in a similar manner as the SIDES IMAGED icon 310 in the PROGRAM scorecard. This icon is unavailable in the "Job Incomplete" and "Print" cases.

INSERT icon 634: allows the operator to select the tray from which inserts will be fed (NON IMAGED).

SPECIAL PAPER icon 636: allows the user to select the tray from which the paper will be fed for copying. This icon is unavailable in the "Job Incomplete" and "Print" cases.

CHAPTER START icon 638: allows the operator to designate that the beginning of a chapter in a 1:2 Sides-Imaged program should be printed face-up. This icon is unavailable in the "Job Incomplete" and "Print" cases.

On exit from an icon or scorecard or the file folder, the last state of the exited item is retained in memory 115.

While the preceding description has described operation of U.I. 213 in the CURRENT JOB state entered by touching soft touch button 250-0 on screen 220, it will be understood that other suitable dialogue pathway file folders with scorecards may be displayed on screen 222 by entering one of the PROGRAM AHEAD TOOLS FAULTS or INFORMATION states. These states are entered by touching of touch button 250-1 (PROGRAM AHEAD) or button 250-2 (TOOLS), or in the event a fault occurs (FAULT), or be pressing hard button "i" (INFORMATION) on bezel 218.

The attached Appendix comprises a program (Copyright 1984 by Xerox Corporation) for the touch dialogue User Interface of the present invention.

While the invention has been described with reference to the structure disclosed, it is not confined to the details set forth, but is intended to cover such modifications or changes as may come within the scope of the following claims.

APPENDIX

```
(PRETTYCOMPRINT PROGRAMMINGB31COMS)

(RPAQQ PROGRAMMINGB31COMS ((DIALOGS INTERF.PROGRAMMING)))
(READ.INTERFACEQ INTERF.PROGRAMMING 3)
(\TYPE INTERFACE NAME INTERF.PROGRAMMING FRAMES  ((\TYPE FRAME NAME BITMAP.QUALITY ITEMS  ((\TYPE
BITMAP PLACEMENT  (169 . 193) NAME QUALITY.MANUAL BITMAP  {(READBITMAP)(26 251
"OOOOOOL@"
"H@@@@@D@"
"H@@@@@D@"
"H@@@@@D@"
"H@@@@@D@"
"H@@@@@D@"
"H@@@@@D@"
"H@@@@@D@"
"H@@@@@D@"
"H@@@@@D@"
"H@@@@@D@"
"H@@H@@D@"
"H@AH@@D@"
"H@GH@@D@"
"H@@H@@D@"
"H@@H@@D@"
"H@@H@@D@"
"H@@H@@D@"
"H@@H@@D@"
"H@@@@@D@"
"H@@@@@D@"
"H@@@@@D@"
"H@@@@@D@"
"H@@@@@D@"
"H@@@@@D@"
"OOOOOOL@"
"H@@@@@D@"
"H@@@@@D@"
"H@@@@@D@"
"H@@@@@D@"
"H@@@@@D@"
"H@@@@@D@"
"H@@@@@D@"
"H@@@@@D@"
"H@@@@@D@"
"H@AL@@D@"
"H@BB@@D@"
"H@@B@@D@"
"H@@B@@D@"
"H@@L@@D@"
"H@A@@@D@"
"H@B@@@D@"
"H@CN@@D@"
"H@@@@@D@"
"H@@@@@D@"
"H@@@@@D@"
"H@@@@@D@"
"H@@@@@D@"
"H@@@@@D@"
"H@@@@@D@"
"OOOOOOL@"
"H@@@@@D@"
"H@@@@@D@"
"H@@@@@D@"
"H@@@@@D@"
"H@@@@@D@"
"H@@@@@D@"
"H@@@@@D@"
"H@@@@@D@"
"H@@@@@D@"
"H@@@@@D@"
"H@CH@@D@"
"H@DD@@D@"
"H@@D@@D@"
"H@AH@@D@"
"H@@D@@D@"
"H@@D@@D@"
"H@DD@@D@"
"H@CH@@D@"
"H@@@@@D@"
```

```
"H@@@@@D@"
"H@@@@@D@"
"H@@@@@D@"
"H@@@@@D@"
"H@@@@@D@"
"OOOOOOL@"
"H@@@@@D@"
"H@@@@@D@"
"H@@@@@D@"
"H@@@@@D@"
"H@@@@@D@"
"H@@@@@D@"
"H@@@@@D@"
"H@@@@@D@"
"H@@@@@D@"
"H@@L@@D@"
"H@@L@@D@"
"H@AD@@D@"
"H@AD@@D@"
"H@BD@@D@"
"H@CN@@D@"
"H@@D@@D@"
"H@@D@@D@"
"H@@@@@D@"
"H@@@@@D@"
"H@@@@@D@"
"H@@@@@D@"
"H@@@@@D@"
"H@@@@@D@"
"H@@@@@D@"
"OOOOOOL@"
"H@@@@@D@"
"H@@@@@D@"
"H@@@@@D@"
"H@@@@@D@"
"H@@@@@D@"
"H@@@@@D@"
"H@@@@@D@"
"H@@@@@D@"
"H@@@@@D@"
"H@@@@@D@"
"H@AN@@D@"
"H@A@@@D@"
"H@CL@@D@"
"H@BB@@D@"
"H@@B@@D@"
"H@@B@@D@"
"H@BB@@D@"
"H@AL@@D@"
"H@@@@@D@"
"H@@@@@D@"
"H@@@@@D@"
"H@@@@@D@"
"H@@@@@D@"
"H@@@@@D@"
"OOOOOOL@"
"H@@@@@D@"
"H@@@@@D@"
"H@@@@@D@"
"H@@@@@D@"
"H@@@@@D@"
"H@@@@@D@"
"H@@@@@D@"
"H@@@@@D@"
"H@@@@@D@"
"H@AL@@D@"
"H@BB@@D@"
"H@B@@@D@"
"H@CL@@D@"
"H@BB@@D@"
"H@BB@@D@"
"H@BB@@D@"
"H@AL@@D@"
"H@@@@@D@"
"H@@@@@D@"
"H@@@@@D@"
"H@@@@@D@"
"H@@@@@D@"
"H@@@@@D@"
"H@@@@@D@"
"OOOOOOL@"
"H@@@@@D@"
"H@@@@@D@"
"H@@@@@D@"
"H@@@@@D@"
"H@@@@@D@"
"H@@@@@D@"
```

```
"H@@@@@D@"
"H@AO@@D@"
"H@@A@@D@"
"H@@B@@D@"
"H@@D@@D@"
"H@@D@@D@"
"H@@H@@D@"
"H@@H@@D@"
"H@@H@@D@"
"H@@@@@D@"
"H@@@@@D@"
"H@@@@@D@"
"H@@@@@D@"
"H@@@@@D@"
"H@@@@@D@"
"H@@@@@D@"
"H@@@@@D@"
"H@@@@@D@"
"OOOOOOL@"
"H@@@@@D@"
"H@@@@@D@"
"H@@@@@D@"
"H@@@@@D@"
"H@@@@@D@"
"H@@@@@D@"
"H@@@@@D@"
"H@@N@@D@"
"H@AA@@D@"
"H@AA@@D@"
"H@@N@@D@"
"H@AA@@D@"
"H@AA@@D@"
"H@AA@@D@"
"H@@N@@D@"
"H@@@@@D@"
"H@@@@@D@"
"H@@@@@D@"
"H@@@@@D@"
"H@@@@@D@"
"H@@@@@D@"
"H@@@@@D@"
"H@@@@@D@"
"H@@@@@D@"
"OOOOOOL@"
"H@@@@@D@"
"H@@@@@D@"
"H@@@@@D@"
"H@@@@@D@"
"H@@@@@D@"
"H@@@@@D@"
"H@@@@@D@"
"H@@@@@D@"
"H@AL@@D@"
"H@BB@@D@"
"H@BB@@D@"
"H@BB@@D@"
"H@AN@@D@"
"H@@B@@D@"
"H@BB@@D@"
"H@AL@@D@"
"H@@@@@D@"
"H@@@@@D@"
"H@@@@@D@"
"H@@@@@D@"
"H@@@@@D@"
"H@@@@@D@"
"H@@@@@D@"
"H@@@@@D@"
"OOOOOOL@"
"H@@@@@D@"
"H@@@@@D@"
"H@@@@@D@"
"H@@@@@D@"
"H@@@@@D@"
"H@@@@@D@"
"H@@@@@D@"
"H@@@@@D@"
"H@@@@@D@"
"H@A@N@D@"
"H@CAA@D@"
"H@OAA@D@"
"H@AAA@D@"
"H@AAA@D@"
"H@AAA@D@"
"H@AAA@D@"
"H@A@N@D@"
"H@@@@@D@"
```

```
"H@@@@@D@"
"H@@@@@D@"
"H@@@@@D@"
"H@@@@@D@"
"H@@@@@D@"
"H@@@@@D@"
"OOOOOOL@")}) (\TYPE BITMAP PLACEMENT  (279 . 229) NAME SHADED.BLOCK BITMAP  ((READBITMAP)(21 23
"HHHHHH@@"
"AAAAA@@@"
"AAAAA@@@"
"@@@@@@@@"
"HHHHHH@@"
"AAAAA@@@"
"AAAAA@@@"
"@@@@@@@@"
"HHHHHH@@"
"AAAAA@@@"
"AAAAA@@@"
"@@@@@@@@"
"HHHHHH@@"
"AAAAA@@@"
"AAAAA@@@"
"@@@@@@@@"
"HHHHHH@@"
"AAAAA@@@"
"AAAAA@@@"
"@@@@@@@@"
"HHHHHH@@"
"AAAAA@@@"
"AAAAA@@@")}))) CLASSES  (BITMAP.FRAMES))  (\TYPE FRAME NAME BITMAPS ITEMS  ((\TYPE BITMAP PLACEMENT  (338 . 2
00)
 NAME PAGE BITMAP  ((READBITMAP)(26 40
"OOOOOOL@"
"OOOOOOL@"
"L@@@@@L@"
"L@@@@@L@"
"MOO@@@L@"
"L@@@@@L@"
"MOO@@@L@"
"L@@@@@L@"
"L@@@@@L@"
"L@@@@@L@"
"L@@@@@L@"
"MOOOOLL@"
"L@@@@@L@"
"L@@@@@L@"
"MOOOOLL@"
"L@@@@@L@"
"L@@@@@L@"
"MOOOOLL@"
"L@@@@@L@"
"L@@@@@L@"
"MOOOOLL@"
"L@@@@@L@"
"L@@@@@L@"
"MOOOOLL@"
"L@@@@@L@"
"L@@@@@L@"
"MOOOOLL@"
"L@@@@@L@"
"L@@@@AL@"
"MOOONCL@"
"L@@@@NL@"
"L@@@@LL@"
"MOOOILH@"
"L@@@C@H@"
"L@@@BAH@"
"L@@@CA@@"
"L@@@AK@@"
"L@@@@O@@"
"OOOOOO@@"
"OOOOOL@@")})  (\TYPE BITMAP PLACEMENT  (273 . 266) NAME SIMPLE.BUTTON.BITMAP BITMAP  ((READBITMAP)(26 40
"OOOOOOL@"
"OOOOOOL@"
"L@@@@@L@"
"L@@@@@L@"
"MOO@@@L@"
"L@@@@@L@"
"MOO@@@L@"
"L@@@@@L@"
"L@@@@@L@"
"L@@@@@L@"
"L@@@@@L@"
"MOOOOLL@"
"L@L@@@L@"
"LAH@@@L@"
"MKKOOLL@"
```

```
"LF@@@@L@"
"LL@@@@L@"
"MOOOGLL@"
"MOOO@@L@"
"LL@@@@L@"
"LGOOOLL@"
"LC@@@@L@"
"LAH@@@L@"
"MOOOOLL@"
"L@L@@@L@"
"L@@@@@L@"
"MOOOOLL@"
"L@@@@@L@"
"L@@@@AL@"
"MOOONCL@"
"L@@@@NL@"
"L@@@@LL@"
"MOOOILH@"
"L@@@C@H@"
"L@@@BAH@"
"L@@@CA@@"
"L@@@AK@@"
"L@@@@O@@"
"OOOOOO@@"
"OOOOOL@@"))) (\TYPE BITMAP PLACEMENT (338 . 144) NAME BLANK.PAGE BITMAP ((READBITMAP)(26 40
"OOOOOOL@"
"OOOOOOL@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@AL@"
"L@@@@CL@"
"L@@@@NL@"
"L@@@@LL@"
"L@@@ALH@"
"L@@@C@H@"
"L@@@BAH@"
"L@@@CA@@"
"L@@@AK@@"
"L@@@@O@@"
"OOOOOO@@"
"OOOOOL@@")}) (\TYPE BITMAP PLACEMENT (32 . 72) NAME OPEN.LINES BITMAP ((READBITMAP)(59 47
"L@@@@@@@@@@@@@F@"
"L@@@@@@@@@@@@@F@"
"L@@@@@@@@@@@@@F@"
"L@@@@@@@@@@@@@F@"
"L@@@@@@@@@@@@@F@"
"L@@@@@@@@@@@@@F@"
"L@@@@@@@@@@@@@F@"
"L@@@@@@@@@@@@@F@"
"L@@@@@@@@@@@@@F@"
"L@@@@@@@@@@@@@F@"
"L@@@@@@@@@@@@@F@"
"L@@@@@@@@@@@@@F@"
"L@@@@@@@@@@@@@F@"
"L@@@@@@@@@@@@@F@"
"L@@@@@@@@@@@@@F@"
"L@@@@@@@@@@@@@F@"
"L@@@@@@@@@@@@@F@"
"L@@@@@@@@@@@@@F@"
"L@@@@@@@@@@@@@F@"
"L@@@@@@@@@@@@@F@"
"L@@@@@@@@@@@@@F@"
"L@@@@@@@@@@@@@F@"
```

```
"L@@@@@@@@@@@@@@F@"
"L@@@@@@@@@@@@@@F@"
"L@@@@@@@@@@@@@@F@"
"L@@@@@@@@@@@@@@F@"
"L@@@@@@@@@@@@@@F@"
"L@@@@@@@@@@@@@@F@"
"L@@@@@@@@@@@@@@F@"
"L@@@@@@@@@@@@@@F@"
"L@@@@@@@@@@@@@@F@"
"L@@@@@@@@@@@@@@F@"
"L@@@@@@@@@@@@@@F@"
"L@@@@@@@@@@@@@@F@"
"L@@@@@@@@@@@@@@F@"
"OOOOOOOOOOOOOOON@"
"OOOOOOOOOOOOOOON@"
"@@@@@@@@@@@@@@@F@"
"@@@@@@@@@@@@@@@F@"
"@@@@@@@@@@@@@@@F@"
"@@@@@@@@@@@@@@@F@"
"@@@@@@@@@@@@@@@F@"
"@@@@@@@@@@@@@@@F@"
"@@@@@@@@@@@@@@@F@"
"@@@@@@@@@@@@@@@F@"
"@@@@@@@@@@@@@@@F@"
"@@@@@@@@@@@@@@@F@")})  (\TYPE BITMAP PLACEMENT  (319 . 257) NAME CROPPING.SHADOW BITMAP  {(READBITMAP)(40 69
"@OAOHCLCN@@@"
"A@I@DDBBA@@@"
"B@A@DHABA@@@"
"B@A@DHABA@@@"
"B@AOHHACN@@@"
"B@A@DHAB@C@@"
"A@I@DDBB@@@@"
"@OA@DCLB@@@@"
"@@@@@@@@@@@@"
"@@@@@@@@@@@@"
"@@@@@@@@@@@@"
"@@@@@@@@@@@@"
"CNAB@HGL@@@@"
"BAAC@HHB@@@@"
"BAABHI@@@@@@"
"BAABDI@@@@@@"
"CNABDIAN@@@@"
"B@ABBI@B@@@@"
"B@ABAHHF@@@@"
"B@AB@HGJ@@@@"
"@@@@@@@@@@@@"
"@@@@@@@@@@@@"
"@@@@@@@@@@@@"
"OOOOOOL@@@@@"
"OOOOOOL@@@@@"
"L@@H@@L@@@@@"
"L@AL@@L@@@@@"
"MOKN@@L@@@@@"
"L@FK@@L@@@@@"
"MNNIH@L@@@@@"
"LAHHL@L@@@@@"
"LA@HD@L@@@@@"
"L@@H@@L@@@@@"
"L@@H@@L@@@@@"
"MOOOOLL@@@@@"
"L@LIH@L@@@@@"
"LAHHL@L@@@@@"
"MKKOFLL@@@@@"
"LF@HC@L@@@@@"
"LL@HAHL@@@@@"
"MOOOOLL@@@@@"
"MOOOOLL@@@@@"
"LL@HAHL@@@@@"
"LGOOODL@@@@@"
"LC@HF@L@@@@@"
"LAHHL@L@@@@@"
"MOOOMLL@@@@@"
"L@LIH@L@@@@@"
"L@@H@@L@@@@@"
"MOOOOLL@@@@@"
"L@@H@@L@@@@@"
"L@@H@AL@@@@@"
"MOOONCL@@@@@"
"L@@H@NL@@@@@"
"LA@HDLL@@@@@"
"MMKNMLH@@@@@"
"L@LIK@H@@@@@"
"L@FKBAH@@@@@"
"L@CNCAC@@@@@"
"L@ALAKGH@@@@"
"L@@H@OGH@@@@"
"OOOOOOGH@@@@"
```

```
"OOOOOLGH@@@@"
"@@@@@@OH@@@@"
"OOOOOOO@@@@@"
"OOOOOON@@@@@"
"OOOOOOL@@@@@"
"OOOOOOH@@@@@"
"OOOOOO@@@@@@"))) (\TYPE BITMAP PLACEMENT (76 . 276) NAME LEFT.ARROW BITMAP {(READBITMAP)(32 57
"@@@@@@@N"
"@@@@@@AL"
"@@@@@@CH"
"@@@@@@GB"
"@@@@@@NB"
"@@@@@ALB"
"@@@@@CHB"
"@@@@@G@B"
"@@@@@N@B"
"@@@@AL@B"
"@@@@CH@B"
"@@@@G@@B"
"@@@@N@@B"
"@@@AL@@B"
"@@@CH@@B"
"@@@G@@@B"
"@@@N@@@B"
"@@AL@@@B"
"@@CH@@@B"
"@@G@@@@B"
"@@N@@@@B"
"@AL@@@@B"
"@CH@@@@B"
"@G@@@@@B"
"@N@@@@@B"
"AL@@@@@B"
"CH@@@@@B"
"G@@@@@@B"
"O@@@@@@B"
"CH@@@@@B"
"AL@@@@@B"
"@N@@@@@B"
"@G@@@@@B"
"@CH@@@@B"
"@AL@@@@B"
"@@N@@@@B"
"@@G@@@@B"
"@@CH@@@B"
"@@AL@@@B"
"@@@N@@@B"
"@@@G@@@B"
"@@@CH@@B"
"@@@AL@@B"
"@@@@N@@B"
"@@@@G@@B"
"@@@@CH@B"
"@@@@AL@B"
"@@@@@N@B"
"@@@@@G@B"
"@@@@@CHB"
"@@@@@ALB"
"@@@@@@NB"
"@@@@@@GB"
"@@@@@@CH"
"@@@@@@AL"
"@@@@@@@N"
"@@@@@@@G"))) (\TYPE BITMAP PLACEMENT (153 . 275) NAME RIGHT.ARROW BITMAP {(READBITMAP)(32 57
"N@@@@@@@"
"G@@@@@@@"
"CH@@@@@@"
"AL@@@@@@"
"DN@@@@@@"
"DG@@@@@@"
"DCH@@@@@"
"DAL@@@@@"
"D@N@@@@@"
"D@G@@@@@"
"D@CH@@@@"
"D@AL@@@@"
"D@@N@@@@"
"D@@G@@@@"
"D@@CH@@@"
"D@@AL@@@"
"D@@@N@@@"
"D@@@G@@@"
"D@@@CH@@"
"D@@@AL@@"
"D@@@@N@@"
"D@@@@G@@"
"D@@@@CH@"
```

```
"D@@@@AL@"
"D@@@@@N@"
"D@@@@@G@"
"D@@@@@CH"
"D@@@@@AL"
"D@@@@@@O"
"D@@@@@@N"
"D@@@@@AL"
"D@@@@@CH"
"D@@@@@G@"
"D@@@@@N@"
"D@@@@AL@"
"D@@@@CH@"
"D@@@@G@@"
"D@@@@N@@"
"D@@@AL@@"
"D@@@CH@@"
"D@@@G@@@"
"D@@@N@@@"
"D@@AL@@@"
"D@@CH@@@"
"D@@G@@@@"
"D@@N@@@@"
"D@AL@@@@"
"D@CH@@@@"
"D@G@@@@@"
"D@N@@@@@"
"DAL@@@@@"
"DCH@@@@@"
"DG@@@@@@"
"DN@@@@@@"
"AL@@@@@@"
"CH@@@@@@"
"G@@@@@@@"}))  (\TYPE BITMAP PLACEMENT  (116 . 340) NAME UP.ARROW BITMAP  {(READBITMAP)(57 32
"@@@@@@@H@@@@@@@@"
"@@@@@@@L@@@@@@@@"
"@@@@@@AN@@@@@@@@"
"@@@@@@CO@@@@@@@@"
"@@@@@@GCH@@@@@@@"
"@@@@@@NAL@@@@@@@"
"@@@@@AL@N@@@@@@@"
"@@@@@CH@G@@@@@@@"
"@@@@@G@@CH@@@@@@"
"@@@@@N@@AL@@@@@@"
"@@@@AL@@@N@@@@@@"
"@@@@CH@@@G@@@@@@"
"@@@@G@@@@CH@@@@@"
"@@@@N@@@@AL@@@@@"
"@@@AL@@@@@N@@@@@"
"@@@CH@@@@@G@@@@@"
"@@@G@@@@@@CH@@@@"
"@@@N@@@@@@AL@@@@"
"@@AL@@@@@@@N@@@@"
"@@CH@@@@@@@G@@@@"
"@@G@@@@@@@@CH@@@"
"@@N@@@@@@@@AL@@@"
"@AL@@@@@@@@@N@@@"
"@CH@@@@@@@@@G@@@"
"@G@@@@@@@@@@CH@@"
"@N@@@@@@@@@@AL@@"
"AL@@@@@@@@@@@N@@"
"CH@@@@@@@@@@@G@@"
"G@@@@@@@@@@@@CH@"
"N@@@@@@@@@@@@AH@"
"LOOOOOOOOOOOOLH@"
"H@@@@@@@@@@@@@@@"}))  (\TYPE BITMAP PLACEMENT  (111 . 205) NAME DOWN.ARROW BITMAP  {(READBITMAP)(57 32
"@@@@@@@@@@@@@@H@"
"IOOOOOOOOOOOOIH@"
"L@@@@@@@@@@@@CH@"
"N@@@@@@@@@@@@G@@"
"G@@@@@@@@@@@@N@@"
"CH@@@@@@@@@@AL@@"
"AL@@@@@@@@@@CH@@"
"@N@@@@@@@@@@G@@@"
"@G@@@@@@@@@@N@@@"
"@CH@@@@@@@@AL@@@"
"@AL@@@@@@@@CH@@@"
"@@N@@@@@@@@G@@@@"
"@@G@@@@@@@@N@@@@"
"@@CH@@@@@@AL@@@@"
"@@AL@@@@@@CH@@@@"
"@@@N@@@@@@G@@@@@"
"@@@G@@@@@@N@@@@@"
"@@@CH@@@@AL@@@@@"
"@@@AL@@@@CH@@@@@"
"@@@@N@@@@G@@@@@@"
```

```
"@@@@G@@@@N@@@@@@"
"@@@@CH@@AL@@@@@@"
"@@@@AL@@CH@@@@@@"
"@@@@@N@@G@@@@@@@"
"@@@@@G@@N@@@@@@@"
"@@@@@CHAL@@@@@@@"
"@@@@@ALCH@@@@@@@"
"@@@@@@NG@@@@@@@@"
"@@@@@@GN@@@@@@@@"
"@@@@@@CL@@@@@@@@"
"@@@@@@AH@@@@@@@@"
"@@@@@@@H@@@@@@@@@")})  (\TYPE BITMAP PLACEMENT  (471 . 42) NAME BIG.PAPER&LINES BITMAP  {(READBITMAP)(150 207

"OOOOOOOOOOOOOOOOOOOOOOOOOOOOOOOOOOOOOL@@"
"OOOOOOOOOOOOOOOOOOOOOOOOOOOOOOOOOOOOOL@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@OOOOOOOOOL@@@@@@@@@@@@@@@@@@@@@@L@@"
"L@@@@OOOOOOOOOL@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@OOOOOOOOOL@@@@@@@@@@@@@@@@@@@@@@L@@"
"L@@@@OOOOOOOOOL@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@COOOOOOOOOOOOOOOOOOOOOOOOOO@@@@@@L@@"
"L@@@COOOOOOOOOOOOOOOOOOOOOOOOOO@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@COOOOOOOOOOOOOOOOOOOOOOOOOO@@@@@@L@@"
"L@@@COOOOOOOOOOOOOOOOOOOOOOOOOO@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@COOOOOOOOOOOOOOOOOOOOOOOOOO@@@@@@L@@"
"L@@@COOOOOOOOOOOOOOOOOOOOOOOOOO@@@@@@L@@"
```

```
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@COOOOOOOOOOOOOOOOOOOOOOOOOO@@@@@@L@@"
"L@@@COOOOOOOOOOOOOOOOOOOOOOOOOO@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@COOOOOOOOOOOOOOOOOOOOOOOOOO@@@@@@L@@"
"L@@@COOOOOOOOOOOOOOOOOOOOOOOOOO@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@COOOOOOOOOOOOOOOOOOOOOOOOOO@@@@@@L@@"
"L@@@COOOOOOOOOOOOOOOOOOOOOOOOOO@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@COOOOOOOOOOOOOOOOOOOOOOOOOO@@@@@@L@@"
"L@@@COOOOOOOOOOOOOOOOOOOOOOOOOO@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@COOOOOOOOOOOOOOOOOOOOOOOOOO@@@@@@L@@"
"L@@@COOOOOOOOOOOOOOOOOOOOOOOOOO@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@COOOOOOOOOOOOOOOOOOOOOOOOOO@@@@@@L@@"
"L@@@COOOOOOOOOOOOOOOOOOOOOOOOOO@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@COOOOOOOOOOOOOOOOOOOOOOOOOO@@@@@@L@@"
"L@@@COOOOOOOOOOOOOOOOOOOOOOOOOO@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@COOOOOOOOOOOOOOOOOOOOOOOOOO@@@@@@L@@"
"L@@@COOOOOOOOOOOOOOOOOOOOOOOOOO@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
"L@@@@@@@@@@@@@@@@@@@@@@@@@@@@@@@@@@@@@@L@@"
```

```
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@AOOOOOL@@@@@@@@@@@@@@@@@@@@@@@L@@"
"L@@@@@@AOOOOOL@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@AOOOOOL@@@@@@@@@@@@@@@@@@@@@@@L@@"
"L@@@@@@AOOOOOL@@@@@@@@@@@@@@@@@@@OOOOL@@"
"L@@@@@@@@@@@@@@@@@@@@@@@@@@@@@@@@OOOOH@@"
"L@@@@@@@@@@@@@@@@@@@@@@@@@@@@@@@@L@@@H@@"
"L@@@@@@@@@@@@@@@@@@@@@@@@@@@@@@@@L@@AH@@"
"L@@@@@@@@@@@@@@@@@@@@@@@@@@@@@@@@L@@A@@@"
"L@@@@@@@@@@@@@@@@@@@@@@@@@@@@@@@@L@@A@@@"
"L@@@@@@@@@@@@@@@@@@@@@@@@@@@@@@@@L@@C@@@"
"L@@@@@@@@@@@@@@@@@@@@@@@@@@@@@@@@L@@B@@@"
"L@@@@@@@@@@@@@@@@@@@@@@@@@@@@@@@AL@@F@@@"
"L@@@@@@@@@@@@@@@@@@@@@@@@@@@@@@@AH@@D@@@"
"L@@@@@@@@@@@@@@@@@@@@@@@@@@@@@@@AH@@L@@@"
"L@@@@@@@@@@@@@@@@@@@@@@@@@@@@@@@CH@@H@@@"
"L@@@@@@@@@@@@@@@@@@@@@@@@@@@@@@@C@@AH@@@"
"L@@@@@@@@@@@@@@@@@@@@@@@@@@@@@@@C@@A@@@@"
"L@@@@@@@@@@@@@@@@@@@@@@@@@@@@@@@C@@C@@@@"
"L@@@@@@@@@@@@@@@@@@@@@@@@@@@@@@@G@@B@@@@"
"L@@@@@@@@@@@@@@@@@@@@@@@@@@@@@@@F@@F@@@@"
"L@@@@@@@@@@@@@@@@@@@@@@@@@@@@@@@F@@L@@@@"
"L@@@@@@@@@@@@@@@@@@@@@@@@@@@@@@@N@AH@@@@"
"L@@@@@@@@@@@@@@@@@@@@@@@@@@@@@@@L@A@@@@@"
"L@@@@@@@@@@@@@@@@@@@@@@@@@@@@@@AL@C@@@@@"
"L@@@@@@@@@@@@@@@@@@@@@@@@@@@@@@AH@F@@@@@"
"L@@@@@@@@@@@@@@@@@@@@@@@@@@@@@@CH@L@@@@@"
"L@@@@@@@@@@@@@@@@@@@@@@@@@@@@@@G@AH@@@@@"
"L@@@@@@@@@@@@@@@@@@@@@@@@@@@@@@F@G@@@@@@"
"L@@@@@@@@@@@@@@@@@@@@@@@@@@@@@@L@L@@@@@@"
"L@@@@@@@@@@@@@@@@@@@@@@@@@@@@@AHAH@@@@@@"
"L@@@@@@@@@@@@@@@@@@@@@@@@@@@@@C@G@@@@@@@"
"L@@@@@@@@@@@@@@@@@@@@@@@@@@@@@FAL@@@@@@@"
"L@@@@@@@@@@@@@@@@@@@@@@@@@@@@@LG@@@@@@@@"
"L@@@@@@@@@@@@@@@@@@@@@@@@@@@@ALH@@@@@@@@"
"OOOOOOOOOOOOOOOOOOOOOOOOOOOOOOOH@@@@@@@@"
"OOOOOOOOOOOOOOOOOOOOOOOOOOOOOL@@@@@@@@@@"))) (\TYPE BITMAP PLACEMENT (498 . 283) NAME BIG.LINES BITMAP ((
READBITMAP)(82 137
"OOOOOON@@@@@@@@@@@@@@@@@"
"OOOOOON@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"OOOOOON@@@@@@@@@@@@@@@@@"
"OOOOOON@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"OOOOOOOOOOOOOOOOOOOOL@@@"
"OOOOOOOOOOOOOOOOOOOOL@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"OOOOOOOOOOOOOOOOOOOOL@@@"
"OOOOOOOOOOOOOOOOOOOOL@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
```

```
"@@@@@@@@@@@@@@@@@@@@@@@@@"
"@@@@@@@@@@@@@@@@@@@@@@@@@"
"000000000000000000000L@@@"
"000000000000000000000L@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"000000000000000000000L@@@"
"000000000000000000000L@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"000000000000000000000L@@@"
"000000000000000000000L@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"000000000000000000000L@@@"
"000000000000000000000L@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"000000000000000000000L@@@"
"000000000000000000000L@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"000000000000000000000L@@@"
"000000000000000000000L@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"000000000000000000000L@@@"
"000000000000000000000L@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"000000000000000000000L@@@"
"000000000000000000000L@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
"@@@@@@@@@@@@@@@@@@@@@@@@@"
```

```
"@@@@@@@@@@@@@@@@@@@@@@@@"
"OOOOON@@@@@@@@@@@@@@@@@@"
"OOOOON@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"OOOOON@@@@@@@@@@@@@@@@@@"
"OOOOON@@@@@@@@@@@@@@@@@@")}) (\TYPE BITMAP PLACEMENT (178 . 11) NAME BIG.PAPER BITMAP {(READBITMAP)(150 2
07
"OOOOOOOOOOOOOOOOOOOOOOOOOOOOOOOOOOOOOL@@"
"OOOOOOOOOOOOOOOOOOOOOOOOOOOOOOOOOOOOOL@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
```

```
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
```

```
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@@@@@L@@"
"L@@@@@@@@@@@@@@@@@@@@@@@@@@@@@@@@OOOOL@@"
"L@@@@@@@@@@@@@@@@@@@@@@@@@@@@@@@@OOOOH@@"
"L@@@@@@@@@@@@@@@@@@@@@@@@@@@@@@@@L@@@H@@"
"L@@@@@@@@@@@@@@@@@@@@@@@@@@@@@@@@L@@AH@@"
"L@@@@@@@@@@@@@@@@@@@@@@@@@@@@@@@@L@@A@@@"
"L@@@@@@@@@@@@@@@@@@@@@@@@@@@@@@@@L@@A@@@"
"L@@@@@@@@@@@@@@@@@@@@@@@@@@@@@@@@L@@C@@@"
"L@@@@@@@@@@@@@@@@@@@@@@@@@@@@@@@@L@@B@@@"
"L@@@@@@@@@@@@@@@@@@@@@@@@@@@@@@@AL@@F@@@"
"L@@@@@@@@@@@@@@@@@@@@@@@@@@@@@@@AH@@D@@@"
"L@@@@@@@@@@@@@@@@@@@@@@@@@@@@@@@AH@@L@@@"
"L@@@@@@@@@@@@@@@@@@@@@@@@@@@@@@@CH@@H@@@"
"L@@@@@@@@@@@@@@@@@@@@@@@@@@@@@@@C@@AH@@@"
"L@@@@@@@@@@@@@@@@@@@@@@@@@@@@@@@C@@A@@@@"
"L@@@@@@@@@@@@@@@@@@@@@@@@@@@@@@@C@@C@@@@"
"L@@@@@@@@@@@@@@@@@@@@@@@@@@@@@@@G@@B@@@@"
"L@@@@@@@@@@@@@@@@@@@@@@@@@@@@@@@F@@F@@@@"
"L@@@@@@@@@@@@@@@@@@@@@@@@@@@@@@@F@@L@@@@"
"L@@@@@@@@@@@@@@@@@@@@@@@@@@@@@@@N@AH@@@@"
"L@@@@@@@@@@@@@@@@@@@@@@@@@@@@@@@L@A@@@@@"
"L@@@@@@@@@@@@@@@@@@@@@@@@@@@@@@AL@C@@@@@"
"L@@@@@@@@@@@@@@@@@@@@@@@@@@@@@@AH@F@@@@@"
"L@@@@@@@@@@@@@@@@@@@@@@@@@@@@@@CH@L@@@@@"
"L@@@@@@@@@@@@@@@@@@@@@@@@@@@@@@G@AH@@@@@"
"L@@@@@@@@@@@@@@@@@@@@@@@@@@@@@@F@G@@@@@@"
"L@@@@@@@@@@@@@@@@@@@@@@@@@@@@@@L@L@@@@@@"
"L@@@@@@@@@@@@@@@@@@@@@@@@@@@@@AHAH@@@@@@"
"L@@@@@@@@@@@@@@@@@@@@@@@@@@@@@C@G@@@@@@@"
"L@@@@@@@@@@@@@@@@@@@@@@@@@@@@@FAL@@@@@@@"
"L@@@@@@@@@@@@@@@@@@@@@@@@@@@@@LG@@@@@@@@"
"L@@@@@@@@@@@@@@@@@@@@@@@@@@@@ALH@@@@@@@@"
"OOOOOOOOOOOOOOOOOOOOOOOOOOOOOOOH@@@@@@@@"
"OOOOOOOOOOOOOOOOOOOOOOOOOOOOOOL@@@@@@@@@"))) (\TYPE BITMAP PLACEMENT (183 . 429) NAME CORNER BITMAP ((REA
DBITMAP)(34 34
"@@@@@@@@L@@@"
"@@@@OOOOL@@@"
"@@@@OOOOH@@@"
"@@@@L@@@H@@@"
"@@@@L@@AH@@@"
"@@@@L@@A@@@@"
"@@@@L@@A@@@@"
"@@@@L@@C@@@@"
"@@@@L@@B@@@@"
"@@@AL@@F@@@@"
"@@@AH@@D@@@@"
"@@@AH@@L@@@@"
"@@@CH@@H@@@@"
"@@@C@@AH@@@@"
"@@@C@@A@@@@@"
"@@@C@@C@@@@@"
"@@@G@@B@@@@@"
"@@@F@@F@@@@@"
"@@@F@@L@@@@@"
"@@@N@AH@@@@@"
"@@@L@A@@@@@@"
"@@AL@C@@@@@@"
"@@AH@F@@@@@@"
"@@CH@L@@@@@@"
"@@G@AH@@@@@@"
"@@F@G@@@@@@@"
"@@L@L@@@@@@@"
"@AHAH@@@@@@@"
"@C@G@@@@@@@@"
"@FAL@@@@@@@@"
"@LG@@@@@@@@@"
"ALH@@@@@@@@@"
"OOH@@@@@@@@@"
"OL@@@@@@@@@@"))) (\TYPE BITMAP PLACEMENT (255 . 420) NAME STANDARD BITMAP ((READBITMAP)(70 55
"CNCOHDA@DOH@HCOAO@@@"
"DA@D@DAHDHD@HB@I@H@@"
"D@@D@JADDHBADB@I@D@@"
"CL@D@JABDHBADB@I@D@@"
"@B@DAAABDHBBBCOA@D@@"
"@A@DAOAADHBCNB@I@D@@"
"DA@DB@I@LHDDAB@I@H@@"
"CN@DB@I@DOHDAB@IO@@@"
"@@@@@@@@@@@@@@@@@@@@"
```

```
"@@@@@@@@@@@@@@@@@@@@"
"@@@@@@@@@@@@@@@@@@@@"
"@@@@@@@@@@@@@@@@@@@@"
"@@@@@@@@@@@@@@@@@@@@"
"@@@@@@@@@@@@@@@@@@@@"
"@@@@@@@@@@@@@@@@@@@@"
"OOOOOOL@@@@@@@@@@@@@"
"OOOOOOL@@@@@@@@@@@@@"
"L@@H@@L@@@@@@@@@@@@@"
"L@AL@@L@@@@@@@@@@@@@"
"MOKN@@L@@@@@@@@@@@@@"
"L@FK@@L@@@@@@@@@@@@@"
"MNNIH@L@@@@@@@@@@@@@"
"LAHHL@L@@@@@@@@@@@@@"
"LA@HD@L@@@@@@@@@@@@@"
"L@@H@@L@@@@@@@@@@@@@"
"L@@H@@L@@@@@@@@@@@@@"
"MOOOOLL@@@@@@@@@@@@@"
"L@LIH@L@@@@@@@@@@@@@"
"LAHHL@L@@@@@@@@@@@@@"
"MKKOFLL@@@@@@@@@@@@@"
"LF@HC@L@@@@@@@@@@@@@"
"LL@HAHL@@@@@@@@@@@@@"
"MOOOOLL@@@@@@@@@@@@@"
"MOOOOLL@@@@@@@@@@@@@"
"LL@HAHL@@@@@@@@@@@@@"
"LGOOODL@@@@@@@@@@@@@"
"LC@HF@L@@@@@@@@@@@@@"
"LAHHL@L@@@@@@@@@@@@@"
"MOOOMLL@@@@@@@@@@@@@"
"L@LIH@L@@@@@@@@@@@@@"
"L@@H@@L@@@@@@@@@@@@@"
"MOOOOLL@@@@@@@@@@@@@"
"L@@H@@L@@@@@@@@@@@@@"
"L@@H@AL@@@@@@@@@@@@@"
"MOOONCL@@@@@@@@@@@@@"
"L@@H@NL@@@@@@@@@@@@@"
"LA@HDLL@@@@@@@@@@@@@"
"MMKNMLH@@@@@@@@@@@@@"
"L@LIK@H@@@@@@@@@@@@@"
"L@FKBAH@@@@@@@@@@@@@"
"L@CNCA@@@@@@@@@@@@@@"
"L@ALAK@@@@@@@@@@@@@@"
"L@@H@O@@@@@@@@@@@@@@"
"OOOOOO@@@@@@@@@@@@@@"
"OOOOOL@@@@@@@@@@@@@@")))  (\TYPE BITMAP PLACEMENT  (340 . 417) NAME NO.CROPPING BITMAP  {(READBITMAP)(68 73
"A@DCL@@@@@@@@@@@@@@@"
"AHDDB@@@@@@@@@@@@@@@"
"ADDHA@@@@@@@@@@@@@@@"
"ABDHA@@@@@@@@@@@@@@@"
"ABDHA@@@@@@@@@@@@@@@"
"AADHA@@@@@@@@@@@@@@@"
"A@LDB@@@@@@@@@@@@@@@"
"A@DCL@@@@@@@@@@@@@@@"
"@@@@@@@@@@@@@@@@@@@@"
"@@@@@@@@@@@@@@@@@@@@"
"@@@@@@@@@@@@@@@@@@@@"
"@@@@@@@@@@@@@@@@@@@@"
"@GHOLANAOAO@I@DCN@@@"
"@HDHBBAA@I@HIHDDA@@@"
"A@@HBD@I@I@HIDDH@@@@"
"A@@HBD@I@I@HIBDH@@@@"
"A@@OLD@IOAO@IBDHO@@@"
"A@@HBD@I@A@@IADHA@@@"
"@HDHBBAA@A@@I@LDC@@@"
"@GHHBANA@A@@I@DCM@@@"
"@@@@@@@@@@@@@@@@@@@@"
"@@@@@@@@@@@@@@@@@@@@"
"@@@@@@@@@@@@@@@@@@@@"
"@@@@@@@@@@@@@@@@@@@@"
"@@@@@@@@@@@@@@@@@@@@"
"@@@GO@@@@@@@@@@@@@@@"
"@@@@@@@@@@@@@@@@@@@@"
"@@@@H@@@@@@@@@@@@@@@"
"@@@AL@@@@@@@@@@@@@@@"
"@OOCNGOL@@@@@@@@@@@@"
"@OOFKGOL@@@@@@@@@@@@"
"@L@LIH@L@@@@@@@@@@@@"
"@L@HHH@L@@@@@@@@@@@@"
"@MN@H@@L@@@@@@@@@@@@"
"@L@@H@@L@@@@@@@@@@@@"
"@MO@H@@L@@@@@@@@@@@@"
"@L@@H@@L@@@@@@@@@@@@"
"@L@@H@@L@@@@@@@@@@@@"
"@L@@H@@L@@@@@@@@@@@@"
"@L@@H@@L@@@@@@@@@@@@"
"@MOOOOLL@@@@@@@@@@@@"
```

```
"@L@@H@@L@@@@@@@@@@@@"
"@C@@H@C@@@@@@@@@@@@@"
"HFGOOOAHD@@@@@@@@@@@"
"HL@@H@@LD@@@@@@@@@@@"
"IH@@H@@FD@@@@@@@@@@@"
"KOOOOOOOD@@@@@@@@@@@"
"KOOOOOOOD@@@@@@@@@@@"
"IH@@H@@FD@@@@@@@@@@@"
"HLGOOOLLD@@@@@@@@@@@"
"HF@@H@AHD@@@@@@@@@@@"
"@C@@H@C@@@@@@@@@@@@@"
"@LGOOOLL@@@@@@@@@@@@"
"@L@@H@@L@@@@@@@@@@@@"
"@L@@H@@L@@@@@@@@@@@@"
"@MOOOOLL@@@@@@@@@@@@"
"@L@@H@@L@@@@@@@@@@@@"
"@L@@H@AL@@@@@@@@@@@@"
"@MOOONCL@@@@@@@@@@@@"
"@L@@H@NL@@@@@@@@@@@@"
"@L@@H@LL@@@@@@@@@@@@"
"@MOOOILH@@@@@@@@@@@@"
"@L@@HC@H@@@@@@@@@@@@"
"@L@@HBAH@@@@@@@@@@@@"
"@L@@HCA@@@@@@@@@@@@@"
"@L@HHIK@@@@@@@@@@@@@"
"@L@LIHO@@@@@@@@@@@@@"
"@OOFKGO@@@@@@@@@@@@@"
"@OOCNGL@@@@@@@@@@@@@"
"@@@AL@@@@@@@@@@@@@@@"
"@@@@H@@@@@@@@@@@@@@@"
"@@@@@@@@@@@@@@@@@@@@"
"@@@GO@@@@@@@@@@@@@@@"))) (\TYPE BITMAP PLACEMENT (418 . 417) NAME MANUAL.CONTROL BITMAP {(READBITMAP)(61
74
"LAHB@HBDA@DA@@@@"
"LAHB@LBDA@DA@@@@"
"JBHE@JBDA@JA@@@@"
"JBHE@IBDA@JA@@@@"
"IDHHHIBDAAAA@@@@"
"IDHOHHJDAAOA@@@@"
"HHI@DHFDAB@I@@@@"
"HHI@DHBCNB@IOH@@"
"@@@@@@@@@@@@@@@@"
"@@@@@@@@@@@@@@@@"
"@@@@@@@@@@@@@@@@"
"@@@@@@@@@@@@@@@@"
"CLANA@DONOLANA@@"
"DBBAAHDA@HBBAA@@"
"H@D@IDDA@HBD@I@@"
"H@D@IBDA@HBD@I@@"
"H@D@IBDA@OLD@I@@"
"H@D@IADA@HBD@I@@"
"DBBAA@LA@HBBAA@@"
"CLANA@DA@HBANAOH"
"@@@@@@@@@@@@@@@@"
"@@@@@@@@@@@@@@@@"
"@@@@@@@@@@@@@@@@"
"@@@@@@@@@@@@@@@@"
"OOOOOOOOOOOOL@@@"
"OOOOOOOOOOOOL@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
```

```
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"L@@@@@@@@@@@L@@@"
"000000000000L@@@"
"000000000000L@@@"))) (\TYPE BITMAP PLACEMENT (428 . 335) NAME GHOST.MANUAL.CONTROL BITMAP {(READBITMAP)(6
1 74
"DA@@@@@DA@DA@@@@"
"H@HB@HB@@@@@@@@@"
"@@@E@@@DA@@A@@@@"
"JBH@@HB@@@J@@@@@"
"AD@@@A@DAAAA@@@@"
"H@HJHHJ@@@J@@@@@"
"@@A@D@DDA@@A@@@@"
"HHH@@HBBJB@HJH@@"
"@@@@@@@@@@@@@@@@"
"@@@@@@@@@@@@@@@@"
"@@@@@@@@@@@@@@@@"
"@@@@@@@@@@@@@@@@"
"ADADA@DEDEDADA@@"
"@BB@@H@@@HBB@@@@"
"@@D@ADDA@@@D@A@@"
"H@@@HB@@@HB@@H@@"
"@@D@A@DA@EDD@A@@"
"H@@@H@@@@HB@@H@@"
"D@@AA@DA@@@@AA@@"
"BH@J@@@@@HB@J@JH"
"@@@@@@@@@@@@@@@@"
"@@@@@@@@@@@@@@@@"
"@@@@@@@@@@@@@@@@"
"@@@@@@@@@@@@@@@@"
"EEEEEEEEEEEED@@@"
"JJJJJJJJJJJJH@@@"
"D@@@@@@@@@@@D@@@"
"H@@@@@@@@@@@H@@@"
"D@@@@@@@@@@@D@@@"
"H@@@@@@@@@@@H@@@"
"D@@@@@@@@@@@D@@@"
"H@@@@@@@@@@@H@@@"
"D@@@@@@@@@@@D@@@"
"H@@@@@@@@@@@H@@@"
"D@@@@@@@@@@@D@@@"
"H@@@@@@@@@@@H@@@"
"D@@@@@@@@@@@D@@@"
"H@@@@@@@@@@@H@@@"
"D@@@@@@@@@@@D@@@"
"H@@@@@@@@@@@H@@@"
"D@@@@@@@@@@@D@@@"
"H@@@@@@@@@@@H@@@"
"D@@@@@@@@@@@D@@@"
"H@@@@@@@@@@@H@@@"
"D@@@@@@@@@@@D@@@"
"H@@@@@@@@@@@H@@@"
"D@@@@@@@@@@@D@@@"
"H@@@@@@@@@@@H@@@"
"D@@@@@@@@@@@D@@@"
"H@@@@@@@@@@@H@@@"
"D@@@@@@@@@@@D@@@"
"H@@@@@@@@@@@H@@@"
"D@@@@@@@@@@@D@@@"
"H@@@@@@@@@@@H@@@"
"D@@@@@@@@@@@D@@@"
"H@@@@@@@@@@@H@@@"
"D@@@@@@@@@@@D@@@"
"H@@@@@@@@@@@H@@@"
"D@@@@@@@@@@@D@@@"
"H@@@@@@@@@@@H@@@"
"D@@@@@@@@@@@D@@@"
"H@@@@@@@@@@@H@@@"
"D@@@@@@@@@@@D@@@"
"H@@@@@@@@@@@H@@@"
"D@@@@@@@@@@@D@@@"
"H@@@@@@@@@@@H@@@"
"D@@@@@@@@@@@D@@@"
"H@@@@@@@@@@@H@@@".
"D@@@@@@@@@@@D@@@"
```

```
"H@@@@@@@@@@@H@@@"
"D@@@@@@@@@@@D@@@"
"H@@@@@@@@@@@H@@@"
"D@@@@@@@@@@@D@@@"
"H@@@@@@@@@@@H@@@"
"D@@@@@@@@@@@D@@@"
"H@@@@@@@@@@@H@@@"
"EEEEEEEEEEEED@@@"
"JJJJJJJJJJJJH@@@")}) (\TYPE BITMAP PLACEMENT (616 . 523) NAME SMALL.LEFT.ARROW BITMAP {(READBITMAP)(21 8
"@L@@@@@@"
"CL@@@@@@"
"GL@@@@@@"
"OOOOOH@@"
"OOOOOH@@"
"GL@@@@@@"
"CL@@@@@@"
"AL@@@@@@")}) (\TYPE BITMAP PLACEMENT (692 . 520) NAME SMALL.RIGHT.ARROW BITMAP {(READBITMAP)(21 8
"@@@AL@@@"
"@@@AN@@@"
"@@@AO@@@"
"OOOOOH@@"
"OOOOOH@@"
"@@@AO@@@"
"@@@AN@@@"
"@@@AH@@@")}) (\TYPE BITMAP PLACEMENT (651 . 520) NAME SMALL.UP.ARROW BITMAP {(READBITMAP)(8 21
"AH@@"
"CL@@"
"GN@@"
"ON@@"
"OO@@"
"OO@@"
"AH@@"
"AH@@"
"AH@@"
"AH@@"
"AH@@"
"AH@@"
"AH@@"
"AH@@"
"AH@@"
"AH@@"
"AH@@"
"AH@@"
"AH@@"
"AH@@"
"AH@@")}) (\TYPE BITMAP PLACEMENT (313 . 338) NAME GHOST.NO.CROPPING BITMAP {(READBITMAP)(66 71
"@@@J@@@@@@@@@@@@@@@@"
"DAA@@@@@@@@@@@@@@@@@"
"@@B@@@@@@@@@@@@@@@@@"
"DA@@D@@@@@@@@@@@@@@@"
"@HB@@@@@@@@@@@@@@@@@"
"DE@@D@@@@@@@@@@@@@@@"
"@B@@H@@@@@@@@@@@@@@@"
"DA@E@@@@@@@@@@@@@@@@"
"@@@@@@@@@@@@@@@@@@@@"
"@@@@@@@@@@@@@@@@@@@@"
"@@@@@@@@@@@@@@@@@@@@"
"@@@@@@@@@@@@@@@@@@@@"
"@JBJ@BHBHBHB@@@JH@@@"
"@A@@@@DD@D@@DAA@D@@@"
"@@B@H@B@B@BB@@B@@@@@"
"D@@@A@@D@D@@DA@@@@@@"
"@@BJ@@BBHBHB@HBBH@@@"
"D@@@A@@D@D@@DE@@D@@@"
"B@B@HH@@@@@B@B@@H@@@"
"AD@@@E@D@D@@DA@ED@@@"
"@@@@@@@@@@@@@@@@@@@@"
"@@@@@@@@@@@@@@@@@@@@"
"@@@@@@@@@@@@@@@@@@@@"
"@@@EE@@@@@@@@@@@@@@@"
"@@@@@@@@@@@@@@@@@@@@"
"@@@@H@@@@@@@@@@@@@@@"
"@@@AD@@@@@@@@@@@@@@@"
"@JJ@HEED@@@@@@@@@@@@"
"@EEBBBJH@@@@@@@@@@@@"
"@H@DI@@D@@@@@@@@@@@@"
"@D@H@H@H@@@@@@@@@@@@"
"@IF@H@@D@@@@@@@@@@@@"
"@D@@@@@H@@@@@@@@@@@@"
"@IE@H@@D@@@@@@@@@@@@"
"@D@@@@@H@@@@@@@@@@@@"
"@H@@H@@D@@@@@@@@@@@@"
"@D@@@@@H@@@@@@@@@@@@"
"@H@@H@@D@@@@@@@@@@@@"
"@EEBEEDH@@@@@@@@@@@@"
"@H@@H@@D@@@@@@@@@@@@"
```

"@A@@H@B@@@@@@@@@@@@@"
"@BEEEEA@D@@@@@@@@@@@"
"HD@@H@@H@@@@@@@@@@@@"
"@H@@@@@DD@@@@@@@@@@@"
"IEEEEEEE@@@@@@@@@@@@"
"BJJJBJJJD@@@@@@@@@@@"
"HH@@H@@D@@@@@@@@@@@@"
"@DEEEEDHD@@@@@@@@@@@"
"HB@@H@A@@@@@@@@@@@@@"
"@A@@H@B@@@@@@@@@@@@@"
"@DFMBJLD@@@@@@@@@@@@"
"@H@@H@@H@@@@@@@@@@@@"
"@D@@@@@D@@@@@@@@@@@@"
"@IEJJIDH@@@@@@@@@@@@"
"@D@@@@@D@@@@@@@@@@@@"
"@H@@H@@H@@@@@@@@@@@@"
"@EFMBNAD@@@@@@@@@@@@"
"@H@@H@JH@@@@@@@@@@@@"
"@D@@@@DD@@@@@@@@@@@@"
"@IFIEIDH@@@@@@@@@@@@"
"@D@@@B@@@@@@@@@@@@@@"
"@H@@HB@H@@@@@@@@@@@@"
"@D@@@AA@@@@@@@@@@@@@"
"@H@HHHJ@@@@@@@@@@@@@"
"@D@DA@E@@@@@@@@@@@@@"
"@JJBJBJ@@@@@@@@@@@@@"
"@EEADED@@@@@@@@@@@@@"
"@@@@H@@@@@@@@@@@@@@@"
"@@@@@@@@@@@@@@@@@@@@"
"@@@@@@@@@@@@@@@@@@@@"
"@@@EE@@@@@@@@@@@@@@@"))) (\TYPE BITMAP PLACEMENT (238 . 347) NAME GHOST.STANDARD BITMAP ((READBITMAP)(69
54
"EDEE@@@@AE@A@EDAD@@@"
"HB@H@HB@H@H@@@@B@@@@"
"@@@@AD@@A@D@@DA@@@@@"
"BH@H@@B@H@@BH@@B@H@@"
"@D@@@@@DA@DDDED@@@@@"
"@B@HBJBBH@@BH@@B@H@@"
"@@@@DA@AA@@@@DA@A@@@"
"BH@H@@B@HJ@HB@@BJ@@@"
"@@@@@@@@@@@@@@@@@@@@"
"@@@@@@@@@@@@@@@@@@@@"
"@@@@@@@@@@@@@@@@@@@@"
"@@@@@@@@@@@@@@@@@@@@"
"@@@@@@@@@@@@@@@@@@@@"
"@@@@@@@@@@@@@@@@@@@@"
"EEEEEED@@@@@@@@@@@@@"
"JJJJJJH@@@@@@@@@@@@@"
"D@@@@@D@@@@@@@@@@@@@"
"H@@H@@H@@@@@@@@@@@@@"
"EFID@@D@@@@@@@@@@@@@"
"H@BJ@@H@@@@@@@@@@@@@"
"EDDI@@D@@@@@@@@@@@@@"
"H@H@H@H@@@@@@@@@@@@@"
"DA@HD@D@@@@@@@@@@@@@"
"H@@@@@H@@@@@@@@@@@@@"
"D@@H@@D@@@@@@@@@@@@@"
"IEEEEDH@@@@@@@@@@@@@"
"D@DI@@D@@@@@@@@@@@@@"
"H@H@H@H@@@@@@@@@@@@@"
"EIBKDLD@@@@@@@@@@@@@"
"HB@@B@H@@@@@@@@@@@@@"
"DD@HA@D@@@@@@@@@@@@@"
"HJJBJHH@@@@@@@@@@@@@"
"EEEEEDD@@@@@@@@@@@@@"
"HD@@A@H@@@@@@@@@@@@@"
"DBJJJDD@@@@@@@@@@@@@"
"HA@@D@H@@@@@@@@@@@@@"
"D@HHH@D@@@@@@@@@@@@@"
"IDEBADH@@@@@@@@@@@@@"
"D@DI@@D@@@@@@@@@@@@@"
"H@@@@@H@@@@@@@@@@@@@"
"EEEEEDD@@@@@@@@@@@@@"
"H@@@@@H@@@@@@@@@@@@@"
"D@@H@AD@@@@@@@@@@@@@"
"IEBEDBH@@@@@@@@@@@@@"
"D@@H@DD@@@@@@@@@@@@@"
"HA@@DHH@@@@@@@@@@@@@"
"EDJJID@@@@@@@@@@@@@@"
"H@DAB@H@@@@@@@@@@@@@"
"D@BJ@A@@@@@@@@@@@@@@"
"H@ADB@@@@@@@@@@@@@@@"
"D@@HAA@@@@@@@@@@@@@@"
"H@@@@J@@@@@@@@@@@@@@"
"EEEEEE@@@@@@@@@@@@@@"
"JJJJJH@@@@@@@@@@@@@@"))) (\TYPE BITMAP PLACEMENT (114 . 444) NAME MANUAL.CONTROL.CROPPING BITMAP ((READBI
TMAP)(61 66

```
"LAHB@HBDA@DA@@@@"
"LAHB@LBDA@DA@@@@"
"JBHE@JBDA@JA@@@@"
"JBHE@IBDA@JA@@@@"
"IDHHHIBDAAAA@@@@"
"IDHOHHJDAAOA@@@@"
"HHI@DHFDAB@I@@@@"
"HHI@DHBCNB@IOH@@"
"@@@@@@@@@@@@@@@@"
"@@@@@@@@@@@@@@@@"
"@@@@@@@@@@@@@@@@"
"@@@@@@@@@@@@@@@@"
"CLANA@DONOLANA@@"
"DBBAAHDA@HBBAA@@"
"H@D@IDDA@HBD@I@@"
"H@D@IBDA@HBD@I@@"
"H@D@IBDA@OLD@I@@"
"H@D@IADA@HBD@I@@"
"DBBAA@LA@HBBAA@@"
"CLANA@DA@HBANAOH"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"GOOOOON@@@@@@@@@"
"GOOOOON@@@@@@@@@"
"F@@D@@F@@@@@@@@@"
"F@@N@@F@@@@@@@@@"
"FOMO@@F@@@@@@@@@"
"F@CEH@F@@@@@@@@@"
"FOGDL@F@@@@@@@@@"
"F@LDF@F@@@@@@@@@"
"F@HDB@F@@@@@@@@@"
"F@@D@@F@@@@@@@@@"
"F@@D@@F@@@@@@@@@"
"FOOOONF@@@@@@@@@"
"F@FDL@F@@@@@@@@@"
"F@LDF@F@@@@@@@@@"
"FMMOKFF@@@@@@@@@"
"FC@DAHF@@@@@@@@@"
"FF@D@LF@@@@@@@@@"
"FOOOONF@@@@@@@@@"
"FOOOONF@@@@@@@@@"
"FF@D@LF@@@@@@@@@"
"FCOOOJF@@@@@@@@@"
"FAHDC@F@@@@@@@@@"
"F@LDF@F@@@@@@@@@"
"FOOONNF@@@@@@@@@"
"F@FDL@F@@@@@@@@@"
"F@@D@@F@@@@@@@@@"
"FOOOONF@@@@@@@@@"
"F@@D@@F@@@@@@@@@"
"F@@D@@N@@@@@@@@@"
"FOOOOAN@@@@@@@@@"
"F@@D@GF@@@@@@@@@"
"F@HDBFF@@@@@@@@@"
"FNMOFND@@@@@@@@@"
"F@FDMHD@@@@@@@@@"
"F@CEI@L@@@@@@@@@"
"F@AOAHH@@@@@@@@@"
"F@@N@MH@@@@@@@@@"
"F@@D@GH@@@@@@@@@"
"GOOOOOH@@@@@@@@@"
"GOOOON@@@@@@@@@@")}})) CLASSES  (BITMAP.FRAMES))  (\TYPE FRAME NAME BITMAPS.PICTURES ITEMS  ((\TYPE BITMAP PL
ACEMENT  (
133 . 262) NAME COLLATED BITMAP  {(READBITMAP)(85 73
"CLANA@A@@B@ONONGL@@@@@@@"
"DBBAA@A@@B@A@H@DB@@@@@@@"
"H@D@I@A@@E@A@H@DA@@@@@@@"
"H@D@I@A@@E@A@OLDA@@@@@@@"
"H@D@I@A@@HHA@H@DA@@@@@@@"
"H@D@I@A@@OHA@H@DA@@@@@@@"
"DBBAA@A@A@DA@H@DB@@@@@@@"
"CLANAOIOI@DA@ONGL@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@AOOOOOOO@@@@@@@@@@@@@@"
"@@A@@@@@@A@@@@@@@@@@@@@@"
"@@COOOOOOM@@@@@@@@@@@@@@"
"@@B@@@@@@E@@@@@@@@@@@@@@"
"@@GOOOOOOE@@@@@@@@@@@@@@"
"@@D@@@@@AE@@@@@@@@@@@@@@"
"@@D@@@@@AE@@@@@@@@@@@@@@"
```

```
"@@D@@@@@AE@@@@@@@@@@@@"
"@@D@@@@@AE@@@@@@@@@@@@"
"@@D@@@@@AE@@@@@@@@@@@@"
"AOOOOOONAE@@@@@@@@@@@@"
"A@@@@@@BAE@@@@@@@@@@@@"
"COOOOOOJAE@@@@@@@@@@@@"
"B@@@@@@JAE@@@@@@@@@@@@"
"GOOOOONJAE@@@@@@@@@@@@"
"D@@@@@BJAE@@@@@@@@@@@@"
"D@@@@@BJAE@@@@@@@@@@@@"
"D@@@@@BJAE@@@@@@@@@@@@"
"D@@@@@BJAE@@@@@@@@@@@@"
"D@@@@@BJAE@@@@@@@@@@@@"
"D@@@@@BJAE@@@@@@@@@@@@"
"D@@@@@BJAE@@@@@@@@@@@@"
"D@@@@@BJAE@@@@@@@@@@@@"
"D@@@@@BJAE@@@@@@@@@@@@"
"D@@@@@BJAE@@@@@@@@@@@@"
"D@@@@@BJAE@@@@@@@@@@@@"
"D@@@@@BJAE@@@@@@@@@@@@"
"D@@@@@BJAE@@@@@@@@@@@@"
"D@@@@@BJAE@@@@@@@@@@@@"
"D@@@@@BJAE@@@@@@@@@@@@"
"D@@@@@BJAE@@@@@@@@@@@@"
"D@@@@@BJAE@@@@@@@@@@@@"
"D@@@@@BJAE@@@@@@@@@@@@"
"D@@@@@BJAE@@@@@@@@@@@@"
"D@@@@@BJAE@@@@@@@@@@@@"
"J@@@@@BJAE@@@@@@@@@@@@"
"D@@@@@BJAE@C@@O@@O@@@@"
"D@@@@@BJAG@G@AIHAIH@@@"
"D@@@@@BJAL@O@@AH@AH@@@"
"D@@@@@BJA@@C@@C@@G@@@@"
"D@@@@@BKO@@C@@F@@AH@@@"
"D@@@@@BJ@@@C@@L@AIH@@@"
"D@@@@@BJ@@@CAIHAIIIIH@@"
"D@@@@@BJ@@@CAIOIHOAIIH@@"
"D@@@@@BJ@@@@@H@@H@@@@@"
"D@@@@@BJ@@@@@H@@H@@@@@"
"D@@@@@BN@@@@A@@A@@@@@@"
"D@@@@@CH@@@@@@@@@@@@@@"
"GOOOOON@@@@@@@@@@@@@@@"
"@@@@@@@@@@@@@@@@@@@@@@"
"@@@@@@@@@L@CL@CL@@@@@@"
"@@@@@@@@AL@FF@FF@@@@@@"
"@@@@@@@@CL@@F@@F@@@@@@"
"@@@@@@@@@L@@L@AL@@@@@@"
"@@@@@@@@@L@AH@@F@@@@@@"
"@@@@@@@@@L@C@@FF@@@@@@"
"@@@@@@@@@LFF@FFFFFF@@@"
"@@@@@@@@@LFGNFCLFFF@@@"
"@@@@@@@@@@B@@B@@@@@@@@"
"@@@@@@@@@@B@@B@@@@@@@@"
"@@@@@@@@@@D@@D@@@@@@@@"))) (\TYPE BITMAP PLACEMENT (35 . 261) NAME UNCOLLATED BITMAP {(READBITMAP)(86 7
4
"HBDA@O@GHD@D@@HCOKOIO@@@"
"HBFAA@HHDD@D@@H@DB@A@H@@"
"HBEAB@A@BD@D@AD@DB@A@D@@"
"HBDIB@A@BD@D@AD@DCOA@D@@"
"HBDIB@A@BD@D@BB@DB@A@D@@"
"HBDEB@A@BD@D@CN@DB@A@D@@"
"HBDCA@HHDD@D@DA@DB@A@H@@"
"GLDA@O@GHGNGNDA@DCOIO@@@"
"@@@@@@@@@@@@@@@@@@@@@@"
"@@@@@@@@@@@@@@@@@@@@@@"
"@@@@@@@@@@@@@@@@@@@@@@"
"@@@@@@@@@@@@@@@@@@@@@@"
"@@@@@@@@@@@@@@@@@@@@@@"
"@@@GOOOOOO@@@@@@@@@@@@"
"@@@D@@@@@A@@@@@@@@@@@@"
"@@@OOOOOOM@@@@@@@@@@@@"
"@@@H@@@@@E@@@@@@@@@@@@"
"@@@H@@@@@E@@@@@@@@@@@@"
"@@@H@@@@@E@@@@@@@@@@@@"
"@AOOOOOOLE@@@@@@@@@@@@"
"@A@@@@@@DE@@@@@@@@@@@@"
"@COOOOOODE@@@@@@@@@@@@"
"@B@@@@@ADE@@@@@@@@@@@@"
"@B@@@@@ADE@@@@@@@@@@@@"
"@B@@@@@ADE@@@@@@@@@@@@"
"GOOOOOOADE@@@@@@@@@@@@"
"D@@@@@AADE@@@@@@@@@@@@"
"OOOOOOMADE@@@@@@@@@@@@"
"H@@@@@EADE@@@@@@@@@@@@"
"H@@@@@EADE@@@@@@@@@@@@"
"H@@@@@EADE@@@@@@@@@@@@"
"H@@@@@EADE@@@@@@@@@@@@"
```

```
"H@@@@@EADE@@@@@@@@@@@@@@"
"H@@@@@EADE@@@@@@@@@@@@@@"
"H@@@@@EADE@@@@@@@@@@@@@@"
"H@@@@@EADE@@@@@@@@@@@@@@"
"H@@@@@EADE@@@@@@@@@@@@@@"
"H@@@@@EADE@@@@@@@@@@@@@@"
"H@@@@@EADE@@@O@@O@@@@@@@"
"H@@@@@EADE@@AIHAIH@@@@@@"
"H@@@@@EADE@@@AH@AH@@@@@@"
"H@@@@@EADE@@@G@@G@@@@@@@"
"H@@@@@EADE@@@AH@AH@@@@@@"
"H@@@@@EADE@@AIHAIH@@@@@@"
"H@@@@@EADE@@AIIIIIIIH@@@"
"H@@@@@EADE@@@OAHOAIIH@@@"
"H@@@@@EADE@@@@@H@@@@@@@@"
"H@@@@@EADE@@@@@H@@@@@@@@"
"H@@@@@EADG@@@@A@@@@@@@@@"
"H@@@@@EAGL@@@@@@@@@@@@@@"
"H@@@@@EAD@@@@@@@@@@@@@@@"
"H@@@@@EAD@CL@CL@@@@@@@@@"
"H@@@@@EAD@FF@FF@@@@@@@@@"
"H@@@@@EAD@@F@@F@@@@@@@@@"
"H@@@@@EAL@@L@@L@@@@@@@@@"
"H@@@@@EO@@AH@AH@@@@@@@@@"
"H@@@@@E@@@C@@C@@@@@@@@@@"
"H@@@@@E@@@F@FF@FFF@@@@@@"
"H@@@@@E@@@GNFGNFFF@@@@@@"
"H@@@@@E@@@@@B@@@@@@@@@@@"
"H@@@@@G@@@@@B@@@@@@@@@@@"
"OOOOOL@@@@@D@@@@@@@@@@@@"
"@@@@@@@@@@@@@@@@@@@@@@@@"
"@@@@@@@@C@@C@@@@@@@@@@@@"
"@@@@@@@@G@@G@@@@@@@@@@@@"
"@@@@@@@@O@@O@@@@@@@@@@@@"
"@@@@@@@@C@@C@@@@@@@@@@@@"
"@@@@@@@@C@@C@@@@@@@@@@@@"
"@@@@@@@@C@@C@@@@@@@@@@@@"
"@@@@@@@@CAHCAIIH@@@@@@@@"
"@@@@@@@@CAHCAIIH@@@@@@@@"
"@@@@@@@@@@H@@@@@@@@@@@@@"
"@@@@@@@@@@H@@@@@@@@@@@@@"
"@@@@@@@@@A@@@@@@@@@@@@@@"))) (\TYPE BITMAP PLACEMENT (232 . 274) NAME TOP.TRAY BITMAP {(READBITMAP)(62 61

"ONCLCN@GOGN@DA@D"
"A@DBBA@@HDA@D@HH"
"A@HABA@@HDA@J@HH"
"A@HABA@@HDA@J@E@"
"A@HACN@@HGNAA@B@"
"A@HAB@@@HDAAO@B@"
"A@DBB@@@HDAB@HB@"
"A@CLB@@@HDAB@HB@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@AO@@@@@@"
"@@@@@@@CNA@@@@@@"
"@@@@@@GL@CL@@@@@"
"@@@@@OH@@DD@@@@@"
"@CHAO@@@@HN@@@@@"
"@CKN@@@@AABGL@@@"
"@CB@@@@@BBGGL@@@"
"@CD@@@@@DDI@L@@@"
"@@H@@@@@HICHL@@@"
```

```
"@A@@@@AOABDHL@@@"
"@B@@@CN@BDI@L@@@"
"@D@@GL@GLIB@L@@@"
"@H@OH@OHABEOL@@@"
"AAO@AO@CNDIOL@@@"
"CN@GN@GL@I@@L@@@"
"GOOOOOOOON@AH@@@"
"GOOOOOOOON@C@@@@"
"F@@@@@@@@F@F@@@@"
"F@@@@@@@@F@L@@@@"
"F@@@@@@@@FAH@@@@"
"F@@@@@@@@FC@@@@@"
"F@@@@@@@@FF@@@@@"
"F@@@@@@@@FL@@@@@"
"F@@@@@@@@GH@@@@@"
"GOOOOOOOOO@@@@@@"
"GOOOOOOOON@@@@@@")}) (\TYPE BITMAP PLACEMENT (37 . 362) NAME GHOST.UNCOLLATED BITMAP ((READBITMAP)(86 74
"HB@@@J@BH@@@@@HBJJJHJ@@@"
"@@DAA@@@DD@D@@@@D@@A@@@@"
"HB@@B@@@B@@@@@@@@B@@@@@@"
"@@DA@@A@@D@D@AD@DAEA@D@@"
"HB@HB@@@B@@@@BB@@B@@@@@@"
"@@DE@@A@@D@D@AD@D@@A@D@@"
"HB@B@@HH@@@@@@@@@B@@@H@@"
"EDDA@E@E@EDEDDA@DAEAE@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@EEEEEEE@@@@@@@@@@@@@@"
"@@@@@@@@@@@@@@@@@@@@@@@@"
"@@@EEEEEEE@@@@@@@@@@@@@@"
"@@@H@@@@@@@@@@@@@@@@@@@@"
"@@@@@@@@@E@@@@@@@@@@@@@@"
"@@@H@@@@@@@@@@@@@@@@@@@@"
"@AEEEEEEDE@@@@@@@@@@@@@@"
"@@@@@@@@@@@@@@@@@@@@@@@@"
"@AEEEEEEDE@@@@@@@@@@@@@@"
"@B@@@@@@@@@@@@@@@@@@@@@@"
"@@@@@@@ADE@@@@@@@@@@@@@@"
"@B@@@@@@@@@@@@@@@@@@@@@@"
"EEEEEEEADE@@@@@@@@@@@@@@"
"@@@@@@@@@@@@@@@@@@@@@@@@"
"EEEEEEEADE@@@@@@@@@@@@@@"
"H@@@@@@@@@@@@@@@@@@@@@@@"
"@@@@@@EADE@@@@@@@@@@@@@@"
"H@@@@@@@@@@@@@@@@@@@@@@@"
"@@@@@@EADE@@@@@@@@@@@@@@"
"H@@@@@@@@@@@@@@@@@@@@@@@"
"@@@@@@EADE@@@@@@@@@@@@@@"
"H@@@@@@@@@@@@@@@@@@@@@@@"
"@@@@@@EADE@@@@@@@@@@@@@@"
"H@@@@@@@@@@@@@@@@@@@@@@@"
"@@@@@@EADE@@@@@@@@@@@@@@"
"H@@@@@@@@@@@@@J@@J@@@@@@"
"@@@@@@EADE@@AA@AA@@@@@@@"
"H@@@@@@@@@@@@@H@@H@@@@@@"
"@@@@@@EADE@@@E@@E@@@@@@@"
"H@@@@@@@@@@@@@H@@H@@@@@@"
"@@@@@@EADE@@AA@AA@@@@@@@"
"H@@@@@@@@@@@@HHHHHHHH@@@"
"@@@@@@EADE@@@EA@EAAA@@@@"
"H@@@@@@@@@@@@@@H@@@@@@@@"
"@@@@@@EADE@@@@@@@@@@@@@@"
"H@@@@@@@@B@@@@@@@@@@@@@@"
"@@@@@@EAED@@@@@@@@@@@@@@"
"H@@@@@@@@@@@@@@@@@@@@@@@"
"@@@@@@EAD@AD@AD@@@@@@@@@"
"H@@@@@@@@@BB@BB@@@@@@@@@"
"@@@@@@EAD@@D@@D@@@@@@@@@"
"H@@@@@@@H@@H@@H@@@@@@@@@"
"@@@@@@EE@@A@@A@@@@@@@@@@"
"H@@@@@@@@@B@@B@@@@@@@@@@"
"@@@@@@E@@@D@DD@DDD@@@@@@"
"H@@@@@@@@@@BJBBJBBB@@@@@"
"@@@@@@E@@@@@@@@@@@@@@@@@"
"H@@@@@B@@@@@@B@@@@@@@@@@"
"EEEEEED@@@@@D@@@@@@@@@@@"
"@@@@@@@@@@@@@@@@@@@@@@@@"
"@@@@@@@@A@@A@@@@@@@@@@@@"
```

```
"@@@@@@@@B@@B@@@@@@@@@@@@"
"@@@@@@@@E@@E@@@@@@@@@@@@"
"@@@@@@@@B@@B@@@@@@@@@@@@"
"@@@@@@@@A@@A@@@@@@@@@@@@"
"@@@@@@@@B@@B@@@@@@@@@@@@"
"@@@@@@@@AA@AAAA@@@@@@@@@"
"@@@@@@@@B@HB@HHH@@@@@@@@"
"@@@@@@@@@@@@@@@@@@@@@@@@"
"@@@@@@@@@@H@@@@@@@@@@@@@"
"@@@@@@@@@@A@@@@@@@@@@@@@"))) (\TYPE BITMAP PLACEMENT (135 . 361) NAME GHOST.COLLATED BITMAP {(READBITMAP)
(85 73
"ADADA@A@@@@EDEDED@@@@@@@"
"@BB@@@@@@B@@@H@@B@@@@@@@"
"@@D@A@A@@E@A@@@DA@@@@@@@"
"H@@@H@@@@@@@@JH@@@@@@@@@"
"@@D@A@A@@@@A@@@DA@@@@@@@"
"H@@@H@@@@JH@@H@@@@@@@@@@"
"D@@AA@A@A@DA@@@D@@@@@@@@"
"BH@J@JHJH@@@@JJBH@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@AEEEEEEEE@@@@@@@@@@@@@"
"@@@@@@@@@@@@@@@@@@@@@@@@"
"@@AEEEEEEEE@@@@@@@@@@@@@"
"@@B@@@@@@@@@@@@@@@@@@@@@"
"@@EEEEEEEEE@@@@@@@@@@@@@"
"@@@@@@@@@@@@@@@@@@@@@@@@"
"@@D@@@@@AE@@@@@@@@@@@@@@"
"@@@@@@@@@@@@@@@@@@@@@@@@"
"@@D@@@@@AE@@@@@@@@@@@@@@"
"@@@@@@@@@@@@@@@@@@@@@@@@"
"AEEEEEEDAE@@@@@@@@@@@@@@"
"@@@@@@@B@@@@@@@@@@@@@@@@"
"AEEEEEE@AE@@@@@@@@@@@@@@"
"B@@@@@@J@@@@@@@@@@@@@@@@"
"EEEEEED@AE@@@@@@@@@@@@@@"
"@@@@@@BJ@@@@@@@@@@@@@@@@"
"D@@@@@@@AE@@@@@@@@@@@@@@"
"@@@@@@BJ@@@@@@@@@@@@@@@@"
"D@@@@@@@AE@@@@@@@@@@@@@@"
"@@@@@@BJ@@@@@@@@@@@@@@@@"
"D@@@@@@@AE@@@@@@@@@@@@@@"
"@@@@@@BJ@@@@@@@@@@@@@@@@"
"D@@@@@@@AE@@@@@@@@@@@@@@"
"@@@@@@BJ@@@@@@@@@@@@@@@@"
"D@@@@@@@AE@@@@@@@@@@@@@@"
"@@@@@@BJ@@@@@@@@@@@@@@@@"
"D@@@@@@@AE@@@@@@@@@@@@@@"
"@@@@@@BJ@@@@@@@@@@@@@@@@"
"D@@@@@@@AE@@@@@@@@@@@@@@"
"@@@@@@BJ@@@@@@@@@@@@@@@@"
"D@@@@@@@AE@@@@@@@@@@@@@@"
"@@@@@@BJ@@@@@@@@@@@@@@@@"
"D@@@@@@@AE@@@@@@@@@@@@@@"
"@@@@@@BJ@@@@@@@@@@@@@@@@"
"D@@@@@@@AE@@@@@@@@@@@@@@"
"@@@@@@BJ@@@@@@@@@@@@@@@@"
"D@@@@@@@AE@A@@E@@E@@@@@@"
"@@@@@@BJ@B@B@@HH@HH@@@@@"
"D@@@@@@@AD@E@@A@@A@@@@@@"
"@@@@@@BJ@@@B@@B@@B@@@@@@"
"D@@@@@@AE@@A@@D@@A@@@@@@"
"@@@@@@BJ@@@B@@H@@HH@@@@@"
"D@@@@@@@@@@AAA@AAAAAA@@@"
"@@@@@@BJ@@@B@HJHHJ@HHH@@"
"D@@@@@@@@@@@@@@@@@@@@@@@"
"@@@@@@BJ@@@@@H@@H@@@@@@@"
"D@@@@@@D@@@@A@@A@@@@@@@@"
"@@@@@@BH@@@@@@@@@@@@@@@@"
"EEEEEED@@@@@@@@@@@@@@@@@"
"@@@@@@@@@@@@@@@@@@@@@@@@"
"@@@@@@@@@@D@AD@AD@@@@@@@"
"@@@@@@@@@@H@BB@BB@@@@@@@"
"@@@@@@@@@AD@@D@@D@@@@@@@"
"@@@@@@@@@@H@@H@@H@@@@@@@"
"@@@@@@@@@@D@A@@@D@@@@@@@"
"@@@@@@@@@@H@B@@BB@@@@@@@"
"@@@@@@@@@@DDD@DDDDDD@@@@"
"@@@@@@@@@@HBBJBBHBBB@@@@"
"@@@@@@@@@@@@@@@@@@@@@@@@"
"@@@@@@@@@@@B@@B@@@@@@@@@"
"@@@@@@@@@@@D@@D@@@@@@@@@"))) (\TYPE BITMAP PLACEMENT (32 . 145) NAME COPY.OUTPUT BITMAP {(READBITMAP)(96
75
"CLANADA@D@GHDACOKNB@IOL@"
"DBBAA@HHH@HDDA@DBAB@HB@@"_
```

```
"H@D@I@HHHA@BDA@DBAB@HB@@"
"H@D@I@HE@A@BDA@DBAB@HB@@"
"H@D@IO@B@A@BDA@DCNB@HB@@"
"H@D@I@@B@A@BDA@DB@B@HB@@"
"DBBAA@@B@@HDDA@DB@B@HB@@"
"CLANA@@B@@GHCN@DB@AO@B@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@COOOOOON@@@@@@@@@@@"
"@@@@@B@@@@@@B@@@@@@@@@@@"
"@@@@@GOOOOOOJ@@@@@@@@@@@"
"@@@@@D@@@@@@J@@@@@@@@@@@"
"@@@@@OOOOOONJ@@@@@@@@@@@"
"@@@@@H@@@@@BJ@@@@@@@@@@@"
"@@@@@H@@@@@BJ@@@@@@@@@@@"
"@@@@@H@@@@@BJ@@@@@@@@@@@"
"@@@@@H@@@@@BJ@@@@@@@@@@@"
"@@@@@H@@@@@BJ@@@@@@@@@@@"
"@@@COOOOOOLBJ@@@@@@@@@@@"
"@@@B@@@@@@DBJ@@@@@@@@@@@"
"@@@GOOOOOODBJ@@@@@@@@@@@"
"@@@D@@@@@ADBJ@@@@@@@@@@@"
"@@@OOOOOOMDBJ@@@@@@@@@@@"
"@@@H@@@@@EDBJ@@@@@@@@@@@"
"@@@H@@@@@EDBJ@@@@@@@@@@@"
"@@@H@@@@@EDBJ@@@@@@@@@@@"
"@@@H@@@@@EDBJ@@@@@@@@@@@"
"@@@H@@@@@EDBJ@@@@@@@@@@@"
"@@@H@@@@@EDBJ@@@@@@@@@@@"
"@@@H@@@@@EDBJ@@@@@@@@@@@"
"@@@H@@@@@EDBJ@@@@@@@@@@@"
"@@@H@@@@@EDBJ@@@@@@@@@@@"
"@@@H@@@@@EDBJ@@@@@@@@@@@"
"@@@H@@@@@EDBJ@@@@@@@@@@@"
"@@@H@@@@@EDBJ@@@@@@@@@@@"
"@@@H@@@@@EDBJ@@@@@@@@@@@"
"@@.3H@@@@@EDBJ@@@@@@@@@@@"
"@@@H@@@@@EDBJ@@@@@@@@@@@"
"@@@H@@@@@EDBJ@@@@@@@@@@@"
"@@@H@@@@@EDBJ@@@@@@@@@@@"
"@@@H@@@@@EDBJ@@@@@@@@@@@"
"@@@H@@@@@EDBJ@@@@@@@@@@@"
"@@@H@@@@@EDBJ@@@@@@@@@@@"
"@@@H@@@@@EDBJ@@@@@@@@@@@"
"@@@H@@@@@EDBJ@F@AN@AN@@@"
"@@@H@@@@@EDBN@N@CC@CC@@@"
"@@@H@@@@@EDCHAN@@C@@C@@@"
"@@@H@@@@@EDB@@F@@F@@N@@@"
"@@@H@@@@@EGN@@F@@L@@C@@@"
"@@@H@@@@@ED@@@F@AH@CC@@@"
"@@@H@@@@@ED@@@FCC@CCCCCC"
"@@@H@@@@@ED@@@FCCOCANCCC"
"@@@H@@@@@ED@@@@A@@A@@@@@"
"@@@H@@@@@EDH@@@A@@A@@@@@"
"@@@H@@@@@EMH@@@B@@B@@@@@"
"@@@H@@@@@GAH@@@@@@@@@@@@"
"@@@OOOOOOLGH@@@@@@@@@@@@"
"@@@@@@@@@AD@@@@@@@@@@@@@"
"@@@OOOOOOONAH@GH@GH@@@@@"
"@@@OOOOOOOLCH@LL@LL@@@@@"
"@@@OOOOOOOHGH@@L@@L@@@@@"
"@@@OOOOOOO@AH@AH@CH@@@@@"
"@@@OOOOOON@AH@C@@@L@@@@@"
"@@@@@@@@@@@AH@F@@LL@@@@@"
"@@@@@@@@@@@AHLL@LLLLLL@@"
"@@@@@@@@@@@AHLOLLGHLLL@@"
"@@@@@@@@@@@@@D@@D@@@@@@@"
"@@@@@@@@@@@@@D@@D@@@@@@@"
"@@@@@@@@@@@@@H@@H@@@@@@@"))) (\TYPE BITMAP PLACEMENT (252 . 362) NAME GHOST.TOP.TRAY BITMAP {(READBITMAP)
(61 61
"JHBHBH@JJJH@HB@H"
"@@@DD@@A@@@@@AA@"
"B@@B@B@@@HB@@@@@"
"@A@@D@@A@@@AD@@@"
"B@@BBH@@@JHBB@@@"
"@A@@D@@A@@@AD@D@"
"B@H@@@@@@HB@@@@@"
"@@E@D@@A@@@DA@D@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
```

```
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@AD@@@@@@"
"@@@@@@@BHB@@@@@@"
"@@@@@@E@@E@@@@@@"
"@@@@@J@@@HH@@@@@"
"@E@AD@@@AAD@@@@@"
"@BBH@@@@BB@JH@@@"
"@DD@@@@@DDDE@@@@"
"@BH@@@@@HHB@H@@@"
"@A@@@@@AA@EA@@@@"
"@B@@@@BJB@H@H@@@"
"@D@@@ED@DA@A@@@@"
"@H@@JH@JHB@@H@@@"
"A@AE@AE@@DAE@@@@"
"BBJ@BJ@BHHBJH@@@"
"ED@ED@E@A@@A@@@@"
"JJJJJJJJJH@B@@@@"
"EEEEEEEEED@D@@@@"
"H@@@@@@@@H@H@@@@"
"D@@@@@@@@DA@@@@@"
"H@@@@@@@@HB@@@@@"
"D@@@@@@@@DD@@@@@"
"H@@@@@@@@HH@@@@@"
"D@@@@@@@@E@@@@@@"
"H@@@@@@@@J@@@@@@"
"EEEEEEEEED@@@@@@"
"JJJJJJJJJH@@@@@@"))) (\TYPE BITMAP PLACEMENT (550 . 350) NAME MARGIN.SHIFT BITMAP {(READBITMAP)(51 66
"F@LA@GN@OHDHB@@@"
"F@LA@DAA@DDLB@@@"
"EADBHDAB@@DJB@@@"
"EADBHDAB@@DIB@@@"
"DJDDDGNBCLDIB@@@"
"DJDGLDAB@DDHJ@@@"
"DDDHBDAA@LDHF@@@"
"DDDHBDA@ODDHB@@@"
"@@@@@@@@@@@@@@@@"
"@@@@@@@@@@@@@@@@"
"@@@@@@@@@@@@@@@@"
"@@@@@@@@@@@@@@@@"
"CNB@HIOIOL@@@@@@"
"DAB@HI@@B@@@@@@@"
"D@B@HI@@B@@@@@@@"
"CLCOHIO@B@@@@@@@"
"@BB@HI@@B@@@@@@@"
"@AB@HI@@B@@@@@@@"
"DAB@HI@@B@@@@@@@"
"CNB@HI@@B@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"OOOOOOL@@@@@@@@@"
"OOOOOOL@@@@@@@@@"
"L@@@@@L@@@@@@@@@"
"L@@@@@L@@@@@@@@@"
"MOO@@@L@@@@@@@@@"
"L@@@@@L@@@@@@@@@"
"MOO@@@L@@@@@@@@@"
"L@@@@@L@@@@@@@@@"
"L@@@@@L@@@@@@@@@"
"L@@@@@L@@@@@@@@@"
"L@@@@@L@@@@@@@@@"
"MOOOOLL@@@@@@@@@"
"L@L@@@L@@@@@@@@@"
```

```
"LAH@@@L@@@@@@@@@"
"MKKOOLL@@@@@@@@@"
"LF@@@@L@@@@@@@@@"
"LL@@@@L@@@@@@@@@"
"MOOOGLL@@@@@@@@@"
"MOOO@@L@@@@@@@@@"
"LL@@@@L@@@@@@@@@"
"LGOOOLL@@@@@@@@@"
"LC@@@@L@@@@@@@@@"
"LAH@@@L@@@@@@@@@"
"MOOOOLL@@@@@@@@@"
"L@L@@@L@@@@@@@@@"
"L@@@@@L@@@@@@@@@"
"MOOOOLL@@@@@@@@@"
"L@@@@@L@@@@@@@@@"
"L@@@@AL@@@@@@@@@"
"MOOONCL@@@@@@@@@"
"L@@@@NL@@@@@@@@@"
"L@@@@LL@@@@@@@@@"
"MOOOILH@@@@@@@@@"
"L@@@C@H@@@@@@@@@"
"L@@@BAH@@@@@@@@@"
"L@@@CA@@@@@@@@@@"
"L@@@AK@@@@@@@@@@"
"L@@@@O@@@@@@@@@@"
"OOOOOO@@@@@@@@@@"
"OOOOOL@@@@@@@@@@"))) (\TYPE BITMAP PLACEMENT  (469 . 344) NAME SHADOW.MARGIN.SHIFT BITMAP  {(READBITMAP)(51
 72
"F@LA@GN@OHDHB@@@"
"F@LA@DAA@DDLB@@@"
"EADBHDAB@@DJB@@@"
"EADBHDAB@@DIB@@@"
"DJDDDGNBCLDIB@@@"
"DJDGLDAB@DDHJ@@@"
"DDDHBDAA@LDHF@@@"
"DDDHBDA@ODDHB@@@"
"@@@@@@@@@@@@@@@@"
"@@@@@@@@@@@@@@@@"
"@@@@@@@@@@@@@@@@"
"@@@@@@@@@@@@@@@@"
"CNB@HIOIOL@@@@@@"
"DAB@HI@@B@@@@@@@"
"D@B@HI@@B@@@@@@@"
"CLCOHIO@B@@@@@@@"
"@BB@HI@@B@@@@@@@"
"@AB@HI@@B@@@@@@@"
"DAB@HI@@B@@@@@@@"
"CNB@HI@@B@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"OOOOOOL@@@@@@@@@"
"OOOOOOL@@@@@@@@@"
"L@@@@@L@@@@@@@@@"
"L@@@@@L@@@@@@@@@"
"MOO@@@L@@@@@@@@@"
"L@@@@@L@@@@@@@@@"
"MOO@@@L@@@@@@@@@"
"L@@@@@L@@@@@@@@@"
"L@@@@@L@@@@@@@@@"
"L@@@@@L@@@@@@@@@"
"L@@@@@L@@@@@@@@@"
"MOOOOLL@@@@@@@@@"
"L@L@@@L@@@@@@@@@"
"LAH@@@L@@@@@@@@@"
"MKKOOLL@@@@@@@@@"
"LF@@@@L@@@@@@@@@"
"LL@@@@L@@@@@@@@@"
"MOOOGLL@@@@@@@@@"
"MOOO@@L@@@@@@@@@"
"LL@@@@L@@@@@@@@@"
"LGOOOLL@@@@@@@@@"
"LC@@@@L@@@@@@@@@"
"LAH@@@L@@@@@@@@@"
"MOOOOLL@@@@@@@@@"
"L@L@@@L@@@@@@@@@"
"L@@@@@L@@@@@@@@@"
"MOOOOLL@@@@@@@@@"
"L@@@@@L@@@@@@@@@"
"L@@@@AL@@@@@@@@@"
"MOOONCL@@@@@@@@@"
"L@@@@NL@@@@@@@@@"
"L@@@@LL@@@@@@@@@"
"MOOOILH@@@@@@@@@"
```

"L@@@C@H@@@@@@@@@"
"L@@@BAH@@@@@@@@@"
"L@@@CA@@@@@@@@@@"
"L@@@AK@@@@@@@@@@"
"L@@@@O@@@@@@@@@@"
"00000B@@@@@@@@@@"
"00000LF@@@@@@@@@"
"@@@@@AN@@@@@@@@@"
"000000N@@@@@@@@@"
"000000N@@@@@@@@@"
"000000L@@@@@@@@@"
"000000H@@@@@@@@@"
"00000N@@@@@@@@@@")}) (\TYPE BITMAP PLACEMENT (42 . 457) NAME COPY.CONTRAST.BAR BITMAP {(READBITMAP)(267 4
4
"000000000000000000000000000000000000000000000000000000000000000000L@"
"000000000000000000000000000000000000000000000000000000000000000000N@"
"L@@@@@@@@@@@@F@@@@@@@@@@@@C@@@@@@@@@@@@AH@@@@@@@@@@@@L@@H@@@@@HC@@F@"
"L@@@@@@@@@@@@FD@A@@D@A@@D@C@@@@@@@@@@@@AH@@@@@@@@@@@@OACD@@@@@LALFF@"
"L@@@@@@@@@@@@F@@@@@@@@@@@@CA@HB@DA@B@A@AHA@D@@@@B@@@@OIIND@BF@G@GKF@"
"L@@@@@@@@@@@@F@@@@@@@@@@@@C@@@@@@@@@@@@AIHHD@@@@A@@A@NFDICCCGHCHAOF@"
"L@@@@@@@@@@@@F@@@@@@@@@@@@C@@@@@@@@@@@@AHHDB@HA@@IIHHOCCBIHMKG@FA@F@"
"L@@@@@@@@@@@@F@@@@@@@@@@@@C@@@@@@@@@@@@AHD@A@H@@@DHDLMHMBFDLEHHEHLF@"
"L@@@@@@@@@@@@F@B@@D@B@@D@@K@D@HD@H@HDABAHDCA@D@H@@DCGLLBIICNDLFALBF@"
"L@@@@@@@@@@@@F@@@@@@@@@@@@C@@@@@@@@@@@@AHB@@DC@FDCBA@LEAFA@KBBA@CBF@"
"L@@@@@@@@@@@@F@@@@@@@@@@@@C@@@@@@@@@@@@AHB@HB@@@B@A@HMBLIFDEIAHLFIF@"
"L@@@@@@@@@@@@F@@@@@@@@@@@@C@@@@@@@@@@@@AHA@DA@HAB@I@DMABE@D@@LFBBGF@"
"L@@@@@@@@@@@@F@@@@@@@@@@@@C@@@@@@@@@@@@AJA@B@HD@I@DHDLLIDEAALBBC@IF@"
"L@@@@@@@@@@@@F@@@@@@@@@@@@C@@@@@H@@@DA@AJ@HA@@@@@H@D@LBFNDHHAAAAHHF@"
"L@@@@@@@@@@@@F@@@@@@@@@@@@C@HB@H@B@H@@@AJ@D@HDB@D@@B@LCAEA@DCHLLDDF@"
"L@@@@@@@@@@@@F@@A@@D@A@@D@C@@@@@@@@@@@@AK@D@@BA@BDAB@NAICICBBJBBFBF@"
"L@@@@@@@@@@@@FH@@@@@@@@@@@C@@@@@@@@@@@@AI@@@D@@H@DA@@O@HJDDA@AAAAAF@"
"L@@@@@@@@@@@@F@@@@@@@@@@@@C@@@@@@@@@@@@AHHB@B@H@A@@IHMH@GFBM@NDLLIF@"
"L@@@@@@@@@@@@F@@@@@@@@@@@@C@@@@@@@@@@@@AHLB@@@DBAA@D@LL@GB@JHBBCBMF@"
"L@D@@@@@@@@@@F@AL@@@@@@@@@C@CH@D@@@@@@AAHDL@B@@B@A@BDLDOCIHEDAHAIGF@"
"L@L@@@@@@@@@@F@BB@@@@@@@@@CBDDB@JBD@@I@AH@MHB@B@@D@@BL@H@LFFN@LLHKN@"
"LCL@@@@@@@@@@F@@B@@@@@@@@@C@@D@@@@@BA@@AHAD@A@A@HDDBAMINANBAM@DBDEN@"
"L@D@@@@@@@@@@F@@B@@@@@@@@@C@AH@@@@@@@@@AHADD@H@@@@BA@LIA@MA@JLB@JBF@"
"L@D@@@@@@@@@@F@@L@@@@@@@@@C@@D@@@@@@@@@AHBDB@D@@D@B@@LDA@CHHFNAHEJF@"
"L@D@@@@@@@@@@F@A@@D@B@@B@@K@@D@@@@@@@@@AHCNB@D@H@A@@HL@AC@LDAG@FAFF@"
"L@D@@@@@@@@@@F@B@@@@@@@@@@C@DDDBBDHHHDDAI@D@@@@DAA@HDLAAE@GF@KLB@FF@"
"L@D@@@@@@@@@@F@CN@@@@@@@@@C@CH@@@@@@@@@AIHD@HB@B@H@DFL@NBDCI@DJAHFF@"
"L@@@@@@@@@@@@F@@@@@@@@@@@@C@@@@@@@@@@@@AHH@@D@@A@@D@@MH@AACM@DGBDAN@"
"L@@@@@@@@@@@@F@@@@@@@@@@@@C@@@@@@@@@@@@AHL@@BAH@@@DB@LHLHM@NHCFHF@F@"
"L@@@@@@@@@@@@F@@@@@@@@@@@@C@@@@@@@@@@@@AJDD@B@@@HB@A@NDDLBDGDAADC@F@"
"L@@@@@@@@@@@@F@@@@@@@@@@@@C@@@@@@@@@@@@AJBC@@@D@HAB@HOFCBABCN@IF@HF@"
"L@@@@@@@@@@@@F@@@@@@@@@@@@C@@@@@@@@@@@@HAIB@HA@B@D@AHHMB@I@MIO@LK@OF@"
"L@@@@@@@@@@@@F@@@H@B@@@@@@CA@HBA@HBA@@@AIA@H@HB@B@D@DMA@I@B@JHFMHFN@"
"L@@@@@@@@@@@@FB@@@@@@@D@@HC@@@@@@@@@@@@AAHHH@@DA@A@DDBLH@DHAFGNCDLCF@"
"L@@@@@@@@@@@@F@@@@@@@@@@@@C@@@@@@A@@DD@AH@DC@FA@A@B@CLHHBD@EBMACFAF@"
"L@@@@@@@@@@@@F@@@@@@@@@@@@C@@@@@@@A@@@@AHDB@@B@H@@@A@LDDBB@GIGLIB@F@"
"L@@@@@@@@@@@@F@@@@@@@@@@@@C@D@@@@@@@@@@AHBB@LB@D@LA@HMDDCA@ADIBLIHF@"
"L@@@@@@@@@@@@F@@@@@@@@@@@@C@@@HH@B@@@@@AHBA@DB@B@D@@@MKBA@H@KFILDLF@"
"L@@@@@@@@@@@@F@@@@@@@@@@A@@C@@@@@D@@@DBBAH@HHBA@C@B@H@LDCMHL@LMNKFFF@"
"L@@@@@@@@@@@@F@B@@D@@H@@@@K@@@@@@@@H@@@AH@HFA@H@HB@D@LCILDB@DCGICCF@"
"L@@@@@@@@@@@@F@@@@@@@@@@@@C@@@@@@@@@@@@AH@@@AH@@HB@D@LAFL@AHBAB@AHF@"
"L@@@@@@@@@@@@F@@@@@@@@@@@@C@@@@@@@@@@@@AH@B@@H@@DA@B@L@C@@@LAH@@@HF@"
"000000000000000000000000000000000000000000000000000000000000000000N@"
"000000000000000000000000000000000000000000000000000000000000000000N@")}) (\TYPE BITMAP PLACEMENT (314 . 45
7) NAME DARK.SPOT.QUALITY BITMAP {(READBITMAP)(53 42
"EEEEEEEEEEEEE@@@"
"HHHHHHHHHHHHHH@@"
"EEEEEEEEEEEEE@@@"
"BBBBBBBBBBBBB@@@"
"EEEEEEEEEEEEE@@@"
"HHHHHHHHHHHHHH@@"
"EEEEEEEEEEEEE@@@"
"BBBBBBBBBBBBB@@@"
"EEEEEEEEEEEEE@@@"
"HHHHHHHHHHHHHH@@"
"EEEEEEEEEEEEE@@@"
"BBBBBBBBBBBBB@@@"
"EEEEEEEEEEEEE@@@"
"HHHHHHHHHHHHHH@@"
"EEEEEEEEEEEEE@@@"
"BBBBBBBBBBBBB@@@"
"EEEEEEEEEEEEE@@@"
"HHHHHHHHHHHHHH@@"
"EEEEEEEEEEEEE@@@"
"BBBBBBBBBBBBB@@@"
"EEEEEEEEEEEEE@@@"
"HHHHHHHHHHHHHH@@"
"EEEEEEEEEEEEE@@@"
"BBBBBBBBBBBBB@@@"
"EEEEEEEEEEEEE@@@"
"HHHHHHHHHHHHHH@@"
"EEEEEEEEEEEEE@@@"
"BBBBBBBBBBBBB@@@"

```
"EEEEEEEEEEEEEE@@@"
"HHHHHHHHHHHHHHH@@"
"EEEEEEEEEEEEEE@@@"
"BBBBBBBBBBBBBB@@@"
"EEEEEEEEEEEEEE@@@"
"HHHHHHHHHHHHHHH@@"
"EEEEEEEEEEEEEE@@@"
"BBBBBBBBBBBBBB@@@"
"EEEEEEEEEEEEEE@@@"
"HHHHHHHHHHHHHHH@@"
"EEEEEEEEEEEEEE@@@"
"BBBBBBBBBBBBBB@@@"
"EEEEEEEEEEEEEE@@@"
"HHHHHHHHHHHHHHH@@")))  (\TYPE BITMAP PLACEMENT  (11 . 5) NAME COPY.QUALITY BITMAP  {(READBITMAP)(95 63
"CLANAOA@D@CLB@HB@H@DONHB"
"DBBAA@HHH@DBB@HB@H@DA@DD"
"H@D@I@HHH@HAB@HE@H@DA@DD"
"H@D@I@HE@@HAB@HE@H@DA@BH"
"H@D@IO@B@@HAB@HHHH@DA@A@"
"H@D@I@@B@@HIB@HOHH@DA@A@"
"DBBAA@@B@@DFB@I@DH@DA@A@"
"CLANA@@B@@CNAOA@DOLDA@A@"
"@@@@@@@@@@@@A@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@@@@@@@@@@@@@@@@@@@@@"
"OOOOOOOOOOOOOOOOOON@@@@@"
"OOOOOOOOOOOOOOOOOON@@@@@"
"L@@@@@@@@@@@@@@@@@F@@@@@"
"L@@@@@@@@@@@@@@@@@F@@@@@"
"L@@@@@@@@@@@@@@@@@F@@@@@"
"L@@@@@@@@@@@@@@@@@F@@@@@"
"L@@@@@@@@@@@@@@@@@F@@@@@"
"L@@@@@@@@@@@@@@@@@F@@@@@"
"L@@@@@@@@@@@@@@@@@F@@@@@"
"L@@@@@@@@@@@@@@@@@F@@@@@"
"L@@@@@@@@@@@@@@@@@F@@@@@"
"L@@@@@@@@@@@@@@@@@F@@@@@"
"L@@@@@@@@@@@@@@@@@F@@@@@"
"L@@@@@@@@@@@@@@@@@F@@@@@"
"L@@@@@@@@@@@@@@@@@F@@@@@"
"L@@@@@@@@@@@@@@@@@F@@@@@"
"L@CLOLFCCGLCAOCN@@F@@@@@"
"L@FFC@OCKFFGIIKC@@F@@@@@"
"L@FFC@OCKFFGIIKC@@F@@@@@"
"L@CHC@OCOFFGIOCC@@F@@@@@"
"L@@LCAIKOFFLMNCC@@F@@@@@"
"L@FFCAOKGFFOMKCC@@F@@@@@"
"L@FFCAIKGFFLMIKC@@F@@@@@"
"L@CLCAIKCGLLMIKN@@F@@@@@"
"L@@@@@@@@@@@@@@@@@F@@@@@"
"L@@@@@@@@@@@@@@@@@F@@@@@"
"L@@@@@@@@@@@@@@@@@F@@@@@"
"L@@@@@@@@@@@@@@@@@F@@@@@"
"L@@@@@@@@@@@@@@@@@F@@@@@"
"L@@@@@@@@@@@@@@@@@F@@@@@"
"L@@@@@@@@@@@@@@@@@F@@@@@"
"L@@@@@@@@@@@@@@@@@F@@@@@"
"L@@@@@@@@@@@@@@@@@F@@@@@"
"L@@@@@@@@@@@@@@@@@F@@@@@"
"L@@@@@@@@@@@@@@@@@F@@@@@"
"L@@@@@@@@@@@@@@@@@F@@@@@"
"L@@@@@@@@@@@@@@@@@F@@@@@"
"L@@@@@@@@@@@@@@@@@F@@@@@"
"L@@@@@@@@@@@@@@@@@F@@@@@"
"L@@@@@@@@@@@@@@@@@F@@@@@"
"L@@@@@@@@@@@@@@@@@F@@@@@"
"OOOOOOOOOOOOOOOOOONB@@@@"
"OOOOOOOOOOOOOOOOOONF@@@@"
"@@@@@@@@@@@@@@@@@@N@@@@@"
"OOOOOOOOOOOOOOOOOOON@@@@"
"OOOOOOOOOOOOOOOOOOON@@@@"
"OOOOOOOOOOOOOOOOOOOL@@@@"
"OOOOOOOOOOOOOOOOOOOH@@@@"
"OOOOOOOOOOOOOOOOOOOO@@@@")))  (\TYPE BITMAP PLACEMENT  (139 . 10) NAME QUALITY.STANDARD BITMAP  {(READBITMAP
)(69 49
"GLGO@HB@IO@A@GNCN@@@"
"HB@H@HC@I@HA@DABA@@@"
"H@@HADBHI@DBHDAB@H@@"
"GH@HADBDI@DBHDAB@H@@"
"@D@HBBBDI@DDDGNB@H@@"
```

```
"@B@HCNBBI@DGLDAB@H@@"
"HB@HDABAI@HHBDABA@@@"
"GL@HDAB@IO@HBDACN@@@"
"@@@@@@@@@@@@@@@@@@@@"
"@@@@@@@@@@@@@@@@@@@@"
"@@@@AOOOOOOH@@@@@@@@"
"@@@@AH@@@@AH@@@@@@@@"
"@@@@AH@@@@AH@@@@@@@@"
"@@@@AKON@@AH@@@@@@@@"
"@@@@AH@@@@AH@@@@@@@@"
"@@@@AKON@@AH@@@@@@@@"
"@@@@AH@@@@AH@@@@@@@@"
"@@@@AH@@@@AH@@@@@@@@"
"@@@@AH@@@@AH@@@@@@@@"
"@@@@AH@@@@AH@@@@@@@@"
"@@@@AKOOOOIH@@@@@@@@"
"@@@@AH@@@@AH@@@@@@@@"
"@@@@AH@@@@AH@@@@@@@@"
"@@@@AKOOOOIH@@@@@@@@"
"@@@@AH@@@@AH@@@@@@@@"
"@@@@AH@@@@AH@@@@@@@@"
"@@@@AKOOOOIH@@@@@@@@"
"@@@@AH@@@@AH@@@@@@@@"
"@@@@AH@@@@AH@@@@@@@@"
"@@@@AKOOOOIH@@@@@@@@"
"@@@@AH@@@@AH@@@@@@@@"
"@@@@AH@@@@AH@@@@@@@@"
"@@@@AKOOOOIH@@@@@@@@"
"@@@@AH@@@@AH@@@@@@@@"
"@@@@AH@@@@AH@@@@@@@@"
"@@@@AKOOOOIH@@@@@@@@"
"@@@@AH@@@@AH@@@@@@@@"
"@@@@AH@@@@CH@@@@@@@@"
"@@@@AKOOOLGH@@@@@@@@"
"@@@@AH@@@AMH@@@@@@@@"
"@@@@AH@@@AIH@@@@@@@@"
"@@@@AKOOOCI@@@@@@@@@"
"@@@@AH@@@FA@@@@@@@@@"
"@@@@AH@@@DC@@@@@@@@@"
"@@@@AH@@@FB@@@@@@@@@"
"@@@@AH@@@CF@@@@@@@@@"
"@@@@AH@@@AN@@@@@@@@@"
"@@@@AOOOOON@@@@@@@@@"
"@@@@AOOOOOH@@@@@@@@@"))) (\TYPE BITMAP PLACEMENT (216 . 11) NAME QUALITY.PHOTO BITMAP {(READBITMAP)(43 45

"OHHBANAOLGH@"
"HDHBBA@B@HD@"
"HDHBD@HBA@B@"
"HDOND@HBA@B@"
"OHHBD@HBA@B@"
"H@HBD@HBA@B@"
"H@HBBA@B@HD@"
"H@HBAN@B@GH@"
"@@@@@@@@@@@@"
"@@@@@@@@@@@@"
"@@@@@@@@@@@@"
"AOOOOOOOOO@@"
"ACO@@@@@EE@@"
"AFGL@@@@GE@@"
"AJGL@@@FEM@@"
"ACON@@@ELE@@"
"AOCML@@@EA@@"
"AIBOH@@@AG@@"
"AICIE@@@KM@@"
"AIGJBD@@@C@@"
"AOOJCD@@BC@@"
"ADKOM@@@@C@@"
"ADHLF@@O@C@@"
"ADACH@AOHC@@"
"AOONG@AOHC@@"
"AMJAO@AOHC@@"
"ANOOL@GOHO@@"
"ANDHFOMOOK@@"
"AKGHOH@O@C@@"
"ANNOH@@O@E@@"
"AHDOO@OOOA@@"
"ABEH@AOOOI@@"
"AOOCLOOOOM@@"
"AIN@@COOOO@@"
"AOL@DGOOOM@@"
"AGLL@GOOOM@@"
"AELA@OGOMM@@"
"AML@@OGOMM@@"
"AOLFANGOMM@@"
"AILLANGOMO@@".
"AGL@CLGOMM@@"
```

```
"AIL@CLGOMM@@"
"AOMBCNGOMM@@"
"AEMHAOGOMO@@"
"AOOOOOOOOO@@")}) (\TYPE BITMAP PLACEMENT (335 . 12) NAME QUALITY.LIGHT BITMAP {(READBITMAP)(38 49
"H@DCNB@IOL@@"
"H@DDAB@HB@@@"
"H@DH@B@HB@@@"
"H@DH@COHB@@@"
"H@DHOB@HB@@@"
"H@DHAB@HB@@@"
"H@DDCB@HB@@@"
"OLDCMB@HB@@@"
"@@@@@@@@@@@@"
"@@@@@@@@@@@@"
"AOOOOOOH@@@@"
"AH@@@@AH@@@@"
"AH@@@@AH@@@@"
"AJJJ@@AH@@@@"
"AH@@@@AH@@@@"
"AJJJ@@AH@@@@"
"AH@@@@AH@@@@"
"AH@@@@AH@@@@"
"AH@@@@AH@@@@"
"AH@@@@AH@@@@"
"AJJJJJIH@@@@"
"AH@@@@AH@@@@"
"AH@@@@AH@@@@"
"AJJJJJIH@@@@"
"AH@@@@AH@@@@"
"AH@@@@AH@@@@"
"AJJJJJIH@@@@"
"AH@@@@AH@@@@"
"AH@@@@AH@@@@"
"AJJJJJIH@@@@"
"AH@@@@AH@@@@"
"AH@@@@AH@@@@"
"AJJJJJIH@@@@"
"AH@@@@AH@@@@"
"AH@@@@AH@@@@"
"AJJJJJIH@@@@"
"AH@@@@AH@@@@"
"AH@@@@CH@@@@"
"AJJJJHGH@@@@"
"AH@@@AMH@@@@"
"AH@@@AIH@@@@"
"AJJJJCI@@@@@"
"AH@@@FA@@@@@"
"AH@@@DC@@@@@"
"AH@@@FB@@@@@"
"AH@@@CF@@@@@"
"AH@@@AN@@@@@"
"AOOOOON@@@@@"
"AOOOOOH@@@@@"))) (\TYPE BITMAP PLACEMENT (407 . 18) NAME QUALITY.COLORED BITMAP {(READBITMAP)(62 49
"CLANA@@GHGNCOIO@"
"DBBAA@@HDDAB@A@H"
"H@D@I@A@BDAB@A@D"
"H@D@I@A@BDACOA@D"
"H@D@I@A@BGNB@A@D"
"H@D@I@A@BDAB@A@D"
"DBBAA@@HDDAB@A@H"
"CLANAOHGHDACOIO@"
"@@@@@@@@@@@@@@@@"
"@@@@@@@@@@@@@@@@"
"@COOOOOO@@@@@@@@"
"@C@@@@@C@@@@@@@@"
"@C@@@@@C@@@@@@@@"
"@CGOL@@C@@@@@@@@"
"@C@@@@@C@@@@@@@@"
"@CGOL@@C@@@@@@@@"
"@C@@@@@C@@@@@@@@"
"@C@@@@@C@@@@@@@@"
"@C@@@@@C@@@@@@@@"
"@C@@@@@C@@@@@@@@"
"@CGOOOOC@@@@@@@@"
"@C@@@@@C@@@@@@@@"
"@C@@@@@C@@@@@@@@"
"@CGOOOOC@@@@@@@@"
"@C@@@@@C@@@@@@@@"
"@C@@@@@C@@@@@@@@"
"@CGOOOOC@@@@@@@@"
"@C@@@@@C@@@@@@@@"
"@C@@@@@C@@@@@@@@"
"@CGOOOOC@@@@@@@@"
"@C@@@@@C@@@@@@@@"
"@C@@@@@C@@@@@@@@"
"@CGOOOOC@@@@@@@@"
```

```
"@C@@@@@C@@@@@@@@"
"@C@@@@@C@@@@@@@@"
"@CGOOOOC@@@@@@@@"
"@C@@@@@C@@@@@@@@"
"@C@@@@@G@@@@@@@@"
"@CGOOOHO@@@@@@@@"
"@C@@@@CK@@@@@@@@"
"@C@@@@CC@@@@@@@@"
"@CGOONGB@@@@@@@@"
"@C@@@@LB@@@@@@@@"
"@C@@@@HF@@@@@@@@"
"@C@@@@LD@@@@@@@@"
"@C@@@@FL@@@@@@@@"
"@C@@@@CL@@@@@@@@"
"@COOOOOL@@@@@@@@"
"@COOOOO@@@@@@@@@"})) (\TYPE BITMAP PLACEMENT (535 . 6) NAME QUALITY.GOLDENROD BITMAP {(READBITMAP)(83 50
"@OHCLB@CNAOLHBGN@O@OH@@@"
"A@DDBB@BAA@@LBDAA@HHD@@@"
"B@@HAB@B@I@@JBDAB@DHB@@@"
"B@@HAB@B@IOHIBDAB@DHB@@@"
"BCLHAB@B@I@@IBGNB@DHB@@@"
"B@DHAB@B@I@@HJDAB@DHB@@@"
"A@LDBB@BAA@@HFDAA@HHD@@@"
"@ODCLCOCNAOLHBDA@O@OH@@@"
"@@@@@@@@@@@@@@@@@@@@@@@@"
"@@@@@@@@@@@@@@@@@@@@@@@@"
"@@@@@@@@@@@@@@@@@@@@@@@@"
"OOOOOL@@@@@@@@@@@@@@@@@@"
"L@@@@@L@@@@@@@@@@@@@@@@@"
"L@@@@@L@@@@@@@@@@@@@@@@@"
"MOO@@@L@@@@@@@@@@@@@@@@@"
"L@@@@@L@@@@@@@@@@@@@@@@@"
"MOO@@@L@@@@@@@@@@@@@@@@@"
"L@@@@@L@@@@@@@@@@@@@@@@@"
"L@@@@@L@@@@@@@@@@@@@@@@@"
"L@@@@@L@@@@@@@@@@@@@@@@@"
"L@@@@@L@@@@@@@@@@@@@@@@@"
"MOOOOLL@@@@@@@@@@@@@@@@@"
"L@@@@@L@@@@@@@@@@@@@@@@@"
"L@@@@@L@@@@@@@@@@@@@@@@@"
"MOOOOLL@@@@@@@@@@@@@@@@@"
"L@@@@@L@@@@@@@@@@@@@@@@@"
"L@@@@@L@@@@@@@@@@@@@@@@@"
"MOOOOLL@@@@@@@@@@@@@@@@@"
"L@@@@@L@@@@@@@@@@@@@@@@@"
"L@@@@@L@@@@@@@@@@@@@@@@@"
"MOOOOLL@@@@@@@@@@@@@@@@@"
"L@@@@@L@@@@@@@@@@@@@@@@@"
"L@@@@@L@@@@@@@@@@@@@@@@@"
"MOOOOLL@@@@@@@@@@@@@@@@@"
"L@@@@@L@@@@@@@@@@@@@@@@@"
"L@@@@@L@@@@@@@@@@@@@@@@@"
"MOOOOLL@@@@@@@@@@@@@@@@@"
"L@@@@@L@@@@@@@@@@@@@@@@@"
"L@@@@AL@@@@@@@@@@@@@@@@@"
"MOOONCL@@@@@@@@@@@@@@@@@"
"L@@@@NL@@@@@@@@@@@@@@@@@"
"L@@@@LL@@@@@@@@@@@@@@@@@"
"MOOOILH@@@@@@@@@@@@@@@@@"
"L@@@C@H@@@@@@@@@@@@@@@@@"
"L@@@BAH@@@@@@@@@@@@@@@@@"
"L@@@CA@@@@@@@@@@@@@@@@@@"
"L@@@AK@@@@@@@@@@@@@@@@@@"
"L@@@@O@@@@@@@@@@@@@@@@@@"
"OOOOOO@@@@@@@@@@@@@@@@@@"
"OOOOOL@@@@@@@@@@@@@@@@@@"})) (\TYPE BITMAP PLACEMENT (636 . 8) NAME QUALITY.PASTEUP BITMAP {(READBITMAP)(
63 50
"GL@HAOAOMOL@HBGL"
"DB@HB@HBA@@@HBDB"
"DBADB@@BA@@@HBDB"
"DBADAN@BAOH@HBDB"
"GLBB@A@BA@@@HBGL"
"D@CN@@HBA@@LHBD@"
"D@DAB@HBA@@@HBD@"
"D@DAAO@BAOL@GLD@"
"@@@@@@@@@@@@@@@@"
"@@@@@@@@@@@@@@@@"
"@@@@@@@@@@@@@@@@"
"OOOOOOL@@@@@@@@@"
"L@@@@@L@@@@@@@@@"
"LB@@A@L@@@@@@@@@"
"LB@@A@L@@@@@@@@@"
"L@@@@@L@@@@@@@@@"
"MKOOOFL@@@@@@@@@"
"LCOOO@L@@@@@@@@@"
"LC@@C@L@@@@@@@@@"
"LC@@C@L@@@@@@@@@"
```

```
"LC@@C@L@@@@@@@@@"
"LC@@C@L@@@@@@@@@"
"LC@@C@L@@@@@@@@@"
"LC@@C@L@@@@@@@@@"
"LC@@C@L@@@@@@@@@"
"LCOOO@L@@@@@@@@@"
"MKOOOFL@@@@@@@@@"
"L@@@@@L@@@@@@@@@"
"L@@@@@L@@@@@@@@@"
"LD@@A@L@@@@@@@@@"
"LD@@A@L@@@@@@@@@"
"L@@@@@L@@@@@@@@@"
"L@@@@@L@@@@@@@@@"
"MOOOOLL@@@@@@@@@"
"L@@@@@L@@@@@@@@@"
"L@@@@@L@@@@@@@@@"
"MOOOOLL@@@@@@@@@"
"L@@@@@L@@@@@@@@@"
"L@@@@AL@@@@@@@@@"
"MOOONCL@@@@@@@@@"
"L@@@@NL@@@@@@@@@"
"L@@@@LL@@@@@@@@@"
"MOOOILH@@@@@@@@@"
"L@@@C@H@@@@@@@@@"
"L@@@BAH@@@@@@@@@"
"L@@@CA@@@@@@@@@@"
"L@@@AK@@@@@@@@@@"
"L@@@@O@@@@@@@@@@"
"OOOOOO@@@@@@@@@@"
"OOOOOL@@@@@@@@@@"))) (\TYPE BITMAP PLACEMENT (490 . 6) NAME QUALITY.HALFTONE BITMAP ((READBITMAP)(36 62
"B@HB@H@OL@@@"
"B@HB@H@H@@@@"
"B@HE@H@H@@@@"
"COHE@H@OH@@@"
"B@HHHH@H@@@@"
"B@HOHH@H@@@@"
"B@I@DH@H@@@@"
"B@I@DOLH@@@@"
"@@@@@@@@@@@@"
"@@@@@@@@@@@@"
"@@@@@@@@@@@@"
"@@@@@@@@@@@@"
"COHO@HBGO@@@"
"@DA@HLBD@@@@"
"@DB@DJBD@@@@"
"@DB@DIBGN@@@"
"@DB@DIBD@@@@"
"@DB@DHJD@@@@"
"@DA@HHFD@@@@"
"@D@O@HBGO@@@"
"@@@@@@@@@@@@"
"@@@@@@@@@@@@"
"@@@@@@@@@@@@"
"OOOOOOL@@@@@"
"OOOOOOL@@@@@"
"MBDIBDL@@@@@"
"MBDIBDL@@@@@"
"OOOOOOL@@@@@"
"MBDIBDL@@@@@"
"MBDIBDL@@@@@"
"OOOOOOL@@@@@"
"MBDIBDL@@@@@"
"MBDIBDL@@@@@"
"OOOOOOL@@@@@"
"MBDIBDL@@@@@"
"MBDIBDL@@@@@"
"OOOOOOL@@@@@"
"MBDIBDL@@@@@"
"MBDIBDL@@@@@"
"OOOOOOL@@@@@"
"MBDIBDL@@@@@"
"MBDIBDL@@@@@"
"OOOOOOL@@@@@"
"MBDIBDL@@@@@"
"MBDIBDL@@@@@"
"OOOOOOL@@@@@"
"MBDIBDL@@@@@"
"MBDIBDL@@@@@"
"OOOOOOL@@@@@"
"MBDIBDL@@@@@"
"MBDIBAL@@@@@"
"OOOONCL@@@@@"
"MBDIBNL@@@@@"
"MBDIBLL@@@@@"
"OOOOHLH@@@@@"
"MBDIC@H@@@@@"
```

```
"MBDIBAH@@@@@"
"OOOOKA@@@@@@"
"MBDIAK@@@@@@"
"MBDI@O@@@@@@"
"OOOOOO@@@@@@"
"OOOOOL@@@@@@"))) (\TYPE PICTURE PLACEMENT  (356 . 244) FIGURE-COLOR GRAY BITMAP QUALITY.PASTEUP)  (\TYPE BI
TMAP
PLACEMENT  (141 . 64) NAME GHOST.QUALITY.STANDARD BITMAP  {(READBITMAP)(69 49
"BHBJ@HB@HJ@@@BJBJ@@@"
"@@@@@@A@A@@A@DA@A@@@"
"H@@H@@BHH@@BH@@B@H@@"
"E@@@AD@DA@D@@DA@@@@@"
"@@@HBBB@H@@@@BJB@H@@"
"@@@@AD@@A@DEDDA@@@@@"
"HB@H@@B@H@HHB@@B@@@@"
"ED@@DA@@AE@@@DAAD@@@"
"@@@@@@@@@@@@@@@@@@@@"
"@@@@@@@@@@@@@@@@@@@@"
"@@@@@JJJJJH@@@@@@@@@"
"@@@@A@@@@@A@@@@@@@@@"
"@@@@@H@@@@@H@@@@@@@@"
"@@@@AAED@@A@@@@@@@@@"
"@@@@@H@@@@@H@@@@@@@@"
"@@@@AAED@@A@@@@@@@@@"
"@@@@@H@@@@@H@@@@@@@@"
"@@@@A@@@@@A@@@@@@@@@"
"@@@@@H@@@@@H@@@@@@@@"
"@@@@A@@@@@A@@@@@@@@@"
"@@@@@JJJJHH@@@@@@@@@"
"@@@@A@@@@@A@@@@@@@@@"
"@@@@@H@@@@@H@@@@@@@@"
"@@@@AAEEEEA@@@@@@@@@"
"@@@@@H@@@@@H@@@@@@@@"
"@@@@A@@@@@A@@@@@@@@@"
"@@@@@JJJJHH@@@@@@@@@"
"@@@@A@@@@@A@@@@@@@@@"
"@@@@@H@@@@@H@@@@@@@@"
"@@@@AAEEEEA@@@@@@@@@"
"@@@@@H@@@@@H@@@@@@@@"
"@@@@A@@@@@A@@@@@@@@@"
"@@@@@JJJJHH@@@@@@@@@"
"@@@@A@@@@@A@@@@@@@@@"
"@@@@@H@@@@@H@@@@@@@@"
"@@@@AAEEEEA@@@@@@@@@"
"@@@@@H@@@@@H@@@@@@@@"
"@@@@A@@@@@A@@@@@@@@@"
"@@@@@JJJJHBH@@@@@@@@"
"@@@@A@@@@AE@@@@@@@@@"
"@@@@@H@@@@HH@@@@@@@@"
"@@@@AAEEEAA@@@@@@@@@"
"@@@@@H@@@B@@@@@@@@@@"
"@@@@A@@@@DA@@@@@@@@@"
"@@@@@H@@@BB@@@@@@@@@"
"@@@@A@@@@AD@@@@@@@@@"
"@@@@@H@@@@J@@@@@@@@@"
"@@@@AEEEEED@@@@@@@@@"
"@@@@@JJJJJH@@@@@@@@@"))) (\TYPE BITMAP PLACEMENT  (231 . 69) NAME GHOST.QUALITY.PHOTO BITMAP  {(READBITMAP)
(43 45
"JHHB@J@JHBH@"
"@D@@@A@@@@D@"
"H@HB@@HB@@B@"
"@DEDD@@@A@@@"
"JHHB@@HB@@B@"
"@@@@D@@@A@@@"
"H@HBB@@B@H@@"
"@@@@AD@@@E@@"
"@@@@@@@@@@@@"
"@@@@@@@@@@@@"
"@@@@@@@@@@@@"
"AEEEEEEEEE@@"
"@BJ@@@@@@@@@"
"ADED@@@@EE@@"
"@JBH@@@B@H@@"
"AAED@@@EDE@@"
"@JBHH@@@@@@@"
"AA@E@@@@AE@@"
"@HBH@@@@JH@@"
"AAE@@D@@@A@@"
"@JJJB@@@BB@@"
"ADAEE@@@@A@@"
"@@HHB@@J@B@@"
"ADAA@@AE@A@@"
"@JJJB@@JHB@@"
"AE@AE@AE@A@@"
"@JJJH@BJHJ@@"
"ADD@DEEEEA@@"
```

```
"@JBHJH@J@B@@"
"ADDE@@@E@E@@"
"@H@JJ@JJJ@@@"
"A@E@@AEEEA@@"
"@JJBHJJJJH@@"
"AAD@@AEEEE@@"
"@JH@@BJJJH@@"
"AEDD@EEEEE@@"
"@@H@@JBJHH@@"
"AED@@EEEEE@@"
"@JHB@JBJHH@@"
"AADDADEEEE@@"
"@BH@BHBJHH@@"
"AAD@ADEEEE@@"
"@JHBBJBJHH@@"
"AEE@AEEEEE@@"
"@JJJJJJJJJ@@"))) (\TYPE BITMAP PLACEMENT (333 . 76) NAME GHOST.QUALITY.LIGHT BITMAP ((READBITMAP)(38 49
"@@DAD@@AED@@"
"H@@@@B@HB@@@"
"@@D@@@@@@@@@"
"H@@H@BJHB@@@"
"@@D@E@@@@@@@"
"H@@H@B@HB@@@"
"@@DDA@@@@@@@"
"JH@BHB@HB@@@"
"@@@@@@@@@@@@"
"@@@@@@@@@@@@"
"AEEEEEE@@@@@"
"@H@@@@@H@@@@"
"A@@@@@A@@@@@"
"@JJJ@@@H@@@@"
"A@@@@@A@@@@@"
"@JJJ@@@H@@@@"
"A@@@@@A@@@@@"
"@H@@@@@H@@@@"
"A@@@@@A@@@@@"
"@H@@@@@H@@@@"
"A@@@@@A@@@@@"
"@H@@@@@H@@@@"
"A@@@@@A@@@@@"
"@JJJJJHH@@@@"
"A@@@@@A@@@@@"
"@H@@@@@H@@@@"
"A@@@@@A@@@@@"
"@H@@@@@H@@@@"
"A@@@@@A@@@@@"
"@JJJJJHH@@@@"
"A@@@@@A@@@@@"
"@H@@@@@H@@@@"
"A@@@@@A@@@@@"
"@H@@@@@H@@@@"
"A@@@@@A@@@@@"
"@JJJJJHH@@@@"
"A@@@@@A@@@@@"
"@H@@@@BH@@@@"
"A@@@@@E@@@@@"
"@H@@@@HH@@@@"
"A@@@@AA@@@@@"
"@JJJJBH@@@@@"
"A@@@@DA@@@@@"
"@H@@@@B@@@@@"
"A@@@@D@@@@@@"
"@H@@@BB@@@@@"
"A@@@@AD@@@@@"
"@JJJJJJ@@@@@"
"AEEEEE@@@@@@"))) (\TYPE BITMAP PLACEMENT (394 . 81) NAME GHOST.QUALITY.COLORED BITMAP ((READBITMAP)(62 49

"ADADA@@E@EDAEAE@"
"@BB@@@@H@@@B@@@H"
"@@D@A@A@@DA@@A@D"
"H@@@H@@@B@@BJ@@@"
"@@D@A@A@@ED@@A@D"
"H@@@H@@@B@@B@@@@"
"D@@AA@@@DDA@@A@@"
"BH@J@JHBH@@BJHJ@"
"@@@@@@@@@@@@@@@@"
"@@@@@@@@@@@@@@@@"
"@AEEEEEE@@@@@@@@"
"@B@@@@@B@@@@@@@@"
"@A@@@@@A@@@@@@@@"
"@BBJH@@B@@@@@@@@"
"@A@@@@@A@@@@@@@@"
"@BBJH@@B@@@@@@@@"
"@A@@@@@A@@@@@@@@"
"@B@@@@@B@@@@@@@@"
"@A@@@@@A@@@@@@@@"
"@B@@@@@B@@@@@@@@"
```

```
"@AEEEEEA@@@@@@@@"
"@B@@@@@B@@@@@@@@"
"@A@@@@@A@@@@@@@@"
"@BBJJJJB@@@@@@@@"
"@A@@@@@A@@@@@@@@"
"@B@@@@@B@@@@@@@@"
"@AEEEEEA@@@@@@@@"
"@B@@@@@B@@@@@@@@"
"@A@@@@@A@@@@@@@@"
"@BBJJJJB@@@@@@@@"
"@A@@@@@A@@@@@@@@"
"@B@@@@@B@@@@@@@@"
"@AEEEEEA@@@@@@@@"
"@B@@@@@B@@@@@@@@"
"@A@@@@@A@@@@@@@@"
"@BBJJJJB@@@@@@@@"
"@A@@@@@A@@@@@@@@"
"@B@@@@@B@@@@@@@@"
"@AEEEE@E@@@@@@@@"
"@B@@@@BJ@@@@@@@@"
"@A@@@@AA@@@@@@@@"
"@BBJJJBB@@@@@@@@"
"@A@@@@D@@@@@@@@@"
"@B@@@@HB@@@@@@@@"
"@A@@@@DD@@@@@@@@"
"@B@@@@BH@@@@@@@@"
"@A@@@@AD@@@@@@@@"
"@BJJJJJH@@@@@@@@"
"@AEEEEE@@@@@@@@@")})  (\TYPE BITMAP PLACEMENT  (486 . 72) NAME GHOST.QUALITY.HALFTONE BITMAP  {(READBITMAP)(
36 62
"B@HB@H@JH@@@"
"@@@@@@@@@@@@"
"B@H@@H@H@@@@"
"AE@E@@@E@@@@"
"B@HHHH@H@@@@"
"@@@E@@@@@@@@"
"B@H@@H@H@@@@"
"@@A@DED@@@@@"
"@@@@@@@@@@@@"
"@@@@@@@@@@@@"
"@@@@@@@@@@@@"
"@@@@@@@@@@@@"
"BJHJ@HBBJ@@@"
"@DA@@D@D@@@@"
"@@B@@JB@@@@@"
"@D@@DA@ED@@@"
"@@B@@HB@@@@@"
"@D@@D@@D@@@@"
"@@@@HHB@@@@@"
"@D@E@@@EE@@@"
"@@@@@@@@@@@@"
"@@@@@@@@@@@@"
"@@@@@@@@@@@@"
"EEEEEED@@@@@"
"JJJJJJH@@@@@"
"E@DA@DD@@@@@"
"HB@HB@H@@@@@"
"EEEEEED@@@@@"
"HB@HB@H@@@@@"
"E@DA@DD@@@@@"
"JJJJJJH@@@@@"
"E@DA@DD@@@@@"
"HB@HB@H@@@@@"
"EEEEEED@@@@@"
"HB@HB@H@@@@@"
"E@DA@DD@@@@@"
"JJJJJJH@@@@@"
"E@DA@DD@@@@@"
"HB@HB@H@@@@@"
"EEEEEED@@@@@"
"HB@HB@H@@@@@"
"E@DA@DD@@@@@"
"JJJJJJH@@@@@"
"E@DA@DD@@@@@"
"HB@HB@H@@@@@"
"EEEEEED@@@@@"
"HB@HB@H@@@@@"
"E@DA@DD@@@@@"
"JJJJJJH@@@@@"
"E@DA@DD@@@@@"
"HB@HB@H@@@@@"
"EEEEDAD@@@@@"
"HB@HBJH@@@@@"
"E@DA@DD@@@@@"
"JJJJHHH@@@@@"
"E@DAA@@@@@@@"
"HB@HB@H@@@@@"
```

```
"EEEEAA@@@@@@"
"HB@H@J@@@@@@"
"E@DA@E@@@@@@"
"JJJJJJ@@@@@@"
"EEEEED@@@@@@")))  (\TYPE BITMAP PLACEMENT  (534 . 70) NAME GHOST.QUALITY.GOLDENROD BITMAP  {(READBITMAP)(83
50
"@JHBHB@BJ@JHHBBJ@J@JH@@@"
"A@DD@@@@AA@@D@DAA@@@D@@@"
"B@@H@B@B@H@@JB@@B@@HB@@@"
"@@@@A@@@@AE@A@DA@@D@@@@@"
"BBHH@B@B@H@@HBBJB@@HB@@@"
"@@D@A@@@@A@@@@DA@@D@@@@@"
"@@H@BB@B@@@@HB@@@@HH@@@@"
"@EDADAEADAED@@DA@E@E@@@@"
"@@@@@@@@@@@@@@@@@@@@@@@@"
"@@@@@@@@@@@@@@@@@@@@@@@@"
"@@@@@@@@@@@@@@@@@@@@@@@@"
"EEEEEED@@@@@@@@@@@@@@@@@"
"H@@@@@H@@@@@@@@@@@@@@@@@"
"D@@@@@D@@@@@@@@@@@@@@@@@"
"HJJ@@@H@@@@@@@@@@@@@@@@@"
"D@@@@@D@@@@@@@@@@@@@@@@@"
"HJJ@@@H@@@@@@@@@@@@@@@@@"
"D@@@@@D@@@@@@@@@@@@@@@@@"
"H@@@@@H@@@@@@@@@@@@@@@@@"
"D@@@@@D@@@@@@@@@@@@@@@@@"
"H@@@@@H@@@@@@@@@@@@@@@@@"
"EEEEEDD@@@@@@@@@@@@@@@@@"
"H@@@@@H@@@@@@@@@@@@@@@@@"
"D@@@@@D@@@@@@@@@@@@@@@@@"
"HJJJJHH@@@@@@@@@@@@@@@@@"
"D@@@@@D@@@@@@@@@@@@@@@@@"
"H@@@@@H@@@@@@@@@@@@@@@@@"
"EEEEEDD@@@@@@@@@@@@@@@@@"
"H@@@@@H@@@@@@@@@@@@@@@@@"
"D@@@@@D@@@@@@@@@@@@@@@@@"
"HJJJJHH@@@@@@@@@@@@@@@@@"
"D@@@@@D@@@@@@@@@@@@@@@@@"
"H@@@@@H@@@@@@@@@@@@@@@@@"
"EEEEEDD@@@@@@@@@@@@@@@@@"
"H@@@@@H@@@@@@@@@@@@@@@@@"
"D@@@@@D@@@@@@@@@@@@@@@@@"
"HJJJJHH@@@@@@@@@@@@@@@@@"
"D@@@@@D@@@@@@@@@@@@@@@@@"
"H@@@@@H@@@@@@@@@@@@@@@@@"
"EEEEDAD@@@@@@@@@@@@@@@@@"
"H@@@@JH@@@@@@@@@@@@@@@@@"
"D@@@@DD@@@@@@@@@@@@@@@@@"
"HJJJHHH@@@@@@@@@@@@@@@@@"
"D@@@A@@@@@@@@@@@@@@@@@@@"
"H@@@B@H@@@@@@@@@@@@@@@@@"
"D@@@AA@@@@@@@@@@@@@@@@@@"
"H@@@@J@@@@@@@@@@@@@@@@@@"
"D@@@@E@@@@@@@@@@@@@@@@@@"
"JJJJJJ@@@@@@@@@@@@@@@@@@"
"EEEEED@@@@@@@@@@@@@@@@@@")))  (\TYPE BITMAP PLACEMENT  (631 . 75) NAME GHOST.QUALITY.PASTEUP BITMAP  ((READB
ITMAP)(63 50
"BH@H@J@JHJH@HBBH"
"D@@@@@@@A@@@@@D@"
"@B@@B@@B@@@@HB@B"
"D@ADAD@@AE@@@@D@"
"BHBB@@@B@@@@HBBH"
"D@AD@@@@A@@D@@D@"
"@@@@B@HB@@@@HB@@"
"D@DAAE@@AED@EDD@"
"@@@@@@@@@@@@@@@@"
"@@@@@@@@@@@@@@@@"
"@@@@@@@@@@@@@@@@"
"EEEEEED@@@@@@@@@"
"H@@@@@H@@@@@@@@@"
"D@@@A@D@@@@@@@@@"
"HB@@@@H@@@@@@@@@"
"D@@@@@D@@@@@@@@@"
"HJJJJBH@@@@@@@@@"
"DAEEE@D@@@@@@@@@"
"HB@@B@H@@@@@@@@@"
"DA@@A@D@@@@@@@@@"
"HB@@B@H@@@@@@@@@"
"DA@@A@D@@@@@@@@@"
"HB@@B@H@@@@@@@@@"
"DA@@A@D@@@@@@@@@"
"HB@@B@H@@@@@@@@@"
"DAEEE@D@@@@@@@@@"
"HJJJJBH@@@@@@@@@"
"D@@@@@D@@@@@@@@@"
"H@@@@@H@@@@@@@@@"
"DD@@A@D@@@@@@@@@"
```

```
"H@@@@@H@@@@@@@@@"
"D@@@@@D@@@@@@@@@"
"H@@@@@H@@@@@@@@@"
"EEEEEDD@@@@@@@@@"
"H@@@@@H@@@@@@@@@"
"D@@@@@D@@@@@@@@@"
"HJJJJHH@@@@@@@@@"
"D@@@@@D@@@@@@@@@"
"H@@@@@H@@@@@@@@@"
"EEEEDAD@@@@@@@@@"
"H@@@@JH@@@@@@@@@"
"D@@@@DD@@@@@@@@@"
"HJJJHHH@@@@@@@@@"
"D@@@A@@@@@@@@@@@"
"H@@@B@H@@@@@@@@@"
"D@@@AA@@@@@@@@@@"
"H@@@@J@@@@@@@@@@"
"D@@@@E@@@@@@@@@@"
"JJJJJJ@@@@@@@@@@"
"EEEEED@@@@@@@@@@"))))) CLASSES  (BITMAP.FRAMES))  (\TYPE FRAME NAME COLORS ITEMS  ((\TYPE COLOR PLACEMENT  (1
70 . 170)
NAME GRAY COLOR  (128 128 128) REPRESENTATIVE.GRAY 42405)))  (\TYPE FRAME NAME FRAME.MAINTAINANCE
ITEMS  ((\TYPE STRAIGHT.LINE PLACEMENT  (5 4 5 454 NIL) WIDTH 2)  (\TYPE STRAIGHT.LINE PLACEMENT  (7 3
 698 3 NIL) WIDTH 2)  (\TYPE STRAIGHT.LINE PLACEMENT  (698 456 718 472 NIL) WIDTH 1)  (\TYPE
STRAIGHT.LINE PLACEMENT  (697 5 697 454 NIL) WIDTH 2)  (\TYPE STRAIGHT.LINE PLACEMENT  (129 457 698
457 NIL) WIDTH 1)  (\TYPE STRAIGHT.LINE PLACEMENT  (699 4 719 20 NIL) WIDTH 1)  (\TYPE STRAIGHT.LINE
PLACEMENT  (708 17 708 462 NIL) WIDTH 2)  (\TYPE STRAIGHT.LINE PLACEMENT  (703 12 703 457 NIL) WIDTH 2
)  (\TYPE STRAIGHT.LINE PLACEMENT  (719 26 719 471 NIL) WIDTH 2)  (\TYPE STRAIGHT.LINE PLACEMENT  (713
 21 713 466 NIL) WIDTH 2)  (\TYPE STRAIGHT.LINE PLACEMENT  (486 469 710 469 NIL) WIDTH 1)  (\TYPE
STRAIGHT.LINE PLACEMENT  (368 465 705 465 NIL) WIDTH 1)  (\TYPE STRAIGHT.LINE PLACEMENT  (248 461 701
461 NIL) WIDTH 1)  (\TYPE STRAIGHT.LINE PLACEMENT  (604 472 716 472 NIL) WIDTH 1)  (\TYPE
STRAIGHT.LINE PLACEMENT  (25 456 25 492 NIL) WIDTH 2)  (\TYPE STRAIGHT.LINE PLACEMENT  (128 456 128
492 NIL) WIDTH 2)  (\TYPE STRAIGHT.LINE PLACEMENT  (25 493 129 493 NIL) WIDTH 2)  (\TYPE STRAIGHT.LINE
 PLACEMENT  (143 460 143 496 NIL) WIDTH 2)  (\TYPE STRAIGHT.LINE PLACEMENT  (247 461 247 497 NIL)
WIDTH 2)  (\TYPE STRAIGHT.LINE PLACEMENT  (143 497 247 497 NIL) WIDTH 2)  (\TYPE STRAIGHT.LINE
PLACEMENT  (263 465 263 501 NIL) WIDTH 2)  (\TYPE STRAIGHT.LINE PLACEMENT  (367 465 367 501 NIL) WIDTH
 2)  (\TYPE STRAIGHT.LINE PLACEMENT  (263 501 367 501 NIL) WIDTH 2)  (\TYPE STRAIGHT.LINE PLACEMENT  (
381 469 381 505 NIL) WIDTH 2)  (\TYPE STRAIGHT.LINE PLACEMENT  (485 469 485 505 NIL) WIDTH 2)  (\TYPE
STRAIGHT.LINE PLACEMENT  (381 505 485 505 NIL) WIDTH 2)  (\TYPE STRAIGHT.LINE PLACEMENT  (499 472 499
508 NIL) WIDTH 2)  (\TYPE STRAIGHT.LINE PLACEMENT  (603 472 603 508 NIL) WIDTH 2)  (\TYPE
STRAIGHT.LINE PLACEMENT  (499 509 603 509 NIL) WIDTH 2)  (\TYPE STRAIGHT.LINE PLACEMENT  (6 456 25 456
 NIL) WIDTH 1)  (\TYPE STRAIGHT.LINE PLACEMENT  (144 461 129 461 NIL) WIDTH 1)  (\TYPE STRAIGHT.LINE
PLACEMENT  (144 465 128 465 NIL) WIDTH 1)  (\TYPE STRAIGHT.LINE PLACEMENT  (144 469 129 469 NIL) WIDTH
 1)  (\TYPE STRAIGHT.LINE PLACEMENT  (144 473 129 473 NIL) WIDTH 1)  (\TYPE STRAIGHT.LINE PLACEMENT  (
264 466 247 466 NIL) WIDTH 1)  (\TYPE STRAIGHT.LINE PLACEMENT  (264 470 248 470 NIL) WIDTH 1)  (\TYPE
STRAIGHT.LINE PLACEMENT  (263 474 249 474 NIL) WIDTH 1)  (\TYPE STRAIGHT.LINE PLACEMENT  (381 469 369
469 NIL) WIDTH 1)  (\TYPE STRAIGHT.LINE PLACEMENT  (381 473 368 473 NIL) WIDTH 1)  (\TYPE
STRAIGHT.LINE PLACEMENT  (499 472 486 472 NIL) WIDTH 1)  (\TYPE STRAIGHT.LINE PLACEMENT  (7 457 24 468
 NIL) WIDTH 1)  (\TYPE STRAIGHT.LINE PLACEMENT  (26 460 12 460 NIL) WIDTH 1)  (\TYPE STRAIGHT.LINE
PLACEMENT  (25 464 19 464 NIL) WIDTH 1)  (\TYPE BLOCK.OF.TEXT PLACEMENT  (27 . 484) LIST.OF.LINES  (
PROGRAMMING))  (\TYPE BLOCK.OF.TEXT PLACEMENT  (147 . 485) LIST.OF.LINES  (PROGRAM) FONT  (GACHA 10  (
MEDIUM REGULAR REGULAR)))  (\TYPE BLOCK.OF.TEXT PLACEMENT  (147 . 472) LIST.OF.LINES  (AHEAD) FONT  (
GACHA 10  (MEDIUM REGULAR REGULAR)))  (\TYPE BLOCK.OF.TEXT PLACEMENT  (269 . 489) LIST.OF.LINES  (
STORED) FONT  (GACHA 10  (MEDIUM REGULAR REGULAR)))  (\TYPE BLOCK.OF.TEXT PLACEMENT  (270 . 477)
LIST.OF.LINES  (PROGRAMS) FONT  (GACHA 10  (MEDIUM REGULAR REGULAR)))  (\TYPE BLOCK.OF.TEXT PLACEMENT
 (386 . 493) LIST.OF.LINES  (SPECIAL) FONT  (GACHA 10  (MEDIUM REGULAR REGULAR)))  (\TYPE
BLOCK.OF.TEXT PLACEMENT  (387 . 480) LIST.OF.LINES  (OUTPUT) FONT  (GACHA 10  (MEDIUM REGULAR REGULAR)
))  (\TYPE BLOCK.OF.TEXT PLACEMENT  (505 . 497) LIST.OF.LINES  (CFF) FONT  (GACHA 10  (MEDIUM REGULAR
REGULAR)))  (\TYPE BLOCK.OF.TEXT PLACEMENT  (246 . 264) LIST.OF.LINES  (MAINTENANCE) FONT  (
TIMESROMAND 24  (MEDIUM REGULAR REGULAR)))  (\TYPE INITIALIZATION PLACEMENT  (17 . 17) NAME
INIT.PROG.SCORE.MAIN.PAPER ACTION.FORM  (PROG NIL  (CHANGE.CELL CELL.PROG.MAIN.PAPER 5)  (CHANGE.CELL
CELL.PROG.MAIN.PAPER.WORK 5)  (CHANGE.CELL CELL.PROG.MAIN.PAPER.WORK.CHOICES  " ")))  (\TYPE
INITIALIZATION PLACEMENT  (17 . 34) NAME INIT.FRAME.PROG.SCORE.MAIN.PAPER ACTION.FORM  (PROG NIL  (
CHANGE.CELL CELL.PROG.MAIN.PAPER.SIZE&COVERS.1  " ")  (CHANGE.CELL CELL.PROG.MAIN.PAPER.SIZE&COVERS.2
 " ")  (CHANGE.CELL CELL.PROG.MAIN.PAPER.SIZE&COVERS.3  " ")  (CHANGE.CELL
CELL.PROG.MAIN.PAPER.SIZE&COVERS.4  " ")  (CHANGE.CELL CELL.PROG.MAIN.PAPER.SIZE  " ")))  (\TYPE
INITIALIZATION PLACEMENT  (0 . 527) NAME INIT.GLOBAL.CELLS.1 ACTION.FORM  (PROG NIL  (CHANGE.CELL
CELL.GLOBAL.PAPER.IN.TRAY 1)  (CHANGE.CELL CELL.GLOBAL.COVERS.IN.TRAY 0)  (CHANGE.CELL
CELL.GLOBAL.TABS.IN.TRAY 0)  (CHANGE.CELL CELL.GLOBAL.INSERTS.IN.TRAY 0)))  (\TYPE INITIALIZATION
PLACEMENT  (0 . 510) NAME INIT.GLOBALS.CELL.2 ACTION.FORM  (PROG NIL  (CHANGE.CELL
CELL.GLOBAL.WHATS.IN.TRAY.1  "8.5X11")  (CHANGE.CELL CELL.GLOBAL.WHATS.IN.TRAY.2  "8.5X14")  (
CHANGE.CELL CELL.GLOBAL.WHATS.IN.TRAY.3  "8.5X11")  (CHANGE.CELL CELL.GLOBAL.WHATS.IN.TRAY.1&3
"8.5X11")  (CHANGE.CELL NULL 0)))  (\TYPE INITIALIZATION PLACEMENT  (17 . 68) NAME
INIT.PROG.SCORE.MAIN.COVERS ACTION.FORM  (PROG NIL  (CHANGE.CELL CELL.PROG.MAIN.COVERS 0)  (
CHANGE.CELL CELL.PROG.MAIN.COVERS.WORK.TRAY1 0)  (CHANGE.CELL CELL.PROG.MAIN.COVERS.WORK.TRAY2 0)  (
CHANGE.CELL CELL.PROG.MAIN.COVERS.TEXT1  " ")  (CHANGE.CELL CELL.PROG.MAIN.COVERS.TEXT2  " ")))  (
\TYPE INITIALIZATION PLACEMENT  (17 . 136) NAME INIT.PROG.SCORE.MAIN.RE ACTION.FORM  (PROG NIL  (
CHANGE.CELL CELL.PROG.MAIN.RE 0)  (CHANGE.CELL CELL.PROG.MAIN.RE.TEXT 100)  (CHANGE.CELL
CELL.PROG.MAIN.RE.TEXT.FULLSIZE  "FULL SIZE")))  (\TYPE INITIALIZATION PLACEMENT  (17 . 102) NAME
INIT.PROG.SCORE.MAIN.CROPPING ACTION.FORM  (PROG NIL  (CHANGE.CELL CELL.PROG.MAIN.CROPPING 0)  (
CHANGE.CELL CELL.PROG.MAIN.CROPPING.WORK.MANUAL.TOP 0)  (CHANGE.CELL
CELL.PROG.MAIN.CROPPING.WORK.MANUAL.BOTTOM 0)  (CHANGE.CELL CELL.PROG.MAIN.CROPPING.WORK.MANUAL.LEFT 0
)  (CHANGE.CELL CELL.PROG.MAIN.CROPPING.WORK.MANUAL.RIGHT 0)  (CHANGE.CELL
CELL.PROG.MAIN.CROPPING.WORK.MANUAL.BOTTOM.INCHES  "0.0 CROP")  (CHANGE.CELL
CELL.PROG.MAIN.CROPPING.WORK.MANUAL.RIGHT.INCHES  "0.0 CROP")  (CHANGE.CELL
CELL.PROG.MAIN.CROPPING.WORK.MANUAL.LEFT.INCHES  "0.0 CROP")  (CHANGE.CELL NULL 0)))  (\TYPE
INITIALIZATION PLACEMENT  (17 . 170) ACTION.FORM  (CHANGE.CELL CELL.PROG.MAIN.SIDES 0) NAME
```

```
INIT.PROGSCORE.MAIN.SIDES)  (\TYPE INITIALIZATION PLACEMENT  (17 . 204) NAME
INIT.PROG.SCORE.MAIN.FINISHING ACTION.FORM  (CHANGE.CELL CELL.PROG.MAIN.FINISHING 0))  (\TYPE
INITIALIZATION PLACEMENT  (17 . 238) NAME INIT.PROG.SCORE.MAIN.COPY ACTION.FORM  (CHANGE.CELL
CELL.PROG.MAIN.COPY 0))  (\TYPE INITIALIZATION PLACEMENT  (17 . 272) NAME INIT.PROG.SCORE.MAIN.MARGIN
ACTION.FORM  (PROG NIL  (CHANGE.CELL CELL.PROG.MAIN.MARGIN 0)  (CHANGE.CELL
CELL.PROG.MAIN.MARGIN.SIDE1  "0.0 RIGHT")  (CHANGE.CELL CELL.PROG.MAIN.MARGIN.SIDE2  "0.0 LEFT")  (
CHANGE.CELL CELL.PROG.MAIN.MARGIN.SIDE1.STORE 1)  (CHANGE.CELL CELL.PROG.MAIN.MARGIN.SIDE2.STORE 1)))
 (\TYPE INITIALIZATION PLACEMENT  (17 . 306) NAME INIT.PROG.SCORE.MAIN.QUALITY ACTION.FORM  (PROG NIL
 (CHANGE.CELL CELL.PROG.MAIN.QUALITY.BAR 3)  (CHANGE.CELL CELL.PROG.MAIN.QUALITY 0)  (CHANGE.CELL
CELL.PROG.MAIN.QUALITY.EXPOSURE 5)  (CHANGE.CELL CELL.PROG.MAIN.QUALITY.CONTRAST 6)  (CHANGE.CELL
CELL.PROG.MAIN.QUALITY.PHOTOCONTRAST 7)  (CHANGE.CELL CELL.PROG.MAIN.QUALITY.LIGHTER  " ")  (
CHANGE.CELL CELL.PROG.MAIN.QUALITY.DARKER  " ")  (CHANGE.CELL CELL.PROG.MAIN.QUALITY.LIGHTER.TOP  " ")
  (CHANGE.CELL CELL.PROG.MAIN.QUALITY.DARKER.TOP  " ")  (CHANGE.CELL CELL.PROG.MAIN.QUALITY.IMAGE  " "
)))  (\TYPE OPTION.SENSOR PLACEMENT  (26 456 103 35) ACTION.FORM  (FRAME.PUSH PROG.SCORE.MAIN T))))  (
\TYPE FRAME NAME FRAME.PROGRAMMING ITEMS  ((\TYPE STRAIGHT.LINE PLACEMENT  (5 4 5 454 NIL) WIDTH 2)  (
\TYPE STRAIGHT.LINE PLACEMENT  (7 3 698 3 NIL) WIDTH 2)  (\TYPE STRAIGHT.LINE PLACEMENT  (698 456 718
472 NIL) WIDTH 1)  (\TYPE STRAIGHT.LINE PLACEMENT  (697 5 697 454 NIL) WIDTH 2)  (\TYPE STRAIGHT.LINE
PLACEMENT  (129 457 698 457 NIL) WIDTH 1)  (\TYPE STRAIGHT.LINE PLACEMENT  (699 4 719 20 NIL) WIDTH 1)
  (\TYPE STRAIGHT.LINE PLACEMENT  (708 17 708 462 NIL) WIDTH 2)  (\TYPE STRAIGHT.LINE PLACEMENT  (703
12 703 457 NIL) WIDTH 2)  (\TYPE STRAIGHT.LINE PLACEMENT  (719 26 719 471 NIL) WIDTH 2)  (\TYPE
STRAIGHT.LINE PLACEMENT  (713 21 713 466 NIL) WIDTH 2)  (\TYPE STRAIGHT.LINE PLACEMENT  (486 469 710
469 NIL) WIDTH 1)  (\TYPE STRAIGHT.LINE PLACEMENT  (368 465 705 465 NIL) WIDTH 1)  (\TYPE
STRAIGHT.LINE PLACEMENT  (248 461 701 461 NIL) WIDTH 1)  (\TYPE STRAIGHT.LINE PLACEMENT  (604 472 716
472 NIL) WIDTH 1)  (\TYPE STRAIGHT.LINE PLACEMENT  (25 456 25 492 NIL) WIDTH 2)  (\TYPE STRAIGHT.LINE
PLACEMENT  (128 456 128 492 NIL) WIDTH 2)  (\TYPE STRAIGHT.LINE PLACEMENT  (25 493 129 493 NIL) WIDTH
2)  (\TYPE STRAIGHT.LINE PLACEMENT  (143 460 143 496 NIL) WIDTH 2)  (\TYPE STRAIGHT.LINE PLACEMENT  (
247 461 247 497 NIL) WIDTH 2)  (\TYPE STRAIGHT.LINE PLACEMENT  (143 497 247 497 NIL) WIDTH 2)  (\TYPE
STRAIGHT.LINE PLACEMENT  (263 465 263 501 NIL) WIDTH 2)  (\TYPE STRAIGHT.LINE PLACEMENT  (367 465 367
501 NIL) WIDTH 2)  (\TYPE STRAIGHT.LINE PLACEMENT  (263 501 367 501 NIL) WIDTH 2)  (\TYPE
STRAIGHT.LINE PLACEMENT  (381 469 381 505 NIL) WIDTH 2)  (\TYPE STRAIGHT.LINE PLACEMENT  (485 469 485
505 NIL) WIDTH 2)  (\TYPE STRAIGHT.LINE PLACEMENT  (381 505 485 505 NIL) WIDTH 2)  (\TYPE
STRAIGHT.LINE PLACEMENT  (499 472 499 508 NIL) WIDTH 2)  (\TYPE STRAIGHT.LINE PLACEMENT  (603 472 603
508 NIL) WIDTH 2)  (\TYPE STRAIGHT.LINE PLACEMENT  (499 509 603 509 NIL) WIDTH 2)  (\TYPE
STRAIGHT.LINE PLACEMENT  (6 456 25 456 NIL) WIDTH 1)  (\TYPE STRAIGHT.LINE PLACEMENT  (144 461 129 461
 NIL) WIDTH 1)  (\TYPE STRAIGHT.LINE PLACEMENT  (144 465 128 465 NIL) WIDTH 1)  (\TYPE STRAIGHT.LINE
 PLACEMENT  (144 469 129 469 NIL) WIDTH 1)  (\TYPE STRAIGHT.LINE PLACEMENT  (144 473 129 473 NIL) WIDTH
  1)  (\TYPE STRAIGHT.LINE PLACEMENT  (264 466 247 466 NIL) WIDTH 1)  (\TYPE STRAIGHT.LINE PLACEMENT  (
264 470 248 470 NIL) WIDTH 1)  (\TYPE STRAIGHT.LINE PLACEMENT  (263 474 249 474 NIL) WIDTH 1)  (\TYPE
STRAIGHT.LINE PLACEMENT  (381 469 369 469 NIL) WIDTH 1)  (\TYPE STRAIGHT.LINE PLACEMENT  (381 473 368
473 NIL) WIDTH 1)  (\TYPE STRAIGHT.LINE PLACEMENT  (499 472 486 472 NIL) WIDTH 1)  (\TYPE
STRAIGHT.LINE PLACEMENT  (7 457 24 468 NIL) WIDTH 1)  (\TYPE STRAIGHT.LINE PLACEMENT  (26 460 12 460
NIL) WIDTH 1)  (\TYPE STRAIGHT.LINE PLACEMENT  (25 464 19 464 NIL) WIDTH 1)  (\TYPE BLOCK.OF.TEXT
PLACEMENT  (27 . 484) LIST.OF.LINES  (PROGRAMMING))  (\TYPE BLOCK.OF.TEXT PLACEMENT  (147 . 485)
LIST.OF.LINES  (PROGRAM) FONT  (GACHA 10  (MEDIUM REGULAR REGULAR)))  (\TYPE BLOCK.OF.TEXT PLACEMENT
(147 . 472) LIST.OF.LINES  (AHEAD) FONT  (GACHA 10  (MEDIUM REGULAR REGULAR)))  (\TYPE BLOCK.OF.TEXT
PLACEMENT  (269 . 489) LIST.OF.LINES  (STORED) FONT  (GACHA 10  (MEDIUM REGULAR REGULAR)))  (\TYPE
BLOCK.OF.TEXT PLACEMENT  (270 . 477) LIST.OF.LINES  (PROGRAMS) FONT  (GACHA 10  (MEDIUM REGULAR
REGULAR)))  (\TYPE BLOCK.OF.TEXT PLACEMENT  (386 . 493) LIST.OF.LINES  (SPECIAL) FONT  (GACHA 10  (
MEDIUM REGULAR REGULAR)))  (\TYPE BLOCK.OF.TEXT PLACEMENT  (387 . 480) LIST.OF.LINES  (OUTPUT) FONT  (
GACHA 10  (MEDIUM REGULAR REGULAR)))  (\TYPE BLOCK.OF.TEXT PLACEMENT  (505 . 497) LIST.OF.LINES  (CFF)
 FONT  (GACHA 10  (MEDIUM REGULAR REGULAR)))  (\TYPE OPTION.SENSOR PLACEMENT  (27 457 103 38)
ACTION.FORM  (FRAME.PUSH PROG.SCORE.MAIN T))))  (\TYPE FRAME NAME ICONS1 ITEMS  ((\TYPE BITMAP
PLACEMENT  (365 . 606) NAME TOP.TRAY BITMAP  {(READBITMAP)(101 57
"@@@@@@@@@@@@@@@@@@@@@@@@@@"
"@@@@@@@@@@@@@@@@@@@@@@@@@@"
"@@@@@@@@@@@@@@@@@@@@@@@@@@"
"@@@@@@@@@@@@@@@@@@@@@@@@@@"
"@@@@@@@@@@@@@@@@@@@@@@@@@@"
"@@@@@@@@@@@@@@@@@@@@@@@@@@"
"@@@@@@@@@@@@@@@@@@@@@@@@@@"
"@@@@@@@@@@@@@@@@@@@@@@@@@@"
"@@@@@@@@@@@@@@@@@@@@@@@@@@"
"@@@@@@@@@@@@@@@@@@@@@@@@@@"
"@@@OOOOOOL@@@@@@@@@@@@@@@@"
"@@@H@@@@@D@@@@@@@@@@@@@@@@"
"@@@H@@@@@D@@@@@@@@@@@@@@@@"
"@@OOOOOOLD@@@@@@@@@@@@@@@@"
"@@H@@@@@DD@@@@@@@@@@@@@@@@"
"@@H@@@@@DD@@@@@@@@@@@@@@@@"
"@@H@@@@@DD@@@@@@@@@@@@@@@@"
"@@H@@@@@DD@@@@@@@@@@@@@@@@"
"@@H@@@@@DD@@@@@@@@@@@@@@@@"
"@@H@@@@@DD@@@@@@@@@@@@@@@@"
"@@H@@@@@DD@@@@@@@@@@@@@@@@"
"@@H@@@@@DD@@@@@@@@@@@@@@@@"
"@@H@@@@@DD@@@@@@@@@@@@@@@@"
"@@H@@@@@DD@@@@@@@@@@@@@@@@"
"@@H@@@@@DD@@@@@@@@@@@@@@@@"
"@@H@@@@@DD@@@@@@@@@@@@@@@@"
"@@H@@@@@DD@@@@@@@@@@@@@@@@"
"@@H@@@@@DD@@@@@@@@@@@@@@@@"
"@@H@@@@@DD@@@@@@@@@@@@@@@@"
"@@H@@@@@DD@@@@@@@@@@@@@@@@"
"@@H@@@@@DD@@@@@@@@@@@@@@@@"
"@@H@@@@@DD@@@@@@@@@@@@@@@@"
"@@H@@@@@DD@@@@@@@@@@@@@@@@"
```

"@@H@@@@@DD@@@@@@@@@@@@@@@@@@@"
"@@H@@@@@DD@@@@@@@@@@@@@@@@@@@"
"@@H@@@@@DD@@@@@@@@@@@@@@@@@@@"
"@@H@@@@@DD@@@@@@@@@@@@@@@@@@@"
"@@H@@@@@DD@@@@@@@@@@@@@@@@@@@"
"@@H@@@@@DD@@@@@@@@@@@@@@@@@@@"
"@@H@@@@@DD@@@@@@@@@@@@@@@@@@@"
"@@H@@@@@DD@@@@@@@@@@@@@@@@@@@"
"@@H@@@@@DD@@@@@@@@@@@@@@@@@@@"
"@@H@@@@@DD@@@@@@@@@@@@@@@@@@@"
"@@H@@@@@DD@@@@@@@@@@@@@@@@@@@"
"@@H@@@@@GLAOH@@@@GN@@@@@@@@@@"
"@@H@@@@@D@@F@@@@@AH@@@@@@@@@@"
"@@H@@@@@D@@FANGL@AHOILFC@@@@@"
"@@OOOOOOOL@@FCCFF@AHMHFFC@@@@"
"@@@@@@@@@@@@FCCFF@AHLANCF@@@@"
"@@@@@@@@@@@@FCCFF@AHLCFAD@@@@"
"@@@@@@@@@@@@FCCFF@AHLCFAL@@@@"
"@@@@@@@@@@@@FANGL@AHLAO@H@@@@"
"@@@@@@@@@@@@@@@F@@@@@@@EH@@@@"
"@@@@@@@@@@@@@@@F@@@@@@@C@@@@@"
"@@@@@@@@@@@@@@@F@@@@@@@@@@@@@"
"@@@@@@@@@@@@@@@@@@@@@@@@@@@@@"
"@@@@@@@@@@@@@@@@@@@@@@@@@@@@@")}) (\TYPE BITMAP PLACEMENT (470 . 424) NAME 2.TO.1 BITMAP {(READBITMAP)(10:
57
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@"
"@@@@@@@L@@@@@@@@@@OOOOOOL@@@@@"
"@@@@@@@J@@@@@@@@@@H@@@@@D@@@@@"
"@@AOOOOI@@@@@@@@@H@@@@@D@@@@@"
"@@A@@@A@H@@@@@@@@OOOOOOLD@@@@"
"@@A@@@A@H@@@@@@@@H@@@@@DD@@@@"
"@@A@@@C@H@@@@@@@@H@@@@@DD@@@@"
"@@A@@@B@H@@@@@@@@H@@@@@DD@@@@"
"@@A@@@BHH@@@@@@@@H@@@@@DD@@@@"
"@@AAOLBDH@@@@@@@@H@@@@@DD@@@@"
"@@A@@@DC@@@@@@@@@HON@@@DD@@@@"
"@@A@@@DC@@@@@@@@@H@@@@@DD@@@@"
"@@A@@@DA@@@@@@@@@H@@@@@DD@@@@"
"@@AAOLHI@@@@@@@@@H@@@@@DD@@@@"
"@@A@@@HF@@@@@@@@@HON@@@DD@@@@"
"@@A@@AHF@@@@@C@@@H@@@@@DD@@@@"
"@@A@@ABB@@@@@AH@@H@@@@@DD@@@@"
"@@AAOOAB@@@@@@L@@H@@@@@DD@@@@"
"@@A@@C@L@@@@@@F@@HOOOOLDD@@@@"
"@@A@@B@L@@@@@@C@@H@@@@@DD@@@@"
"@@A@@BDD@@@@OOOH@H@@@@@DD@@@@"
"@@AAONBD@@@@OOOH@H@@@@@DD@@@@"
"@@A@@DAH@@@@@@C@@HOOOOLDD@@@@"
"@@A@@DAH@@@@@@F@@H@@@@@DD@@@@"
"@@A@@LHH@@@@@@L@@H@@@@@DD@@@@"
"@@AAOHDH@@@@@AH@@H@@@@@DD@@@@"
"@@A@@HC@@@@@@C@@@HOOOOLDD@@@@"
"@@A@@HC@@@@@@@@@@H@@@@@DD@@@@"
"@@A@A@A@@@@@@@@@@H@@@@@DD@@@@"
"@@AAONA@@@@@@@@@@H@@@@@DD@@@@"
"@@A@@CB@@@@@@@@@@HOON@@DD@@@@"
"@@A@@@J@@@@@@@@@@H@@@@@DD@@@@"
"@@A@@@F@@@@@@@@@@H@@@@@DD@@@@"
"@@A@@@F@@@@@@@@@@H@@@@@DD@@@@"
"@@A@@@D@@@@@@@@@@H@@@@@DD@@@@"
"@@A@@@D@@@@@@@@@@H@@@@@GL@@@@"
"@@A@@@H@@@@@@@@@@H@@@@@D@@@@@"
"@@AOOO@@@@@@@@@@@H@@@@@D@@@@@"
"@@@@@@@@@@@@@@@@@OOOOOOL@@@@@"
"@@@@@@@@@@@@@@@@@@@@@@@@@@@@@"
"@@@@@@@@@@@@@@@@@@@@@@@@@@@@@"
"@@@@@F@@@@@@@@@@@@AH@@@@@@@@@"
"@O@@@F@L@@C@@@@L@@AHC@@@L@@@"
"AIH@@@@L@@C@@@AL@@@@C@@@L@@@"
"@AH@OFGLOAO@@@CL@CMIOCLGL@@@"
"@C@AIFLMIKC@@@@L@FEKCFFLL@@@"
"@F@ALFLMOKC@@@@L@GAKCGNLL@@@"
"@L@@GFLMHCC@@@@L@AMKCF@LL@@@"
"AH@ACFLMIKC@@@@L@DMKCFFLL@@@"
"AOHANFGLOAO@@@@L@GIIOCLGL@@@"
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@")}) (\TYPE BITMAP PLACEMENT (367 . 424) NAME 2.TO.2 BITMAP {(READBITMAP)(101
57
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@"

```
"@@@@@@@L@@@@@@@@@@@@@@@C@@@@@@"
"@@@@@@@J@@@@@@@@@@@@@@BH@@@@@@"
"@@AOOOOI@@@@@@@@@@GOOOND@@@@@@"
"@@A@@@A@H@@@@@@@@@D@@@DB@@@@@@"
"@@A@@@A@H@@@@@@@@@D@@@DB@@@@@@"
"@@A@@@C@H@@@@@@@@@D@@@LB@@@@@@"
"@@A@@@B@H@@@@@@@@@D@@@HB@@@@@@"
"@@A@@@BHH@@@@@@@@@D@@@JB@@@@@@"
"@@AAOLBDH@@@@@@@@@DGO@IB@@@@@@"
"@@A@@@DC@@@@@@@@@@D@@A@L@@@@@@"
"@@A@@@DC@@@@@@@@@@D@@A@L@@@@@@"
"@@A@@@DA@@@@@@@@@@D@@A@D@@@@@@"
"@@AAOLHI@@@@@@@@@@DGOBBD@@@@@@"
"@@A@@@HF@@@@@@@@@@D@@BAH@@@@@@"
"@@A@@AHF@@@@C@@@@D@@FAH@@@@@@"
"@@A@@ABB@@@@AH@@@D@@DHH@@@@@@"
"@@AAOOAB@@@@@L@@@DGOLDH@@@@@@"
"@@A@@C@L@@@@@F@@@D@@LC@@@@@@@"
"@@A@@B@L@@@@@C@@@D@@HC@@@@@@@"
"@@A@@BDD@@@OOOH@@D@@IA@@@@@@@"
"@@AAONBD@@@OOOH@@DGOHI@@@@@@@"
"@@A@@DAH@@@@@C@@@D@A@F@@@@@@@"
"@@A@@DAH@@@@@F@@@D@A@F@@@@@@@"
"@@A@@LHH@@@@@L@@@D@CBB@@@@@@@"
"@@AAOHDH@@@@AH@@@DGNAB@@@@@@@"
"@@A@@HC@@@@@C@@@@D@B@L@@@@@@@"
"@@A@@HC@@@@@@@@@@D@B@L@@@@@@@"
"@@A@A@A@@@@@@@@@@D@D@D@@@@@@@"
"@@AAONA@@@@@@@@@@DGOHD@@@@@@@"
"@@A@@CB@@@@@@@@@@D@@LH@@@@@@@"
"@@A@@@J@@@@@@@@@@D@@BH@@@@@@@"
"@@A@@@F@@@@@@@@@@D@@AH@@@@@@@"
"@@A@@@F@@@@@@@@@@D@@AH@@@@@@@"
"@@A@@@D@@@@@@@@@@D@@A@@@@@@@@"
"@@A@@@D@@@@@@@@@@D@@A@@@@@@@@"
"@@A@@@H@@@@@@@@@@D@@B@@@@@@@@"
"@@AOOO@@@@@@@@@@@GOOL@@@@@@@@"
"@@@@@@@@@@@@@@@@@@@@@@@@@@@@@@"
"@@@@@@@@@@@@@@@@@@@@@@@@@@@@@@"
"@@@@@@@@@@@@@@@@@@@@@@@@@@@@@@"
"@@@@@F@@@@@@@@@@@@C@@@@@@@@@"
"@O@@@F@L@@C@@@GH@@C@F@@AH@@@"
"AIH@@@@L@@C@@@LL@@@@F@@AH@@@"
"@AH@OFGLOAO@@@@L@GKCNGHOH@@@"
"@C@AIFLMIKC@@@AH@LKFFLMIH@@@"
"@F@ALFLMOKC@@@C@@NCFFOMIH@@@"
"@L@@GFLMHCC@@@F@@CKFFLAIH@@@"
"AH@ACFLMIKC@@@L@@IKFFLMIH@@@"
"AOHANFGLOAO@@@OL@OCCNGHOH@@@"
"@@@@@@@@@@@@@@@@@@@@@@@@@@@@@@"
"@@@@@@@@@@@@@@@@@@@@@@@@@@@@@@"
"@@@@@@@@@@@@@@@@@@@@@@@@@@@@@@"
"@@@@@@@@@@@@@@@@@@@@@@@@@@@@@@"))) (\TYPE BITMAP PLACEMENT (263 . 543) NAME TRAY2 BITMAP ((READBITMAP)(57 3
9
"@@@OOOOOOOOOOOH@"
"@@@A@@@@@@@@@@H@"
"@@@B@@@@@@@@@A@@"
"@@@D@@@@@@@@@B@@"
"@@@H@@@@@@@@@GH@"
"@@A@@@@@@@@@@HH@"
"@@B@@@@@@@@@AA@@"
"@@D@@@@@@@@@BB@@"
"@@H@@@@@@@@@DGH@"
"@A@@@@@@@@@@HHH@"
"OOOOOOOOOOLAAA@@"
"OOOOOOOOOOLBBB@@"
"L@@@@@@@@@LDDGH@"
"L@@@@@@@@@LHHHH@"
"L@@@@@@@@@OAAA@@"
"LAN@@@@@@@LBBB@@"
"LCC@@@@@@@LDDGH@"
"L@C@@@@@@@LHHHH@"
"L@F@C@@@L@OAAA@@"
"L@L@C@@@L@LBBB@@"
"LAH@CCOLL@LDDGH@"
"LC@@C@@@L@LHHHH@"
"LCO@C@@@L@OAAA@@"
"L@@@CCOLL@LBBB@@"
"L@@@C@@@L@LDDGH@"
"L@@@C@@@L@LHHHH@"
"L@@@CCOLL@OAAA@@"
"L@@@C@@@L@LBBB@@"
"L@@@COOOL@LDDD@@"
"L@@@AOOOH@LHHH@@"
```

```
"L@@@@@@@@@OAA@@@"
"L@@@@@@@@@LBB@@@"
"L@@@@@@@@@LDD@@@"
"L@@@@@@@@@LHH@@@"
"L@@@@@@@@@OA@@@@"
"L@@@@@@@@@LB@@@@"
"L@@@@@@@@@LD@@@@"
"OOOOOOOOOOLH@@@@"
"OOOOOOOOOOOO@@@@"))) (\TYPE BITMAP PLACEMENT (264 . 424) NAME 1.TO.2 BITMAP {(READBITMAP)(101 57
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@OOOOOOL@@@@@@@@@@@F@@@@@@"
"@@@H@@@@@D@@@@@@@@@@@E@@@@@@"
"@@@H@@@@@D@@@@@@@OOOOLH@@@@@"
"@@GOOOOOND@@@@@@@H@@@HD@@@@@"
"@@D@@@@@BD@@@@@@@H@@@HD@@@@@"
"@@D@@@@@BD@@@@@@@H@@AHD@@@@@"
"@@D@@@@@BD@@@@@@@H@@A@D@@@@@"
"@@D@@@@@BD@@@@@@@H@@ADD@@@@@"
"@@D@@@@@BD@@@@@@@HONABD@@@@@"
"@@DGO@@@BD@@@@@@@H@@BAH@@@@@"
"@@D@@@@@BD@@@@@@@H@@BAH@@@@@"
"@@D@@@@@BD@@@@@@@H@@B@H@@@@@"
"@@D@@@@@BD@@@@@@@HONDDH@@@@@"
"@@DGO@@@BD@@@@@@@H@@DC@@@@@@"
"@@D@@@@@BD@@AH@@@H@@LC@@@@@@"
"@@D@@@@@BD@@@L@@@H@@IA@@@@@@"
"@@D@@@@@BD@@@F@@@HOOHI@@@@@@"
"@@DGOOONBD@@@C@@@H@AHF@@@@@@"
"@@D@@@@@BD@@@AH@@H@A@F@@@@@@"
"@@D@@@@@BD@GOOL@@H@ABB@@@@@@"
"@@D@@@@@BD@GOOL@@HOOAB@@@@@@"
"@@DGOOONBD@@@AH@@H@B@L@@@@@@"
"@@D@@@@@BD@@@C@@@H@B@L@@@@@@"
"@@D@@@@@BD@@@F@@@H@FDD@@@@@@"
"@@D@@@@@BD@@@L@@@HOLBD@@@@@@"
"@@DGOOONBD@@AH@@@H@DAH@@@@@@"
"@@D@@@@@BD@@@@@@@H@DAH@@@@@@"
"@@D@@@@@BD@@@@@@@H@H@H@@@@@@"
"@@D@@@@@BD@@@@@@@HOO@H@@@@@@"
"@@DGOO@@BD@@@@@@@H@AI@@@@@@@"
"@@D@@@@@BD@@@@@@@H@@E@@@@@@@"
"@@D@@@@@BD@@@@@@@H@@C@@@@@@@"
"@@D@@@@@BD@@@@@@@H@@C@@@@@@@"
"@@D@@@@@BD@@@@@@@H@@B@@@@@@@"
"@@D@@@@@CL@@@@@@@H@@B@@@@@@@"
"@@D@@@@@B@@@@@@@@H@@D@@@@@@@"
"@@D@@@@@B@@@@@@@@OOOH@@@@@@@"
"@@GOOOOON@@@@@@@@@@@@@@@@@@@"
"@@@@@@@@@@@@@@@@@@@@@@@@@@@@"
"@@@@@@@@@@@@@@@@@@@@@@@@@@@@"
"@@@@@F@@@@@@@@@@@@AH@@@@@@@@"
"@C@@@F@L@@C@@@CL@@AHC@@@L@@@"
"@G@@@@@L@@C@@@FF@@@@C@@@L@@@"
"@O@@OFGLOAO@@@@F@CMIOCLGL@@@"
"@C@AIFLMIKC@@@@L@FEKCFFLL@@@"
"@C@ALFLMOKC@@@AH@GAKCGNLL@@@"
"@C@@GFLMHCC@@@C@@AMKCF@LL@@@"
"@C@ACFLMIKC@@@F@@DMKCFFLL@@@"
"@C@ANFGLOAO@@@GN@GIIOCLGL@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"))) (\TYPE BITMAP PLACEMENT (160 . 424) NAME 1.TO.1 BITMAP {(READBITMAP)(101
57
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@COOOOOO@@@@@@@OOOOOOL@@@@@"
"@@B@@@@@A@@@@@@@H@@@@@D@@@@@"
"@@B@@@@@A@@@@@@@H@@@@@D@@@@@"
"@@B@@@@@A@@@@@@@H@@@@@D@@@@@"
"@@B@@@@@A@@@@@@@H@@@@@D@@@@@"
"@@B@@@@@A@@@@@@@H@@@@@D@@@@@"
"@@BCOH@@A@@@@@@@HON@@@D@@@@@"
"@@B@@@@@A@@@@@@@H@@@@@D@@@@@"
"@@B@@@@@A@@@@@@@H@@@@@D@@@@@"
"@@B@@@@@A@@@@@@@H@@@@@D@@@@@"
"@@BCOH@@A@@@@@@@HON@@@D@@@@@"
"@@B@@@@@A@@@@@@@H@@@@@D@@@@@"
"@@B@@@@@A@@@C@@@H@@@@@D@@@@@"
"@@B@@@@@A@@@AH@@H@@@@@D@@@@@"
```

```
"@@BCOOOOA@@@@L@@HOOOOLD@@@@@"
"@@B@@@@@A@@@@F@@H@@@@@D@@@@@"
"@@B@@@@@A@@@@C@@H@@@@@D@@@@@"
"@@B@@@@@A@@OOOH@H@@@@@D@@@@@"
"@@BCOOOOA@@OOOH@HOOOOLD@@@@@"
"@@B@@@@@A@@@@C@@H@@@@@D@@@@@"
"@@B@@@@@A@@@@F@@H@@@@@D@@@@@"
"@@B@@@@@A@@@@L@@H@@@@@D@@@@@"
"@@BCOOOOA@@@AH@@HOOOOLD@@@@@"
"@@B@@@@@A@@@C@@@H@@@@@D@@@@@"
"@@B@@@@@A@@@@@@@H@@@@@D@@@@@"
"@@B@@@@@A@@@@@@@H@@@@@D@@@@@"
"@@BCOOH@A@@@@@@@HOON@@D@@@@@"
"@@B@@@@@A@@@@@@@H@@@@@D@@@@@"
"@@B@@@@@A@@@@@@@H@@@@@D@@@@@"
"@@B@@@@@A@@@@@@@H@@@@@D@@@@@"
"@@B@@@@@A@@@@@@@H@@@@@D@@@@@"
"@@B@@@@@A@@@@@@@H@@@@@D@@@@@"
"@@B@@@@@A@@@@@@@H@@@@@D@@@@@"
"@@B@@@@@A@@@@@@@H@@@@@D@@@@@"
"@@COOOOOO@@@@@@@OOOOOOL@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@L@@@@@@@@@@@@C@@@@@@@@@"
"@F@@@LAH@@F@@@AH@@C@F@@AH@@@"
"@N@@@@AH@@F@@@CH@@@@F@@AH@@@"
"AN@ANLOINCN@@@GH@GKCNGHOH@@@"
"@F@CBMIKCFF@@@AH@LKFFLMIH@@@"
"@F@CHMIKOFF@@@AH@NCFFOMIH@@@"
"@F@@NMIK@FF@@@AH@CKFFLAIH@@@"
"@F@BFMIKCFF@@@AH@IKFFLMIH@@@"
"@F@CLLOINCN@@@AH@OCCNGHOH@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"))) (\TYPE BITMAP PLACEMENT (261 . 606) NAME UNCOLLATE BITMAP {(READBITMAP)(
101 57
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@OOOOOOL@@@@@@@@@@@@@"
"@@@@@@@@H@@@@@D@@@@@@@@@@@@@"
"@@@@@@@@H@@@@@D@@@@@@@@@@@@@"
"@@@@@@@GOOOOOND@@@@@@@@@@@@@"
"@@@@@@@D@@@@@BD@@@@@@@@@@@@@"
"@@@@@@@D@@@@@BD@@@@@@@@@@@@@"
"@@@@@@@D@@@@@BD@@@@@@@@@@@@@"
"@@@@@OOOOOOL@BD@@@@@@@@@@@@@"
"@@@@@H@@@@@D@BD@@@@@@@@@@@@@"
"@@@@@H@@@@@D@BD@@@@@@@@@@@@@"
"@@@@GOOOOOND@BD@@@@@@@@@@@@@"
"@@@@D@@@@@BD@BD@@@@@@@@@@@@@"
"@@@@D@@@@@BD@BD@@@@@@@@@@@@@"
"@@@@D@@@@@BD@BD@@@@@@@@@@@@@"
"@COOOOOO@@BD@BD@@@@@@@@@@@@@"
"@B@@@@@A@@BD@BD@@@@@@@@@@@@@"
"@B@@@@@A@@BD@BD@@@@@@@@@@@@@"
"AOOOOOOI@@BD@BD@@@@@@@@@@@@@"
"A@@@@@@I@@BD@BD@@@@@@@@@@@@@"
"A@@@@@@I@@BD@BD@@@@@@@@@@@@@"
"A@@@@@@I@@BD@BD@@@@@@@@@@@@@"
"A@@@@@@I@@BD@BD@@@@@@@@@@@@@"
"A@@@@@@I@@BD@BD@@@@@@@@@@@@@"
"A@@@@@@I@@BD@BD@@@@@@@@@@@@@"
"A@@@@@@I@@BD@BD@@@@@@@@@@@@@"
"A@@@@@@I@@BD@BD@@@@@@@@@@@@@"
"A@@@@@@I@@BD@BD@@@@@@@@@@@@@"
"A@@@@@@I@@BD@BD@@@@@@@@@@@@@"
"A@@@@@@I@@BD@BD@@@@@@@@@@@@@"
"A@@@@@@I@@BD@BD@@@@@@@@@@@@@"
"A@@@@@@I@@BD@BD@@@@@@@@@@@@@"
"A@@@@@@I@@BD@BD@@@@@@@@@@@@@"
"A@@@@@@I@@BD@BD@@@@@@@@@@@@@"
"A@@@@@@I@@BD@CL@@@@@@@@@@@@@"
"A@@@@@@I@@BD@B@@@@@@@@@@@@@@"
"A@@@@@@I@@BD@B@@@@@@@@@@@@@@"
"A@@@@@@I@@BGON@@@@@@@@@@@@@@"
"A@@@@@@I@@BD@@@@@@@@@@@@@@@@"
"A@@@@@@I@@BD@@@@@@@@@@@@@@@@"
"A@@@@@@I@@BD@@@@@@@@@@@@@@@@"
"A@@@@@@I@@CL@@@@@@@@@@@@@@@@"
"A@@@@@@I@@B@@@@@@@@@@@@@@@@@"
"A@@@@@@I@@B@@@@@@@@@@@@@@@@@"
"A@@@@@@IOONFC@@@@@CF@@@@@@@@"
"A@@@@@@I@@@FC@@@@@CF@@L@@@@@"
"A@@@@@@I@@@FCGLGHOCFGAOCL@@@"
```

```
"A@@@@@@I@@@FCFFLMIKFAHLFF@@@"
"A@@@@@@O@@@FCFFLAIKFGHLGN@@@"
"A@@@@@@H@@@FCFFLAIKFMHLF@@@@"
"A@@@@@@H@@@FCFFLMIKFMHLFF@@@"
"AOOOOOOH@@@CNFFGHOCFGLGCL@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"))) (\TYPE BITMAP PLACEMENT (159 . 606) NAME COLLATE BITMAP {(READBITMAP)(10
1 57
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@OOOOOOL@@@@@@@@@@"
"@@@@@@@@@@@H@@@@@D@@@@@@@@@@"
"@@@@@@@@@@@H@@@@@D@@@@@@@@@@"
"@@@@@@@@@@GOOOOOND@@@@@@@@@@"
"@@@@@@@@@@D@@@@@BD@@@@@@@@@@"
"@@@@@@@@@@D@@@@@BD@@@@@@@@@@"
"@@@@@@@@@COOOOOOBD@@@@@@@@@@"
"@@@@@@@@@B@@@@@ABD@@@@@@@@@@"
"@@@@@@@@@B@@@@@ABD@@@@@@@@@@"
"@@@@@@@@@B@@@@@ABD@@@@@@@@@@"
"@@@@@@@@@B@@@@@ABD@@@@@@@@@@"
"@@@@@AOOOOOOH@@ABD@@@@@@@@@@"
"@@@@@A@@@@@@H@@ABD@@@@@@@@@@"
"@@@@@A@@@@@@H@@ABD@@@@@@@@@@"
"@@@@@OOOOOOLH@@ABD@@@@@@@@@@"
"@@@@@H@@@@@DH@@ABD@@@@@@@@@@"
"@@@@@H@@@@@DH@@ABD@@@@@@@@@@"
"@@@@GOOOOONDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ACL@@@@@@@@@@"
"@@@@D@@@@@BDH@@AB@@@@@@@@@@@"
"@@@@D@@@@@BDH@@AB@@@@@@@@@@@"
"@@@@D@@@@@BDH@@AN@@@@@@@@@@@"
"@@@@D@@@@@BDH@@A@@@@@@@@@@@@"
"@@@@D@@@@@BDH@@A@@@@@@@@@@@@"
"@@@@D@@@@@BDOOOO@@@@@@@@@@@@"
"@@@@D@@@@@BDH@@@@@@@@@@@@@@@"
"@@@@D@@@@@BDH@@@@@@@@@@@@@@@"
"@@@@D@@@@@BDH@@@@@@@@@@@@@@@"
"@@@@D@@@@@BDHOH@CF@@@@@@@@@@"
"@@@@D@@@@@BGIHL@CF@@L@@@@@@@"
"@@@@D@@@@@BDAHLOCFGAOCL@@@@@"
"@@@@D@@@@@BDAHAIKFAHLFF@@@@@"
"@@@@D@@@@@CLAHAIKFGHLGN@@@@@"
"@@@@D@@@@@B@AHMIKFMHLF@@@@@@"
"@@@@D@@@@@B@AHMIKFMHLFF@@@@@"
"@@@@GOOOOON@@OHOCFGLGCL@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"))) (\TYPE BITMAP PLACEMENT (350 . 111) NAME TABS.TRAY3 BITMAP {(READBITMAP)
(101 57
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@GOOOOON@@@@@@@@@@@@@@@@@@"
"@@@D@@@@@B@@@@@@@@@@@@@@@@@@"
"@@@D@@@@@B@@@@@@@@@@@@@@@@@@"
"@@@D@@@@@B@@@@@@@@@@@@@@@@@@"
"@@@D@@@@@B@@@@@@@@@@@@@@@@@@"
"@@@D@@@@@B@@@@@@@@@@@@@@@@@@"
"@@@D@@@@@B@@@@@@@@@@@@@@@@@@"
```

```
"@@@D@@@@@CL@@@@@@@@@@@@@@@@@"
"@@@D@@@@@@D@@@@@@@@@@@@@@@@@"
"@@@D@@@@@@D@@@@@@@@@@@@@@@@@"
"@@@D@@@@@@D@@@@@@@@@@@@@@@@@"
"@@@D@@@@@@D@@@@@@@@@@@@@@@@@"
"@@@D@@@@@@D@@@@@@@@@@@@@@@@@"
"@@@D@@@@@@D@@@@@@@@@@@@@@@@@"
"@@@D@@@@@@D@@@@@@@@@@@@@@@@@"
"@@@D@@@@@@D@@@@@@@@@@@@@@@@@"
"@@@D@@@@@@D@@@@@@@@@@@@@@@@@"
"@@@D@@@@@CL@@@@@@@@@@@@@@@@@"
"@@@D@@@@@B@@@@@@@@@@@@@@@@@@"
"@@@D@@@@@B@@@@@@@@@@@@@@@@@@"
"@@@D@@@@@B@@@@@@@@@@@@@@@@@@"
"@@@D@@@@@B@@@@@@@@@@@@@@@@@@"
"@@@D@@@@@B@@@@@@@@@@@@@@@@@@"
"@@@D@@@@@B@@@@@@@@@@@@@@@@@@"
"@@@D@@@@@B@@@@@@@@@@@@@@@@@@"
"@@@D@@@@@B@@@@@@@@@@@@@@@@@@"
"@@@D@@@@@B@@@@@@@@@@@@@@@@@@"
"@@@D@@@@@B@AOH@@@@@@CL@@@@@@"
"@@@D@@@@@B@@F@@@@@@@FF@@@@@@"
"@@@D@@@@@B@@FCNGAHL@@F@@@@@@"
"@@@D@@@@@B@@FCFAIHL@AL@@@@@@"
"@@@D@@@@@B@@FC@GHMH@@F@@@@@@"
"@@@D@@@@@B@@FC@MHE@@FF@@@@@@"
"@@@D@@@@@B@@FC@MHG@@FF@@@@@@"
"@@@GOOOOON@@FC@GLB@@CL@@@@@@"
"@@@@@@@@@@@@@@@@AF@@@@@@@@@@"
"@@@@@@@@@@@@@@@@@L@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@")))  (\TYPE BITMAP PLACEMENT  (246 . 111) NAME TABS.TRAY2 BITMAP  {(READBITMAP)
(101 57
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@AOOOOOOH@@@@@@@@@@@@@@@@@"
"@@@A@@@@@@H@@@@@@@@@@@@@@@@@"
"@@@A@@@@@@H@@@@@@@@@@@@@@@@@"
"@@@A@@@@@@H@@@@@@@@@@@@@@@@@"
"@@@A@@@@@@H@@@@@@@@@@@@@@@@@"
"@@@A@@@@@@H@@@@@@@@@@@@@@@@@"
"@@@A@@@@@@H@@@@@@@@@@@@@@@@@"
"@@@A@@@@@@O@@@@@@@@@@@@@@@@@"
"@@@A@@@@@@A@@@@@@@@@@@@@@@@@"
"@@@A@@@@@@A@@@@@@@@@@@@@@@@@"
"@@@A@@@@@@A@@@@@@@@@@@@@@@@@"
"@@@A@@@@@@A@@@@@@@@@@@@@@@@@"
"@@@A@@@@@@A@@@@@@@@@@@@@@@@@"
"@@@A@@@@@@A@@@@@@@@@@@@@@@@@"
"@@@A@@@@@@A@@@@@@@@@@@@@@@@@"
"@@@A@@@@@@A@@@@@@@@@@@@@@@@@"
"@@@A@@@@@@A@@@@@@@@@@@@@@@@@"
"@@@A@@@@@@O@@@@@@@@@@@@@@@@@"
"@@@A@@@@@@H@@@@@@@@@@@@@@@@@"
"@@@A@@@@@@H@@@@@@@@@@@@@@@@@"
"@@@A@@@@@@H@@@@@@@@@@@@@@@@@"
"@@@A@@@@@@H@@@@@@@@@@@@@@@@@"
"@@@A@@@@@@H@@@@@@@@@@@@@@@@@"
"@@@A@@@@@@H@@@@@@@@@@@@@@@@@"
"@@@A@@@@@@H@@@@@@@@@@@@@@@@@"
"@@@A@@@@@@H@@@@@@@@@@@@@@@@@"
"@@@A@@@@@@H@@@@@@@@@@@@@@@@@"
"@@@A@@@@@@H@GN@@@@@@@O@@@@@@"
"@@@A@@@@@@H@AH@@@@@@AIH@@@@@"
"@@@A@@@@@@H@AHOILFC@@AH@@@@@"
"@@@A@@@@@@H@AHMHFFC@@C@@@@@@"
"@@@A@@@@@@H@AHLANCF@@F@@@@@@"
"@@@A@@@@@@H@AHLCFAD@@L@@@@@@"
"@@@A@@@@@@H@AHLCFAL@AH@@@@@@"
"@@@AOOOOOOH@AHLAO@H@AOH@@@@@"
"@@@@@@@@@@@@@@@@EH@@@@@@@@@@"
"@@@@@@@@@@@@@@@@C@@@@@@@@@@@"
```

```
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"))) (\TYPE BITMAP PLACEMENT (453 . 111) NAME TABS.TRAYS2&3 BITMAP {(READBITM
AP)(101 57
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@GOOOOON@@@@@@@@@@@@@@@@@"
"@@@@D@@@@@B@@@@@@@@@@@@@@@@@"
"@@@@D@@@@@B@@@@@@@@@@@@@@@@@"
"@@@@D@@@@@B@@@@@@@@@@@@@@@@@"
"@@@@D@@@@@B@@@@@@@@@@@@@@@@@"
"@@@@D@@@@@B@@@@@@@@@@@@@@@@@"
"@@@@D@@@@@B@@@@@@@@@@@@@@@@@"
"@@@@D@@@@@CL@@@@@@@@@@@@@@@@"
"@@@@D@@@@@@D@@@@@@@@@@@@@@@@"
"@@@@D@@@@@@D@@@@@@@@@@@@@@@@"
"@@@@D@@@@@@D@@@@@@@@@@@@@@@@"
"@@@@D@@@@@@D@@@@@@@@@@@@@@@@"
"@@@@D@@@@@@D@@@@@@@@@@@@@@@@"
"@@@@D@@@@@@D@@@@@@@@@@@@@@@@"
"@@@@D@@@@@@D@GN@@@@@@@@@@@@@"
"@@@@D@@@@@@D@AH@@@@@@@@@@@@@"
"@@@@D@@@@@@D@AHOILFCCL@@@@@@"
"@@@@D@@@@@CL@AHMHFFCFD@@@@@@"
"@@@@D@@@@@B@@AHLANCFG@@@@@@@"
"@@@@D@@@@@B@@AHLCFADAL@@@@@@"
"@@@@D@@@@@B@@AHLCFALDL@@@@@@"
"@@@@D@@@@@B@@AHLAO@HGH@@@@@@"
"@@@@D@@@@@B@@@@@@EH@@@@@@@@@"
"@@@@D@@@@@B@@@@@@C@@@@@@@@@@"
"@@@@D@@@@@B@@@@@@@@@@@@@@@@@"
"@@@@D@@@@@B@@@@@@@@@@@@@@@@@"
"@@@@D@@@@@B@@@@@@@@@@@@@@@@@"
"@@@@D@@@@@B@@@GHAH@O@@@@@@@@"
"@@@@D@@@@@B@@@LLCDAIH@@@@@@@"
"@@@@D@@@@@B@@@@LCD@AH@@@@@@@"
"@@@@D@@@@@B@@@AHAL@G@@@@@@@@"
"@@@@D@@@@@B@@@C@CK@AH@@@@@@@"
"@@@@D@@@@@B@@@F@FLAIH@@@@@@@"
"@@@@D@@@@@B@@@L@FFAIH@@@@@@@"
"@@@@GOOOOON@@@OLCK@O@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"))) (\TYPE BITMAP PLACEMENT (142 . 110) NAME NO.TABS BITMAP {(READBITMAP)(10
1 57
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@GOOOOON@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@@@@@@@@@@@@@@@@"
```

```
"@@@@@D@@@@@B@@@@@@@@@@@@@@@@@"
"@@@@@D@@@@@B@@@@@@@@@@@@@@@@@"
"@@@@@D@@@@@B@@@@@@@@@@@@@@@@@"
"@@@@@D@@@@@B@@@@@@@@@@@@@@@@@"
"@@@@@D@@@@@B@@@@@@@@@@@@@@@@@"
"@@@@@D@@@@@B@@@@@@@@@@@@@@@@@"
"@@@@@D@@@@@B@@@@@@@@@@@@@@@@@"
"@@@@@D@@@@@B@@@@@@@@@@@@@@@@@"
"@@@@@D@@@@@B@@@@@@@@@@@@@@@@@"
"@@@@@D@@@@@B@@@@@@@@@@@@@@@@@"
"@@@@@D@@@@@B@@@@@@@@@@@@@@@@@"
"@@@@@D@@@@@B@@@@@@@@@@@@@@@@@"
"@@@@@D@@@@@B@@@@@@@@@@@@@@@@@"
"@@@@@D@@@@@B@@@@@@@@@@@@@@@@@"
"@@@@@D@@@@@B@@@@@@@@@@@@@@@@@"
"@@@@@D@@@@@B@@@@@@@@@@@@@@@@@"
"@@@@@D@@@@@B@@@@@@@@@@@@@@@@@"
"@@@@@D@@@@@B@@@@@@@@@@@@@@@@@"
"@@@@@D@@@@@B@@@@@@@@@@@@@@@@@"
"@@@@@D@@@@@B@@@@@@@@@@@@@@@@@"
"@@@@@D@@@@@B@@@@@@@@@@@@@@@@@"
"@@@@@D@@@@@B@CHL@@@@@@@@@@@@@"
"@@@@@D@@@@@B@CLL@@@@@@@@@@@@@"
"@@@@@D@@@@@B@CLLOCNCL@@@@@@@@"
"@@@@@D@@@@@B@CFMIKCFF@@@@@@@@"
"@@@@@D@@@@@B@CFMIKCGN@@@@@@@@"
"@@@@@D@@@@@B@CCMIKCF@@@@@@@@@"
"@@@@@D@@@@@B@CCMIKCFF@@@@@@@@"
"@@@@@GOOOOON@CALOCCCL@@@@@@@@"
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@")}) (\TYPE BITMAP PLACEMENT (575 . 340) NAME STANDARD BITMAP {(READBITMAP)(1
01 57
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@OOOOOOL@@@@@@@@@@@@"
"@@@@@@@@@H@@@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@HON@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@HON@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@HOOOOLD@@@@@@@@@@@@"
"@@@@@@@@@H@@@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@HOOOOLD@@@@@@@@@@@@"
"@@@@@@@@@H@@@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@HOOOOLD@@@@@@@@@@@@"
"@@@@@@@@@H@@@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@HOON@@D@@@@@@@@@@@@"
"@@@@@@@@@H@@@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@OOOOOOL@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
```

```
"@@@@@@CL@@@@@@L@@@@L@@@@@@@@"
"@@@@@@FFF@@@@@L@@@@L@@@@@@@@"
"@@@@@@G@OILGLGLNCNGL@@@@@@@@"
"@@@@@@CLF@FFFLLCCFLL@@@@@@@@"
"@@@@@@ANFANFFLLOC@LL@@@@@@@@"
"@@@@@@@FFCFFFLMKC@LL@@@@@@@@"
"@@@@@@FFFCFFFLMKC@LL@@@@@@@@"
"@@@@@@GLCIOFFGLOK@GL@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"))) (\TYPE BITMAP PLACEMENT (362 . 255) NAME NO.STAPLES BITMAP {(READBITMAP)
(26 43
"@@@N@@@@"
"@@CJ@@@@"
"@@NB@@@@"
"@CHB@@@@"
"@N@B@@@@"
"CH@B@@@@"
"D@@B@@@@"
"OOOOOOL@"
"N@@@@@D@"
"N@@@@@D@"
"N@@@@@D@"
"N@@@@@D@"
"N@@@@@D@"
"N@@@@@D@"
"N@@@@@D@"
"N@@@@@D@"
"N@@@@@D@"
"N@@@@@D@"
"N@@@@@D@"
"N@@@@@D@"
"N@@@@@D@"
"N@@@@@D@"
"N@@@@@D@"
"N@@@@@D@"
"N@@@@@D@"
"N@@@@@D@"
"N@@@@@D@"
"N@@@@@D@"
"N@@@@@D@"
"N@@@@@D@"
"N@@@@@D@"
"N@@@@@D@"
"N@@@@@D@"
"N@@@@@D@"
"N@@@@@D@"
"N@@@@@D@"
"N@@@@@D@"
"N@@@@@D@"
"N@@@@@D@"
"N@@@@@D@"
"OOOOOOL@"))) (\TYPE BITMAP PLACEMENT (696 . 453) NAME RIGHT.BUTTON BITMAP {(READBITMAP)(40 40
"@OOOOOOOOL@@"
"AOOOOOOOOH@@"
"COOOOOOOOA@@"
"GOOOOOOONC@@"
"OOOOOOOOLG@@"
"@@@@@@@@@O@@"
"OOOOOOOOMO@@"
"OOOOOOOOMO@@"
"OOOOOOOOMO@@"
"N@@@@@@AMO@@"
"N@@@@@@AMO@@"
"N@CL@@@AMO@@"
"N@AN@@@AMO@@"
"N@@O@@@AMO@@"
"N@@GH@@AMO@@"
"N@@CL@@AMO@@"
"N@@AN@@AMO@@"
"N@@@O@@AMO@@"
"N@@@GH@AMO@@"
"N@@@CL@AMO@@"
"N@@@AN@AMO@@"
"N@@@@O@AMO@@"
"N@@@@GHAMO@@"
"N@@@@GHAMO@@"
"N@@@@O@AMO@@"
"N@@@AN@AMO@@"
"N@@@CL@AMO@@"
"N@@@GH@AMO@@"
"N@@@O@@AMO@@"
"N@@AN@@AMO@@"
"N@@CL@@AMO@@"
```

```
"N@@GH@@AMO@@"
"N@@O@@@AMO@@"
"N@AN@@@AMO@@"
"N@CL@@@AMO@@"
"N@@@@@@AMO@@"
"N@@@@@@AMN@@"
"OOOOOOOOML@@"
"OOOOOOOOMH@@"
"OOOOOOOOM@@@")))  (\TYPE BITMAP PLACEMENT  (585 . 453) NAME LEFT.BUTTON BITMAP  {(READBITMAP)(40 40
"@OOOOOOOOL@@"
"AOOOOOOOOH@@"
"COOOOOOOOA@@"
"GOOOOOOONC@@"
"OOOOOOOOLG@@"
"@@@@@@@@@O@@"
"OOOOOOOOMO@@"
"OOOOOOOOMO@@"
"OOOOOOOOMO@@"
"N@@@@@@AMO@@"
"N@@@@@@AMO@@"
"N@@@@O@AMO@@"
"N@@@AN@AMO@@"
"N@@@CL@AMO@@"
"N@@@GH@AMO@@"
"N@@@O@@AMO@@"
"N@@AN@@AMO@@"
"N@@CL@@AMO@@"
"N@@GH@@AMO@@"
"N@@O@@@AMO@@"
"N@AN@@@AMO@@"
"N@CL@@@AMO@@"
"N@GH@@@AMO@@"
"N@GH@@@AMO@@"
"N@CL@@@AMO@@"
"N@AN@@@AMO@@"
"N@@O@@@AMO@@"
"N@@GH@@AMO@@"
"N@@CL@@AMO@@"
"N@@AN@@AMO@@"
"N@@@O@@AMO@@"
"N@@@GH@AMO@@"
"N@@@CL@AMO@@"
"N@@@AN@AMO@@"
"N@@@@O@AMO@@"
"N@@@@@@AMO@@"
"N@@@@@@AMN@@"
"OOOOOOOOML@@"
"OOOOOOOOMH@@"
"OOOOOOOOM@@@")))  (\TYPE BITMAP PLACEMENT  (583 . 111) NAME INSERTS BITMAP  {(READBITMAP)(44 45
"@@COOOOOOH@@"
"@@B@@@@@@H@@"
"@@OOOOOOONH@@"
"@@H@@@@@BH@@"
"@COOOOOOBH@@"
"@B@@@@@ABH@@"
"@B@@@OOOOOO@"
"@B@@@H@@@@A@"
"COOOOOO@@@A@"
"B@@@@@A@@@A@"
"OOOOOOM@@@A@"
"H@@@@@E@@@A@"
"H@@@@@E@@@A@"
"H@@@@@E@@@A@"
"H@@@@@E@@@A@"
"H@@@@@E@@@A@"
"H@@@@@E@@@A@"
"H@@@@@E@@@A@"
"H@@@@@E@@@A@"
"H@@@@@E@@@A@"
"H@@@@@E@C@A@"
"H@@@@@E@F@A@"
"H@@@@@E@L@A@"
"H@@@@@EAH@A@"
"H@@@@@ECOOM@"
"H@@@@@ECOOM@"
"H@@@@@EAH@A@"
"H@@@@@E@L@A@"
"H@@@@@E@F@A@"
"H@@@@@E@C@A@"
"H@@@@@E@@@A@"
"H@@@@@E@@@A@"
"H@@@@@E@@@A@"
"H@@@@@E@@@A@"
"H@@@@@E@@@A@"
"H@@@@@E@@@A@"
"H@@@@@E@@@A@"
"H@@@@@E@@@A@"
```

```
"H@@@@@E@@@A@"
"H@@@@@E@@@A@"
"H@@@@@E@@@A@"
"H@@@@@EOOOO@"
"H@@@@@G@@@@@"
"H@@@@@D@@@@@"
"OOOOOOL@@@@@")}}) (\TYPE BITMAP PLACEMENT (628 . 27) NAME 1.TO.1 BITMAP {(READBITMAP)(80 35
"OOOOOOL@@@@@@COOOOOO"
"H@@@@@D@@@@@@B@@@@@A"
"H@@@@@D@@@@@@B@@@@@A"
"H@@@@@D@@@@@@B@@@@@A"
"H@@@@@D@@@@@@B@@@@@A"
"H@@@@@D@@@@@@B@@@@@A"
"HON@@@D@@@@@@BCOH@@A"
"H@@@@@D@@@@@@B@@@@@A"
"H@@@@@D@@@@@@B@@@@@A"
"H@@@@@D@@@@@@B@@@@@A"
"HON@@@D@@@@@@BCOH@@A"
"H@@@@@D@@@@@@B@@@@@A"
"H@@@@@D@@@L@@B@@@@@A"
"H@@@@@D@@@F@@B@@@@@A"
"HOOOOLD@@@C@@BCOOOOA"
"H@@@@@D@@@AH@B@@@@@A"
"H@@@@@D@@@@L@B@@@@@A"
"H@@@@@D@COON@B@@@@@A"
"HOOOOLD@COON@BCOOOOA"
"H@@@@@D@@@@L@B@@@@@A"
"H@@@@@D@@@AH@B@@@@@A"
"H@@@@@D@@@C@@B@@@@@A"
"HOOOOLD@@@F@@BCOOOOA"
"H@@@@@D@@@L@@B@@@@@A"
"H@@@@@D@@@@@@B@@@@@A"
"H@@@@@D@@@@@@B@@@@@A"
"HOON@@D@@@@@@BCOOH@A"
"H@@@@@D@@@@@@B@@@@@A"
"H@@@@@D@@@@@@B@@@@@A"
"H@@@@@D@@@@@@B@@@@@A"
"H@@@@@D@@@@@@B@@@@@A"
"H@@@@@D@@@@@@B@@@@@A"
"H@@@@@D@@@@@@B@@@@@A"
"H@@@@@D@@@@@@B@@@@@A"
"OOOOOOL@@@@@@COOOOOO")}}) (\TYPE BITMAP PLACEMENT (411 . 24) NAME TABS BITMAP {(READBITMAP)(29 35
"OOOOOOL@"
"OOOOOOL@"
"L@@@@@L@"
"L@@@@@L@"
"L@@@@@L@"
"L@@@@@L@"
"L@@@@@L@"
"L@@@@@OH"
"L@@@@@OH"
"L@@@@@AH"
"L@@@@@AH"
"L@@@@@AH"
"L@@@@@AH"
"L@@@@@AH"
"L@@@@@AH"
"L@@@@@AH"
"L@@@@@OH"
"L@@@@@OH"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"OOOOOOL@"
"OOOOOOL@")}}) (\TYPE BITMAP PLACEMENT (487 . 20) NAME REPEAT.COPIES BITMAP {(READBITMAP)(30 41
"AOOOOOOL"
"A@@@@@@D"
"A@@@@@@D"
"GOOOOOOD"
"D@@@@@AD"
"D@@@@@AD"
"OOOOOOMD"
"H@@@@@ED"
"H@@@@@ED"
```

```
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@EL"
"H@@@@@G@"
"H@@@@@D@"
"OOOOOL@"))) (\TYPE BITMAP PLACEMENT (565 . 519) NAME TRAYS1&3 BITMAP ((READBITMAP)(57 39
"@@@@OOOOOOOOOOH@"
"@@@A@@@@@@@@@@H@"
"@@@B@@@@@@@@@A@@"
"@@@D@@@@@@@@@B@@"
"@@@H@@@@@@@@@GH@"
"@@A@@@@@@@@@@HH@"
"@@B@@@@@@@@@AA@@"
"@@D@@@@@@@@@BB@@"
"@@H@@@@@@@@@DGH@"
"@A@@@@@@@@@@HHH@"
"OOOOOOOOOOLAAA@@"
"OOOOOOOOOOLBBB@@"
"L@@@@@@@@@LDDGH@"
"L@@@@@@@@@LHHHH@"
"L@@@@@@@@@OAAA@@"
"LAHC@AN@@@LBBB@@"
"LCHFHCC@@@LDDGH@"
"LGHFH@C@@@LHHHH@"
"LAHC@@N@@@OAAA@@"
"LAHGF@B@@@LBBB@@"
"LAHML@C@@@LDDGH@"
"LAHLLCC@@@LHHHH@"
"LAHGFAN@@@OAAA@@"
"L@@@@@@@@@LBBB@@"
"L@@@@@@@@@LDDGH@"
"L@@@@@@@@@LHHHH@"
"L@@@CCOC@@OAAA@@"
"L@@@C@@C@@LBBB@@"
"L@@@C@@C@@LDDD@@"
"L@@@CCOC@@LHHH@@"
"L@@@C@@C@@OAA@@@"
"L@@@C@@C@@LBB@@@"
"L@@@CCOC@@LDD@@@"
"L@@@C@@C@@LHH@@@"
"L@@@COOO@@OA@@@@"
"L@@@AOON@@LB@@@@"
"L@@@@@@@@@LD@@@@"
"OOOOOOOOOOLH@@@@"
"OOOOOOOOOOOO@@@@"))) (\TYPE BITMAP PLACEMENT (199 . 546) NAME TRAY1 BITMAP ((READBITMAP)(57 39
"@@@@OOOOOOOOOOH@"
"@@@A@@@@@@@@@@H@"
"@@@B@@@@@@@@@A@@"
"@@@D@@@@@@@@@B@@"
"@@@H@@@@@@@@@GH@"
"@@A@@@@@@@@@@HH@"
"@@B@@@@@@@@@AA@@"
"@@D@@@@@@@@@BB@@"
"@@H@@@@@@@@@DGH@"
"@A@@@@@@@@@@HHH@"
"OOOOOOOOOOLAAA@@"
"OOOOOOOOOOLBBB@@"
"L@@@@@@@@@LDDGH@"
"L@@@@@@@@@LHHHH@"
"L@@@@@@@@@OAAA@@"
"LAH@@@@@@@LBBB@@"
```

```
"LCH@@@@@@@LDDGH@"
"LGH@@@@@@@LHHHH@"
"LAH@F@@@L@OAAA@@"
"LAH@F@@@L@LBBB@@"
"LAH@FGOLL@LDDGH@"
"LAH@F@@@L@LHHHH@"
"LAH@F@@@L@OAAA@@"
"L@@@FGOLL@LBBB@@"
"L@@@F@@@L@LDDGH@"
"L@@@F@@@L@LHHHH@"
"L@@@FGOLL@OAAA@@"
"L@@@F@@@L@LBBB@@"
"L@@@GOOOL@LDDD@@"
"L@@@COOOH@LHHH@@"
"L@@@@@@@@@OAA@@@"
"L@@@@@@@@@LBB@@@"
"L@@@@@@@@@LDD@@@"
"L@@@@@@@@@LHH@@@"
"L@@@@@@@@@OA@@@@"
"L@@@@@@@@@LB@@@@"
"L@@@@@@@@@LD@@@@"
"OOOOOOOOOLH@@@@"
"OOOOOOOOOOO@@@@@"))) (\TYPE BITMAP PLACEMENT (387 . 550) NAME TRAY3 BITMAP {(READBITMAP)(57 39
"@@@@OOOOOOOOOOH@"
"@@@A@@@@@@@@@@H@"
"@@@B@@@@@@@@@@A@@"
"@@@D@@@@@@@@@@B@@"
"@@@H@@@@@@@@@@GH@"
"@@A@@@@@@@@@@@HH@"
"@@B@@@@@@@@@@@AA@@"
"@@D@@@@@@@@@@@BB@@"
"@@H@@@@@@@@@@@DGH@"
"@A@@@@@@@@@@@@HHH@"
"OOOOOOOOOLAAA@@"
"OOOOOOOOOLBBB@@"
"L@@@@@@@@@LDDGH@"
"L@@@@@@@@@LHHHH@"
"L@@@@@@@@@OAAA@@"
"LGH@@@@@@@LBBB@@"
"LLL@@@@@@@LDDGH@"
"L@L@@@@@@@LHHHH@"
"LCH@L@@AH@OAAA@@"
"L@H@L@@AH@LBBB@@"
"L@L@LOOIH@LDDGH@"
"LLL@L@@AH@LHHHH@"
"LGH@L@@AH@OAAA@@"
"L@@@LOOIH@LBBB@@"
"L@@@L@@AH@LDDGH@"
"L@@@L@@AH@LHHHH@"
"L@@@LOOIH@OAAA@@"
"L@@@L@@AH@LBBB@@"
"L@@@OOOOH@LDDD@@"
"L@@@GOOO@@LHHH@@"
"L@@@@@@@@@OAA@@@"
"L@@@@@@@@@LBB@@@"
"L@@@@@@@@@LDD@@@"
"L@@@@@@@@@LHH@@@"
"L@@@@@@@@@OA@@@@"
"L@@@@@@@@@LB@@@@"
"L@@@@@@@@@LD@@@@"
"OOOOOOOOOLH@@@@"
"OOOOOOOOOOO@@@@@"))) (\TYPE BITMAP PLACEMENT (348 . 21) NAME 8.5X11 BITMAP {(READBITMAP)(44 8
"G@@O@DA@@HA@"
"HH@H@BB@AHC@"
"HHAN@AD@GHO@"
"G@AA@@H@@HA@"
"HH@A@@H@@HA@"
"HH@A@AD@@HA@"
"HIAA@BB@@HA@"
"GA@N@DA@@HA@"))) (\TYPE BITMAP PLACEMENT (328 . 48) NAME 8.5X14 BITMAP {(READBITMAP)(45 8
"G@@O@DA@@HC@"
"HH@H@BB@AHC@"
"HHAN@AD@GHE@"
"G@AA@@H@@HE@"
"HH@A@@H@@HI@"
"HH@A@AD@@HOH"
"HIAA@BB@@HA@"
"GA@N@DA@@HA@"))) (\TYPE BITMAP PLACEMENT (35 . 268) BITMAP {(READBITMAP)(57 45
"@@@@OOOOOOOOOOH@"
"@@@A@@@@@@@@@@H@"
"@@@B@@@@@@@@@@A@@"
"@@@D@@@@@@@@@@B@@"
"@@@H@@@@@@@@@@GH@"
"@@A@@@@@@@@@@@HH@"
"@@B@@@@@@@@@@@AA@@"
"@@D@@@@@@@@@@@BB@@"
"@@H@@@@@@@@@@@DGH@"
```

```
"@A@@@@@@@@@@HHH@"
"0000000000LAAA@@"
"0000000000LBBB@@"
"L@@@@@@@@@LDDGH@"
"L@@@@@@@@@LHHHH@"
"L@@@@@@@@@OAAA@@"
"LAH@@@@@@@LBBB@@"
"LCH@@@@@@@LDDGH@"
"LGH@@@@@@@LHHHH@"
"LAH@F@@@L@OAAA@@"
"LAH@F@@@L@LBBB@@"
"LAH@FGOLL@LDDGH@"
"LAH@F@@@L@LHHHH@"
"LAH@F@@@L@OAAA@@"
"L@@@FGOLL@LBBB@@"
"L@@@F@@@L@LDDGH@"
"L@@@F@@@L@LHHHH@"
"L@@@FGOLL@OAAA@@"
"L@@@F@@@L@LBBB@@"
"L@@@GOOOL@LDDDH@"
"L@@@COOOH@LHHIH@"
"L@@@@@@@@@OAACH@"
"L@@@@@@@@@LBBGH@"
"L@@@@@@@@@LDDOH@"
"L@@@@@@@@@LHIOH@"
"L@@@@@@@@@OACOH@"
"L@@@@@@@@@LBGO@@"
"L@@@@@@@@@LDON@@"
"0000000000LIOL@@"
"00000000000COH@@"
"@@@@@@@@@@@GO@@@"
"G00000000000N@@@"
"C00000000000L@@@"
"A00000000000H@@@"
"@00000000000@@@@"
"@G000000000N@@@@")} NAME SHADOW.TRAY1) (\TYPE BITMAP PLACEMENT (108 . 270) BITMAP ((READBITMAP)(57 45
"@@@@0000000000H@"
"@@@A@@@@@@@@@@H@"
"@@@B@@@@@@@@@A@@"
"@@@D@@@@@@@@@B@@"
"@@@H@@@@@@@@@GH@"
"@@A@@@@@@@@@@HH@"
"@@B@@@@@@@@@AA@@"
"@@D@@@@@@@@@BB@@"
"@@H@@@@@@@@@DGH@"
"@A@@@@@@@@@@HHH@"
"0000000000LAAA@@"
"0000000000LBBB@@"
"L@@@@@@@@@LDDGH@"
"L@@@@@@@@@LHHHH@"
"L@@@@@@@@@OAAA@@"
"LCH@@@@@@@LBBB@@"
"LDL@@@@@@@LDDGH@"
"L@D@@@@@@@LHHHH@"
"L@L@F@@@L@OAAA@@"
"LAH@F@@@L@LBBB@@"
"LC@@FGOLL@LDDGH@"
"LF@@F@@@L@LHHHH@"
"LGL@F@@@L@OAAA@@"
"L@@@FGOLL@LBBB@@"
"L@@@F@@@L@LDDGH@"
"L@@@F@@@L@LHHHH@"
"L@@@FGOLL@OAAA@@"
"L@@@F@@@L@LBBB@@"
"L@@@GOOOL@LDDDH@"
"L@@@COOOH@LHHIH@"
"L@@@@@@@@@OAACH@"
"L@@@@@@@@@LBBGH@"
"L@@@@@@@@@LDDOH@"
"L@@@@@@@@@LHIOH@"
"L@@@@@@@@@OACOH@"
"L@@@@@@@@@LBGO@@"
"L@@@@@@@@@LDON@@"
"0000000000LIOL@@"
"00000000000COH@@"
"@@@@@@@@@@@GO@@@"
"G00000000000N@@@"
"C00000000000L@@@"
"A00000000000H@@@"
"@00000000000@@@@"
"@G000000000N@@@@")} NAME SHADOW.TRAY2) (\TYPE BITMAP PLACEMENT (181 . 270) BITMAP ((READBITMAP)(57 45
"@@@@0000000000H@"
"@@@A@@@@@@@@@@H@"
"@@@B@@@@@@@@@A@@"
```

```
"@@@D@@@@@@@@@B@@"
"@@@H@@@@@@@@@GH@"
"@@A@@@@@@@@@@HH@"
"@@B@@@@@@@@@AA@@"
"@@D@@@@@@@@@BB@@"
"@@H@@@@@@@@@DGH@"
"@A@@@@@@@@@@HHH@"
"OOOOOOOOOOLAAA@@"
"OOOOOOOOOOLBBB@@"
"L@@@@@@@@@LDDGH@"
"L@@@@@@@@@LHHHH@"
"L@@@@@@@@@OAAA@@"
"LGH@@@@@@@LBBB@@"
"LLL@@@@@@@LDDGH@"
"L@L@@@@@@@LHHHH@"
"LCH@F@@@L@OAAA@@"
"L@L@F@@@L@LBBB@@"
"L@L@FGOLL@LDDGH@"
"LLL@F@@@L@LHHHH@"
"LGH@F@@@L@OAAA@@"
"L@@@FGOLL@LBBB@@"
"L@@@F@@@L@LDDGH@"
"L@@@F@@@L@LHHHH@"
"L@@@FGOLL@OAAA@@"
"L@@@F@@@L@LBBB@@"
"L@@@GOOOL@LDDDH@"
"L@@@COOOH@LHHIH@"
"L@@@@@@@@@OAACH@"
"L@@@@@@@@@LBBGH@"
"L@@@@@@@@@LDDOH@"
"L@@@@@@@@@LHIOH@"
"L@@@@@@@@@OACOH@"
"L@@@@@@@@@LBGO@@"
"L@@@@@@@@@LDON@@"
"OOOOOOOOOOLIOL@@"
"OOOOOOOOOOOCOH@@"
"@@@@@@@@@@@GO@@@"
"GOOOOOOOOOOON@@@"
"COOOOOOOOOOOL@@@"
"AOOOOOOOOOOOH@@@"
"@OOOOOOOOOOOO@@@"
"@GOOOOOOOOON@@@@")) NAME SHADOW.TRAY3)  (\TYPE BITMAP PLACEMENT  (244 . 268) NAME SHADOW.TRAY1&3 BITMAP  ((R
EADBITMAP)(
57 46
"@@@@OOOOOOOOOOH@"
"@@@A@@@@@@@@@@H@"
"@@@B@@@@@@@@@A@@"
"@@@D@@@@@@@@@B@@"
"@@@H@@@@@@@@@GH@"
"@@A@@@@@@@@@@HH@"
"@@B@@@@@@@@@AA@@"
"@@D@@@@@@@@@BB@@"
"@@H@@@@@@@@@DGH@"
"@A@@@@@@@@@@HHH@"
"OOOOOOOOOOLAAA@@"
"OOOOOOOOOOLBBB@@"
"L@@@@@@@@@LDDGH@"
"L@@@@@@@@@LHHHH@"
"L@@@@@@@@@OAAA@@"
"LAHC@AN@@@LBBB@@"
"LCHFHCC@@@LDDGH@"
"LGHFH@C@@@LHHHH@"
"LAHC@@F@@@OAAA@@"
"LAHGF@C@@@LBBB@@"
"LAHML@C@@@LDDGH@"
"LAHLLCC@@@LHHHH@"
"LAHGFAN@@@OAAA@@"
"L@@@@@@@@@LBBB@@"
"L@@@@@@@@@LDDGH@"
"L@@@CCOC@@LHHHH@"
"L@@@C@@C@@OAAA@@"
"L@@@C@@C@@LBBB@@"
"L@@@CCOC@@LDDDH@"
"L@@@C@@C@@LHHIH@"
"L@@@C@@C@@OAACH@"
"L@@@CCOC@@LBBGH@"
"L@@@C@@C@@LDDOH@"
"L@@@COOO@@LHIOH@"
"L@@@AOON@@OACOH@"
"L@@@@@@@@@LBGO@@"
"L@@@@@@@@@LDON@@"
"OOOOOOOOOOLIOL@@"
"OOOOOOOOOOOCOH@@"
"@@@@@@@@@@@GO@@@"
"OOOOOOOOOOOON@@@"
"GOOOOOOOOOOOL@@@"
"COOOOOOOOOOOH@@@"
```

```
"AOOOOOOOOOOO@@@@"
"@OOOOOOOOOON@@@@"
"@GOOOOOOOOOL@@@@")}) (\TYPE BITMAP PLACEMENT (215 . 12) NAME TRANSPARENCY BITMAP ((READBITMAP)(104 49
"ONOL@HB@HOHOHA@GNCOI@DCLDA@@"
"A@HB@HC@I@DHDA@DAB@AHDDBBB@@"
"A@HBADBHI@@HDBHDAB@ADDH@BB@@"
"A@HBADBDHO@HDBHDACOABDH@AD@@"
"A@OLBBBDH@HOHDDGNB@ABDH@@H@@"
"A@HBCNBBH@DH@GLDAB@AADH@@H@@"
"A@HBDABAI@DH@HBDAB@A@LDB@H@@"
"A@HBDAB@HOHH@HBDACOI@DCL@H@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@GOOOOON@@@@@@@@@@@@@@@"
"@@@@@@E@@@@@B@@@@@@@@@@@@@@@"
"@@@@@@E@@D@@B@@@@@@@@@@@@@@@"
"@@@@@@E@@H@@B@@@@@@@@@@@@@@@"
"@@@@@@E@AA@@B@@@@@@@@@@@@@@@"
"@@@@@@E@BB@@B@@@@@@@@@@@@@@@"
"@@@@@@E@DD@@B@@@@@@@@@@@@@@@"
"@@@@@@E@HH@@B@@@@@@@@@@@@@@@"
"@@@@@@EAA@@@B@@@@@@@@@@@@@@@"
"@@@@@@EBB@@@B@@@@@@@@@@@@@@@"
"@@@@@@E@@@@@B@@@@@@@@@@@@@@@"
"@@@@@@E@@@@@B@@@@@@@@@@@@@@@"
"@@@@@@E@@@@@B@@@@@@@@@@@@@@@"
"@@@@@@E@@@@@B@@@@@@@@@@@@@@@"
"@@@@@@E@@@@@B@@@@@@@@@@@@@@@"
"@@@@@@E@@@@@B@@@@@@@@@@@@@@@"
"@@@@@@E@@@@@B@@@@@@@@@@@@@@@"
"@@@@@@E@@@@@B@@@@@@@@@@@@@@@"
"@@@@@@E@@@@@B@@@@@@@@@@@@@@@"
"@@@@@@E@@@@@B@@@@@@@@@@@@@@@"
"@@@@@@E@@@@@B@@@@@@@@@@@@@@@"
"@@@@@@E@@A@DB@@@@@@@@@@@@@@@"
"@@@@@@E@@B@HB@@@@@@@@@@@@@@@"
"@@@@@@E@@DA@B@@@@@@@@@@@@@@@"
"@@@@@@E@@HB@B@@@@@@@@@@@@@@@"
"@@@@@@E@A@D@B@@@@@@@@@@@@@@@"
"@@@@@@E@B@H@B@@@@@@@@@@@@@@@"
"@@@@@@E@DA@@B@@@@@@@@@@@@@@@"
"@@@@@@E@H@@@B@@@@@@@@@@@@@@@"
"@@@@@@EA@@@@B@@@@@@@@@@@@@@@"
"@@@@@@E@@@@@B@@@@@@@@@@@@@@@"
"@@@@@@E@@@@@B@@@@@@@@@@@@@@@"
"@@@@@@E@@@@@B@@@@@@@@@@@@@@@"
"@@@@@@E@@@@@B@@@@@@@@@@@@@@@"
"@@@@@@GOOOOON@@@@@@@@@@@@@@@")}) (\TYPE BITMAP PLACEMENT (41 . 92) NAME OVERSIZED BITMAP ((READBITMAP)(75
49
"CLB@IOLOLCNACOIOLOH@"
"DBB@I@@HBDAA@AA@@HD@"
"HAAAA@@HBD@A@BA@@HB@"
"HAAAAOHHBCLA@DAOHHB@"
"HA@JA@@OL@BA@DA@@HB@"
"HA@JA@@HB@AA@HA@@HB@"
"DB@DA@@HBDAAA@A@@HD@"
"CL@DAOLHBCNACOIOLOH@"
"@@@@@@@@@@@@@@@@@@@@"
"@@@@@@@@@@@@@@@@@@@@"
"@@@@@@@@@@@@@@@@@@@@"
"@@@@@@@@@@@@@@@@@@@@"
"@@@@@@@@@@@@@@@@@@@@"
"@@@@@@@@@@@@@@@@@@@@"
"@@@@@@@OOOOOOOOH@@@@"
"@@@@@@@H@@@@@@@H@@@@"
"@@@@@@@H@@@@@@@H@@@@"
"@@@@@@@H@@@@@@@H@@@@"
"@@@@@@@H@@@@@@@H@@@@"
"@@@@@@@H@@@@@@@H@@@@"
"@@@@@@@H@@@@@@@H@@@@"
"@@@@@@@H@@@@@@@H@@@@"
"@@@@@@@H@@@@@@@H@@@@"
"@@@@@@@H@@@@@@@H@@@@"
"@@@@@@@H@@@@@@@H@@@@"
"@@@@@@@H@@@BH@@H@@@@"
"@@@@@@@H@@@BH@@H@@@@"
"@@@@@@@HF@G@@C@H@@@@"
"@@@@@@@HL@HH@AHH@@@@"
"@@@@@@@IH@HH@@LH@@@@"
"@@@@@@@KOLGHCONH@@@@"
"@@@@@@@KOL@HCONH@@@@"
"@@@@@@@IH@@H@@LH@@@@"
"@@@@@@@HL@@H@AHH@@@@"
```

```
"@@@@@@@HF@@@@C@H@@@@"
"@@@@@@@H@@@@@@@H@@@@"
"@@@@@@@H@@@@@@@H@@@@"
"@@@@@@@H@@@@@@@H@@@@"
"@@@@@@@H@@@@@@@H@@@@"
"@@@@@@@H@@@@@@@H@@@@"
"@@@@@@@H@@@@@@@H@@@@"
"@@@@@@@H@@@@@@@H@@@@"
"@@@@@@@H@@@@@@@H@@@@"
"@@@@@@@H@@@@@@@H@@@@"
"@@@@@@@H@@@@@@@H@@@@"
"@@@@@@@H@@@@@@@H@@@@"
"@@@@@@@H@@@@@@@H@@@@"
"@@@@@@@H@@@@@@@H@@@@"
"@@@@@@@@OOOOOOOH@@@@")}})  (\TYPE BITMAP PLACEMENT  (74 . 24) NAME FORMATTED BITMAP  {(READBITMAP)(79 50
"OLCLCOAHC@DAOMOMOLOH"
"H@DBB@IHC@D@B@BA@@HD"
"H@HAB@IDE@J@B@BA@@HB"
"OHHAB@IDE@J@B@BAOHHB"
"H@HACOABIAA@B@BA@@HB"
"H@HAB@IBIAO@B@BA@@HB"
"H@DBB@IAAB@HB@BA@@HD"
"H@CLB@IAAB@HB@BAOLOH"
"@@@@@@@@@@@@@@@@@@@@"
"@@@@@@@@@@@@@@@@@@@@"
"@@@@@@@@@@@@@@@@@@@@"
"@@@@@@@@@@@@@@@@@@@@"
"@@@@@@@@@@@@@@@@@@@@"
"@@@@@@@@@@@@@@@@@@@@"
"@@@@@@@@@@@@@@@@@@@@"
"@@@@@@AOOOOOOH@@@@@@"
"@@@@@@A@@@@@@H@@@@@@"
"@@@@@@A@@@@@@H@@@@@@"
"@@@@@@AC@@@@@H@@@@@@"
"@@@@@@ADH@@@@H@@@@@@"
"@@@@@@ADH@@@@H@@@@@@"
"@@@@@@AC@@@@@H@@@@@@"
"@@@@@@A@AOOO@H@@@@@@"
"@@@@@@A@@@@@@H@@@@@@"
"@@@@@@A@@@@@@H@@@@@@"
"@@@@@@A@AOOO@H@@@@@@"
"@@@@@@A@@@@@@H@@@@@@"
"@@@@@@A@@@@@@H@@@@@@"
"@@@@@@A@@@@@@H@@@@@@"
"@@@@@@A@@@@@@H@@@@@@"
"@@@@@@AC@@@@@H@@@@@@"
"@@@@@@ADH@@@@H@@@@@@"
"@@@@@@ADH@@@@H@@@@@@"
"@@@@@@AC@@@@@H@@@@@@"
"@@@@@@A@@@@@@H@@@@@@"
"@@@@@@A@@@@@@H@@@@@@"
"@@@@@@A@@@@@@H@@@@@@"
"@@@@@@A@@@@@@H@@@@@@"
"@@@@@@A@@@@@@H@@@@@@"
"@@@@@@A@@@@@@H@@@@@@"
"@@@@@@A@@@@@@H@@@@@@"
"@@@@@@A@@@@@@H@@@@@@"
"@@@@@@A@@@@@@H@@@@@@"
"@@@@@@AC@@@@@H@@@@@@"
"@@@@@@ADH@@@@H@@@@@@"
"@@@@@@ADH@@@@H@@@@@@"
"@@@@@@AC@@@@@H@@@@@@"
"@@@@@@A@@@@@@H@@@@@@"
"@@@@@@A@@@@@@H@@@@@@"
"@@@@@@AOOOOOOH@@@@@@")}})  (\TYPE BITMAP PLACEMENT  (422 . 312) NAME VERTICAL.LINE BITMAP  {(READBITMAP)(3 37

"N@@@"
"N@@@"
"N@@@"
"N@@@"
"N@@@"
"N@@@"
"N@@@"
"N@@@"
"N@@@"
"N@@@"
"N@@@"
"N@@@"
"N@@@"
"N@@@"
"N@@@"
"N@@@"
"N@@@"
"N@@@"
"N@@@"
"N@@@"
"N@@@"
"N@@@"
```

```
"N@@@"
"N@@@"
"N@@@"
"N@@@"
"N@@@"
"N@@@"
"N@@@"
"N@@@"
"N@@@"
"N@@@"
"N@@@"
"N@@@"
"N@@@"
"N@@@"
"N@@@"
"N@@@")}}  (\TYPE BITMAP PLACEMENT  (618 . 263) NAME WORD.OVERSIZED BITMAP  {(READBITMAP)(75 8
"CLB@IOLOLCNACOIOLOH@"
"DBB@I@@HBDAA@AA@@HD@"
"HAAAA@@HBD@A@BA@@HB@"
"HAAAAOHHBCLA@DAOHHB@"
"HA@JA@@OL@BA@DA@@HB@"
"HA@JA@@HB@AA@HA@@HB@"
"DB@DA@@HBDAAA@A@@HD@"
"CL@DAOLHBCNACOIOLOH@")}}  (\TYPE BITMAP PLACEMENT  (619 . 222) NAME WORD.TRANSPARENCY BITMAP  {(READBITMAP)(
104 8
"ONOL@HB@HOHOHA@GNCOI@DCLDA@@"
"A@HB@HC@I@DHDA@DAB@AHDDBBB@@"
"A@HBADBHI@@HDBHDAB@ADDH@BB@@"
"A@HBADBDHO@HDBHDACOABDH@AD@@"
"A@OLBBBDH@HOHDDGNB@ABDH@@H@@"
"A@HBCNBBH@DH@GLDAB@AADH@@H@@"
"A@HBDABAI@DH@HBDAB@A@LDB@H@@"
"A@HBDAB@HOHH@HBDACOI@DCL@H@@")}}  (\TYPE BITMAP PLACEMENT  (623 . 188) NAME WORD.FORMATTED BITMAP  {(READBIT
MAP)(79 8
"OLCLCOAHC@DAOMOMOLOH"
"H@DBB@IHC@D@B@BA@@HD"
"H@HAB@IDE@J@B@BA@@HB"
"OHHAB@IDE@J@B@BAOHHB"
"H@HACOABIAA@B@BA@@HB"
"H@HAB@IBIAO@B@BA@@HB"
"H@DBB@IAAB@HB@BA@@HD"
"H@CLB@IAAB@HB@BAOLOH")}}  (\TYPE BITMAP PLACEMENT  (648 . 159) NAME COVERS BITMAP  {(READBITMAP)(53 8
"CLANA@DONGNAO@@@"
"DBBAA@DH@DAB@H@@"
"H@D@HHHH@DAB@@@@"
"H@D@HHHOLDAAN@@@"
"H@D@HE@H@GN@A@@@"
"H@D@HE@H@DA@@H@@"
"DBBA@B@H@DAB@H@@"
"CLAN@B@ONDAAO@@@")}}  (\TYPE GROUP PLACEMENT  (374 . 493) MEMBERS  ((\TYPE BITMAP PLACEMENT  (-111 . -11) NA
ME
FRONT.COVERS BITMAP  {(READBITMAP)(76 45
"@@@@@OOOOOOL@@@@@@@@"
"@@@@@H@@@@@D@@@@@@@@"
"@@@@@H@@@@@D@@@@@@@@"
"@@@@@H@@@@@D@@@@@@@@"
"@@@@OOOOOOLD@@@@@@@@"
"@@@@H@@@@@DD@@@@@@@@"
"@@@@H@@@@@DD@@@@@@@@"
"@@@OOOOOOLDD@@@@@@@@"
"@@@H@@@@@DDD@@@@@@@@"
"@@@H@@@@@DDD@@@@@@@@"
"OOOOOOL@@DDD@@@@@@@@"
"JJJJJJL@@DDD@@@@@@@@"
"MEEEEED@@DDD@@@@@@@@"
"JJJJJJL@@DDD@@@@@@@@"
"MEEEEED@@DDD@@@@@@@@"
"JJJJJJL@@DDD@@@@@@@@"
"MEEEEED@@DDD@@@@@@@@"
"JJJJJJL@@DDD@@@@@@@@"
"MEEEEED@@DDD@@@@@@@@"
"JJJJJJL@@DDD@@@@@@@@"
"MEEEEED@@DDD@@@@@@@@"
"JJJJJJL@@DDD@@@@@@@@"
"MEEEEED@@DDD@@@@@@@@"
"JJJJJJL@@DDD@@@@@@@@"
"MEEEEED@@DDD@@@@@@@@"
"JJJJJJL@@DDD@@@@@@@@"
"MEEEEED@@DDD@@@@@@@@"
"JJJJJJL@@DDD@@@@@@@@"
"MEEEEED@@DDD@@@@@@@@"
"JJJJJJL@@DDD@@@@@@@@"
"MEEEEED@@DDD@@@@@@@@"
"JJJJJJL@@DDD@@@@@@@@"
"MEEEEED@@DDD@@@@@@@@"
"JJJJJJL@@DDD@@@@@@@@"
"MEEEEED@@DGL@@@@@@@@"
```

```
"JJJJJJL@@DD@@@@@@@@@@"
"MEEEEED@@DD@@@@@@@@@@"
"JJJJJJL@@DDOL@@@@@@@"
"MEEEEED@@GLL@@@@@@L@"
"JJJJJJL@@D@LAOCLOHL@"
"MEEEEED@@D@OIKFFLMO@"
"JJJJJJOOOL@LAHFFLLL@"
"MEEEEED@@@@LAHFFLLL@"
"JJJJJJL@@@@LAHFFLLL@"
"OOOOOOL@@@@LAHCLLLG@")) BOUNDING.BOX NIL SUBITEMS NIL) (\TYPE BITMAP PLACEMENT (96 . -11) NAME BOTH.COVERS
 BITMAP ((
READBITMAP)(73 47
"@@@@@@@@AOOOOOOH@@@@"
"@@@@@@@@AEEEEEEH@@@@"
"@@@@@@@@AJJJJJJH@@@@"
"@@@@@OOOOOOMEEEH@@@@"
"@@@@@H@@@@@FJJJH@@@@"
"@@@@@H@@@@@EEEEH@@@@"
"@@@@OOOOOOLFJJJH@@@@"
"@@@@H@@@@@DEEEEH@@@@"
"@@@@H@@@@@DFJJJH@@@@"
"@@@OOOOOOLDEEEEH@@@@"
"@@@H@@@@@DDFJJJH@@@@"
"@@@H@@@@@DDEEEEH@@@@"
"OOOOCOL@@DDFJJJH@@@@"
"JJJJJJL@@DDEEEEH@@@@"
"MEEEEED@@DDFJJJH@@@@"
"JJJJJJL@@DDEEEEH@@@@"
"MEEEEED@@DDFJJJH@@@@"
"JJJJJJL@@DDEEEEH@@@@"
"MEEEEED@@DDFJJJH@@@@"
"JJJJJJL@@DDEEEEH@@@@"
"MEEEEED@@DDFJJJH@@@@"
"JJJJJJL@@DDEEEEH@@@@"
"MEEEEED@@DDFJJJH@@@@"
"JJJJJJL@@DDEEEEH@@@@"
"MEEEEED@@DDFJJJH@@@@"
"JJJJJJL@@DDEEEEH@@@@"
"MEEEEED@@DDFJJJH@@@@"
"JJJJJJL@@DDEEEEH@@@@"
"MEEEEED@@DDFJJJH@@@@"
"JJJJJJL@@DDEEEEH@@@@"
"MEEEEED@@DDFJJJH@@@@"
"JJJJJJL@@DDEEEEH@@@@"
"MEEEEED@@DDFJJJH@@@@"
"JJJJJJL@@DDEEEEH@@@@"
"MEEEEED@@DDGOOOH@@@@"
"JJJJJJL@@DDD@@@@@@@@"
"MEEEEED@@DDD@@@@@@@@"
"JJJJJJL@@DGL@@@@@@@@"
"MEEEEED@@DD@@@@@@@@@"
"JJJJJJL@@DDAO@@@AH@@"
"MEEEEED@@GLAIH@CAH@@"
"JJJJJJL@@D@AIINGMO@@"
"MEEEEED@@D@AOCCCAIH@"
"JJJJJJOOOL@AIKCCAIH@"
"MEEEEED@@@@AIKCCAIH@"
"JJJJJJL@@@@AIKCCAIH@"
"OOOOOOL@@@@AOANAMIH@")) BOUNDING.BOX NIL SUBITEMS NIL) (\TYPE BITMAP PLACEMENT (-7 . -11) NAME BACK.COVERS
 BITMAP ((
READBITMAP)(64 45
"@@@@@AOOOOOOH@@@"
"@@@@@AEEEEEEH@@@"
"@@@@@AJJJJJJH@@@"
"@@@@@AEEEEEEH@@@"
"@@OOOOOONJJJH@@@"
"@@H@@@@@EEEEH@@@"
"@@H@@@@@FJJJH@@@"
"@OOOOOOLEEEEH@@@"
"@H@@@@@DFJJJH@@@"
"@H@@@@@DEEEEH@@@"
"OOOOOOLDFJJJH@@@"
"H@@@@@DDEEEEH@@@"
"H@@@@@DDFJJJH@@@"
"H@@@@@DDEEEEH@@@"
"H@@@@@DDFJJJH@@@"
"H@@@@@DDEEEEH@@@"
"H@@@@@DDFJJJH@@@"
"H@@@@@DDEEEEH@@@"
"H@@@@@DDFJJJH@@@"
"H@@@@@DDEEEEH@@@"
"H@@@@@DDFJJJH@@@"
"H@@@@@DDEEEEH@@@"
"H@@@@@DDFJJJH@@@"
"H@@@@@DDEEEEH@@@"
"H@@@@@DDFJJJH@@@"
"H@@@@@DDEEEEH@@@"
```

```
"H@@@@@DDFJJJH@@@"
"H@@@@@DDEEEEH@@@"
"H@@@@@DDFJJJH@@@"
"H@@@@@DDEEEEH@@@"
"H@@@@@DDFJJJH@@@"
"H@@@@@DDEEEEH@@@"
"H@@@@@DDFJJJH@@@"
"H@@@@@DDEEEEH@@@"
"H@@@@@DDGOOOH@@@"
"H@@@@@DDD@@@@@@@"
"H@@@@@DDD@@@@@@@"
"H@@@@@DDDOH@@@F@"
"H@@@@@DGLLL@@@F@"
"H@@@@@DD@LLNANFF"
"H@@@@@DD@OHCCCFL"
"H@@@@@GL@LLOC@GH"
"H@@@@@D@@LMKC@FL"
"H@@@@@D@@LMKCCFF"
"OOOOOOL@@OHOINFC")} BOUNDING.BOX NIL SUBITEMS NIL) (\TYPE BITMAP PLACEMENT (-214 . -11) NAME NO.COVERS BIT
MAP {(
READBITMAP)(66 41
"@@OOOOOOL@@@@@@@@@@@"
"@@H@@@@@D@@@@@@@@@@@"
"@@H@@@@@D@@@@@@@@@@@"
"@OOOOOOLD@@@@@@@@@@@"
"@H@@@@@DD@@@@@@@@@@@"
"@H@@@@@DD@@@@@@@@@@@"
"OOOOOOLDD@@@@@@@@@@@"
"H@@@@@DDD@@@@@@@@@@@"
"H@@@@@DDD@@@@@@@@@@@"
"H@@@@@DDD@@@@@@@@@@@"
"H@@@@@DDD@@@@@@@@@@@"
"H@@@@@DDD@@@@@@@@@@@"
"H@@@@@DDD@@@@@@@@@@@"
"H@@@@@DDD@@@@@@@@@@@"
"H@@@@@DDD@@@@@@@@@@@"
"H@@@@@DDD@@@@@@@@@@@"
"H@@@@@DDD@@@@@@@@@@@"
"H@@@@@DDD@@@@@@@@@@@"
"H@@@@@DDD@@@@@@@@@@@"
"H@@@@@DDD@@@@@@@@@@@"
"H@@@@@DDD@@@@@@@@@@@"
"H@@@@@DDD@@@@@@@@@@@"
"H@@@@@DDD@@@@@@@@@@@"
"H@@@@@DDD@@@@@@@@@@@"
"H@@@@@DDD@@@@@@@@@@@"
"H@@@@@DDD@@@@@@@@@@@"
"H@@@@@DDD@@@@@@@@@@@"
"H@@@@@DDD@@@@@@@@@@@"
"H@@@@@DDD@@@@@@@@@@@"
"H@@@@@DDD@@@@@@@@@@@"
"H@@@@@DDD@@@@@@@@@@@"
"H@@@@@DDD@@@@@@@@@@@"
"H@@@@@DDD@@@@@@@@@@@"
"H@@@@@DDDGAH@@@@@@@@"
"H@@@@@DGLGIH@@@@@@@@"
"H@@@@@DD@GIINGLGH@@@"
"H@@@@@DD@FMKCFFLL@@@"
"H@@@@@GL@FMKCFFOL@@@"
"H@@@@@D@@FGKCFFL@@@@"
"H@@@@@D@@FGKCFFLL@@@"
"OOOOOOL@@FCINFFGH@@@")} BOUNDING.BOX NIL SUBITEMS NIL))) (\TYPE BITMAP PLACEMENT (72 . 317) NAME GHOSTRAY.
2 BITMAP {(
READBITMAP)(57 39
"@@@@JJJJJJJJJJH@"
"@@@@@@@@@@@@@@@@"
"@@@B@@@@@@@@@A@@"
"@@@@@@@@@@@@@@@@"
"@@@H@@@@@@@@@E@@"
"@@@@@@@@@@@@@@H@"
"@@B@@@@@@@@@AA@@"
"@@@@@@@@@@@@@@@@"
"@@H@@@@@@@@@DE@@"
"@A@@@@@@@@@@@@H@"
"EEEEEEEEEEDAAA@@"
"JJJJJJJJJJH@@@@@"
"D@@@@@@@@@DDDE@@"
"H@@@@@@@@@H@@@H@"
"D@@@@@@@@@EAAA@@"
"HE@@@@@@@@H@@@@@"
"DHD@@@@@@@DDDE@@"
"H@H@@@@@@@H@@@H@"
"D@@@D@@A@@EAAA@@"
```

```
"HB@@H@@@H@H@@@@@"
"DH@@DJJI@@DDDE@@"
"HED@H@@@H@H@@@H@"
"D@@@D@@A@@EAAA@@"
"H@@@HJJHH@H@@@@@"
"D@@@D@@A@@DDDE@@"
"H@@@H@@@H@H@@@H@"
"D@@@DJJI@@EAAA@@"
"H@@@H@@@H@H@@@@@"
"D@@@EEEE@@DDDD@@"
"H@@@BJJJ@@H@@@@@"
"D@@@@@@@@@EAA@@@"
"H@@@@@@@@@D@@@@@"
"D@@@@@@@@@HDD@@@"
"H@@@@@@@@@D@@@@@"
"D@@@@@@@@@I@@@@@"
"H@@@@@@@@@DB@@@@"
"D@@@@@@@@@H@@@@@"
"JEEEEEEEEEDH@@@@"
"EJJJJJJJJJJ@@@@@")})  (\TYPE BITMAP PLACEMENT  (0 . 316) NAME GHOSTRAY.1 BITMAP  {(READBITMAP)(57 39
"@@@@JJJJJJJJJJH@"
"@@@@@@@@@@@@@@@@"
"@@@B@@@@@@@@@A@@"
"@@@@@@@@@@@@@@@@"
"@@@H@@@@@@@@@E@@"
"@@@@@@@@@@@@@@H@"
"@@B@@@@@@@@@AA@@"
"@@@@@@@@@@@@@@@@"
"@@H@@@@@@@@@DE@@"
"@A@@@@@@@@@@@@H@"
"EEEEEEEEEEDAAA@@"
"JJJJJJJJJJH@@@@@"
"D@@@@@@@@@DDDE@@"
"H@@@@@@@@@H@@@H@"
"D@@@@@@@@@EAAA@@"
"HB@@@@@@@@H@@@@@"
"DE@@@@@@@@DDDE@@"
"HB@@@@@@@@H@@@H@"
"DA@@D@@A@@EAAA@@"
"HB@@H@@@H@H@@@@@"
"DA@@DJJI@@DDDE@@"
"HB@@H@@@H@H@@@H@"
"DA@@D@@A@@EAAA@@"
"H@@@HJJHH@H@@@@@"
"D@@@D@@A@@DDDE@@"
"H@@@H@@@H@H@@@H@"
"D@@@DJJI@@EAAA@@"
"H@@@H@@@H@H@@@@@"
"D@@@EEEE@@DDDD@@"
"H@@@BJJJ@@H@@@@@"
"D@@@@@@@@@EAA@@@"
"H@@@@@@@@@D@@@@@"
"D@@@@@@@@@HDD@@@"
"H@@@@@@@@@D@@@@@"
"D@@@@@@@@@I@@@@@"
"H@@@@@@@@@DB@@@@"
"D@@@@@@@@@H@@@@@"
"JEEEEEEEEEDH@@@@"
"EJJJJJJJJJJ@@@@@")})  (\TYPE BITMAP PLACEMENT  (144 . 316) NAME GHOSTRAY.3 BITMAP  {(READBITMAP)(57 39
"@@@@JJJJJJJJJJH@"
"@@@@@@@@@@@@@@@@"
"@@@B@@@@@@@@@A@@"
"@@@@@@@@@@@@@@@@"
"@@@H@@@@@@@@@E@@"
"@@@@@@@@@@@@@@H@"
"@@B@@@@@@@@@AA@@"
"@@@@@@@@@@@@@@@@"
"@@H@@@@@@@@@DE@@"
"@A@@@@@@@@@@@@H@"
"EEEEEEEEEEDAAA@@"
"JJJJJJJJJJH@@@@@"
"D@@@@@@@@@DDDE@@"
"H@@@@@@@@@H@@@H@"
"D@@@@@@@@@EAAA@@"
"HE@@@@@@@@H@@@@@"
"DHH@@@@@@@DDDE@@"
"H@@@@@@@@@H@@@H@"
"DBH@D@@A@@EAAA@@"
"H@@@H@@@H@H@@@@@"
"CHH@DJJI@@DDDE@@"
"HE@@H@@@H@H@@@H@"
"D@@@D@@A@@EAAA@@"
"H@@@HJJHH@H@@@@@"
"D@@@D@@A@@DDDE@@"
"H@@@H@@@H@H@@@H@"
"D@@@DJJI@@EAAA@@"
"H@@@H@@@H@H@@@@@"
```

```
"D@@@EEEE@@DDDD@@"
"H@@@BJJJ@@H@@@@@"
"D@@@@@@@@@EAA@@@"
"H@@@@@@@@@D@@@@@"
"D@@@@@@@@@HDD@@@"
"H@@@@@@@@@D@@@@@"
"D@@@@@@@@@I@@@@@"
"H@@@@@@@@@DB@@@@"
"D@@@@@@@@@H@@@@@"
"JEEEEEEEEEDH@@@@"
"EJJJJJJJJJ@@@@@@"))) (\TYPE BITMAP PLACEMENT (218 . 315) NAME GHOSTRAYS.1&3 BITMAP {(READBITMAP)(57 39
"@@@@JJJJJJJJJJH@"
"@@@A@@@@@@@@@@@@"
"@@@@@@@@@@@@@@H@"
"@@@D@@@@@@@@@B@@"
"@@@@@@@@@@@@@@@@"
"@@A@@@@@@@@@@HH@"
"@@@@@@@@@@@@@@@@"
"@@D@@@@@@@@@BBH@"
"@@@@@@@@@@@@@@@@"
"@A@@@@@@@@@@HHH@"
"JJJJJJJJJJH@@@@@"
"EEEEEEEEEEDBBBH@"
"H@@@@@@@@@H@@@@@"
"D@@@@@@@@@DHHHH@"
"H@@@@@@@@@J@@@@@"
"DA@A@AD@@@DBBBH@"
"HBHBHBB@@@H@@@@@"
"DA@DD@A@@@DHHHH@"
"H@HA@@J@@@J@@@@@"
"DA@BD@A@@@DBBBH@"
"H@HE@@B@@@H@@@@@"
"DA@HDBB@@@DHHHH@"
"H@HEBAD@@@J@@@@@"
"D@@@@@@@@@DBBBH@"
"H@@@@@@@@@H@@@@@"
"D@@@@@@@@@DHHHH@"
"H@@@ABJA@@J@@@@@"
"D@@@B@@B@@DBBB@@"
"H@@@A@@A@@H@@@@@"
"D@@@BBJB@@DHHH@@"
"H@@@A@@A@@J@@@@@"
"D@@@B@@B@@DBB@@@"
"H@@@ABJA@@H@@@@@"
"D@@@B@@B@@DHH@@@"
"H@@@AEEE@@J@@@@@"
"D@@@BJJJ@@DB@@@@"
"H@@@@@@@@@H@@@@@"
"EEEEEEEEEE@H@@@@"
"JJJJJJJJJJ@@@@@@"))) (\TYPE BITMAP PLACEMENT (50 . 425) NAME SHADOW.1.TO.1 BITMAP {(READBITMAP)(98 53
"@AOOOOOOH@@@@@@GOOOOON@@@@@@"
"@A@@@@@@H@@@@@@D@@@@@B@@@@@@"
"@A@@@@@@H@@@@@@D@@@@@B@@@@@@"
"@A@@@@@@H@@@@@@D@@@@@B@@@@@@"
"@A@@@@@@H@@@@@@D@@@@@B@@@@@@"
"@A@@@@@@H@@@@@@D@@@@@B@@@@@@"
"@AAOL@@@H@@@@@@DGO@@@B@@@@@@"
"@A@@@@@@H@@@@@@D@@@@@B@@@@@@"
"@A@@@@@@H@@@@@@D@@@@@B@@@@@@"
"@A@@@@@@H@@@@@@D@@@@@B@@@@@@"
"@AAOL@@@H@@@@@@DGO@@@B@@@@@@"
"@A@@@@@@H@@@@@@D@@@@@B@@@@@@"
"@A@@@@@@H@@AH@@D@@@@@B@@@@@@"
"@A@@@@@@H@@@L@@D@@@@@B@@@@@@"
"@AAOOOOHH@@@F@@DGOOONB@@@@@@"
"@A@@@@@@H@@@C@@D@@@@@B@@@@@@"
"@A@@@@@@H@@@AH@D@@@@@B@@@@@@"
"@A@@@@@@H@GOOL@D@@@@@B@@@@@@"
"@AAOOOOHH@GOOL@DGOOONB@@@@@@"
"@A@@@@@@H@@@AH@D@@@@@B@@@@@@"
"@A@@@@@@H@@@C@@D@@@@@B@@@@@@"
"@A@@@@@@H@@@F@@D@@@@@B@@@@@@"
"@AAOOOOHH@@@L@@DGOOONB@@@@@@"
"@A@@@@@@H@@AH@@D@@@@@B@@@@@@"
"@A@@@@@@H@@@@@@D@@@@@B@@@@@@"
"@A@@@@@@H@@@@@@D@@@@@B@@@@@@"
"@AAOOL@@H@@@@@@DGOO@@B@@@@@@"
"@A@@@@@@H@@@@@@D@@@@@B@@@@@@"
"@A@@@@@@H@@@@@@D@@@@@B@@@@@@"
"@A@@@@@@H@@@@@@D@@@@@B@@@@@@"
"@A@@@@@@H@@@@@@D@@@@@B@@@@@@"
"@A@@@@@@H@@@@@@D@@@@@B@@@@@@"
"@A@@@@@@H@@@@@@D@@@@@B@@@@@@"
"@A@@@@@@H@@@@@@D@@@@@B@@@@@@"
"@AOOOOOOH@@@@@@GOOOOON@@@@@@"
"@@@@@@@@@@@@@@@@@@@@@@@@@@@@"
"@@@@@@@@@@@@@@@@@@@@@@@@@@@@"
```

```
"@@@@@@@@@@@@@@@@@@@@@@@@@@@@"
"@@@@F@@@@@@@@@@@@AH@@@@@@@@@"
"C@@@F@L@@C@@@@L@@AHC@@@L@@@@"
"G@@@@@L@@C@@@AL@@@@C@@@L@@@@"
"O@@OFGLOAO@@@CL@CMIOCLGL@@@@"
"C@AIFLMIKC@@@@L@FEKCFFLL@@@@"
"C@ALFLMOKC@@@@L@GAKCGNLLD@@@"
"C@@GFLMHCC@@@@L@AMKCF@LLL@@@"
"C@ACFLMIKC@@@@L@DMKCFFLML@@@"
"C@ANFGLOAO@@@@L@GIIOCLGML@@@"
"@@@@@@@@@@@@@@@@@@@@@@@AL@@@"
"COOOOOOOOOOOOOOOOOOOOOOOL@@@"
"COOOOOOOOOOOOOOOOOOOOOOOL@@@"
"COOOOOOOOOOOOOOOOOOOOOOOH@@@"
"COOOOOOOOOOOOOOOOOOOOOOO@@@@"
"COOOOOOOOOOOOOOOOOOOOOON@@@@"))) (\TYPE BITMAP PLACEMENT (162 . 360) NAME GHOST.1.TO.1 BITMAP {(READBITMA
P)(93 47
"@AEEEEEE@@@@@@@EEEEEED@@"
"@B@@@@@@@@@@@@@H@@@@@@@@"
"@@@@@@@A@@@@@@@@@@@@@D@@"
"@B@@@@@@@@@@@@@H@@@@@@@@"
"@@@@@@@A@@@@@@@@@@@@@D@@"
"@B@@@@@@@@@@@@@H@@@@@@@@"
"@@AE@@@A@@@@@@@@ED@@@D@@"
"@B@@@@@@@@@@@@@H@@@@@@@@"
"@@@@@@@A@@@@@@@@@@@@@D@@"
"@B@@@@@@@@@@@@@H@@@@@@@@"
"@@AE@@@A@@@@@@@@ED@@@D@@"
"@B@@@@@@@@@@@@@H@@@@@@@@"
"@@@@@@@A@@@A@@@@@@@@@D@@"
"@B@@@@@@@@@@H@@H@@@@@@@@"
"@@AEEEEA@@@@D@@@EEEEDD@@"
"@B@@@@@@@@@@B@@H@@@@@@@@"
"@@@@@@@A@@@@A@@@@@@@@D@@"
"@B@@@@@@@@JJJH@H@@@@@@@@"
"@@AEEEEA@@EEE@@@EEEEDD@@"
"@B@@@@@@@@@@B@@H@@@@@@@@"
"@@@@@@@A@@@@D@@@@@@@@D@@"
"@B@@@@@@@@@@H@@H@@@@@@@@"
"@@AEEEEA@@@A@@@@EEEEDD@@"
"@B@@@@@@@@@@B@@@H@@@@@@@"
"@@@@@@@A@@@@@@@@@@@@@D@@"
"@B@@@@@@@@@@@@@H@@@@@@@@"
"@@AEE@@A@@@@@@@@EED@@D@@"
"@B@@@@@@@@@@@@@H@@@@@@@@"
"@@@@@@@A@@@@@@@@@@@@@D@@"
"@B@@@@@@@@@@@@@H@@@@@@@@"
"@@@@@@@A@@@@@@@@@@@@@D@@"
"@B@@@@@@@@@@@@@H@@@@@@@@"
"@@@@@@@A@@@@@@@@@@@@@D@@"
"@B@@@@@@@@@@@@@H@@@@@@@@"
"@AEEEEEE@@@@@@@EEEEEED@@"
"@@@@@@@@@@@@@@@@@@@@@@@@"
"@@@@@@@@@@@@@@@@@@@@@@@@"
"@@@@@@@@@@@@@@@@@@@@@@@@"
"@@@@D@@@@@@@@@@@@A@@@@@@"
"B@@@H@H@@B@@@@H@@B@B@@@H"
"D@@@@A@@@D@@@A@@@@@D@@A@"
"J@@JHJHJBJ@@@BH@BJBJBHJH"
"D@A@EAAADD@@@A@@DADDDEA@"
"B@BHHHJJBB@@@@H@JBBBJHHH"
"D@@DEAA@DD@@@A@@AADDDAA@"
"B@BBHHJBBB@@@@H@HJBBHHHH"
"D@ADDEADAD@@@A@@EAADE@E@"))) (\TYPE PICTURE PLACEMENT (16 . 168) FIGURE-COLOR GRAY BITMAP 2.TO.2) (\TYPE
BITMAP PLACEMENT (
268 . 357) NAME GHOST.1.TO.2 BITMAP {(READBITMAP)(93 49
"@AEEEEEE@@@@@@@@@@@@D@@@"
"@@@@@@@@H@@@@@@@@@@@J@@@"
"@A@@@@@@@@@@@@@AEEEEA@@@"
"@JJJJJJHH@@@@@@@@@@@@H@@"
"@@@@@@@D@@@@@@@A@@@A@@@@"
"@H@@@@@@H@@@@@@@@@@B@H@@"
"@@@@@@@D@@@@@@@A@@@@@@@@"
"@H@@@@@@H@@@@@@@@@@BHH@@"
"@@@@@@@D@@@@@@@AAED@D@@@"
"@HJJ@@@@H@@@@@@@@@@@B@@@"
"@@@@@@@D@@@@@@@A@@@DA@@@"
"@H@@@@@@H@@@@@@@@@@@@@@@"
"@@@@@@@D@@@@@@@AAED@A@@@"
"@HJJ@@@@H@@@@@@@@@@HB@@@"
"@@@@@@@D@@@A@@@A@@A@D@@@"
"@H@@@@@@H@@@H@@@@@@BB@@@"
"@@@@@@@D@@@@D@@AAEEA@@@@"
"@HJJJJH@H@@@B@@@@@B@H@@@"
"@@@@@@@D@@@@A@@A@@@@D@@@"
"@H@@@@@@H@JJJH@@@@B@@@@@"
"@@@@@@@D@@EEE@@AAED@D@@@"
```

"@HJJJJH@H@@@B@@@@@@@@H@@@"
"@@@@@@@D@@@@D@@A@@DA@@@@"
"@H@@@@@@H@@@H@@@@@HHH@@@"
"@@@@@@@D@@@A@@@AAE@D@@@@"
"@HJJJJH@H@@B@@@@@@HB@@@@"
"@@@@@@@D@@@@@@@A@@@A@@@@"
"@H@@@@@@H@@@@@@@@@@@@@@@"
"@@@@@@@D@@@@@@@AAEDA@@@@"
"@HJJJ@@@H@@@@@@@@@@BB@@@@"
"@@@@@@@D@@@@@@@A@@@@@@@@"
"@H@@@@@@H@@@@@@@@@@@B@@@@"
"@@@@@@@D@@@@@@@A@@@D@@@@"
"@H@@@@@@H@@@@@@@@@@@@@@@"
"@@@@@@@E@@@@@@@A@@@D@@@@"
"@H@@@@@@@@@@@@@@@@@H@@@@"
"@@@@@@@D@@@@@@@AEEE@@@@@"
"@JJJJJJH@@@@@@@@@@@@@@@@"
"@@@@@@@@@@@@@@@@@@@@@@@@"
"@@@@@@@@@@@@@@@@@@@@@@@@"
"@@@@D@@@@@@@@@@@@A@@@@@@"
"B@@@H@H@@B@@@BH@@B@B@@@H"
"D@@@@A@@@D@@@DD@@@@D@@A@"
"J@@JHJHJBJ@@@@H@BJBJBHJH"
"D@A@EAAADD@@@A@@DADDDEA@"
"B@BHHHJJBB@@@B@@JBBBJHHH"
"D@@DEAA@DD@@@D@@AADDDAA@"
"B@BBHHJBBB@@@H@@HJBBHHHH"
"D@ADDEADAD@@@@ED@EAADE@E@"))) (\TYPE BITMAP PLACEMENT (377 . 354) NAME GHOST.2.TO.1 BITMAP ((READBITMAP)(9
5 49
"@@@@@@D@@@@@@@@@@EEEEED@"
"@@@@@@@@@@@@@@@@@@@@@@B@"
"@@EEEED@@@@@@@@@@D@@@@@@@"
"@@H@@@H@@@@@@@@@BJJJJJB@"
"@@@@@@@D@@@@@@@@D@@@@@@@@"
"@@H@@@H@@@@@@@@@@@@@@BB@"
"@@@@@A@D@@@@@@@@D@@@@@@@@"
"@@H@@@@@@@@@@@@@@@@@@BB@"
"@@@EDA@D@@@@@@@@D@@@@@@@@"
"@@H@@B@H@@@@@@@@BJ@@@BB@"
"@@@@@@A@@@@@@@@@D@@@@@@@@"
"@@H@@B@H@@@@@@@@@@@@@@BB@"
"@@@EDDD@@@@@@@@@D@@@@@@@@"
"@@H@@@B@@@@@@@@@BJ@@@BB@"
"@@@@@DA@@@@A@@@D@@@@@@@@@"
"@@H@@H@@@@@@H@@@@@@@@@BB@"
"@@@EE@A@@@@@D@@D@@@@@@@@@"
"@@H@@HB@@@@@B@@@BJJJJBB@"
"@@@@A@D@@@@@A@@D@@@@@@@@@"
"@@H@@BB@@@@BJJH@@@@@@@@BB@"
"@@@EEA@@@@@EEED@D@@@@@@@@@"
"@@H@B@H@@@@@@H@@BJJJJBB@"
"@@@@@@D@@@@@A@@D@@@@@@@@@"
"@@H@B@@@@@@@@B@@@@@@@@@BB@"
"@@@ED@D@@@@@D@@D@@@@@@@@@"
"@@H@@@H@@@@@H@@@BJJJJBB@"
"@@@@DA@@@@@@@@@@D@@@@@@@@@"
"@@H@H@H@@@@@@@@@@@@@@@@BB@"
"@@@EE@@@@@@@@@@@D@@@@@@@@@"
"@@H@@H@@@@@@@@@@BJJ@@BB@"
"@@@@@E@@@@@@@@@@D@@@@@@@@@"
"@@H@@B@@@@@@@@@@@@@@@@@BB@"
"@@@@@A@@@@@@@@@@D@@@@@@@@@"
"@@H@@B@@@@@@@@@@@@@@@@@BB@"
"@@@@@@@@@@@@@@@@D@@@@@AD@"
"@@H@@@@@@@@@@@@@@@@@@@B@@"
"@@EEE@@@@@@@@@@@D@@@@@@@@"
"@@@@@@@@@@@@@@@@BJJJJJ@@"
"@@@@@@@@@@@@@@@@@@@@@@@@@"
"@@@@@@@@@@@@@@@@@@@@@@@@@"
"@@@@A@@@@@@@@@@@@@@D@@@@@"
"BH@@B@B@@@H@@@B@@@H@H@@B"
"DD@@@@D@@A@@@@D@@@@A@@@D"
"@H@BJBJBHJH@@@J@@JHJHJBJ"
"A@@DADDDEA@@@@D@A@EAAADD"
"B@@JBBBJHHH@@@B@BHHHJJBB"
"D@@AADDDAA@@@@D@@DEAA@DD"
"H@@HJBBHHHH@@@B@BBHHJBBB"
"ED@EAADE@E@@@@D@ADDEADAD"))) (\TYPE BITMAP PLACEMENT (477 . 349) NAME GHOST.2.TO.2 BITMAP ((READBITMAP)(9
4 49
"@@@@@@B@@@@@@@@@@@@@@H@@"
"@@@@@@E@@@@@@@@@@@@@@AD@@"
"@@JJJJHH@@@@@@@@BJJJJB@@"
"@@@@@@@D@@@@@@@@@@@@@@A@@"
"@@H@@@H@@@@@@@@@B@@@B@@@"
"@@@@@A@D@@@@@@@@@@@@@DA@@"
"@@H@@@@@@@@@@@@@B@@@@@@@"
"@@@@@ADD@@@@@@@@@@@@@EA@@"

```
"@@HJJ@B@@@@@@@@@@BBJH@H@@"
"@@@@@@A@@@@@@@@@@@@@@@D@@"
"@@H@@B@H@@@@@@@@@B@@@HB@@"
"@@@@@@@@@@@@@@@@@@@@@@@@@"
"@@HJJ@@H@@@@@@@@@BBJH@B@@"
"@@@@@DA@@@@@@@@@@@@@A@D@@"
"@@H@@HB@@@@@@H@@@B@@B@H@@"
"@@@@@AA@@@@@@D@@@@@@@@DD@@"
"@@HJJHH@@@@@@B@@@@BBJJB@@@"
"@@@@A@D@@@@@@A@@@@@@@DA@@@"
"@@H@@@B@@@@@@@H@@B@@@@@H@@"
"@@@@A@@@@@@@EEED@@@@@@D@@@@"
"@@HJJ@B@@@@BJJH@@BBJH@H@@"
"@@@@@@@D@@@@@@A@@@@@@@@@A@@@"
"@@H@B@H@@@@@@B@@@@B@@HB@@@"
"@@@@DDD@@@@@@D@@@@@@AAA@@@"
"@@HJHB@@@@@@@H@@@@BBJ@H@@@"
"@@@@DA@@@@@@A@@@@@@@A@D@@@"
"@@H@@@H@@@@@@@@@@@B@@@@B@@@"
"@@@@@@@@@@@@@@@@@@@@@@@@@"
"@@HJJ@H@@@@@@@@@@BBJHB@@@"
"@@@@AA@@@@@@@@@@@@@@@DD@@@"
"@@H@@@@@@@@@@@@@@@B@@@@@@@"
"@@@@@A@@@@@@@@@@@@@@@@D@@@"
"@@H@@B@@@@@@@@@@@@B@@@H@@@"
"@@@@@@@@@@@@@@@@@@@@@@@@@@"
"@@H@@B@@@@@@@@@@@@B@@@H@@@"
"@@@@@D@@@@@@@@@@@@@@@A@@@@"
"@@JJJH@@@@@@@@@@@BJJJ@@@@"
"@@@@@@@@@@@@@@@@@@@@@@@@@@"
"@@@@@@@@@@@@@@@@@@@@@@@@@@"
"@@@@@@@@@@@@@@@@@@@@@@@@@@"
"@@@@B@@@@@@@@@@@@@@H@@@@@"
"E@@@A@D@@A@@@AD@@A@A@@@D"
"HH@@@@B@@@H@@BB@@@@B@@@H"
"@D@EAADE@E@@@@D@AEAEADED"
"@H@HJBBHHHH@@@H@B@JBBBHH"
"A@@DADDEEA@@@A@@EAAAEDDD"
"B@@BJBBH@HH@@B@@@HJBB@HH"
"D@@AADDDEA@@@D@@DEAADDDD"
"JH@JBBJBHJH@@BJ@BHHJBHBH")))) CLASSES  (BITMAP.FRAMES))  (\TYPE FRAME NAME ICONS2 ITEMS  ((\TYPE BITMAP PLAC
EMENT  (660 . 306)
NAME HALF.TONES BITMAP  ((READBITMAP)(101 57
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@"
"@@@@@@@@@GOOOOON@@@@@@@@@@@@@"
"@@@@@@@@@D@@@@@B@@@@@@@@@@@@@"
"@@@@@@@@@EIIIIIJ@@@@@@@@@@@@@"
"@@@@@@@@@EIIIIIJ@@@@@@@@@@@@@"
"@@@@@@@@@D@@@@@B@@@@@@@@@@@@@"
"@@@@@@@@@D@@@@@B@@@@@@@@@@@@@"
"@@@@@@@@@EIIIIIJ@@@@@@@@@@@@@"
"@@@@@@@@@EIIIIIJ@@@@@@@@@@@@@"
"@@@@@@@@@D@@@@@B@@@@@@@@@@@@@"
"@@@@@@@@@D@@@@@B@@@@@@@@@@@@@"
"@@@@@@@@@EIIIIIJ@@@@@@@@@@@@@"
"@@@@@@@@@EIIIIIJ@@@@@@@@@@@@@"
"@@@@@@@@@D@@@@@B@@@@@@@@@@@@@"
"@@@@@@@@@D@@@@@B@@@@@@@@@@@@@"
"@@@@@@@@@EIIIIIJ@@@@@@@@@@@@@"
"@@@@@@@@@EIIIIIJ@@@@@@@@@@@@@"
"@@@@@@@@@D@@@@@B@@@@@@@@@@@@@"
"@@@@@@@@@D@@@@@B@@@@@@@@@@@@@"
"@@@@@@@@@EIIIIIJ@@@@@@@@@@@@@"
"@@@@@@@@@EIIIIIJ@@@@@@@@@@@@@"
"@@@@@@@@@D@@@@@B@@@@@@@@@@@@@"
"@@@@@@@@@D@@@@@B@@@@@@@@@@@@@"
"@@@@@@@@@EIIIIIJ@@@@@@@@@@@@@"
"@@@@@@@@@EIIIIIJ@@@@@@@@@@@@@"
"@@@@@@@@@D@@@@@B@@@@@@@@@@@@@"
"@@@@@@@@@D@@@@@B@@@@@@@@@@@@@"
"@@@@@@@@@EIIIIIJ@@@@@@@@@@@@@"
"@@@@@@@@@EIIIIIJ@@@@@@@@@@@@@"
"@@@@@@@@@D@@@@@B@@@@@@@@@@@@@"
"@@@@@@@@@D@@@@@B@@@@@@@@@@@@@"
"@@@@@@@@@EIIIIIJ@@@@@@@@@@@@@"
"@@@@@@@@@EIIIIIJ@@@@@@@@@@@@@"
"@@@@@@@@@D@@@@@B@@@@@@@@@@@@@"
"@@@@@@@@@D@@@@@B@@@@@@@@@@@@@"
"@@@@@@@@@GOOOOON@@@@@@@@@@@@@"
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@"
```

"@@@@AHL@CAL@OL@@@@@@@@@@@@@@@"
"@@@@AHL@CC@@C@@@@@@@@@@@@@@@@"
"@@@@AHLNCGL@C@OCNCLGH@@@@@@@@"
"@@@@AOLCCC@@CAIKCFFLH@@@@@@@@"
"@@@@AHLOCC@@CAIKCGNN@@@@@@@@@"
"@@@@AHMKCC@@CAIKCF@CH@@@@@@@@"
"@@@@AHMKCC@@CAIKCFFIH@@@@@@@@"
"@@@@AHLOKC@@C@OCCCLO@@@@@@@@@"
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@"))) (\TYPE BITMAP PLACEMENT (556 . 306) NAME LIGHT BITMAP {(READBITMAP)(101
57
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@"
"@@@@@@@@@COOOOO@@@@@@@@@@@@@@"
"@@@@@@@@@B@@@@@A@@@@@@@@@@@@@"
"@@@@@@@@@B@@@@@A@@@@@@@@@@@@@"
"@@@@@@@@@B@@@@@A@@@@@@@@@@@@@"
"@@@@@@@@@B@@@@@A@@@@@@@@@@@@@"
"@@@@@@@@@B@@@@@A@@@@@@@@@@@@@"
"@@@@@@@@@BBJH@@A@@@@@@@@@@@@@"
"@@@@@@@@@B@@@@@A@@@@@@@@@@@@@"
"@@@@@@@@@B@@@@@A@@@@@@@@@@@@@"
"@@@@@@@@@B@@@@@A@@@@@@@@@@@@@"
"@@@@@@@@@BBJH@@A@@@@@@@@@@@@@"
"@@@@@@@@@B@@@@@A@@@@@@@@@@@@@"
"@@@@@@@@@B@@@@@A@@@@@@@@@@@@@"
"@@@@@@@@@B@@@@@A@@@@@@@@@@@@@"
"@@@@@@@@@BBJJJJA@@@@@@@@@@@@@"
"@@@@@@@@@B@@@@@A@@@@@@@@@@@@@"
"@@@@@@@@@B@@@@@A@@@@@@@@@@@@@"
"@@@@@@@@@B@@@@@A@@@@@@@@@@@@@"
"@@@@@@@@@BBJJJJA@@@@@@@@@@@@@"
"@@@@@@@@@B@@@@@A@@@@@@@@@@@@@"
"@@@@@@@@@B@@@@@A@@@@@@@@@@@@@"
"@@@@@@@@@B@@@@@A@@@@@@@@@@@@@"
"@@@@@@@@@BBJJJJA@@@@@@@@@@@@@"
"@@@@@@@@@B@@@@@A@@@@@@@@@@@@@"
"@@@@@@@@@B@@@@@A@@@@@@@@@@@@@"
"@@@@@@@@@B@@@@@A@@@@@@@@@@@@@"
"@@@@@@@@@BBJJH@A@@@@@@@@@@@@@"
"@@@@@@@@@B@@@@@A@@@@@@@@@@@@@"
"@@@@@@@@@B@@@@@A@@@@@@@@@@@@@"
"@@@@@@@@@B@@@@@A@@@@@@@@@@@@@"
"@@@@@@@@@B@@@@@A@@@@@@@@@@@@@"
"@@@@@@@@@B@@@@@A@@@@@@@@@@@@@"
"@@@@@@@@@B@@@@@A@@@@@@@@@@@@@"
"@@@@@@@@@B@@@@@A@@@@@@@@@@@@@"
"@@@@@@@@@COOOOO@@@@@@@@@@@@@@"
"@@@@@@@@@@@@@@@@@@@@@@@@@@@@@"
"@@@@@@@@@@@@@@@@@@@@@@@@@@@@@"
"@@@@@@@@@@AH@@@@@@@@@@@@@@@@@"
"@@@@@@@@@LAH@F@@@@@@@@@@@@@@@"
"@@@@@@@@@L@@@F@F@@@@@@@@@@@@@"
"@@@@@@@@@LAIOGLOH@@@@@@@@@@@@"
"@@@@@@@@@LAKCFFF@@@@@@@@@@@@@"
"@@@@@@@@@LAKCFFF@@@@@@@@@@@@@"
"@@@@@@@@@LAKCFFF@@@@@@@@@@@@@"
"@@@@@@@@@LAKCFFF@@@@@@@@@@@@@"
"@@@@@@@@@OMIOFFCH@@@@@@@@@@@@"
"@@@@@@@@@@@@C@@@@@@@@@@@@@@@@"
"@@@@@@@@@@@@CC@@@@@@@@@@@@@@@"
"@@@@@@@@@@@@AN@@@@@@@@@@@@@@@"
"@@@@@@@@@@@@@@@@@@@@@@@@@@@@@"
"@@@@@@@@@@@@@@@@@@@@@@@@@@@@@"))) (\TYPE BITMAP PLACEMENT (453 . 306) NAME PHOTOGRAPH BITMAP {(READBITMAP)
(101 57
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@"
"@@@@@@@@@@@@@@@@@@@@@@@@@@@@@"
"@@@@@@@@@GOOOON@@@@@@@@@@@@@@"
"@@@@@@@@@D@@@@@B@@@@@@@@@@@@@"
"@@@@@@@@@D@@@@@B@@@@@@@@@@@@@"
"@@@@@@@@@D@@@@@B@@@@@@@@@@@@@"
"@@@@@@@@@EOOOOJ@@@@@@@@@@@@@@"

```
"@@@@@@@@@EOFIGAJ@@@@@@@@@@@@@@"
"@@@@@@@@@EOBLADJ@@@@@@@@@@@@@@"
"@@@@@@@@@EME@@EJ@@@@@@@@@@@@@@"
"@@@@@@@@@EL@@BOJ@@@@@@@@@@@@@@"
"@@@@@@@@@EOD@@@J@@@@@@@@@@@@@@"
"@@@@@@@@@EML@@HJ@@@@@@@@@@@@@@"
"@@@@@@@@@END@@@J@@@@@@@@@@@@@@"
"@@@@@@@@@EK@CL@J@@@@@@@@@@@@@@"
"@@@@@@@@@EK@GN@J@@@@@@@@@@@@@@"
"@@@@@@@@@ELDGN@J@@@@@@@@@@@@@@"
"@@@@@@@@@EL@GN@J@@@@@@@@@@@@@@"
"@@@@@@@@@E@AONCJ@@@@@@@@@@@@@@"
"@@@@@@@@@EKOGONJ@@@@@@@@@@@@@@"
"@@@@@@@@@EN@CL@J@@@@@@@@@@@@@@"
"@@@@@@@@@EH@CLAJ@@@@@@@@@@@@@@"
"@@@@@@@@@ELCOOLJ@@@@@@@@@@@@@@"
"@@@@@@@@@E@GOONJ@@@@@@@@@@@@@@"
"@@@@@@@@@EKOOOOJ@@@@@@@@@@@@@@"
"@@@@@@@@@E@OOOOJ@@@@@@@@@@@@@@"
"@@@@@@@@@EAOOOOJ@@@@@@@@@@@@@@"
"@@@@@@@@@EAOOOOJ@@@@@@@@@@@@@@"
"@@@@@@@@@ECMOOGJ@@@@@@@@@@@@@@"
"@@@@@@@@@ECMOOGJ@@@@@@@@@@@@@@"
"@@@@@@@@@EGIOOGJ@@@@@@@@@@@@@@"
"@@@@@@@@@EGIOOGJ@@@@@@@@@@@@@@"
"@@@@@@@@@EOOOOOJ@@@@@@@@@@@@@@"
"@@@@@@@@@D@@@@@B@@@@@@@@@@@@@@"
"@@@@@@@@@D@@@@@B@@@@@@@@@@@@@@"
"@@@@@@@@@D@@@@@B@@@@@@@@@@@@@@"
"@@@@@@@@@GOOOOON@@@@@@@@@@@@@@"
"@@@@@@@@@@@@@@@@@@@@@@@@@@@@@@"
"@@@@@@@@@@@@@@@@@@@@@@@@@@@@@@"
"@@@@@@@@@@@@@@@@@@@@@@@@@@@@@@"
"@@@@CNF@@@@@@@@@@@@@@AH@@@@@@@"
"@@@@CCF@@@L@@@@@@@@@@AH@@@@@@@"
"@@@@CCGLGIOCLGMOCHOIO@@@@@@@@@"
"@@@@CCFFLLLFFLMK@LLMIH@@@@@@@@"
"@@@@CNFFLLLFFLMHCLLMIH@@@@@@@@"
"@@@@C@FFLLLFFLMHFLLMIH@@@@@@@@"
"@@@@C@FFLLLFFLMHFLLMIH@@@@@@@@"
"@@@@C@FFGHGCLGMHCNOIIH@@@@@@@@"
"@@@@@@@@@@@@@L@@@L@@@@@@@@@@@@"
"@@@@@@@@@@@@LL@@@L@@@@@@@@@@@@"
"@@@@@@@@@@@@GH@@@L@@@@@@@@@@@@"
"@@@@@@@@@@@@@@@@@@@@@@@@@@@@@@"
"@@@@@@@@@@@@@@@@@@@@@@@@@@@@@@"))) (\TYPE BITMAP PLACEMENT (350 . 306) NAME PASTE.UP BITMAP {(READBITMAP)(1
01 57
"@@@@@@@@@@@@@@@@@@@@@@@@@@@@@@"
"@@@@@@@@@@@@@@@@@@@@@@@@@@@@@@"
"@@@@@@@@@@@@@@@@@@@@@@@@@@@@@@"
"@@@@@@@@@@@@@@@@@@@@@@@@@@@@@@"
"@@@@@@@@@@@@@@@@@@@@@@@@@@@@@@"
"@@@@@@@@@@@@@@@@@@@@@@@@@@@@@@"
"@@@@@@@@@GOOOOON@@@@@@@@@@@@@@"
"@@@@@@@@@D@@@@@B@@@@@@@@@@@@@@"
"@@@@@@@@@D@@@@@B@@@@@@@@@@@@@@"
"@@@@@@@@@D@@@@@B@@@@@@@@@@@@@@"
"@@@@@@@@@D@@@@@B@@@@@@@@@@@@@@"
"@@@@@@@@@DGOO@@B@@@@@@@@@@@@@@"
"@@@@@@@@@DD@AGNB@@@@@@@@@@@@@@"
"@@@@@@@@@DD@A@@B@@@@@@@@@@@@@@"
"@@@@@@@@@DD@A@@B@@@@@@@@@@@@@@"
"@@@@@@@@@DD@AGNB@@@@@@@@@@@@@@"
"@@@@@@@@@DD@A@@B@@@@@@@@@@@@@@"
"@@@@@@@@@DGOO@@B@@@@@@@@@@@@@@"
"@@@@@@@@@D@@@@@B@@@@@@@@@@@@@@"
"@@@@@@@@@D@@@@@B@@@@@@@@@@@@@@"
"@@@@@@@@@DGOOONB@@@@@@@@@@@@@@"
"@@@@@@@@@D@@@@@B@@@@@@@@@@@@@@"
"@@@@@@@@@D@@@@@B@@@@@@@@@@@@@@"
"@@@@@@@@@DGOO@@B@@@@@@@@@@@@@@"
"@@@@@@@@@DD@AGNB@@@@@@@@@@@@@@"
"@@@@@@@@@DD@A@@B@@@@@@@@@@@@@@"
"@@@@@@@@@DD@A@@B@@@@@@@@@@@@@@"
"@@@@@@@@@DD@A@@B@@@@@@@@@@@@@@"
"@@@@@@@@@DD@AGNB@@@@@@@@@@@@@@"
"@@@@@@@@@DGOO@@B@@@@@@@@@@@@@@"
"@@@@@@@@@D@@@@@B@@@@@@@@@@@@@@"
"@@@@@@@@@D@@@@@B@@@@@@@@@@@@@@"
"@@@@@@@@@DGOOONB@@@@@@@@@@@@@@"
"@@@@@@@@@D@@@@@B@@@@@@@@@@@@@@"
"@@@@@@@@@D@@@@@B@@@@@@@@@@@@@@"
"@@@@@@@@@D@@@@@B@@@@@@@@@@@@@@"
"@@@@@@@@@D@@@@@B@@@@@@@@@@@@@@"
"@@@@@@@@@D@@@@@B@@@@@@@@@@@@@@"
"@@@@@@@@@D@@@@@B@@@@@@@@@@@@@@"
"@@@@@@@@@D@@@@@B@@@@@@@@@@@@@@"
```

```
"@@@@@@@@@GOOOOON@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@AO@@@@@@@@@AHL@@@@@@@@@"
"@@@@@AIH@@@L@@@AHL@@@@@@@@@@"
"@@@@@AIILCMOCL@AHMO@@@@@@@@@"
"@@@@@AIHFFDLFFGMHMIH@@@@@@@@"
"@@@@@AOANG@LGNGMHMIH@@@@@@@@"
"@@@@@AHCFALLF@@AHMIH@@@@@@@@"
"@@@@@AHCFDLLFF@AHMIH@@@@@@@@"
"@@@@@AHAOGHGCL@@OIO@@@@@@@@@"
"@@@@@@@@@@@@@@@@AH@@@@@@@@@@"
"@@@@@@@@@@@@@@@@AH@@@@@@@@@@"
"@@@@@@@@@@@@@@@@AH@@@@@@@@@@"
"@@@@@@@@@@@@@@@@@@@@@@@@@@@@"
"@@@@@@@@@@@@@@@@@@@@@@@@@@@@")}) (\TYPE BITMAP PLACEMENT (246 . 306) NAME COLORED BITMAP {(READBITMAP)(10
1 57
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@GOOOOON@@@@@@@@@@@@"
"@@@@@@@@@EEEEEEF@@@@@@@@@@@@"
"@@@@@@@@@FJJJJJJ@@@@@@@@@@@@"
"@@@@@@@@@EEEEEEF@@@@@@@@@@@@"
"@@@@@@@@@FJJJJJJ@@@@@@@@@@@@"
"@@@@@@@@@EEEEEEF@@@@@@@@@@@@"
"@@@@@@@@@FJJJJJJ@@@@@@@@@@@@"
"@@@@@@@@@EEEEEEF@@@@@@@@@@@@"
"@@@@@@@@@FJJJJJJ@@@@@@@@@@@@"
"@@@@@@@@@EEEEEEF@@@@@@@@@@@@"
"@@@@@@@@@FJJJJJJ@@@@@@@@@@@@"
"@@@@@@@@@EEEEEEF@@@@@@@@@@@@"
"@@@@@@@@@FJJJJJJ@@@@@@@@@@@@"
"@@@@@@@@@EEEEEEF@@@@@@@@@@@@"
"@@@@@@@@@FJJJJJJ@@@@@@@@@@@@"
"@@@@@@@@@EEEEEEF@@@@@@@@@@@@"
"@@@@@@@@@FJJJJJJ@@@@@@@@@@@@"
"@@@@@@@@@EEEEEEF@@@@@@@@@@@@"
"@@@@@@@@@FJJJJJJ@@@@@@@@@@@@"
"@@@@@@@@@EEEEEEF@@@@@@@@@@@@"
"@@@@@@@@@FJJJJJJ@@@@@@@@@@@@"
"@@@@@@@@@EEEEEEF@@@@@@@@@@@@"
"@@@@@@@@@FJJJJJJ@@@@@@@@@@@@"
"@@@@@@@@@EEEEEEF@@@@@@@@@@@@"
"@@@@@@@@@FJJJJJJ@@@@@@@@@@@@"
"@@@@@@@@@EEEEEEF@@@@@@@@@@@@"
"@@@@@@@@@FJJJJJJ@@@@@@@@@@@@"
"@@@@@@@@@EEEEEEF@@@@@@@@@@@@"
"@@@@@@@@@FJJJJJJ@@@@@@@@@@@@"
"@@@@@@@@@EEEEEEF@@@@@@@@@@@@"
"@@@@@@@@@FJJJJJJ@@@@@@@@@@@@"
"@@@@@@@@@EEEEEEF@@@@@@@@@@@@"
"@@@@@@@@@FJJJJJJ@@@@@@@@@@@@"
"@@@@@@@@@EEEEEEF@@@@@@@@@@@@"
"@@@@@@@@@GOOOOON@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@CN@@L@@@@@AH@@@@@@@@@"
"@@@@@@@FC@@L@@@@@AH@@@@@@@@@"
"@@@@@@@FCCLLOCNGHOH@@@@@@@@@"
"@@@@@@@F@FFMIKFLMIH@@@@@@@@@"
"@@@@@@@F@FFMIK@OMIH@@@@@@@@@"
"@@@@@@@FCFFMIK@LAIH@@@@@@@@@"
"@@@@@@@FCFFMIK@LMIH@@@@@@@@@"
"@@@@@@@CNCLLOC@GHOH@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@")}) (\TYPE BITMAP PLACEMENT (556 . 367) NAME VENTURE BITMAP {(READBITMAP)(33
5 168
"@@@@@@@@@@@@@@@@@@@@@@@@@@@@@@@@@@COOOOOOOOOOO@@@@@@@@@@@@@@@@@@@@@@@@@@@@@@@@@@"
"@@@@@@@@@@@@@@@@@@@@@@@@@@@@@@@@@@GOOOOOOOOOOOH@@@@@@@@@@@@@@@@@@@@@@@@@@@@@@@@@"
"@@@@@@@@@@@@@@@@@@@@@@@@@@@@@@@@@@N@@@@@@@@@@AL@@@@@@@@@@@@@@@@@@@@@@@@@@@@@@@@@"
"@@@@@@@@@@@@@@@@@@@@@@@@@@@@@@@@@@OOOOOOOOOOOOL@@@@@@@@@@@@@@@@@@@@@@@@@@@@@@@@@"
"@@@@@@@@@@@@@@@@@@@@@@@@@@@@@@@@@@L@@@@@@@@@@@L@@@@@@@@@@@@@@@@@@@@@@@@@@@@@@@@@"
"@@@@@@@@@@@@@@@@@@@@@@@@@@@@@@@@@@L@@@@@@@@@@@L@@@@@@@@@@@@@@@@@@@@@@@@@@@@@@@@@"
"@@@@@@@@@@@@@@@@@@@@@@@@@@@@@@@@@@L@@@@@@@@@@@L@@@@@@@@@@@@@@@@@@@@@@@@@@@@@@@@@"
"@@@@@@@@@@@@@@@@@@@@@@@@@@@@@@@@@@L@@@@@@@@@@@L@@@@@@@@@@@@@@@@@@@@@@@@@@@@@@@@@"
"@@@@@@@@@@@@@@@@@@@@@@@@@@@@@@@@@@LAOOOOOOOON@L@@@@@@@@@@@@@@@@@@@@@@@@@@@@@@@@@"
"@@@@@@@@@@@@@@@@@@@@@@@@@@@@@@@@@@LBOOOOOOOOM@L@@@@@@@@@@@@@@@@@@@@@@@@@@@@@@@@@"
"@@@@@@@@@@@@@@@@@@@@@@@@@@@@@@@@@@LBOOOOOOOOM@L@@@@@@@@@@@@@@@@@@@@@@@@@@@@@@@@@"
```

```
"@@@@@@@@@@@@@@@@@@@@@@@@@@@@@@@@@@@@@@LBOOOOOOOOM@L@@@@@@@@@@@@@@@@@@@@@@@@@@@@@@@@@@@@@@@"
"@@@@@@@@@@@@@@@@@@@@@@@@@@@@@@@@@@@@@@LBKFJJJMKFM@L@@@@@@@@@@@@@@@@@@@@@@@@@@@@@@@@@@@@@@@"
"@@@@@@@@@@@@@@@@@@@@@@@@@@@@@@@@@@@@@@LBOH@KOOOOE@L@@@@@@@@@@@@@@@@@@@@@@@@@@@@@@@@@@@@@@@"
"@@@@@@@@@@@@@@@@@@@@@@@@@@@@@@@@@@@@@@LBM@BNKKFMM@L@@@@@@@@@@@@@@@@@@@@@@@@@@@@@@@@@@@@@@@"
"@@@@@@@@@@@@@@@@@@@@@@@@@@@@@@@@@@@@@@LBKLGOOOMOE@L@@@@@@@@@@@@@@@@@@@@@@@@@@@@@@@@@@@@@@@"
"@@@@@@@@@@@@@@@@@@@@@@@@@@@@@@@@@@@@@@LBNKOOOOOJM@L@@@@@@@@@@@@@@@@@@@@@@@@@@@@@@@@@@@@@@@"
"@@@@@@@@@@@@@@@@@@@@@@@@@@@@@@@@@@@@@@LBKOOOOOOOE@L@@@@@@@@@@@@@@@@@@@@@@@@@@@@@@@@@@@@@@@"
"@@@@@@@@@@@@@@@@@@@@@@@@@@@@@@@@@@@@@@LBNOOOOOOOM@L@@@@@@@@@@@@@@@@@@@@@@@@@@@@@@@@@@@@@@@"
"@@@@@@@@@@@@@@@@@@@@@@@@@@@@@@@@@@@@@@LBKOOOOOOOM@L@@@@@@@@@@@@@@@@@@@@@@@@@@@@@@@@@@@@@@@"
"@@@@@@@@@@@@@@@@@@@@@@@@@@@@@@@@@@@@@@LBOOOOOOOOM@L@@@@@@@@@@@@@@@@@@@@@@@@@@@@@@@@@@@@@@@"
"@@@@@@@@@@@@@@@@@@@@@@@@@@@@@@@@@@@@@@LBOOOOOOOOM@L@@@GOOOOOOOOOOOOOOOOOOOOOOOOOH@@@@@@@@@"
"@@@@@@@@@@GOOOOOOOOOOOOOOON@@@@@@@@@@@LBOOOOOOOOM@L@@@OOOOOOOOOOOOOOOOOOOOOOOOOOL@@@@@@@@@"
"@@@@@@@@@@AOOOOOOOOOOOOOOOH@@@@@@@@@@@LBOOOOOOOOM@L@@AL@@@@@@@@@@@@@@@@@@@@@@@@@N@@@@@@@@@"
"@@@@@@@@@@AL@@@@@@@@@@@@@CL@@@@@@@@@@@LBOOOOOOOOM@L@@CD@@@@@@@@@@@@@@@@@@@@@@@@@F@@@@@@@@@"
"@@@@@@@@@@CH@@@@@@@@@@@@@BG@@@@@@@@@@@LBOOOOOOOOM@L@@FD@@@@@@@@@@@@@@@@@@@@@@@@@C@@@@@@@@@"
"@@@@@@@@@@C@@@@@@@@@@@@@@BCH@@@@@@@@@@LBOOOOOOOOM@L@@LB@@@@@@@@@@@@@@@@@@@@@@@@CH@@@@@@@@@"
"@@@@@@@@@@G@@@@@@@@@@@@AOL@@@B@L@@@@@@LBOOOOOOOOM@L@@LB@@@@@@@@@@@@@@@@@@@@@@@@AL@@@@@@@@@"
"@@@@@@@@@@N@@@@@@@@@@@@COL@@@B@L@@@@@@LBOOOOOOOOM@L@@LB@@@@@@@@@@@@@@@@@@@@@@@@@N@@@@@@@@@"
"@@@@@@OOOOOOOOOOOOOOOOOO@GOOON@L@@@@@@LBOOOOOOOOM@L@@LB@@@@@@@@COOOOOOOOOOOOOOOOOOOOOL@@@@"
"@@@@@AOOOOL@@@@@A@@@@@C@D@CHL@@@@@@LBOOOOOOOOM@L@@LA@@@@@@@@@C@@@@@@@@@@@@@@@GOOOON@@@@"
"@@@@@CH@@CH@@@@@A@@@@@C@D@@@@BDL@@@@@@LBOOOOOOOOM@L@@LA@@@@@@@@@C@@@@@@@@@@@@@G@F@@@@G@@@@"
"@@@@@G@@@@C@@@@@@B@@@@C@D@@@@BCL@@@@@@LC@@@@@@@@C@L@@LA@@@@@@@@@C@@@@@@@@@@@@CIHF@@@@CH@@@"
"@@@@@N@@@@G@@@@@@CA@@@C@D@@@@B@MOOOOOOLC@@@@@@@@C@OONJ@H@@@@@@@@AH@@@@@@@@@@CLALF@@@@CH@@@"
"@@@@AL@@@@N@@@@@@EA@@@CN@H@@@B@MOOOOOOLCOOOOOOOOOO@OOOJ@H@@@@@@@AH@@@@@@@@@CL@NLF@@@@AL@@@"
"@@@@CH@@@L@@@@@EC@GLF@H@@@B@MH@@@@@L@@@@@@@@@@@@L@AJ@H@@@@@@@@AH@@@@@@@@@CL@O@OF@@@@@@N@@@"
"@@@@COOOOL@@@@@FCGH@F@H@@@B@MH@@@@@L@@@@@@@@@@@L@AJ@H@@@@@@@@L@@@@@@AL@O@GOO@@@@@@N@@@"
"@@@@C@@@AH@@@@@JCL@@F@H@@@B@MH@@@@@L@@@@@@@@@@@L@AJ@D@@@@@@@@L@@@@@@G@O@GOIK@@@@@@G@@@"
"@@@@C@@@CH@@@@@JF@@@F@H@@@B@MH@@@@@L@@@@@@@@@@@L@AI@D@@@@@@@@L@@@@@AIG@GOH@KH@@@@CH@@@"
"@@@@C@@@G@@@@@@LF@@@LA@@@@B@MH@@@@@L@@@@@@@@@@@L@@I@D@@@@@@@@F@@@@@F@HGOH@CMH@@@@CH@@@"
"@@@@C@@@F@@@@@ADF@@@OO@@@@B@MH@@@@@OOOOOOOOOOOOL@@I@B@@@@@@@@F@@@@AH@OOH@GLML@@@@AL@@@"
"@@@@COOON@@@@@ADL@@@LA@@@@B@MH@@@@@L@@@@@@@@@@@L@@I@B@@@@@@@@GOOOON@@GH@OH@LL@@@@@L@@@"
"@@@@F@@@OOOOOONHL@@@LAOOOON@OH@@@@@GOOOOOOOOOOOOH@@HHB@@@@@@@C@@@@A@@DAO@@@LN@@@@@N@@@"
"@@@@L@@AH@@@@@BOL@@@LA@@@@CHOH@@@@@COOOOOOOOOOOO@@@DHB@@@@@@@COOOOOOON@@@@LG@@@@@G@@"
"@@@AON@COOOOOONHOOOOLAOOOONDEOOOOOOOOOOOOOOOOOOOOOOLHAOOOOOOOOOOOOOOOOOOOOOOOLC@@@@@C@@"
"@@@AHD@C@@@@@@BOOOOOOO@@@@AKE@@@@@@@JJJJJJJJJJ@@@DDB@@@@@@@B@@@@@@@@@@@@@@@CH@@@@CH@"
"@@OOOOOO@@@@@@BH@@@@@A@@@@@DM@@CN@@@EEEEEEEEEED@@@DDD@@@@@@@B@@@@@@@@@@@@@@@@AH@@@@AL@"
"@AOOOOOO@@@@@@C@@@@@@A@@@@@CE@CLB@@@BJJJJJJJJH@@@DDH@@@@@@@@B@@@@@@@@@@@@@@@AL@@@@@L@"
"@C@@@@@COOOOOOOOOOOOOO@@@@@@MCLCJ@@@@@@@@@@@@@@@@@@DE@@@@@@@@@B@@@@@@@@@@@@@@@@L@@@@@N@"
"@F@@@@@C@@@@@@@@@@@@@@@@@@@@GLCLN@@@@@@@@@@@@@@@@@@DF@@@@@@@@@COOOOOOOOOOOOOOOL@@@@@G@"
"@OOOOOOO@@@@@@@@@@@@@@@@@@@@@DCL@M@@@@@@@@@@@@@@@@@@DD@@@@@@@@@@@@@@@@@@@@@@@@@@L@@@@@C@"
"@L@@@@@C@@@@@@@AOOOO@@@@@@@@@GL@@N@@@@@@@@@@@@@@@@@@DD@@@GOOON@@@@@@@@@@@@@@@@@L@@@@@CH"
"@L@@@@@C@@@@@@@A@@@A@@@@@@@@@D@@@M@@@@@@@@@@@@@@@@@@DD@@@D@@@B@@@@@@@@@@@@@@@@@L@@@@@AH"
"@L@@@@@COOOOOOONOOONOOOOOOOOOL@OOOOOOOOOOOOOOOOOOOOOLGOOOKOOOMOOOOOOOOOOOOOOOOOOOOOOOOH"
"@L@@@@@AOOOOOOOOOOOOOOOOOOOOOL@O@M@@@@@@@@@@@@@@@@@@DGOOOOOOOOOOOOOOOOOOOOOOOOOOOL@@@@@AH"
"@L@@@@@@CEEEEEEEEEEEEEEEEEEEEDO@ONH@@@@@@@@@@@@@@@@@@DEEEEEEEEEEEEEEEEEEEEEEEEEE@@@@@@AH"
"@L@@@@@@BJJJJJJJJJJJJJJJJJJJG@OOM@@@@@@@@@@@@@@@@@@DDJJJJJJJJJJJJJJJJJJJJJJJJJ@@@@@@@AH"
"@L@@@@@@B@@@@@@@@@@@@@@@@@@@@DOOJJH@@@@@@@@@@@@@@@@@@DD@@@@@@@@@@@@@@@@@@@@@@@@@@@@@@@AH"
"AOOOOOOON@@@@@@@@@@@@@@@@@@@@@GOMEE@@@@@@@@@@@@@@@@@@@BD@@@@@@@@@@@@@@@@@@@@@@@@@@@@@@AL"
"CH@@@@@AGOOOOOOOOOOOOOOOOOOOOOOJJJ@@@@@@@@@@@@@@@@@@@@BGOOOOOOOOOOOOOOOOOOOOOOOOOOOOOOOL"
"G@@@@@@BH@@@@@@@@@@@@@@@@@@@@@@GED@@@@@@@@@@@@@@@@@@@@BD@@@@@@@@@@@@@@@@@@@@@@@@@@@@@@N"
"F@@@@@@E@@@@@@@@@@@@@@@@@@@@@@@FH@@@@@@@@@@@@@@@@@@@@AB@@@@@@@@@@@@@@@@@@@@@@@@@@@@@@@F"
"OOOOOOOIOOOOOOOOOOOOOOOOOOOOOOOOOOOOOOOOOOOOOOCOOOOOOOOOOOOOOOOOOOOOOOOOOOOOOOOOOON"
"L@@@@@@I@@@@@@@@@@@@@@@@@@@@@@D@@@@@@@@@@@@@@@@@@@@@@AN@@@@@@@@@@@@@@@@@@@@@@@@@@@@@@@@@@F"
"L@@@@@@I@@@@@@@@@@@@@@@@@@@@@@D@@@@@@@@@@@@@@@@@@@@@@AB@@@@@@@@@@@@@@@@@@@@@@@@@@@@@@@@@@F"
"L@@@@@@I@@@@@@@@@@@@@@@@@@@@@@D@@@@@@@@@@@@@@@@@@@@@@AB@@@@@@@@@@@@@@@@@@@@@@@@@@@@@@@@@@F"
"L@@@@@@I@@@@@@@@@@@@@@@@@@@@@@D@@@@@@@@@@@@@@@@@@@@@@AB@@@@@@@@@@@@@@@@@@@@@@@@@@@@@@@@@@F"
"L@@@@@@I@@@@@@@@@@@@@@@@@@@@@@D@@@@@@@@@@@@@@@@@@@@@@AB@@@@@@@@@@@@@@@@@@@@@@@@@@@@@@@@@@F"
"L@@@@@@I@@@@@@@@@@@@@@@@@@@@@@D@@@@@@@@@@@@@@@@@@@@@@AB@@@@@@@@@@@@@@@@@@@@@@@@@@@@@@@@@@F"
"OOOOOOOIOOOOOOOOOOOOOOOOOOOOOOOOOOOOOOOOOOOOOOCOOOOOOOOOOOOOOOOOOOOOOOOOOOOOOOOOOON"
"L@@@@@@I@@@@@@@@@@@@@@@@@@@@@@D@@@@@@@@@@@@@@@@@@@@@@AB@@@@@@@@@@@@@@@@@@H@@@@@@@@@@@@@@@F"
"L@@@@@@I@@@@@@@@@@@@@@@@@@@@@@D@@@@@@@@@@@@@@@@@@@@@@AB@@@@@@@@@@@@@@@@@@H@@@@@@@@@@@@@@@F"
"L@@@@@@I@@@@@@@@@@@@@@@@@@@@@@D@@@@@@@@@@@@@@@@@@@@@@AB@@@@@@@@@@@@@@@@@@H@@@@@@@@@@@@@@@F"
"L@@@@@@I@@@@@@@@@@@@@@@@@@@@@@D@@@@@@@@@@@@@@@@@@@@@@AB@@@@@@@@@@@@@@@@@@H@@@@@@@@@@@@@@@F"
"L@@@@@@I@@@@@@@@@@@@@@@@@@@@@@D@@@@@@@@@@@@@@@@@@@@@@AB@@@@@@@@@@@@@@@@@@H@@@@@@@@@@@@@@@F"
"L@@@@@@I@@@@@@@@@@@@@@@@@@@@@@D@@@@@@@@@@@@@@@@@@@@@@AB@@@@@@@@@@@@@@@@@@H@@@@@@@@@@@@@@@F"
"L@AOOOHI@@@@@@@@@@@@@@@@@@@@@@D@COOON@@@@@@@@@@@@@@@@AB@@@@@@@@@@@@@@@@@@H@@@@@@@@@@@@@@@F"
"L@A@@HI@@@@@@@@@@@@@@@@@@@@@@D@B@@@B@@@@@@@@@@@@@@@@AB@@@@@@@@@@@AOOON@H@@@@@@@@@@@@@@@F"
"L@A@@HI@@@@@@@@@@@@@@@@@@@@@@D@B@@@B@@@@@@@@@@@@@@@@AB@@@@@@@@@@@A@@@B@H@@@@@@@@@@@@@@@F"
"L@AOOOHI@@@@@@@@@@@@@@@@@@@@@@D@COOON@@@@@@@@@@@@@@@@AB@@@@@@@@@@@A@@@B@H@@@@@@@@@@@@@@@F"
"L@A@@HI@@@@@@@@@@@@@@@@@@@@@@D@B@@@F@@@@@@@@@@@@@@@@AB@@@@@@@@@@@AOOON@H@@@@@@@@@@@@@@@F"
"L@AOOOHI@@@@@@@@@@@@@@@@@@@@@@D@COOON@@@@@@@@@@@@@@@@AB@@@@@@@@@@@A@@@B@H@@@@@@@@@@@@@@@F"
"L@@@@@@I@@@@@@@@@@@@@@@@@@@@@@D@@@@@@@@@@@@@@@@@@@@@@AB@@@@@@@@@@@AOOON@H@@@@@@@@@@@@@@@F"
"L@@@@@@I@@@@@@@@@@@@@@@@@@@@@@D@@@@@@@@@@@@@@@@@@@@@@AB@@@@@@@@@@@@@@@@@@H@@@@@@@@@@@@@@@F"
"L@@@@@@I@@@@@@@@@@@@@@@@@@@@@@D@@@@@@@@@@@@@@@@@@@@@@AB@@@@@@@@@@@@@@@@@@H@@@@@@@@@@@@@@@F"
"L@@@@@@I@@@@@@@@@@@@@@@@@@@@@@D@@@@@@@@@@@@@@@@@@@@@@AB@@@@@@@@@@@@@@@@@@H@@@@@@@@@@@@@@@F"
"L@@@@@@I@@@@@@@@@@@@@@@@@@@@@@D@@@@@@@@@@@@@@@@@@@@@@AB@@@@@@@@@@@@@@@@@@H@@@@@@@@@@@@@@@F"
"L@@@@@@I@@@@@@@@@@@@@@@@@@@@@@D@@@@@@@@@@@@@@@@@@@@@@AB@@@@@@@@@@@@@@@@@@H@@@@@@@@@@@@@@@F"
"L@@@@@@I@@@@@@@@@@@@@@@@@@@@@@D@@@@@@@@@@@@@@@@@@@@@@AB@@@@@@@@@@@@@@@@@@H@@@@@@@@@@@@@@@F"
"L@@@@@@I@@@@@@@@@@@@@@@@@@@@@@D@@@@@@@@@@@@@@@@@@@@@@AB@@@@@@@@@@@@@@@@@@H@@@@@@@@@@@@@@@F"
"L@@@@@@I@@@@@@@@@@@@@@@@@@@@@@D@@@@@@@@@@@@@@@@@@@@@@AB@@@@@@@@@@@@@@@@@@H@@@@@@@@@@@@@@@F"
"L@@@@@@I@@@@@@@@@@@@@@@@@@@@@@D@@@@@@@@@@@@@@@@@@@@@@AB@@@@@@@@@@@@@@@@@@H@@COOOOOOO@@@@F"
"L@@@@@@I@@@@@@@@@@@@@@@@@@@@@@D@@@@@@@@@OOOOOOOOON@@@AB@@@@@@@@@@@@@@@@@@H@@B@@@@@@C@@@@F"
"L@@@@@@I@@@@@@@@@@@@@@@@@@@@@@D@@@@@@@@@H@@@@@@@B@@@AB@@@@@@@@@@@@@@@@@@H@@COOOOOM@@@@F"
"L@@@@@@I@@@@@@@@@@@@@@@@@@@@@@D@@@@@@@@@H@@@@@@@B@@@AB@@@@@@@@@@@@@@@@@@H@@COOOOOM@@@@F"
"L@@@@@@I@@@@@@@@@@@@@@@@@@@@@@D@@@@@@@@@H@COOOO@@B@@@AB@@@@@@@@@@@@@@@@@@H@@COOOOOM@@@@F"
"L@@@@@@I@@@@@@@@@@@@@@@@@@@@@@D@@@@@@@@@H@B@@@A@@B@@@AB@@@@@@@@@@@@@@@@@@H@@COOOOOM@@@@F"
```

```
"L@@@@@@I@@@@@@@@@@@@@@@@@@@@@D@@@@@@@@H@B@@@A@@B@@@AB@@@@@@@@@@@@@@@@@@@H@@COOOOOOM@@@@F"
"L@@@@@@I@@@@@@@@@@@@@@@@@@@@@D@@@@@@@@H@B@@@A@@B@@@AB@@@@@@@@@@@@@@@@@@@H@@COOOOOOM@@@@F"
"L@@@@@@I@@@@@@@@@@@@@@@@@@@@@D@@@@@@@@H@COOOO@@B@@@AB@@@@@@@@@@@@@@@@@@@H@@COOOOOOM@@@@F"
"L@@@@@@I@@@@@@@@@@@@@@@@@@@@@D@@@@@@@@H@@@@@@@@B@@@AB@@@@@@@@@@@@@@@@@@@H@@COOOOOOM@@@@F"
"L@@@@@@I@@@@@@@@@@@@@@@@@@@@@D@@@@@@@@H@@@@@@@@B@@@AB@@@@@@@@@@@@@@@@@@@H@@COOOOOOM@@@@F"
"L@@@@@@I@@@@@@@@@@@@@@@@@@@@@D@@@@@@@@H@@@@@@@@B@@@AB@@@@@@@@@@@@@@@@@@@H@@COOOOOOM@@@@F"
"L@@@@@@I@@@@@@@@@@@@@@@@@@@@@D@@@@@@@@H@@@@@@@@B@@@AB@@@@@@@@@@@@@@@@@@@H@@COOOOOOM@@@@F"
"L@@@@@@I@@@@@@@@@@@@@@@@@@@@@D@@@@@@@@H@@@@@@@@B@@@AB@@@@@@@@@@@@@@@@@@@H@@COOOOOOM@@@@F"
"L@@@@@@I@@@@@@@@@@@@@@@@@@@@@D@@@@@@@@H@@@@@@@@B@@@AB@@@@@@@@@@@@@@@@@@@H@@COOOOOOM@@@@F"
"L@@@@@@I@@@@@@@@@@@@@@@@@@@@@D@@@@@@@@H@@@@@@@@B@@@AB@@@@@@@@@@@@@@@@@@@H@@COOOOOOM@@@@F"
"L@@@@@@I@@@@@@@@@@@@@@@@@@@@@D@@@@@@@@H@@@@@@@@B@@@ACOOOOOOOOOOOOOOOOOOH@@COOOOOOM@@@@F"
"L@@@@@@I@@@@@@@@@@@@@@@@@@@@@D@@@@@@@@H@@@@@@@@B@@@AB@@@B@@@@@@@@@@@@@@H@@COOOOOOM@@@@F"
"L@@@@@@I@@@@@@@@@@@@@@@@@@@@@D@@@@@@@@H@@@@@@@@B@@@AB@@@B@@@@@@@@@@@@@@H@@COOOOOOM@@@@F"
"L@@@@@@I@@@@@@@@@@@@@@@@@@@@@D@@@@@@@@H@@@@@@@@B@@@AB@@@B@@@@@@@@@@@@@@H@@COOOOOOM@@@@F"
"L@@@@@@I@@@@@@@@@@@@@@@@@@@@@D@@@@@@@@H@@@@@@@@B@@@AB@@@B@@@@@@@@@@@@@@H@@COOOOOOM@@@@F"
"L@@@@@@I@@@@@@@@@@@@@@@@@@@@@D@@@@@@@@H@@@@@@@@B@@@AB@@@B@@@@@@@@@@@@@@H@@COOOOOOM@@@@F"
"L@@@@@@I@@@@@@@@@@@@@@@@@@@@@D@@@@@@@@OOOOOOOON@@@AB@@@B@@@@@@@@@@@@@@H@@COOOOOOM@@@@F"
"L@@@@@@I@@@@@@@@@@@@@@@@@@@@@D@@@@@@@@H@@@@@@@@B@@@AB@@@B@@@@@@@@@@@@@@H@@COOOOOOM@@@@F"
"L@@@@@@I@@@@@@@@@@@@@@@@@@@@@D@@@@@@@@H@@@@@@@@B@@@AB@@@B@@@OOOOO@@@@@@H@@COOOOOOM@@@@F"
"L@@@@@@I@@@@@@@@@@@@@@@@@@@@@D@@@@@@@@H@COOOO@@B@@@AB@@@B@@@H@@@A@@@@H@@COOOOOOM@@@@F"
"L@@@@@@I@@@@@@@@@@@@@@@@@@@@@D@@@@@@@@H@B@@@A@@B@@@AB@@@B@@@H@@@A@@@@H@@COOOOOOM@@@@F"
"L@@@@@@I@@@@@@@@@@@@@@@@@@@@@D@@@@@@@@H@B@@@A@@B@@@AB@@@B@@@H@@@A@@@@H@@COOOOOOM@@@@F"
"L@@@@@@I@@@@@@@@@@@@@@@@@@@@@D@@@@@@@@H@B@@@A@@B@@@AB@@@B@@@OOOOO@@@@H@@COOOOOOM@@@@F"
"L@@@@@@I@@@@@@@@@@@@@@@@@@@@@D@@@@@@@@H@COOOO@@B@@@AB@@@B@@@@@@@@@@@@@@H@@COOOOOOM@@@@F"
"L@@@@@@I@@@@@@@@@@@@@@@@@@@@@D@@@@@@@@H@@@@@@@@B@@@AB@@@B@@@@@@@@@@@@@@H@@COOOOOOM@@@@F"
"L@@@@@@I@@@@@@@@@@@@@@@@@@@@@D@@@@@@@@H@@@@@@@@B@@@AB@@@B@@@@@@@@@@@@@@H@@COOOOOOM@@@@F"
"L@@@@@@I@@@@@@@@@@@@@@@@@@@@@D@@@@@@@@H@@@@@@@@B@@@AB@@@B@@@@@@@@@@@@@@H@@COOOOOOM@@@@F"
"L@@@@@@I@@@@@@@@@@@@@@@@@@@@@D@@@@@@@@H@@@@@@@@B@@@AB@@@B@@@@@@@@@@@@@@H@@COOOOOOM@@@@F"
"L@@@@@@I@@@@@@@@@@@@@@@@@@@@@D@@@@@@@@H@@@@@@@@B@@@AB@@@B@@@@@@@@@@@@@@H@@COOOOOOM@@@@F"
"L@@@@@@I@@@@@@@@@@@@@@@@@@@@@D@@@@@@@@H@@@@@@@@B@@@AB@@@B@@@@@@@@@@@@@@H@@COOOOOOM@@@@F"
"L@@@@@@I@@@@@@@@@@@@@@@@@@@@@D@@@@@@@@H@@@@@@@@B@@@AB@@@B@@@@@@@@@@@@@@H@@COOOOOOM@@@@F"
"L@@@@@@I@@@@@@@@@@@@@@@@@@@@@D@@@@@@@@H@@@@@@@@B@@@AB@@@B@@@@@@@@@@@@@@H@@COOOOOOM@@@@F"
"L@@@@@@I@@@@@@@@@@@@@@@@@@@@@D@@@@@@@@H@@@@@@@@B@@@AB@@@B@@@@@@@@@@@@@@H@@B@@@@@@@C@@@@F"
"L@@@@@@I@@@@@@@@@@@@@@@@@@@@@D@@@@@@@@H@@@@@@@@B@@@AB@@@B@@@@@@@@@@@@@@H@@B@@@@@@@C@@@@F"
"L@@@@@@I@@@@@@@@@@@@@@@@@@@@@D@@@@@@@@H@@@@@@@@B@@@AB@@@B@@@@@@@@@@@@@@H@@COOOOOOO@@@@F"
"L@@@@@@I@@@@@@@@@@@@@@@@@@@@@D@@@@@@@@OOOOOOOON@@@AB@@@B@@@@@@@@@@@@@@H@@@@@@@@@@@@@@@@F"
"L@@@@@@I@@@@@@@@@@@@@@@@@@@@@D@@@@@@@@@@@@@@@@@@@@@@@AB@@@B@@@@@@@@@@@@@@H@@@@@@@@@@@@@@@@F"
"L@@@@@@I@@@@@@@@@@@@@@@@@@@@@D@@@@@@@@@@@@@@@@@@@@@@@AB@@@B@@@@@@@@@@@@@@H@@@@@@@@@@@@@@@@F"
"L@@@@@@I@@@@@@@@@@@@@@@@@@@@@D@@@@@@@@@@@@@@@@@@@@@@@AB@@@B@@@@@@@@@@@@@@H@@@@@@@@@@@@@@@@F"
"L@@@@@@I@@@@@@@@@@@@@@@@@@@@@D@@@@@@@@@@@@@@@@@@@@@@@AB@@@B@@@@@@@@@@@@@@H@@@@@@@@@@@@@@@@F"
"L@@@@@@I@@@@@@@@@@@@@@@@@@@@@D@@@@@@@@@@@@@@@@@@@@@@@AB@@@B@@@@@@@@@@@@@@H@@@@@@@@@@@@@@@@F"
"L@@@@@@I@@@@@@@@@@@@@@@@@@@@@D@@@@@@@@@@@@@@@@@@@@@@@AB@@@B@@@@@@@@@@@@@@H@@@@@@@@@@@@@@@@F"
"L@@@@@@I@@@@@@@@@@@@@@@@@@@@@D@@@@@@@@@@@@@@@@@@@@@@@AB@@@B@@@@@@@@@@@@@@H@@@@@@@@@@@@@@@@F"
"L@@@@@@I@@@@@@@@@@@@@@@@@@@@@D@@@@@@@@@@@@@@@@@@@@@@@AB@@@B@@@@@@@@@@@@@@H@@@@@@@@@@@@@@@@F"
"OOOOOOOIOOOOOOOOOOOOOOOOOOOOOOOOOOOOOOOOOOOOOOOOOOOOOCOOOOOOOOOOOOOOOOOOOOOOOOOOOOOOOON"
"L@@@@@@I@@@@@@@@@@@@@@@@@@@@@D@@@@@@@@@@@@@@@@@@@@@@@AB@@@B@@@@@@@@@@@@@@H@@@@@@@@@@@@@@@@F"
"L@@@@@@I@@@@@@@@@@@@@@@@@@@@@D@@@@@@@@@@@@@@@@@@@@@@@AB@@@B@@@@@@@@@@@@@@H@@@@@@@@@@@@@@@@F"
"OOOOOOOIOOOOOOOOOOOOOOOOOOOOOOOOOOOOOOOOOOOOOOOOOOOOOCOOOOOOOOOOOOOOOOOOOOOOOOOOOOOOOON"
"L@@@@@@I@@@@@@@@@@@@@@@@@@@@@D@@@@@@@@@@@@@@@@@@@@@@@AB@@@B@@@@@@@@@@@@@@H@@@@@@@@@@@@@@@@F"
"L@@@@@@I@@@@@@@@@@@@@@@@@@@@@D@@@@@@@@@@@@@@@@@@@@@@@AB@@@B@@@@@@@@@@@@@@H@@@@@@@@@@@@@@@@F"
"OOOOOOOIOOOOOOOOOOOOOOOOOOOOOOOOOOOOOOOOOOOOOOOOOOOOOCOOOOOOOOOOOOOOOOOOOOOOOOOOOOOOOON"
"L@@@@@@I@@@@@@@@@@@@@@@@@@@@@D@@@@@@@@@@@@@@@@@@@@@@@AB@@@B@@@@@@@@@@@@@@H@@@@@@@@@@@@@@@@F"
"L@@@@@@I@@@@@@@@@@@@@@@@@@@@@D@@@@@@@@@@@@@@@@@@@@@@@AB@@@B@@@@@@@@@@@@@@H@@@@@@@@@@@@@@@@F"
"OOOOOOOIOOOOOOOOOOOOOOOOOOOOOOOOOOOOOOOOOOOOOOOOOOOOOCOOOOOOOOOOOOOOOOOOOOOOOOOOOOOOOON"
"L@@@@@@I@@@@@@@@@@@@@@@@@@@@@D@@@@@@@@@@@@@@@@@@@@@@@AB@@@B@@@@@@@@@@@@@@H@@@@@@@@@@@@@@@@F"
"L@@@@@@I@@@@@@@@@@@@@@@@@@@@@D@@@@@@@@@@@@@@@@@@@@@@@AB@@@B@@@@@@@@@@@@@@H@@@@@@@@@@@@@@@@F"
"OOOOOOOIOOOOOOOOOOOOOOOOOOOOOOOOOOOOOOOOOOOOOOOOOOOOOCOOOOOOOOOOOOOOOOOOOOOOOOOOOOOOOON"
"L@@@@@@I@@@@@@@@@@@@@@@@@@@@@D@@@@@@@@@@@@@@@@@@@@@@@AB@@@B@@@@@@@@@@@@@@H@@@@@@@@@@@@@@@@F"
"L@@@@@@I@@@@@@@@@@@@@@@@@@@@@D@@@@@@@@@@@@@@@@@@@@@@@AB@@@B@@@@@@@@@@@@@@H@@@@@@@@@@@@@@@@F"
"OOOOOOOIOOOOOOOOOOOOOOOOOOOOOOOOOOOOOOOOOOOOOOOOOOOOOCOOOOOOOOOOOOOOOOOOOOOOOOOOOOOOOON"
"L@@@@@@I@@@@@@@@@@@@@@@@@@@@@D@@@@@@@@@@@@@@@@@@@@@@@AB@@@B@@@@@@@@@@@@@@H@@@@@@@@@@@@@@@@F"
"L@@@@@@I@@@@@@@@@@@@@@@@@@@@@D@@@@@@@@@@@@@@@@@@@@@@@AB@@@B@@@@@@@@@@@@@@H@@@@@@@@@@@@@@@@F"
"OOOOOOOIOOOOOOOOOOOOOOOOOOOOOOOOOOOOOOOOOOOOOOOOOOOOOCOOOOOOOOOOOOOOOOOOOOOOOOOOOOOOOON"
"L@@@@@@I@@@@@@@@@@@@@@@@@@@@@D@@@@@@@@@@@@@@@@@@@@@@@AB@@@B@@@@@@@@@@@@@@H@@@@@@@@@@@@@@@@F"
"L@@@@@@I@@@@@@@@@@@@@@@@@@@@@D@@@@@@@@@@@@@@@@@@@@@@@AB@@@B@@@@@@@@@@@@@@H@@@@@@@@@@@@@@@@F"
"OOOOOOOIOOOOOOOOOOOOOOOOOOOOOOOOOOOOOOOOOOOOOOOOOOOOOCOOOOOOOOOOOOOOOOOOOOOOOOOOOOOOOON"
"L@@@@@@I@@@@@@@@@@@@@@@@@@@@@D@@@@@@@@@@@@@@@@@@@@@@@AB@@@B@@@@@@@@@@@@@@H@@@@@@@@@@@@@@@@F"
"L@@@@@@I@@@@@@@@@@@@@@@@@@@@@D@@@@@@@@@@@@@@@@@@@@@@@AB@@@B@@@@@@@@@@@@@@H@@@@@@@@@@@@@@@@F"
"L@@@@@@I@@@@@@@@@@@@@@@@@@@@@D@@@@@@@@@@@@@@@@@@@@@@@AB@@@B@@@@@@@@@@@@@@H@@@@@@@@@@@@@@@@F"
"L@@@@@@O@@@@@@@@@@@@@@@@@@@@@D@@@@@@@@@@@@@@@@@@@@@@@AN@@@B@@@@@@@@@@@@@@H@@@@@@@@@@@@@@@@F"
"L@@@@@@O@@@@@@@@@@@@@@@@@@@@@D@@@@@@@@@@@@@@@@@@@@@@@AN@@@B@@@@@@@@@@@@@@H@@@@@@@@@@@@@@@@F"
"OOOOOOOOOOOOOOOOOOOOOOOOOOOOOOOOOOOOOOOOOOOOOOOOOOOOOOOOOOOOOOOOOOOOOOOOOOOOOOOOOOOOOOOON"
"OOOOOOOIOOOOOOOOOOOOOOOOOOOOOOOOOOOOOOOOOOOOOOOOOOOOOCOOOOOOOOOOOOOOOOOOOOOOOOOOOOOOOON"))) (\TYPE BITMAP PLAC
EMENT (321 . 79) NAME PHOTO BITMAP {(READBITMAP)(37 34
"OOOOOOOOOH@@"
"IOH@@@@BJH@@"
"KCN@@@@CJH@@"
"MCN@@@CBNH@@"
"IOO@@@BNBH@@"
"OINN@@@BHH@@"
"LIGL@@@@KH@@"
"LILJH@@ENH@@"
"LKMAB@@@AH@@"
"OOMAJ@@AAH@@"
"JEONH@@@AH@@"
"JDFC@@GHAH@@"
"J@IL@@OLAH@@"
"OOOCH@OLAH@@"
"NM@OH@OLAH@@"
"OGON@COLGH@@"
```

```
"OBDCGNOOMH@@"
"MKLGL@GHAH@@"
"OGGL@@GHBH@@"
"LBGOHGOOHH@@"
"IBL@@OOOLH@@"
"OOINGOOONH@@"
"LO@@AOOOOH@@"
"ON@BCOOONH@@"
"KNF@COOONH@@"
"JN@HGKONNH@@"
"NN@@GKONNH@@"
"ONC@OCONNH@@"
"LNF@OCONOH@@"
"KN@ANCONNH@@"
"LN@ANCONNH@@"
"ONIAOCONNH@@"
"JNL@OKONOH@@"
"OOOOOOOOOH@@")}) (\TYPE BITMAP PLACEMENT (350 . 366) NAME TABS.TRAY3 BITMAP ((READBITMAP)(101 57
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@GOOOOON@@@@@@@@@@@@@@@@@@"
"@@@D@@@@@B@@@@@@@@@@@@@@@@@@"
"@@@D@@@@@B@@@@@@@@@@@@@@@@@@"
"@@@D@@@@@B@@@@@@@@@@@@@@@@@@"
"@@@D@@@@@B@@@@@@@@@@@@@@@@@@"
"@@@D@@@@@B@@@@@@@@@@@@@@@@@@"
"@@@D@@@@@B@@@@@@@@@@@@@@@@@@"
"@@@D@@@@@CL@@@@@@@@@@@@@@@@@"
"@@@D@@@@@@D@@@@@@@@@@@@@@@@@"
"@@@D@@@@@@D@@@@@@@@@@@@@@@@@"
"@@@D@@@@@@D@@@@@@@@@@@@@@@@@"
"@@@D@@@@@@D@@@@@@@@@@@@@@@@@"
"@@@D@@@@@@D@@@@@@@@@@@@@@@@@"
"@@@D@@@@@@D@@@@@@@@@@@@@@@@@"
"@@@D@@@@@@D@@@@@@@@@@@@@@@@@"
"@@@D@@@@@@D@@@@@@@@@@@@@@@@@"
"@@@D@@@@@@D@@@@@@@@@@@@@@@@@"
"@@@D@@@@@CL@@@@@@@@@@@@@@@@@"
"@@@D@@@@@B@@@@@@@@@@@@@@@@@@"
"@@@D@@@@@B@@@@@@@@@@@@@@@@@@"
"@@@D@@@@@B@@@@@@@@@@@@@@@@@@"
"@@@D@@@@@B@@@@@@@@@@@@@@@@@@"
"@@@D@@@@@B@@@@@@@@@@@@@@@@@@"
"@@@D@@@@@B@@@@@@@@@@@@@@@@@@"
"@@@D@@@@@B@@@@@@@@@@@@@@@@@@"
"@@@D@@@@@B@@@@@@@@@@@@@@@@@@"
"@@@D@@@@@B@@@@@@@@@@@@@@@@@@"
"@@@D@@@@@B@AOH@@@@@@CL@@@@@@"
"@@@D@@@@@B@@F@@@@@@@FF@@@@@@"
"@@@D@@@@@B@@FCNGAHL@@F@@@@@@"
"@@@D@@@@@B@@FCFAIHL@AL@@@@@@"
"@@@D@@@@@B@@FC@GHMH@@F@@@@@@"
"@@@D@@@@@B@@FC@MHE@@FF@@@@@@"
"@@@D@@@@@B@@FC@MHG@@FF@@@@@@"
"@@@GOOOOON@@FC@GLB@@CL@@@@@@"
"@@@@@@@@@@@@@@@@AF@@@@@@@@@@"
"@@@@@@@@@@@@@@@@@L@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@")}) (\TYPE BITMAP PLACEMENT (246 . 366) NAME TABS.TRAY2 BITMAP ((READBITMAP)
(101 57
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
```

"@@@@@@@@@@@@@@@@@@@@@@@@@@@@"
"@@@AOOOOOOH@@@@@@@@@@@@@@@@@"
"@@@A@@@@@@H@@@@@@@@@@@@@@@@@"
"@@@A@@@@@@H@@@@@@@@@@@@@@@@@"
"@@@A@@@@@@H@@@@@@@@@@@@@@@@@"
"@@@A@@@@@@H@@@@@@@@@@@@@@@@@"
"@@@A@@@@@@H@@@@@@@@@@@@@@@@@"
"@@@A@@@@@@H@@@@@@@@@@@@@@@@@"
"@@@A@@@@@@O@@@@@@@@@@@@@@@@@"
"@@@A@@@@@@A@@@@@@@@@@@@@@@@@"
"@@@A@@@@@@A@@@@@@@@@@@@@@@@@"
"@@@A@@@@@@A@@@@@@@@@@@@@@@@@"
"@@@A@@@@@@A@@@@@@@@@@@@@@@@@"
"@@@A@@@@@@A@@@@@@@@@@@@@@@@@"
"@@@A@@@@@@A@@@@@@@@@@@@@@@@@"
"@@@A@@@@@@A@@@@@@@@@@@@@@@@@"
"@@@A@@@@@@A@@@@@@@@@@@@@@@@@"
"@@@A@@@@@@A@@@@@@@@@@@@@@@@@"
"@@@A@@@@@@O@@@@@@@@@@@@@@@@@"
"@@@A@@@@@@H@@@@@@@@@@@@@@@@@"
"@@@A@@@@@@H@@@@@@@@@@@@@@@@@"
"@@@A@@@@@@H@@@@@@@@@@@@@@@@@"
"@@@A@@@@@@H@@@@@@@@@@@@@@@@@"
"@@@A@@@@@@H@@@@@@@@@@@@@@@@@"
"@@@A@@@@@@H@@@@@@@@@@@@@@@@@"
"@@@A@@@@@@H@@@@@@@@@@@@@@@@@"
"@@@A@@@@@@H@@@@@@@@@@@@@@@@@"
"@@@A@@@@@@H@@@@@@@@@@@@@@@@@"
"@@@A@@@@@@H@GN@@@@@@@O@@@@@@"
"@@@A@@@@@@H@AH@@@@@@AIH@@@@@"
"@@@A@@@@@@H@AHOILFC@@AH@@@@@"
"@@@A@@@@@@H@AHMHFFC@@C@@@@@@"
"@@@A@@@@@@H@AHLANCF@@F@@@@@@"
"@@@A@@@@@@H@AHLCFAD@@L@@@@@@"
"@@@A@@@@@@H@AHLCFAL@AH@@@@@@"
"@@@AOOOOOOH@AHLAO@H@AOH@@@@@"
"@@@@@@@@@@@@@@@@@EH@@@@@@@@@"
"@@@@@@@@@@@@@@@@@C@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@")}) (\TYPE BITMAP PLACEMENT (453 . 366) NAME TABS.TRAYS2&3 BITMAP (
AP)(101 57
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@GOOOOON@@@@@@@@@@@@@@@@@"
"@@@@D@@@@@B@@@@@@@@@@@@@@@@@"
"@@@@D@@@@@B@@@@@@@@@@@@@@@@@"
"@@@@D@@@@@B@@@@@@@@@@@@@@@@@"
"@@@@D@@@@@B@@@@@@@@@@@@@@@@@"
"@@@@D@@@@@B@@@@@@@@@@@@@@@@@"
"@@@@D@@@@@B@@@@@@@@@@@@@@@@@"
"@@@@D@@@@@CL@@@@@@@@@@@@@@@@"
"@@@@D@@@@@@D@@@@@@@@@@@@@@@@"
"@@@@D@@@@@@D@@@@@@@@@@@@@@@@"
"@@@@D@@@@@@D@@@@@@@@@@@@@@@@"
"@@@@D@@@@@@D@@@@@@@@@@@@@@@@"
"@@@@D@@@@@@D@@@@@@@@@@@@@@@@"
"@@@@D@@@@@@D@@@@@@@@@@@@@@@@"
"@@@@D@@@@@@D@GN@@@@@@@@@@@@@"
"@@@@D@@@@@@D@AH@@@@@@@@@@@@@"
"@@@@D@@@@@@D@AHOILFCCL@@@@@@"
"@@@@D@@@@@CL@AHMHFFCFD@@@@@@"
"@@@@D@@@@@B@@AHLANCFG@@@@@@@"
"@@@@D@@@@@B@@AHLCFADAL@@@@@@"
"@@@@D@@@@@B@@AHLCFALDL@@@@@@"
"@@@@D@@@@@B@@AHLAO@HGH@@@@@@"
"@@@@D@@@@@B@@@@@@@EH@@@@@@@@"

```
"@@@@D@@@@@B@@@@@@@@C@@@@@@@@"
"@@@@D@@@@@B@@@@@@@@@@@@@@@@@"
"@@@@D@@@@@B@@@@@@@@@@@@@@@@@"
"@@@@D@@@@@B@@@@@@@@@@@@@@@@@"
"@@@@D@@@@@B@@@GHAH@O@@@@@@@@"
"@@@@D@@@@@B@@@LLCDAIH@@@@@@@"
"@@@@D@@@@@B@@@@LCD@AH@@@@@@@"
"@@@@D@@@@@B@@@AHAL@G@@@@@@@@"
"@@@@D@@@@@B@@@C@CK@AH@@@@@@@"
"@@@@D@@@@@B@@@F@FLAIH@@@@@@@"
"@@@@D@@@@@B@@@L@FFAIH@@@@@@@"
"@@@@GOOOOON@@@OLCK@O@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@")}) (\TYPE BITMAP PLACEMENT (139 . 255) NAME NO.BINDING BITMAP {(READBITMAP)
(69 40
"OOOOOOL@@@@@@@@@@@@@"
"L@@@@@D@@@@@@@@@@@@@"
"J@@@@@D@@@@@@@@@@@@@"
"I@@@@@D@@@@@@@@@@@@@"
"HH@@@@D@@@@@@@@@@@@@"
"HGOOOOON@@@@@@@@@@@@"
"HD@@@@@B@@@@@@@@@@@@"
"HD@@@@@B@@@@@@@@@@@@"
"HD@@@@@B@@@@@@@@@@@@"
"HD@@@@@B@@@@@@@@@@@@"
"HD@@@@@B@@@@@@@@@@@@"
"HD@@@@@B@@@@@@@@@@@@"
"HD@@@@@B@@@@@@@@@@@@"
"HD@@@@@B@@@@@@@@@@@@"
"HD@@@@@B@@@@@@@@@@@@"
"HD@@@@@B@@@@@@@@@@@@"
"HD@@@@@B@@@@@@@@@@@@"
"HD@@@@@B@@@@@@@@@@@@"
"HD@@@@@B@@@@@@@@@@@@"
"HD@@@@@B@@@@@@@@@@@@"
"HD@@@@@B@@@@@@@@@@@@"
"HD@@@@@B@@@@@@@@@@@@"
"HD@@@@@B@@@@@@@@@@@@"
"HD@@@@@B@@@@@@@@@@@@"
"HD@@@@@B@@@@@@@@@@@@"
"HD@@@@@B@@@@@@@@@@@@"
"HD@@@@@B@@@@@@@@@@@@"
"HD@@@@@B@@@@@@@@@@@@"
"HD@@@@@B@@@@@@@@@@@@"
"HD@@@@@B@@@@@@@@@@@@"
"HD@@@@@B@@@@@@@@@@@@"
"HD@@@@@B@@@@@@@@@@@@"
"HD@@@@@B@@NC@@@@@@@@"
"HD@@@@@B@@OC@@@@@@@@"
"HD@@@@@B@@OCCLOHO@@@"
"HD@@@@@B@@MKFFLMIH@@"
"DD@@@@@B@@MKFFLMOH@@"
"BD@@@@@B@@LOFFLMH@@@"
"AD@@@@@B@@LOFFLMIH@@"
"@OOOOOON@@LGCLLLO@@@")}) (\TYPE BITMAP PLACEMENT (349 . 472) NAME BOUND1 BITMAP {(READBITMAP)(46 52
"CO@GHDAB@IO@"
"B@HHDDAC@I@H"
"B@I@BDABHI@D"
"COA@BDABDI@D"
"B@I@BDABDI@D"
"B@I@BDABBI@D"
"B@HHDDABAI@H"
"CO@GHCNB@IO@"
"@@@@@@@@@@@@"
"@@@@@@@@@@@@"
"@@@@@@@@@@@@"
"@@@@@@@@@@@@"
"OOOOOOL@@@@@"
"L@@@@@D@@@@@"
"N@@@@@D@@@@@"
"O@@@@@D@@@@@"
"OH@@@@D@@@@@"
"OOOOOOON@@@@"
"OOL@@@@B@@@@"
"OOL@@@@B@@@@"
"OOL@@@@B@@@@"
"OOL@@@@B@@@@"
"OOL@@@@B@@@@"
"OOL@@@@B@@@@"
"OOL@@@@B@@@@"
```

```
"OOL@@@@B@@@@"
"OOL@@@@B@@@@"
"OOL@@@@B@@@@"
"OOL@@@@B@@@@"
"OOL@@@@B@@@@"
"OOL@@@@B@@@@"
"OOL@@@@B@@@@"
"OOL@@@@B@@@@"
"OOL@@@@B@@@@"
"OOL@@@@B@@@@"
"OOL@@@@B@@@@"
"OOL@@@@B@@@@"
"OOL@@@@B@@@@"
"OOL@@@@B@@@@"
"OOL@@@@B@@@@"
"OOL@@@@B@@@@"
"OOL@@@@B@@@@"
"OOL@@@@B@@@@"
"OOL@@@@B@@@@"
"OOL@@@@B@@@@"
"OOL@@@@B@@@@"
"OOL@@@@B@@@@"
"OOL@@@@B@@@@"
"GOL@@@@B@@@@"
"COL@@@@B@@@@"
"AOL@@@@B@@@@"
"@OOOOOON@@@@"))) (\TYPE BITMAP PLACEMENT (356 . 608) NAME TOP.TRAY BITMAP ((READBITMAP)(101 57
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@OOOOOOL@@@@@@@@@@@@@@@@@@"
"@@@H@@@@@D@@@@@@@@@@@@@@@@@@"
"@@@H@@@@@D@@@@@@@@@@@@@@@@@@"
"@@OOOOOOLD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@DD@@@@@@@@@@@@@@@@@@"
"@@H@@@@@GLAOH@@@@GN@@@@@@@@@"
"@@H@@@@@D@@F@@@@@AH@@@@@@@@@"
"@@H@@@@@D@@FANGL@AHOILFC@@@@"
"@@OOOOOOL@@FCCFF@AHMHFFC@@@@"
"@@@@@@@@@@@FCCFF@AHLANCF@@@@"
"@@@@@@@@@@@FCCFF@AHLCFAD@@@@"
"@@@@@@@@@@@FCCFF@AHLCFAL@@@@"
"@@@@@@@@@@@FANGL@AHLAO@H@@@@"
"@@@@@@@@@@@@@@F@@@@@@@EH@@@@"
"@@@@@@@@@@@@@@F@@@@@@@C@@@@@"
"@@@@@@@@@@@@@@F@@@@@@@@@@@@@"
"@@@@@@@@@@@@@@@@@@@@@@@@@@@@"
"@@@@@@@@@@@@@@@@@@@@@@@@@@@@"))) (\TYPE BITMAP PLACEMENT (143 . 611) NAME COLLATE BITMAP ((READBITMAP)(10
1 57
"@@@@@@@@@@@@@@@@@@@@@@@@@@@@"
"@@@@@@@@@@@@@@@@@@@@@@@@@@@@"
```

```
"@@@@@@@@@@@@@@@@@@@@@@@@@@@@"
"@@@@@@@@@@@@OOOOOOL@@@@@@@@@"
"@@@@@@@@@@@@H@@@@@D@@@@@@@@@"
"@@@@@@@@@@@@H@@@@@D@@@@@@@@@"
"@@@@@@@@@@@GOOOOOND@@@@@@@@@"
"@@@@@@@@@@@D@@@@@BD@@@@@@@@@"
"@@@@@@@@@@@D@@@@@BD@@@@@@@@@"
"@@@@@@@@@@COOOOOOBD@@@@@@@@@"
"@@@@@@@@@@B@@@@@ABD@@@@@@@@@"
"@@@@@@@@@@B@@@@@ABD@@@@@@@@@"
"@@@@@@@@@@B@@@@@ABD@@@@@@@@@"
"@@@@@@@@@@B@@@@@ABD@@@@@@@@@"
"@@@@@AOOOOOOH@@ABD@@@@@@@@@@"
"@@@@@A@@@@@@H@@ABD@@@@@@@@@@"
"@@@@@A@@@@@@H@@ABD@@@@@@@@@@"
"@@@@@OOOOOOLH@@ABD@@@@@@@@@@"
"@@@@@H@@@@@DH@@ABD@@@@@@@@@@"
"@@@@@H@@@@@DH@@ABD@@@@@@@@@@"
"@@@@GOOOOONDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ABD@@@@@@@@@@"
"@@@@D@@@@@BDH@@ACL@@@@@@@@@@"
"@@@@D@@@@@BDH@@AB@@@@@@@@@@@"
"@@@@D@@@@@BDH@@AB@@@@@@@@@@@"
"@@@@D@@@@@BDH@@AN@@@@@@@@@@@"
"@@@@D@@@@@BDH@@A@@@@@@@@@@@@"
"@@@@D@@@@@BDH@@A@@@@@@@@@@@@"
"@@@@D@@@@@BDOOOO@@@@@@@@@@@@"
"@@@@D@@@@@BDH@@@@@@@@@@@@@@@"
"@@@@D@@@@@BDH@@@@@@@@@@@@@@@"
"@@@@D@@@@@BDH@@@@@@@@@@@@@@@"
"@@@@D@@@@@BDHOH@CF@@@@@@@@@@"
"@@@@D@@@@@BGIHL@CF@@L@@@@@@@"
"@@@@D@@@@@BDAHLOCFGAOCL@@@@@"
"@@@@D@@@@@BDAHAIKFAHLFF@@@@@"
"@@@@D@@@@@CLAHAIKFGHLGN@@@@@"
"@@@@D@@@@@B@AHMIKFMHLF@@@@@@"
"@@@@D@@@@@B@AHMIKFMHLFF@@@@@"
"@@@@GOOOOON@@OHOCFGLGCL@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"))) (\TYPE BITMAP PLACEMENT (250 . 610) NAME UNCOLLATE BITMAP {(READBITMAP)(
101 57
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@OOOOOOL@@@@@@@@@@@@@"
"@@@@@@@@H@@@@@D@@@@@@@@@@@@@"
"@@@@@@@@H@@@@@D@@@@@@@@@@@@@"
"@@@@@@@GOOOOOND@@@@@@@@@@@@@"
"@@@@@@@D@@@@@BD@@@@@@@@@@@@@"
"@@@@@@@D@@@@@BD@@@@@@@@@@@@@"
"@@@@@@@D@@@@@BD@@@@@@@@@@@@@"
"@@@@@OOOOOOL@BD@@@@@@@@@@@@@"
"@@@@@H@@@@@D@BD@@@@@@@@@@@@@"
"@@@@@H@@@@@D@BD@@@@@@@@@@@@@"
"@@@@GOOOOOND@BD@@@@@@@@@@@@@"
"@@@@D@@@@@BD@BD@@@@@@@@@@@@@"
"@@@@D@@@@@BD@BD@@@@@@@@@@@@@"
"@@@@D@@@@@BD@BD@@@@@@@@@@@@@"
"@COOOOOO@@BD@BD@@@@@@@@@@@@@"
"@B@@@@@A@@BD@BD@@@@@@@@@@@@@"
"@B@@@@@A@@BD@BD@@@@@@@@@@@@@"
"AOOOOOI@@BD@BD@@@@@@@@@@@@@@"
"A@@@@@I@@BD@BD@@@@@@@@@@@@@@"
"A@@@@@I@@BD@BD@@@@@@@@@@@@@@"
"A@@@@@I@@BD@BD@@@@@@@@@@@@@@"
"A@@@@@I@@BD@BD@@@@@@@@@@@@@@"
"A@@@@@I@@BD@BD@@@@@@@@@@@@@@"
"A@@@@@I@@BD@BD@@@@@@@@@@@@@@"
"A@@@@@I@@BD@BD@@@@@@@@@@@@@@"
"A@@@@@I@@BD@BD@@@@@@@@@@@@@@"
"A@@@@@I@@BD@BD@@@@@@@@@@@@@@"
"A@@@@@I@@BD@BD@@@@@@@@@@@@@@"
```

```
"A@@@@@@I@@BD@BD@@@@@@@@@@@@@"
"A@@@@@@I@@BD@BD@@@@@@@@@@@@@"
"A@@@@@@I@@BD@BD@@@@@@@@@@@@@"
"A@@@@@@I@@BD@BD@@@@@@@@@@@@@"
"A@@@@@@I@@BD@BD@@@@@@@@@@@@@"
"A@@@@@@I@@BD@CL@@@@@@@@@@@@@"
"A@@@@@@I@@BD@B@@@@@@@@@@@@@@"
"A@@@@@@I@@BD@B@@@@@@@@@@@@@@"
"A@@@@@@I@@BGON@@@@@@@@@@@@@@"
"A@@@@@@I@@BD@@@@@@@@@@@@@@@@"
"A@@@@@@I@@BD@@@@@@@@@@@@@@@@"
"A@@@@@@I@@BD@@@@@@@@@@@@@@@@"
"A@@@@@@I@@CL@@@@@@@@@@@@@@@@"
"A@@@@@@I@@B@@@@@@@@@@@@@@@@@"
"A@@@@@@I@@B@@@@@@@@@@@@@@@@@"
"A@@@@@@IOONFC@@@@@CF@@@@@@@@"
"A@@@@@@I@@@FC@@@@@CF@@L@@@@@"
"A@@@@@@I@@@FCGLGHOCFGAOCL@@@"
"A@@@@@@I@@@FCFFLMIKFAHLFF@@@"
"A@@@@@@O@@@FCFFLAIKFGHLGN@@@"
"A@@@@@@H@@@FCFFLAIKFMHLF@@@@"
"A@@@@@@H@@@FCFFLMIKFMHLFF@@@"
"AOOOOOOH@@@CNFFGHOCFGLGCL@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"))) (\TYPE BITMAP PLACEMENT (142 . 306) NAME STANDARD BITMAP {(READBITMAP)(1
01 57
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@OOOOOOL@@@@@@@@@@@@"
"@@@@@@@@@H@@@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@HON@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@HON@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@HOOOOLD@@@@@@@@@@@@"
"@@@@@@@@@H@@@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@HOOOOLD@@@@@@@@@@@@"
"@@@@@@@@@H@@@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@HOOOOLD@@@@@@@@@@@@"
"@@@@@@@@@H@@@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@HOON@@D@@@@@@@@@@@@"
"@@@@@@@@@H@@@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@H@@@@@D@@@@@@@@@@@@"
"@@@@@@@@@OOOOOOL@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@CL@@@@@@L@@@@L@@@@@@@@"
"@@@@@@FFF@@@@@L@@@@L@@@@@@@@"
"@@@@@@G@OILGLGLNCNGL@@@@@@@@"
"@@@@@@CLF@FFFLLCCFLL@@@@@@@@"
"@@@@@@ANFANFFLLOC@LL@@@@@@@@"
"@@@@@@@FFCFFFLMKC@LL@@@@@@@@"
"@@@@@@FFFCFFFLMKC@LL@@@@@@@@"
"@@@@@@GLCIOFFGLOK@GL@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"))) (\TYPE BITMAP PLACEMENT (142 . 365) NAME NO.TABS BITMAP {(READBITMAP)(10
1 57
"@@@@@@@@@@@@@@@@@@@@@@@@@@@@"
"@@@@@@@@@@@@@@@@@@@@@@@@@@@@"
```

```
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@GOOOOON@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@@@@@@@@@@@@@@@@"
"@@@@@D@@@@@B@CHL@@@@@@@@@@@@"
"@@@@@D@@@@@B@CLL@@@@@@@@@@@@"
"@@@@@D@@@@@B@CLLOCNCL@@@@@@@"
"@@@@@D@@@@@B@CFMIKCFF@@@@@@@"
"@@@@@D@@@@@B@CFMIKCGN@@@@@@@"
"@@@@@D@@@@@B@CCMIKCF@@@@@@@@"
"@@@@@D@@@@@B@CCMIKCFF@@@@@@@"
"@@@@@GOOOOON@CALOCCCL@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@")})  (\TYPE BITMAP PLACEMENT  (143 . 475) NAME 1.LEFT BITMAP  {(READBITMAP)(61
47
"@D@GLGO@HCNB@COH"
"@L@HB@H@HBAB@B@@"
"CL@H@@HADBAB@B@@"
"@D@GH@HADBAB@CO@"
"@D@@D@HBBCNB@B@@"
"@D@@B@HCNB@B@B@@"
"@D@HB@HDAB@B@B@@"
"@D@GL@HDAB@COCOH"
"@@@@@@@@@@@@@@@@"
"@@@@@@@@@@@@@@@@"
"@@@@@@@@@@@@@@@@"
"@@@@@@@@@@@@@@@@"
"OOOOOOL@@@@@@@@@"
"H@@@@@D@@@@@@@@@"
"H@@@@@D@@@@@@@@@"
"H@@@@@D@@@@@@@@@"
"IH@@@@D@@@@@@@@@"
"IH@@@@D@@@@@@@@@"
"IH@@@@D@@@@@@@@@"
"IH@@@@D@@@@@@@@@"
"IH@@@@D@@@@@@@@@"
"IH@@@@D@@@@@@@@@"
"H@@@@@D@@@@@@@@@"
"H@@@@@D@@@@@@@@@"
"H@@@@@D@@@@@@@@@"
"H@@@@@D@@@@@@@@@"
"H@@@@@D@@@@@@@@@"
"H@@@@@D@@@@@@@@@"
"H@@@@@D@@@@@@@@@"
"H@@@@@D@@@@@@@@@"
"H@@@@@D@@@@@@@@@"
```

"H@@@@@D@@@@@@@@@@"
"H@@@@@D@@@@@@@@@@"
"H@@@@@D@@@@@@@@@@"
"H@@@@@D@@@@@@@@@@"
"H@@@@@D@@@@@@@@@@"
"H@@@@@D@@@@@@@@@@"
"H@@@@@D@@@@@@@@@@"
"H@@@@@D@@@@@@@@@@"
"H@@@@@D@@@@@@@@@@"
"H@@@@@D@@@@@@@@@@"
"H@@@@@D@@@@@@@@@@"
"H@@@@@D@@@@@@@@@@"
"H@@@@@D@@@@@@@@@@"
"H@@@@@D@@@@@@@@@@"
"H@@@@@D@@@@@@@@@@"
"OOOOOOL@@@@@@@@@@")}) (\TYPE BITMAP PLACEMENT (211 . 476) NAME 2.LEFT BITMAP ((READBITMAP)(68 47
"G@AOAOLB@OHH@ONCN@@@"
"HHB@HB@B@HDH@H@DA@@@"
"@HB@@B@E@HDH@H@D@@@@"
"@HAN@B@E@HDH@OLCL@@@"
"C@@A@B@HHOHH@H@@B@@@"
"D@@@HB@OHH@H@H@@A@@@"
"H@B@HBA@DH@H@H@DA@@@"
"OHAO@BA@DH@OLONCN@@@"
"@@@@@@@@@@@@@@@@@@@@"
"@@@@@@@@@@@@@@@@@@@@"
"@@@@@@@@@@@@@@@@@@@@"
"@@@@@@@@@@@@@@@@@@@@"
"OOOOOOL@@@@@@@@@@@@@"
"H@@@@@D@@@@@@@@@@@@@"
"H@@@@@D@@@@@@@@@@@@@"
"H@@@@@D@@@@@@@@@@@@@"
"IH@@@@D@@@@@@@@@@@@@"
"IH@@@@D@@@@@@@@@@@@@"
"IH@@@@D@@@@@@@@@@@@@"
"IH@@@@D@@@@@@@@@@@@@"
"IH@@@@D@@@@@@@@@@@@@"
"IH@@@@D@@@@@@@@@@@@@"
"H@@@@@D@@@@@@@@@@@@@"
"H@@@@@D@@@@@@@@@@@@@"
"H@@@@@D@@@@@@@@@@@@@"
"H@@@@@D@@@@@@@@@@@@@"
"H@@@@@D@@@@@@@@@@@@@"
"H@@@@@D@@@@@@@@@@@@@"
"H@@@@@D@@@@@@@@@@@@@"
"H@@@@@D@@@@@@@@@@@@@"
"H@@@@@D@@@@@@@@@@@@@"
"H@@@@@D@@@@@@@@@@@@@"
"H@@@@@D@@@@@@@@@@@@@"
"H@@@@@D@@@@@@@@@@@@@"
"H@@@@@D@@@@@@@@@@@@@"
"IH@@@@D@@@@@@@@@@@@@"
"IH@@@@D@@@@@@@@@@@@@"
"IH@@@@D@@@@@@@@@@@@@"
"IH@@@@D@@@@@@@@@@@@@"
"IH@@@@D@@@@@@@@@@@@@"
"IH@@@@D@@@@@@@@@@@@@"
"H@@@@@D@@@@@@@@@@@@@"
"H@@@@@D@@@@@@@@@@@@@"
"H@@@@@D@@@@@@@@@@@@@"
"H@@@@@D@@@@@@@@@@@@@"
"H@@@@@D@@@@@@@@@@@@@"
"OOOOOOL@@@@@@@@@@@@@")}) (\TYPE BITMAP PLACEMENT (283 . 485) NAME 1.TOP BITMAP ((READBITMAP)(59 38
"A@AOAOLB@OHH@ON@"
"C@B@HB@B@HDH@H@@"
"O@B@@B@E@HDH@H@@"
"A@AN@B@E@HDH@OL@"
"A@@A@B@HHOHH@H@@"
"A@@@HB@OHH@H@H@@"
"A@B@HBA@DH@H@H@@"
"A@AO@BA@DH@OLON@"
"@@@@@@@@@@@@@@@@"
"@@@@@@@@@@@@@@@@"
"@@@@@@@@@@@@@@@@"
"@@@@@@@@@@@@@@@@"
"OOOOOOOON@@@@@@@"
"H@@@@@@@B@@@@@@@"
"H@@@@@@@B@@@@@@@"
"HGN@@@@@B@@@@@@@"
"HGN@@@@@B@@@@@@@"
"H@@@@@@@B@@@@@@@"
"H@@@@@@@B@@@@@@@"
"H@@@@@@@B@@@@@@@"
"H@@@@@@@B@@@@@@@"
"H@@@@@@@B@@@@@@@"
"H@@@@@@@B@@@@@@@"
"H@@@@@@@B@@@@@@@"

```
"H@@@@@@@B@@@@@@@"
"H@@@@@@@B@@@@@@@"
"H@@@@@@@B@@@@@@@"
"H@@@@@@@B@@@@@@@"
"H@@@@@@@B@@@@@@@"
"H@@@@@@@B@@@@@@@"
"H@@@@@@@B@@@@@@@"
"H@@@@@@@B@@@@@@@"
"H@@@@@@@B@@@@@@@"
"H@@@@@@@B@@@@@@@"
"H@@@@@@@B@@@@@@@"
"H@@@@@@@B@@@@@@@"
"H@@@@@@@B@@@@@@@"
"OOOOOOOON@@@@@@@")}) (\TYPE BITMAP PLACEMENT (433 . 210) NAME FRONT.COVERS BITMAP {(READBITMAP)(46 70
"OMOAOCHMOH@@"
"LAIKAKLLF@@@"
"LAIKAKLLF@@@"
"OIIKAKFLF@@@"
"LAOCAKFLF@@@"
"LAIKAKCLF@@@"
"LAIKAKCLF@@@"
"LAIIOCALF@@@"
"@@@@@@@@@@@@"
"@@@@@@@@@@@@"
"@@@@@@@@@@@@"
"@@@@@@@@@@@@"
"@@@@@@@@@@@@"
"GLGLLCGNOH@@"
"LFLFLCF@LL@@"
"LFLFFFF@LL@@"
"L@LFFFGLLL@@"
"L@LFBDF@OH@@"
"LFLFCLF@LL@@"
"LFLFAHF@LL@@"
"GLGLAHGNLL@@"
"@@@@@@@@@@@@"
"@@@@@@@@@@@@"
"@@@@@@@@@@@@"
"@@@@@@@@@@@@"
"@@@@@OOOOOOL"
"@@@@@H@@@@@D"
"@@@@@H@@@@@D"
"@@@@@H@@@@@D"
"@@@@OOOOOOLD"
"@@@@H@@@@@DD"
"@@@@H@@@@@DD"
"@@@OOOOOOLDD"
"@@@H@@@@@DDD"
"@@@H@@@@@DDD"
"OOOOOOL@@DDD"
"JJJJJJL@@DDD"
"MEEEEED@@DDD"
"JJJJJJL@@DDD"
"MEEEEED@@DDD"
"JJJJJJL@@DDD"
"MEEEEED@@DDD"
"JJJJJJL@@DDD"
"MEEEEED@@DDD"
"JJJJJJL@@DDD"
"MEEEEED@@DDD"
"JJJJJJL@@DDD"
"MEEEEED@@DDD"
"JJJJJJL@@DDD"
"MEEEEED@@DDD"
"JJJJJJL@@DDD"
"MEEEEED@@DDD"
"JJJJJJL@@DDD"
"MEEEEED@@DDD"
"JJJJJJL@@DDD"
"MEEEEED@@DDD"
"JJJJJJL@@DDD"
"MEEEEED@@DDD"
"JJJJJJL@@DDD"
"MEEEEED@@GL"
"JJJJJJL@@DD@"
"MEEEEED@@DD@"
"JJJJJJL@@DD@"
"MEEEEED@@GL@"
"JJJJJJL@@D@@"
"MEEEEED@@D@@"
"JJJJJJOOOL@@"
"MEEEEED@@@@@"
"JJJJJJL@@@@@"
"OOOOOOL@@@@@")}) (\TYPE BITMAP PLACEMENT (640 . 210) NAME BOTH.COVERS BITMAP {(READBITMAP)(61 72
"GLGLOMHL@@@@@@@@"
"FFLFCAHL@@@@@@@@"
"FFLFCAHL@@@@@@@@"
```

```
"GLLFCAOL@@@@@@@@"
"FFLFCAHL@@@@@@@@"
"FFLFCAHL@@@@@@@@"
"FFLFCAHL@@@@@@@@"
"GLGLCAHL@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"CNCNFAKOGLGH@@@@"
"FCFCFAK@FFLL@@@@"
"FCFCCCC@FFN@@@@@"
"F@FCCCCNFFGH@@@@"
"F@FCABC@GLCL@@@@"
"FCFCANC@FF@L@@@@"
"FCFC@LC@FFLL@@@@"
"CNCN@LCOFFOH@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@AOOOOOOH"
"@@@@@@@@AEEEEEEH"
"@@@@@@@@AJJJJJJH"
"@@@@@OOOOOOMEEEH"
"@@@@@H@@@@@FJJJH"
"@@@@@H@@@@@EEEEH"
"@@@@OOOOOOLFJJJH"
"@@@@H@@@@@DEEEEH"
"@@@@H@@@@@DFJJJH"
"@@@OOOOOOLDEEEEH"
"@@@H@@@@@DDFJJJH"
"@@@H@@@@@DDEEEEH"
"OOOOOOL@@DDFJJJH"
"JJJJJJL@@DDEEEEH"
"MEEEEED@@DDFJJJH"
"JJJJJJL@@DDEEEEH"
"MEEEEED@@DDFJJJH"
"JJJJJJL@@DDEEEEH"
"MEEEEED@@DDFJJJH"
"JJJJJJL@@DDEEEEH"
"MEEEEED@@DDFJJJH"
"JJJJJJL@@DDEEEEH"
"MEEEEED@@DDFJJJH"
"JJJJJJL@@DDEEEEH"
"MEEEEED@@DDFJJJH"
"JJJJJJL@@DDEEEEH"
"MEEEEED@@DDFJJJH"
"JJJJJJL@@DDEEEEH"
"MEEEEED@@DDFJJJH"
"JJJJJJL@@DDEEEEH"
"MEEEEED@@DDFJJJH"
"JJJJJJL@@DDEEEEH"
"MEEEEED@@DDFJJJH"
"JJJJJJL@@DDEEEEH"
"MEEEEED@@DDGOOOH"
"JJJJJJL@@DDD@@@@"
"MEEEEED@@DDD@@@@"
"JJJJJJL@@DGL@@@@"
"MEEEEED@@DD@@@@@"
"JJJJJJL@@DD@@@@@"
"MEEEEED@@GL@@@@@"
"JJJJJJL@@D@@@@@@"
"MEEEEED@@D@@@@@@"
"JJJJJOOOL@@@@@@@"
"MEEEEED@@@@@@@@@"
"JJJJJJL@@@@@@@@@"
"OOOOOOL@@@@@@@@@")})  (\TYPE BITMAP PLACEMENT  (537 . 210) NAME BACK.COVERS BITMAP  {(READBITMAP)(49 70
"OHB@OIIH@@@@@@@@"
"LLGAHMK@@@@@@@@@"
"LLGAHMN@@@@@@@@@"
"OHMIHAL@@@@@@@@@"
"LLMIHAN@@@@@@@@@"
"LLOIHMK@@@@@@@@@"
"LMHMHMIH@@@@@@@@"
"OIHLOIHL@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"GLGLLCGNOH@@@@@@"
"LFLFLCF@LL@@@@@@"
"LFLFFFF@LL@@@@@@"
"L@LFFFGLLL@@@@@@"
"L@LFBDF@OH@@@@@@"
```

```
"LFLFCLF@LL@@@@@@"
"LFLFAHF@LL@@@@@@"
"GLGLAHGNLL@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@AOOOOOOH@@@"
"@@@@@AEEEEEEH@@@"
"@@@@@AJJJJJJH@@@"
"@@@@@AEEEEEEH@@@"
"@@OOOOOONJJJH@@@"
"@@H@@@@@EEEEH@@@"
"@@H@@@@@FJJJH@@@"
"@OOOOOOLEEEEH@@@"
"@H@@@@@DFJJJH@@@"
"@H@@@@@DEEEEH@@@"
"OOOOOOLDFJJJH@@@"
"H@@@@@DDEEEEH@@@"
"H@@@@@DDFJJJH@@@"
"H@@@@@DDEEEEH@@@"
"H@@@@@DDFJJJH@@@"
"H@@@@@DDEEEEH@@@"
"H@@@@@DDFJJJH@@@"
"H@@@@@DDEEEEH@@@"
"H@@@@@DDFJJJH@@@"
"H@@@@@DDEEEEH@@@"
"H@@@@@DDFJJJH@@@"
"H@@@@@DDEEEEH@@@"
"H@@@@@DDFJJJH@@@"
"H@@@@@DDEEEEH@@@"
"H@@@@@DDFJJJH@@@"
"H@@@@@DDEEEEH@@@"
"H@@@@@DDFJJJH@@@"
"H@@@@@DDEEEEH@@@"
"H@@@@@DDFJJJH@@@"
"H@@@@@DDEEEEH@@@"
"H@@@@@DDFJJJH@@@"
"H@@@@@DDEEEEH@@@"
"H@@@@@DDFJJJH@@@"
"H@@@@@DDEEEEH@@@"
"H@@@@@DDGOOOH@@@"
"H@@@@@DDD@@@@@@@"
"H@@@@@DDD@@@@@@@"
"H@@@@@DDD@@@@@@@"
"H@@@@@DGL@@@@@@@"
"H@@@@@DD@@@@@@@@"
"H@@@@@DD@@@@@@@@"
"H@@@@@GL@@@@@@@@"
"H@@@@@D@@@@@@@@@"
"H@@@@@D@@@@@@@@@"
"OOOOOOL@@@@@@@@@")))  (\TYPE BITMAP PLACEMENT  (330 . 212) NAME NO.COVERS BITMAP  {(READBITMAP)(46 66
"CHLOH@@@@@@@"
"CLMHL@@@@@@@"
"CLMHL@@@@@@@"
"CFMHL@@@@@@@"
"CFMHL@@@@@@@"
"CCMHL@@@@@@@"
"CCMHL@@@@@@@"
"CALOH@@@@@@@"
"@@@@@@@@@@@@"
"@@@@@@@@@@@@"
"@@@@@@@@@@@@"
"@@@@@@@@@@@@"
"@@@@@@@@@@@@"
"CNCNFAKOGLGH"
"FCFCFAK@FFLL"
"FCFCCCC@FFN@"
"F@FCCCCNFFGH"
"F@FCABC@GLCL"
"FCFCANC@FF@L"
"FCFC@LC@FFLL"
"CNCN@LCOFFOH"
"@@@@@@@@@@@@"
"@@@@@@@@@@@@"
"@@@@@@@@@@@@"
"@@@@@@@@@@@@"
"@@OOOOOOL@@@"
"@@H@@@@@D@@@"
"@@H@@@@@D@@@"
"@OOOOOOLD@@@"
"@H@@@@@DD@@@"
"@H@@@@@DD@@@"
"OOOOOOLDD@@@"
"H@@@@@DDD@@@"
"H@@@@@DDD@@@"
"H@@@@@DDD@@@"
```

```
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DGL@@@"
"H@@@@@DD@@@@"
"H@@@@@DD@@@@"
"H@@@@@GL@@@@"
"H@@@@@D@@@@@"
"H@@@@@D@@@@@"
"OOOOOOL@@@@@"))) (\TYPE BITMAP PLACEMENT (330 . 127) NAME GHOST.NO.COVERS BITMAP {(READBITMAP)(46 66
"BHHJH@@@@@@@"
"ADE@D@@@@@@@"
"BHHHH@@@@@@@"
"ADE@D@@@@@@@"
"BBHHH@@@@@@@"
"AAE@D@@@@@@@"
"BBHHH@@@@@@@"
"AADE@@@@@@@@"
"@@@@@@@@@@@@"
"@@@@@@@@@@@@"
"@@@@@@@@@@@@"
"@@@@@@@@@@@@"
"@@@@@@@@@@@@"
"ADBJB@IEEDBH"
"BBDAB@J@BBDD"
"DABBAAA@DDJ@"
"B@DA@@BJBBE@"
"D@BBAAA@EDBH"
"BBDA@JB@BB@D"
"DABB@DA@DDHH"
"BJAD@DBJBBE@"
"@@@@@@@@@@@@"
"@@@@@@@@@@@@"
"@@@@@@@@@@@@"
"@@@@@@@@@@@@"
"@@JJJJJH@@@@"
"@@@@@@@@D@@@"
"@@H@@@@@@@@@"
"@EEEEEEDD@@@"
"@H@@@@@@@@@@"
"@@@@@@@DD@@@"
"JJJJJH@@@@@@"
"@@@@@@DDD@@@"
"H@@@@@@@@@@@"
"@@@@@@DDD@@@"
"H@@@@@@@@@@@"
"@@@@@@DDD@@@"
"H@@@@@@@@@@@"
"@@@@@@DDD@@@"
"H@@@@@@@@@@@"
"@@@@@@D@D@@@"
"H@@@@@@D@@@@"
"@@@@@@D@D@@@"
"H@@@@@@D@@@@"
"@@@@@@D@D@@@"
"H@@@@@@D@@@@"
"@@@@@@D@D@@@"
"H@@@@@@D@@@@"
"@@@@@@D@D@@@"
"H@@@@@@D@@@@"
"@@@@@@D@D@@@"
"H@@@@@@D@@@@"
"@@@@@@D@D@@@"
"H@@@@@@D@@@@"
"@@@@@@D@D@@@"
"H@@@@@@D@@@@"
```

```
"@@@@@@D@D@@@"
"H@@@@@@D@@@@"
"@@@@@@D@D@@@"
"H@@@@@@E@@@@"
"@@@@@@D@@@@@"
"H@@@@@@D@@@@"
"@@@@@@BH@@@@"
"H@@@@@@@@@@@"
"@@@@@@D@@@@@"
"JJJJJJH@@@@@"))) (\TYPE BITMAP PLACEMENT (430 . 124) NAME GHOST.FRONT.COVERS BITMAP {(READBITMAP)(46 70
"JHJAEA@EEH@@"
"DAAB@JHHB@@@"
"H@HIAADDD@@@"
"EAAB@JBHB@@@"
"H@JAAADDD@@@"
"DAAB@JBHB@@@"
"H@HIAAAD@@@@"
"DAA@JB@HB@@@"
"@@@@@@@@@@@@"
"@@@@@@@@@@@@"
"@@@@@@@@@@@@"
"@@@@@@@@@@@@"
"@@@@@@@@@@@@"
"EDEDDBEDJH@@"
"HBHBHAB@DD@@"
"DDDDDBD@HH@@"
"H@HBBDBHDD@@"
"D@DD@@D@JH@@"
"HBHBBDB@DD@@"
"DDDD@HD@HH@@"
"BHBHA@BJDD@@"
"@@@@@@@@@@@@"
"@@@@@@@@@@@@"
"@@@@@@@@@@@@"
"@@@@@@@@@@@@"
"@@@@@EEEEEED"
"@@@@@H@@@@@@"
"@@@@@@@@@@@D"
"@@@@@H@@@@@@"
"@@@@EEEEEEDD"
"@@@@H@@@@@@@"
"@@@@@@@@@@DD"
"@@@JJJJJJH@@"
"@@@@@@@@@DDD"
"@@@H@@@@@@@@"
"IEEEEBH@@DDD"
"B@B@B@D@@@@@"
"HA@A@A@@@DDD"
"@H@H@HD@@@@@"
"H@D@D@@@@DDD"
"@B@B@BD@@@@@"
"I@A@A@@@@DDD"
"@@H@H@D@@@@@"
"HD@D@D@@@DDD"
"@@B@B@D@@@@@"
"IA@A@A@@@DDD"
"@@@H@HD@@@@@"
"HDD@D@@@@DDD"
"@@@B@BD@@@@@"
"IAA@A@@@@DDD"
"@@@@H@D@@@@@"
"HDDD@D@@@DDD"
"@@@@B@D@@@@@"
"IAAA@A@@@DDD"
"@@@@@HD@@@@@"
"HDDDD@@@@DDD"
"@@@@@BD@@@@@"
"IAAAA@@@@DDD"
"@@@@@@D@@@@@"
"HDDDDD@@@DED"
"@@@@@@D@@@@@"
"IAAAAA@@@DD@"
"@@@@@@D@@@@@"
"HDDDDD@@@ED@"
"@@@@@@D@@@@@"
"IAAAAA@@@D@@"
"@@@@@@EFJH@@"
"HDDDDD@@@@@@"
"@@@@@@D@@@@@"
"JJJJJJH@@@@@"))) (\TYPE BITMAP PLACEMENT (537 . 122) NAME GHOST.BACK.COVERS BITMAP {(READBITMAP)(49 67
"EDA@EDDD@@@@@@@@"
"BBBHHBHH@@@@@@@@"
"DDA@DDE@@@@@@@@@"
"BHBHH@J@@@@@@@@@"
"DDDDD@E@@@@@@@@@"
"BBBHHBHH@@@@@@@@"
"DDDDDDDD@@@@@@@@"
```

```
"BHHBBHHB@@@@@@@@"
"@@@@@@@@@@@@@@@@"
"@@@@@@@@@@@@@@@@"
"@@@@@@@@@@@@@@@@"
"ADBJB@IEED@@@@@@"
"BBDAB@J@BB@@@@@@"
"DABBAAA@DD@@@@@@"
"B@DA@@BJBB@@@@@@"
"D@BBAAA@ED@@@@@@"
"BBDA@JB@BB@@@@@@"
"DABB@DA@DD@@@@@@"
"BJAD@DBJBB@@@@@@"
"@@@@@@@@@@@@@@@@"
"@@@@@@@@@@@@@@@@"
"@@@@@@@@@@@@@@@@"
"@@@@@AEEEEEE@@@@"
"@@@@@@@@@@@@H@@@"
"@@@@@ABJHHHH@@@@"
"@@@@@@@@@@@@H@@@"
"@@EEEEEEDBBB@@@@"
"@@H@@@@@@@@@H@@@"
"@@@@@@@@DHHH@@@@"
"@BJJJJJH@@@@H@@@"
"@H@@@@@DDBBB@@@@"
"@@@@@@@@@@@@H@@@"
"JJJJJJHDDHHH@@@@"
"@@@@@@D@@@@@H@@@"
"H@@@@@@DDBBB@@@@"
"@@@@@@D@@@@@H@@@"
"H@@@@@@DDHHH@@@@"
"@@@@@@D@@@@@H@@@"
"H@@@@@@DDBBB@@@@"
"@@@@@@D@@@@@H@@@"
"H@@@@@@DDHHH@@@@"
"@@@@@@D@@@@@H@@@"
"H@@@@@@DDBBB@@@@"
"@@@@@@D@@@@@H@@@"
"H@@@@@@DDHHH@@@@"
"@@@@@@D@@@@@H@@@"
"H@@@@@@DDBBB@@@@"
"@@@@@@D@A@@@H@@@"
"H@@@@@@DD@HH@@@@"
"@@@@@@D@@@@@H@@@"
"H@@@@@@DDBBB@@@@"
"@@@@@@D@@@@@H@@@"
"H@@@@@@DD@HH@@@@"
"@@@@@@D@@H@@H@@@"
"H@@@@@@DDDBB@@@@"
"@@@@@@D@@@@@H@@@"
"H@@@@@@DEEEE@@@@"
"@@@@@@D@@@@@@@@@"
"H@@@@@@DD@@@@@@@"
"@@@@@@D@@@@@@@@@"
"H@@@@@@ED@@@@@@@"
"@@@@@@D@@@@@@@@@"
"H@@@@@@D@@@@@@@@"
"@@@@@@BH@@@@@@@@"
"H@@@@@@@@@@@@@@@"
"@@@@@@D@@@@@@@@@"
"JJJJJJH@@@@@@@@@"))) (\TYPE BITMAP PLACEMENT (638 . 119) NAME GHOST.BOTH.COVERS BITMAP {(READBITMAP)(61 6
9
"EDEDIE@D@@@@@@@@"
"BBHBB@HH@@@@@@@@"
"DDDDAA@D@@@@@@@@"
"BHHBB@JH@@@@@@@@"
"DDDDAA@D@@@@@@@@"
"BBHBB@HH@@@@@@@@"
"DDDDAA@D@@@@@@@@"
"BHBHB@HH@@@@@@@@"
"@@@@@@@@@@@@@@@@"
"@@@@@@@@@@@@@@@@"
"@@@@@@@@@@@@@@@@"
"@@@@@@@@@@@@@@@@"
"ADBJB@IEEDBH@@@@"
"BBDAB@J@BBDD@@@@"
"DABBAAA@DDJ@@@@@"
"B@DA@@BJBBE@@@@@"
"D@BBAAA@EDBH@@@@"
"BBDA@JB@BB@D@@@@"
"DABB@DA@DDHH@@@@"
"BJAD@DBJBBE@@@@@"
"@@@@@@@@@@@@@@@@"
"@@@@@@@@@@@@@@@@"
"@@@@@@@@@@JJJJJH"
"@@@@@@@@@AA@@@@@"
"@@@@@@@@@@HBHHHH"
"@@@@@EEEEEED@@@@"
```

```
"@@@@@H@@@@@@BBBH"
"@@@@@@@@@@@D@@@@"
"@@@@JJJJJJH@HHHH"
"@@@@@@@@@@DD@@@@"
"@@@@H@@@@@@@BBBH"
"@@@EEEEEEDDD@@@@"
"@@@H@@@@@@@@HHHH"
"@@@@@@@@@DDD@@@@"
"JJJJJJH@@@@@BBBH"
"@@@@@@D@@DDD@@@@"
"HDDDDD@@@@@@HHHH"
"@@@@@@D@@DDD@@@@"
"IAAAAA@@@@@@BBBH"
"@@@@@@D@@DDD@@@@"
"HDDDDD@@@@@@HHHH"
"@@@@@@D@@DDD@@@@"
"IAAAAA@@@@@@BBBH"
"@@@@@@D@@DDD@@@@"
"HDDDDD@@@@@@HHHH"
"@@@@@@D@@DDD@@@@"
"IAAAAA@@@@@@BBBH"
"@@@@@@D@@DDD@@@@"
"HDDDDD@@@@@@HHHH"
"@@@@@@D@@DDD@@@@"
"IAAAAA@@@@@@BBBH"
"@@@@@@D@@DDD@@@@"
"HDDDDD@@@@@@HHHH"
"@@@@@@D@@DDD@@@@"
"IAAAAA@@@@@@BBBH"
"@@@@@@D@@DDD@@@@"
"HDDDDD@@@@@BJJJH"
"@@@@@@D@@DDD@@@@"
"IAAAAA@@@@@@@@@@"
"@@@@@@D@@DED@@@@"
"HDDDDD@@@@@@@@@@"
"@@@@@@D@@DD@@@@@"
"IAAAAA@@@BH@@@@@"
"@@@@@@D@@D@@@@@@"
"HDDDDD@@@@@@@@@@"
"@@@@@@EEED@@@@@@"
"IAAAAA@@@@@@@@@@"
"@@@@@@D@@@@@@@@@"
"JJJJJJH@@@@@@@@@"))) (\TYPE BITMAP PLACEMENT  (249 . 209) NAME SHADOW.NO.COVERS BITMAP  ((READBITMAP)(46 59

"CNCNFAKOGLGH"
"FCFCFAK@FFLL"
"FCFCCCC@FFN@"
"F@FCCCCNFFGH"
"F@FCABC@GLCL"
"FCFCANC@FF@L"
"FCFC@LC@FFLL"
"CNCN@LCOFFOH"
"@@@@@@@@@@@@"
"@@@@@@@@@@@@"
"@@@@@@@@@@@@"
"@@@@@@@@@@@@"
"@@OOOOOOL@@@"
"@@H@@@@@D@@@"
"@@H@@@@@D@@@"
"@OOOOOOLD@@@"
"@H@@@@@DD@@@"
"@H@@@@@DD@@@"
"OOOOOOLDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
"H@@@@@DDD@@@"
```

```
"H@@@@@DDD@@@"
"H@@@@@DDD@@@"
"H@@@@@DDD@@@"
"H@@@@@DGL@@@"
"H@@@@@DD@@@@"
"H@@@@@DEL@@@"
"H@@@@@GML@@@"
"H@@@@@DCL@@@"
"H@@@@@EOL@@@"
"OOOOOOMOL@@@"
"@@@@@@AOH@@@"
"OOOOOOOO@@@@"
"GOOOOOON@@@@"
"COOOOOOL@@@@"
"AOOOOOOH@@@@"
"@OOOOOOO@@@@")))  (\TYPE BITMAP PLACEMENT  (141 . 102) NAME SHADOW.RE.BOX BITMAP  ((READBITMAP)(88 45
"OOOOOOOOOOOOOOOOOOO@@@"
"OOOOOOOOOOOOOOOOOOO@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@C@@@"
"L@@@@@@@@@@@@@@@@@CA@@"
"L@@@@@@@@@@@@@@@@@CC@@"
"L@@@@@@@@@@@@@@@@@CG@@"
"L@@@@@@@@@@@@@@@@@CG@@"
"OOOOOOOOOOOOOOOOOOOG@@"
"OOOOOOOOOOOOOOOOOOOG@@"
"@@@@@@@@@@@@@@@@@@@G@@"
"OOOOOOOOOOOOOOOOOOOO@@"
"OOOOOOOOOOOOOOOOOOOO@@"
"OOOOOOOOOOOOOOOOOOON@@"
"OOOOOOOOOOOOOOOOOOOL@@"
"OOOOOOOOOOOOOOOOOOOH@@")))  (\TYPE BITMAP PLACEMENT  (143 . 40) NAME RE.BOX BITMAP  ((READBITMAP)(84 39
"OOOOOOOOOOOOOOOOOO@@@"
"OOOOOOOOOOOOOOOOOO@@@"
"L@@@@@@@@@@@@@@@@C@@@"
"L@@@@@@@@@@@@@@@@C@@@"
"L@@@@@@@@@@@@@@@@C@@@"
"L@@@@@@@@@@@@@@@@C@@@"
"L@@@@@@@@@@@@@@@@C@@@"
"L@@@@@@@@@@@@@@@@C@@@"
"L@@@@@@@@@@@@@@@@C@@@"
"L@@@@@@@@@@@@@@@@C@@@"
"L@@@@@@@@@@@@@@@@C@@@"
"L@@@@@@@@@@@@@@@@C@@@"
"L@@@@@@@@@@@@@@@@C@@@"
"L@@@@@@@@@@@@@@@@C@@@"
"L@@@@@@@@@@@@@@@@C@@@"
"L@@@@@@@@@@@@@@@@C@@@"
"L@@@@@@@@@@@@@@@@C@@@"
"L@@@@@@@@@@@@@@@@C@@@"
"L@@@@@@@@@@@@@@@@C@@@"
"L@@@@@@@@@@@@@@@@C@@@"
"L@@@@@@@@@@@@@@@@C@@@"
"L@@@@@@@@@@@@@@@@C@@@"
"L@@@@@@@@@@@@@@@@C@@@"
"L@@@@@@@@@@@@@@@@C@@@"
"L@@@@@@@@@@@@@@@@C@@@"
"L@@@@@@@@@@@@@@@@C@@@"
```

```
"L@@@@@@@@@@@@@@@@@@@@C@@@"
"L@@@@@@@@@@@@@@@@@@@@C@@@"
"L@@@@@@@@@@@@@@@@@@@@C@@@"
"L@@@@@@@@@@@@@@@@@@@@C@@@"
"L@@@@@@@@@@@@@@@@@@@@C@@@"
"L@@@@@@@@@@@@@@@@@@@@C@@@"
"L@@@@@@@@@@@@@@@@@@@@C@@@"
"L@@@@@@@@@@@@@@@@@@@@C@@@"
"L@@@@@@@@@@@@@@@@@@@@C@@@"
"L@@@@@@@@@@@@@@@@@@@@C@@@"
"L@@@@@@@@@@@@@@@@@@@@C@@@"
"OOOOOOOOOOOOOOOOOOOOOO@@@"
"OOOOOOOOOOOOOOOOOOOOOO@@@"))) (\TYPE BITMAP PLACEMENT (406 . 473) NAME BOUND.&.STAPLED BITMAP {(READBITMAP
)(60 64
"CO@GHDAB@IO@@F@@"
"B@HHDDAC@I@H@I@@"
"B@I@BDABHI@D@I@@"
"COA@BDABDI@D@F@@"
"B@I@BDABDI@D@JH@"
"B@I@BDABBI@DAAH@"
"B@HHDDABAI@HAAH@"
"CO@GHCNB@IO@@ND@"
"@@@@@@@@@@@@@@@@"
"@@@@@@@@@@@@@@@@"
"@@@@@@@@@@@@@@@@"
"@@@@@@@@@@@@@@@@"
"AOAOLB@OHH@ONGL@"
"B@HB@B@HDH@H@DB@"
"B@@B@E@HDH@H@DA@"
"AN@B@E@HDH@OLDA@"
"@A@B@HHOHH@H@DA@"
"@@HB@OHH@H@H@DA@"
"B@HBA@DH@H@H@DB@"
"AO@BA@DH@OLONGL@"
"@@@@@@@@@@@@@@@@"
"@@@@@@@@@@@@@@@@"
"@@@@@@@@@@@@@@@@"
"@@@@@@@@@@@@@@@@"
"OOOOOOL@@@@@@@@@"
"L@@@@@D@@@@@@@@@"
"N@@@@@D@@@@@@@@@"
"O@@@@@D@@@@@@@@@"
"OH@@@@D@@@@@@@@@"
"OOOOOOON@@@@@@@@"
"OOL@@@@B@@@@@@@@"
"OOL@@@@B@@@@@@@@"
"OLL@@@@B@@@@@@@@"
"OLL@@@@B@@@@@@@@"
"OLL@@@@B@@@@@@@@"
"OLL@@@@B@@@@@@@@"
"OLL@@@@B@@@@@@@@"
"OLL@@@@B@@@@@@@@"
"OLL@@@@B@@@@@@@@"
"OLL@@@@B@@@@@@@@"
"OOL@@@@B@@@@@@@@"
"OOL@@@@B@@@@@@@@"
"OOL@@@@B@@@@@@@@"
"OOL@@@@B@@@@@@@@"
"OOL@@@@B@@@@@@@@"
"OOL@@@@B@@@@@@@@"
"OOL@@@@B@@@@@@@@"
"OOL@@@@B@@@@@@@@"
"OOL@@@@B@@@@@@@@"
"OOL@@@@B@@@@@@@@"
"OOL@@@@B@@@@@@@@"
"OOL@@@@B@@@@@@@@"
"OOL@@@@B@@@@@@@@"
"OLL@@@@B@@@@@@@@"
"OLL@@@@B@@@@@@@@"
"OLL@@@@B@@@@@@@@"
"OLL@@@@B@@@@@@@@"
"OLL@@@@B@@@@@@@@"
"OLL@@@@B@@@@@@@@"
"OLL@@@@B@@@@@@@@"
"GLL@@@@B@@@@@@@@"
"COL@@@@B@@@@@@@@"
"AOL@@@@B@@@@@@@@"
"@OOOOOON@@@@@@@@"))) (\TYPE BITMAP PLACEMENT (479 . 479) NAME NO.FINISHING BITMAP {(READBITMAP)(66 58
"B@HGH@@@@@@@@@@@@@@@"
"C@HHD@@@@@@@@@@@@@@@"
"BHI@B@@@@@@@@@@@@@@@"
"BDI@B@@@@@@@@@@@@@@@"
"BDI@B@@@@@@@@@@@@@@@"
"BBI@B@@@@@@@@@@@@@@@"
"BAHHD@@@@@@@@@@@@@@@"
"B@HGH@@@@@@@@@@@@@@@"
"@@@@@@@@@@@@@@@@@@@@"
```

```
"@@@@@@@@@@@@@@@@@@@@"
"@@@@@@@@@@@@@@@@@@@@"
"@@@@@@@@@@@@@@@@@@@@"
"COAB@HHOHHBBDA@OH@@@"
"B@AC@HI@DHBBFAA@D@@@"
"B@ABHHI@@HBBEAB@@@@@"
"CNABDHHO@ONBDIB@@@@@"
"B@ABDHH@HHBBDIBCL@@@"
"B@ABBHH@DHBBDEB@D@@@"
"B@ABAHI@DHBBDCA@L@@@"
"B@AB@HHOHHBBDA@OD@@@"
"@@@@@@@@@@@@@@@@@@@@"
"@@@@@@@@@@@@@@@@@@@@"
"@@@@@@@@@@@@@@@@@@@@"
"OOOOOOL@@@@@@@@@@@@@"
"H@@@@@D@@@@@@@@@@@@@"
"H@@@@@D@@@@@@@@@@@@@"
"H@@@@@D@@@@@@@@@@@@@"
"H@@@@@D@@@@@@@@@@@@@"
"H@@@@@D@@@@@@@@@@@@@"
"K@@@@CD@@@@@@@@@@@@@"
"IH@@@FD@@@@@@@@@@@@@"
"HL@@@LD@@@@@@@@@@@@@"
"HF@@AHD@@@@@@@@@@@@@"
"HC@@C@D@@@@@@@@@@@@@"
"HAH@F@D@@@@@@@@@@@@@"
"H@L@L@D@@@@@@@@@@@@@"
"H@FAH@D@@@@@@@@@@@@@"
"H@CC@@D@@@@@@@@@@@@@"
"H@AN@@D@@@@@@@@@@@@@"
"H@@L@@D@@@@@@@@@@@@@"
"H@AN@@D@@@@@@@@@@@@@"
"H@CC@@D@@@@@@@@@@@@@"
"H@FAH@D@@@@@@@@@@@@@"
"H@L@L@D@@@@@@@@@@@@@"
"HAH@F@D@@@@@@@@@@@@@"
"HC@@C@D@@@@@@@@@@@@@"
"HF@@AHD@@@@@@@@@@@@@"
"HL@@@LD@@@@@@@@@@@@@"
"IH@@@FD@@@@@@@@@@@@@"
"K@@@@CD@@@@@@@@@@@@@"
"H@@@@@D@@@@@@@@@@@@@"
"H@@@@@D@@@@@@@@@@@@@"
"H@@@@@D@@@@@@@@@@@@@"
"H@@@@@D@@@@@@@@@@@@@"
"H@@@@@D@@@@@@@@@@@@@"
"H@@@@@D@@@@@@@@@@@@@"
"H@@@@@D@@@@@@@@@@@@@"
"OOOOOOL@@@@@@@@@@@@@"))) (\TYPE BITMAP PLACEMENT (138 . 420) NAME GHOST.1.LEFT BITMAP {(READBITMAP)(61 47

"@@@BHBJ@HBJB@BJH"
"@D@@@@@@@@A@@@@@"
"BH@H@@H@@B@B@B@@"
"@D@E@@@AD@A@@AE@"
"@@@@@@HBBBJB@B@@"
"@D@@@@@AD@@@@@@@"
"@@@HB@H@@B@B@B@@"
"@D@ED@@DA@@AEAE@"
"@@@@@@@@@@@@@@@@"
"@@@@@@@@@@@@@@@@"
"@@@@@@@@@@@@@@@@"
"@@@@@@@@@@@@@@@@"
"JJJJJH@@@@@@@@@@"
"@@@@@@D@@@@@@@@@"
"H@@@@@@@@@@@@@@@"
"@@@@@@D@@@@@@@@@"
"HH@@@@@@@@@@@@@@"
"A@@@@@D@@@@@@@@@"
"HH@@@@@@@@@@@@@@"
"A@@@@@D@@@@@@@@@"
"HH@@@@@@@@@@@@@@"
"A@@@@@D@@@@@@@@@"
"H@@@@@@@@@@@@@@@"
"@@@@@@D@@@@@@@@@"
"H@@@@@@@@@@@@@@@"
"@@@@@@D@@@@@@@@@"
"H@@@@@@@@@@@@@@@"
"@@@@@@D@@@@@@@@@"
"H@@@@@@@@@@@@@@@"
"@@@@@@D@@@@@@@@@"
"H@@@@@@@@@@@@@@@"
"@@@@@@D@@@@@@@@@"
"H@@@@@@@@@@@@@@@"
"@@@@@@D@@@@@@@@@"
"H@@@@@@@@@@@@@@@"
```

```
"@@@@@@D@@@@@@@@@"
"H@@@@@@@@@@@@@@@"
"@@@@@@D@@@@@@@@@"
"H@@@@@@@@@@@@@@@"
"@@@@@@D@@@@@@@@@"
"H@@@@@@@@@@@@@@@"
"@@@@@@D@@@@@@@@@"
"H@@@@@@@@@@@@@@@"
"@@@@@@D@@@@@@@@@"
"JJJJJJH@@@@@@@@@"))) (\TYPE BITMAP PLACEMENT (206 . 422) NAME GHOST.2.LEFT BITMAP ((READBITMAP)(68 47
"B@@J@JHB@JHH@JJBJ@@@"
"@@@@@@@@@@D@@@@DA@@@"
"@HB@@B@@@H@H@H@@@@@@"
"@@AD@@@E@@D@@EDAD@@@"
"B@@@@B@HHJHH@H@@B@@@"
"D@@@@@@E@@@@@@@@A@@@"
"H@B@HB@@@H@H@H@@@@@@"
"E@AE@@A@D@@EDEDAD@@@"
"@@@@@@@@@@@@@@@@@@@@"
"@@@@@@@@@@@@@@@@@@@@"
"@@@@@@@@@@@@@@@@@@@@"
"@@@@@@@@@@@@@@@@@@@@"
"JJJJJJH@@@@@@@@@@@@@"
"@@@@@@D@@@@@@@@@@@@@"
"H@@@@@@@@@@@@@@@@@@@"
"@@@@@@D@@@@@@@@@@@@@"
"HH@@@@@@@@@@@@@@@@@@"
"A@@@@@D@@@@@@@@@@@@@"
"HH@@@@@@@@@@@@@@@@@@"
"A@@@@@D@@@@@@@@@@@@@"
"HH@@@@@@@@@@@@@@@@@@"
"A@@@@@D@@@@@@@@@@@@@"
"H@@@@@@@@@@@@@@@@@@@"
"@@@@@@D@@@@@@@@@@@@@"
"H@@@@@@@@@@@@@@@@@@@"
"@@@@@@D@@@@@@@@@@@@@"
"H@@@@@@@@@@@@@@@@@@@"
"@@@@@@D@@@@@@@@@@@@@"
"H@@@@@@@@@@@@@@@@@@@"
"@@@@@@D@@@@@@@@@@@@@"
"H@@@@@@@@@@@@@@@@@@@"
"@@@@@@D@@@@@@@@@@@@@"
"H@@@@@@@@@@@@@@@@@@@"
"@@@@@@D@@@@@@@@@@@@@"
"H@@@@@@@@@@@@@@@@@@@"
"A@@@@@D@@@@@@@@@@@@@"
"HH@@@@@@@@@@@@@@@@@@"
"A@@@@@D@@@@@@@@@@@@@"
"HH@@@@@@@@@@@@@@@@@@"
"A@@@@@D@@@@@@@@@@@@@"
"HH@@@@@@@@@@@@@@@@@@"
"@@@@@@D@@@@@@@@@@@@@"
"H@@@@@@@@@@@@@@@@@@@"
"@@@@@@D@@@@@@@@@@@@@"
"H@@@@@@@@@@@@@@@@@@@"
"@@@@@@D@@@@@@@@@@@@@"
"JJJJJJH@@@@@@@@@@@@@"))) (\TYPE BITMAP PLACEMENT (281 . 434) NAME GHOST.1.TOP BITMAP ((READBITMAP)(59 38
"A@AEAED@@E@@@ED@"
"B@B@HB@B@H@H@H@@"
"E@@@@@@E@@D@@@@@"
"@@@J@B@@@H@H@JH@"
"A@@A@@@@@E@@@@@@"
"@@@@HB@JHH@H@H@@"
"A@@@@@A@D@@@@@@@"
"@@@J@B@@@H@JHJJ@"
"@@@@@@@@@@@@@@@@"
"@@@@@@@@@@@@@@@@"
"@@@@@@@@@@@@@@@@"
"@@@@@@@@@@@@@@@@"
"EEEEEEEED@@@@@@@"
"H@@@@@@@B@@@@@@@"
"@@@@@@@@@@@@@@@@"
"HBJ@@@@@B@@@@@@@"
"@ED@@@@@@@@@@@@@"
"H@@@@@@@B@@@@@@@"
"@@@@@@@@@@@@@@@@"
"H@@@@@@@B@@@@@@@"
"@@@@@@@@@@@@@@@@"
"H@@@@@@@B@@@@@@@"
"@@@@@@@@@@@@@@@@"
"H@@@@@@@B@@@@@@@"
"@@@@@@@@@@@@@@@@"
"H@@@@@@@B@@@@@@@"
"@@@@@@@@@@@@@@@@"
"H@@@@@@@B@@@@@@@"
"@@@@@@@@@@@@@@@@"
"H@@@@@@@B@@@@@@@"
"@@@@@@@@@@@@@@@@"
```

"H@@@@@@@B@@@@@@@"
"@@@@@@@@@@@@@@@@"
"H@@@@@@@B@@@@@@@"
"@@@@@@@@@@@@@@@@"
"H@@@@@@@B@@@@@@@"
"@@@@@@@@@@@@@@@@"
"JJJJJJJJ@@@@@@@@")}) (\TYPE BITMAP PLACEMENT (346 . 415) NAME GHOST.BOUND BITMAP {(READBITMAP)(46 52
"AE@E@DA@@AE@"
"B@HH@@@B@H@H"
"@@A@@DA@@A@D"
"BJ@@B@@B@H@@"
"@@A@@DA@DA@D"
"B@H@B@@BBH@@"
"@@@@DDA@AA@@"
"BJ@BHBJB@HJ@"
"@@@@@@@@@@@@"
"@@@@@@@@@@@@"
"@@@@@@@@@@@@"
"@@@@@@@@@@@@"
"EEEEEED@@@@@"
"H@@@@@@@@@@@"
"D@@@@@D@@@@@"
"J@@@@@@@@@@@"
"E@@@@@D@@@@@"
"JJJJJJJ@@@@@"
"EED@@@@@@@@@"
"JJH@@@@B@@@@"
"EED@@@@@@@@@"
"JJH@@@@B@@@@"
"EED@@@@@@@@@"
"JJH@@@@B@@@@"
"EED@@@@@@@@@"
"JJH@@@@B@@@@"
"EED@@@@@@@@@"
"JJH@@@@B@@@@"
"EED@@@@@@@@@"
"JJH@@@@B@@@@"
"EED@@@@@@@@@"
"JJH@@@@B@@@@"
"EED@@@@@@@@@"
"JJH@@@@B@@@@"
"EED@@@@@@@@@"
"JJH@@@@B@@@@"
"EED@@@@@@@@@"
"JJH@@@@B@@@@"
"EED@@@@@@@@@"
"JJH@@@@B@@@@"
"EED@@@@@@@@@"
"JJH@@@@B@@@@"
"EED@@@@@@@@@"
"JJH@@@@B@@@@"
"EED@@@@@@@@@"
"JJH@@@@B@@@@"
"EED@@@@@@@@@"
"JJH@@@@B@@@@"
"EED@@@@@@@@@"
"BJH@@@@B@@@@"
"AED@@@@@@@@@"
"@JJJJJJJ@@@@")}) (\TYPE BITMAP PLACEMENT (399 . 405) NAME GHOST.BOUND.&.STAPLED BITMAP {(READBITMAP)(60 6
4
"AE@E@DA@@AE@@D@@"
"B@HH@@@B@H@H@H@@"
"@@A@@DA@@A@D@A@@"
"BJ@@B@@B@H@@@B@@"
"@@A@@DA@DA@D@@@@"
"B@H@B@@BBH@@@@H@"
"@@@@DDA@AA@@AA@@"
"BJ@BHBJB@HJ@@J@@"
"@@@@@@@@@@@@@@@@"
"@@@@@@@@@@@@@@@@"
"@@@@@@@@@@@@@@@@"
"@@@@@@@@@@@@@@@@"
"AEAED@@E@@@EDED@"
"B@HB@B@H@H@H@@B@"
"@@@@@E@@D@@@@DA@"
"@J@B@@@H@H@JH@@@"
"@A@@@@@E@@@@@DA@"
"@@HB@JHH@H@H@@@@"
"@@@@A@D@@@@@@D@@"
"@J@B@@@H@JHJJBH@"
"@@@@@@@@@@@@@@@@"
"@@@@@@@@@@@@@@@@"
"@@@@@@@@@@@@@@@@"
"@@@@@@@@@@@@@@@@"
"EEEEEED@@@@@@@@@"
"H@@@@@@@@@@@@@@@"
"D@@@@@D@@@@@@@@@"

```
"J@@@@@@@@@@@@@@@"
"E@@@@@D@@@@@@@@@"
"JJJJJJJJ@@@@@@@@"
"EED@@@@@@@@@@@@@"
"JJH@@@@B@@@@@@@@"
"EDD@@@@@@@@@@@@@"
"JHH@@@@B@@@@@@@@"
"EDD@@@@@@@@@@@@@"
"JHH@@@@B@@@@@@@@"
"EDD@@@@@@@@@@@@@"
"JHH@@@@B@@@@@@@@"
"EDD@@@@@@@@@@@@@"
"JHH@@@@B@@@@@@@@"
"EED@@@@@@@@@@@@@"
"JJH@@@@B@@@@@@@@"
"EED@@@@@@@@@@@@@"
"JJH@@@@B@@@@@@@@"
"EED@@@@@@@@@@@@@"
"JJH@@@@B@@@@@@@@"
"EED@@@@@@@@@@@@@"
"JJH@@@@B@@@@@@@@"
"EED@@@@@@@@@@@@@"
"JJH@@@@B@@@@@@@@"
"EED@@@@@@@@@@@@@"
"JJH@@@@B@@@@@@@@"
"EED@@@@@@@@@@@@@"
"JHH@@@@B@@@@@@@@"
"EDD@@@@@@@@@@@@@"
"JHH@@@@B@@@@@@@@"
"EDD@@@@@@@@@@@@@"
"JHH@@@@B@@@@@@@@"
"EDD@@@@@@@@@@@@@"
"JHH@@@@B@@@@@@@@"
"EDD@@@@@@@@@@@@@"
"BJH@@@@B@@@@@@@@"
"AED@@@@@@@@@@@@@"
"@JJJJJJJ@@@@@@@@")))  (\TYPE BITMAP PLACEMENT  (470 . 414) NAME GHOST.NO.FINISHING BITMAP  {(READBITMAP)(66
58
"@@@E@@@@@@@@@@@@@@@@"
"B@HH@@@@@@@@@@@@@@@@"
"@@A@@@@@@@@@@@@@@@@@"
"B@H@B@@@@@@@@@@@@@@@"
"@DA@@@@@@@@@@@@@@@@@"
"BBH@B@@@@@@@@@@@@@@@"
"@A@@D@@@@@@@@@@@@@@@"
"B@HBH@@@@@@@@@@@@@@@"
"@@@@@@@@@@@@@@@@@@@@"
"@@@@@@@@@@@@@@@@@@@@"
"@@@@@@@@@@@@@@@@@@@@"
"@@@@@@@@@@@@@@@@@@@@"
"AEA@@@@E@@@@DA@E@@@@"
"B@@B@HH@@HBBB@@@@@@@"
"@@A@@@A@@@@@EA@@@@@@"
"BJ@B@HHJ@JJB@HB@@@@@"
"@@A@D@@@@@@@DA@AD@@@"
"B@@BBHH@@HBB@@B@@@@@"
"@@A@A@A@D@@@DAA@D@@@"
"B@@B@HHJHHBB@@@J@@@@"
"@@@@@@@@@@@@@@@@@@@@"
"@@@@@@@@@@@@@@@@@@@@"
"@@@@@@@@@@@@@@@@@@@@"
"JJJJJJH@@@@@@@@@@@@@"
"@@@@@@D@@@@@@@@@@@@@"
"H@@@@@@@@@@@@@@@@@@@"
"@@@@@@D@@@@@@@@@@@@@"
"H@@@@@@@@@@@@@@@@@@@"
"@@@@@@D@@@@@@@@@@@@@"
"J@@@@B@@@@@@@@@@@@@@"
"A@@@@DD@@@@@@@@@@@@@"
"HH@@@H@@@@@@@@@@@@@@"
"@D@@A@D@@@@@@@@@@@@@"
"HB@@B@@@@@@@@@@@@@@@"
"@A@@D@D@@@@@@@@@@@@@"
"H@H@H@@@@@@@@@@@@@@@"
"@@DA@@D@@@@@@@@@@@@@"
"H@BB@@@@@@@@@@@@@@@@"
"@@AD@@D@@@@@@@@@@@@@"
"H@@H@@@@@@@@@@@@@@@@"
"@@AD@@D@@@@@@@@@@@@@"
"H@BB@@@@@@@@@@@@@@@@"
"@@DA@@D@@@@@@@@@@@@@"
"H@H@H@@@@@@@@@@@@@@@"
"@A@@D@D@@@@@@@@@@@@@"
"HB@@B@@@@@@@@@@@@@@@"
"@D@@A@D@@@@@@@@@@@@@"
"HH@@@H@@@@@@@@@@@@@@"
"A@@@@DD@@@@@@@@@@@@@"
```

```
"J@@@@B@@@@@@@@@@@@@@"
"@@@@@@D@@@@@@@@@@@@@"
"H@@@@@@@@@@@@@@@@@@@"
"@@@@@@D@@@@@@@@@@@@@"
"H@@@@@@@@@@@@@@@@@@@"
"@@@@@@D@@@@@@@@@@@@@"
"H@@@@@@@@@@@@@@@@@@@"
"@@@@@@D@@@@@@@@@@@@@"
"JJJJJH@@@@@@@@@@@@@@")}))  (\TYPE BITMAP PLACEMENT  (43 . 418) NAME FINISHING BITMAP  {(READBITMAP)(64 63
"OLDHBBCNB@HI@DCN"
"H@DLBBDAB@HIHDDA"
"H@DJBBD@B@HIDDH@"
"OHDIBBCLCOHIBDH@"
"H@DIBB@BB@HIBDHO"
"H@DHJB@AB@HIADHA"
"H@DHFBDAB@HI@LDC"
"H@DHBBCNB@HI@DCM"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@@@@@@@@@@@@@@"
"@@@G@@@@@@@@@@@@"
"@@AM@@@@@@@@@@@@"
"@@GA@@@@@@@@@@@@"
"@ALA@@@@@@@@@@@@"
"@G@A@@@@@@@@@@@@"
"AL@A@@@@@@@@@@@@"
"B@@A@@@@@@@@@@@@"
"GOOOON@@@@@@@@@@"
"G@@@@@B@@@@@@@@@"
"G@@@@@B@@@@@@@@@"
"G@@@@@B@@@@@@@@@"
"G@@@@@B@@@@@@@@@"
"G@@@@@B@@@@@@@@@"
"G@@@@@B@@@@@@@@@"
"G@@@@@B@@@@@@@@@"
"G@@@@@B@@@@@@@@@"
"G@@@@@B@@@@@@@@@"
"G@@@@@B@@@@@@@@@"
"G@@@@@B@@@@@@@@@"
"G@@@@@B@@@@@@@@@"
"G@@@@@B@@@@@@@@@"
"G@@@@@B@@@@@@@@@"
"G@@@@@B@@@@@@@@@"
"G@@@@@B@@@@@@@@@"
"G@@@@@B@@@@@@@@@"
"G@@@@@B@@@@@@@@@"
"G@@@@@B@@@@@@@@@"
"G@@@@@B@@@@@@@@@"
"G@@@@@B@@@@@@@@@"
"G@@@@@B@@@@@@@@@"
"G@@@@@B@@@@@@@@@"
"G@@@@@B@@@@@@@@@"
"G@@@@@B@@@@@@@@@"
"G@@@@@B@@@@@@@@@"
"G@@@@@B@@@@@@@@@"
"G@@@@@B@@@@@@@@@"
"G@@@@@B@@@@@@@@@"
"G@@@@@B@@@@@@@@@"
"G@@@@@BB@@@@@@@@"
"G@@@@@BF@@@@@@@@"
"G@@@@@BN@@@@@@@@"
"GOOOOONN@@@@@@@@"
"@@@@@@@N@@@@@@@@"
"GOOOOOON@@@@@@@@"
"GOOOOOON@@@@@@@@"
"GOOOOOOL@@@@@@@@"
"GOOOOOOH@@@@@@@@"
"GOOOOOO@@@@@@@@@")}))) CLASSES  (BITMAP.FRAMES))  (\TYPE FRAME NAME PROG.SCORE.DIRECT SUPERFRAMES  (FRAME.PRO
GRAMMING)
ITEMS  ((\TYPE STRAIGHT.LINE PLACEMENT  (21 3 21 390 NIL) WIDTH 2)  (\TYPE STRAIGHT.LINE PLACEMENT  (
23 4 305 4 NIL) WIDTH 2)  (\TYPE STRAIGHT.LINE PLACEMENT  (304 5 304 392 NIL) WIDTH 2)  (\TYPE
STRAIGHT.LINE PLACEMENT  (305 392 314 401 NIL) WIDTH 1)  (\TYPE STRAIGHT.LINE PLACEMENT  (306 5 315 14
 NIL) WIDTH 1)  (\TYPE STRAIGHT.LINE PLACEMENT  (313 13 313 400 NIL) WIDTH 1)  (\TYPE STRAIGHT.LINE
PLACEMENT  (309 10 309 397 NIL) WIDTH 1)  (\TYPE STRAIGHT.LINE PLACEMENT  (168 396 306 396 NIL) WIDTH
1)  (\TYPE STRAIGHT.LINE PLACEMENT  (42 397 42 440 NIL) WIDTH 2)  (\TYPE STRAIGHT.LINE PLACEMENT  (43
440 99 440 NIL) WIDTH 2)  (\TYPE STRAIGHT.LINE PLACEMENT  (99 398 99 441 NIL) WIDTH 2)  (\TYPE
STRAIGHT.LINE PLACEMENT  (110 392 110 435 NIL) WIDTH 2)  (\TYPE STRAIGHT.LINE PLACEMENT  (168 392 168
435 NIL) WIDTH 2)  (\TYPE STRAIGHT.LINE PLACEMENT  (238 400 310 400 NIL) WIDTH 1)  (\TYPE
STRAIGHT.LINE PLACEMENT  (182 401 182 444 NIL) WIDTH 2)  (\TYPE STRAIGHT.LINE PLACEMENT  (182 443 238
443 NIL) WIDTH 2)  (\TYPE STRAIGHT.LINE PLACEMENT  (237 401 237 444 NIL) WIDTH 2)  (\TYPE
STRAIGHT.LINE PLACEMENT  (169 392 303 392 NIL) WIDTH 1)  (\TYPE STRAIGHT.LINE PLACEMENT  (112 397 98
397 NIL) WIDTH 1)  (\TYPE STRAIGHT.LINE PLACEMENT  (111 402 98 402 NIL) WIDTH 1)  (\TYPE STRAIGHT.LINE
 PLACEMENT  (182 401 168 401 NIL) WIDTH 1)  (\TYPE STRAIGHT.LINE PLACEMENT  (41 397 28 397 NIL) WIDTH
```

```
I) (\TYPE STRAIGHT.LINE PLACEMENT (42 402 34 402 NIL) WIDTH 1) (\TYPE STRAIGHT.LINE PLACEMENT (24
393 34 401 NIL) WIDTH 1) (\TYPE BLOCK.OF.TEXT PLACEMENT (188 . 430) LIST.OF.LINES (RDH) FONT (
GACHA 10 (MEDIUM REGULAR REGULAR))) (\TYPE BLOCK.OF.TEXT PLACEMENT (187 . 417) LIST.OF.LINES (PAGE
) FONT (GACHA 10 (MEDIUM REGULAR REGULAR))) (\TYPE BITMAP PLACEMENT (35 . 121) NAME MARGIN.SHIFT
BITMAP ((READBITMAP)(26 40
"OOOOOOL@"
"OOOOOOL@"
"L@@@@@L@"
"L@@@@@L@"
"MOO@@@L@"
"L@@@@@L@"
"MOO@@@L@"
"L@@@@@L@"
"L@@@@@L@"
"L@@@@@L@"
"L@@@@@L@"
"MOOOOLL@"
"L@L@@@L@"
"LAH@@@L@"
"MKKOOLL@"
"LF@@@@L@"
"LL@@@@L@"
"MOOOGLL@"
"MOOO@@L@"
"LL@@@@L@"
"LGOOOLL@"
"LC@@@@L@"
"LAH@@@L@"
"MOOOOLL@"
"L@L@@@L@"
"L@@@@@L@"
"MOOOOLL@"
"L@@@@@L@"
"L@@@@AL@"
"MOOONCL@"
"L@@@@NL@"
"L@@@@LL@"
"MOOOILH@"
"L@@@C@H@"
"L@@@BAH@"
"L@@@CA@@"
"L@@@AK@@"
"L@@@@O@@"
"OOOOOO@@"
"OOOOOL@@"))) (\TYPE BITMAP PLACEMENT (86 . 308) NAME TRAY1 BITMAP ((READBITMAP)(101 57
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@OOOOOOOOOOL@@@@@@@@"
"@@@@@@@@A@@@@@@@@@@D@@@@@@@@"
"@@@@@@@@B@@@@@@@@@@H@@@@@@@@"
"@@@@@@@@D@@@@@@@@@A@@@@@@@@@"
"@@@@@@@@H@@@@@@@@@CL@@@@@@@@"
"@@@@@@@A@@@@@@@@@@DD@@@@@@@@"
"@@@@@@@B@@@@@@@@@HH@@@@@@@@@"
"@@@@@@@D@@@@@@@@@AA@@@@@@@@@"
"@@@@@@@H@@@@@@@@@BCL@@@@@@@@"
"@@@@@@A@@@@@@@@@@DDD@@@@@@@@"
"@@@@@GOOOOOOOOON@HHH@@@@@@@@"
"@@@@@GOOOOOOOOONAAA@@@@@@@@@"
"@@@@@F@@@@@@@@@FBBCL@@@@@@@@"
"@@@@@F@@@@@@@@@FDDDD@@@@@@@@"
"@@@@@F@@@@@@@@@GHHHH@@@@@@@@"
"@@@@@F@F@@@@@@@FAAA@@@@@@@@@"
"@@@@@F@N@@@@@@@FBBCL@@@@@@@@"
"@@@@@FAN@@@@@@@FDDDD@@@@@@@@"
"@@@@@F@F@@@@@@@GHHHH@@@@@@@@"
"@@@@@F@F@@@@@@@FAAA@@@@@@@@@"
"@@@@@F@F@@@@@@@FBBCL@@@@@@@@"
"@@@@@F@F@@@@@@@FDDDD@@@@@@@@"
"@@@@@F@F@@@@@@@GHHHH@@@@@@@@"
"@@@@@F@@@@@@@@@FAAA@@@@@@@@@"
"@@@@@F@@@@@@@@@FBBCL@@@@@@@@"
"@@@@@F@@@@@@@@@FDDDD@@@@@@@@"
```

"@@@@@F@@@@@@@@@@GHHHH@@@@@@@@@"
"@@@@@F@@@@@@@@@@FAAA@@@@@@@@@@"
"@@@@@F@@@@@@@@@@FBBB@@@@@@@@@@"
"@@@@@F@@@@@@@@@@FDDD@@@@@@@@@@"
"@@@@@F@@@@@@@@@@GHHH@@@@@@@@@@"
"@@@@@F@@@@@@@@@@FAA@@@@@@@@@@@"
"@@@@@F@@@@@@@@@@FBB@@@@@@@@@@@"
"@@@@@F@@@@@@@@@@FDD@@@@@@@@@@@"
"@@@@@F@@@@@@@@@@GHH@@@@@@@@@@@"
"@@@@@F@@@@@@@@@@FA@@@@@@@@@@@@"
"@@@@@F@@@@@@@@@@FB@@@@@@@@@@@@"
"@@@@@GOOOOOOOOOOND@@@@@@@@@@@@"
"@@@@@GOOOOOOOOOOOH@@@@@@@@@@@@"
"@@@@@@@@@@@@@@@@@@@@@@@@@@@@@@"
"@@@@@@@@@@@@@@@@@@@@@@@@@@@@@@"))) (\TYPE BLOCK.OF.TEXT PLACEMENT (158 . 375) LIST.OF.LINES (SUPPLY) FONT (HELVETICA 10 (MEDIUM
REGULAR REGULAR))) (\TYPE BLOCK.OF.TEXT PLACEMENT (112 . 375) LIST.OF.LINES (PAPER) FONT ( HELVETICA 10 (MEDIUM REGULAR REGULAR))) (\TYPE BLOCK.OF.TEXT PLACEMENT (112 . 360) LIST.OF.LINES ( 8.5X11) FONT (HELVETICA 10 (MEDIUM REGULAR REGULAR))) (\TYPE BLOCK.OF.TEXT PLACEMENT (35 . 167) LIST.OF.LINES (SHIFT) FONT (HELVETICA 10 (MEDIUM REGULAR REGULAR))) (\TYPE BLOCK.OF.TEXT PLACEMENT (35 . 179) LIST.OF.LINES (MARGIN) FONT (HELVETICA 10 (MEDIUM REGULAR REGULAR))) (\TYPE STRAIGHT.LINE PLACEMENT (162 313 221 313 NIL) WIDTH 3) (\TYPE STRAIGHT.LINE PLACEMENT (110 435 168 435 NIL) WIDTH 2) (\TYPE STRAIGHT.LINE PLACEMENT (23 391 111 391 NIL) WIDTH 1) (\TYPE BLOCK.OF.TEXT PLACEMENT (48 . 427) LIST.OF.LINES (MAIN) FONT (GACHA 10 (MEDIUM REGULAR REGULAR))) (\TYPE BLOCK.OF.TEXT PLACEMENT (48 . 415) LIST.OF.LINES (JOB) FONT (GACHA 10 (MEDIUM REGULAR REGULAR))) (\TYPE BLOCK.OF.TEXT PLACEMENT (115 . 423) LIST.OF.LINES (DIRECT)) (\TYPE BLOCK.OF.TEXT PLACEMENT (115 . 409) LIST.OF.LINES (PAGE)) (\TYPE GROUP PLACEMENT (153 . 238) MEMBERS ((\TYPE BLOCK.OF.TEXT PLACEMENT (-45 . -13) LIST.OF.LINES (DARKNESS) FONT (GACHA 10 (BOLD REGULAR REGULAR)) SUBITEMS NIL BOUNDING.BOX NIL) (\TYPE BLOCK.OF.TEXT PLACEMENT (-45 . 0) LIST.OF.LINES (CONTRAST) FONT ( GACHA 10 (BOLD REGULAR REGULAR)) SUBITEMS NIL BOUNDING.BOX NIL) (\TYPE BLOCK.OF.TEXT PLACEMENT (-45 . 12) LIST.OF.LINES (STANDARD) FONT (GACHA 10 (BOLD REGULAR REGULAR)) SUBITEMS NIL BOUNDING.BOX NIL) (\TYPE BLOCK.OF.TEXT PLACEMENT (13 . -13) LIST.OF.LINES (4) FONT (GACHA 10 (BOLD REGULAR REGULAR)) SUBITEMS NIL BOUNDING.BOX NIL) (\TYPE BLOCK.OF.TEXT PLACEMENT (14 . 0) LIST.OF.LINES (4) FONT (GACHA 10 (BOLD REGULAR REGULAR)) SUBITEMS NIL BOUNDING.BOX NIL) (\TYPE BORDER PLACEMENT (-51 -19 75 43) THICKNESS 2 BOUNDING.BOX NIL SUBITEMS NIL) (\TYPE BLOCK.OF.TEXT PLACEMENT (-52 . 30) LIST.OF.LINES (COPY) FONT (HELVETICA 10 (MEDIUM REGULAR REGULAR)) SUBITEMS NIL BOUNDING.BOX NIL) ( \TYPE BLOCK.OF.TEXT PLACEMENT (-12 . 30) LIST.OF.LINES (QUALITY) FONT (HELVETICA 10 (MEDIUM REGULAR REGULAR)) SUBITEMS NIL BOUNDING.BOX NIL))) (\TYPE BITMAP PLACEMENT (225 . 157) NAME TABS BITMAP ((READBITMAP)(29 35
"OOOOOOL@"
"OOOOOOL@"
"L@@@@@L@"
"L@@@@@L@"
"L@@@@@L@"
"L@@@@@L@"
"L@@@@@L@"
"L@@@@@OH"
"L@@@@@OH"
"L@@@@@AH"
"L@@@@@AH"
"L@@@@@AH"
"L@@@@@AH"
"L@@@@@AH"
"L@@@@@AH"
"L@@@@@AH"
"L@@@@@OH"
"L@@@@@OH"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"OOOOOOL@"
"OOOOOOL@"))) (\TYPE BITMAP PLACEMENT (120 . 14) NAME REPEAT.COPIES BITMAP ((READBITMAP)(30 41
"AOOOOOOL"
"A@@@@@@D"
"A@@@@@@D"
"GOOOOOOD"
"D@@@@@AD"
"D@@@@@AD"
"OOOOOOMD"
"H@@@@@ED"
"H@@@@@ED"
"H@@@@@ED"
"H@@@@@ED"
"H@@@@@ED"
"H@@@@@ED"

```
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@EL"
"H@@@@@G@"
"H@@@@@D@"
"OOOOOOL@"))) (\TYPE BITMAP PLACEMENT (122 . 119) NAME SIMPLE.BUTTON.BITMAP BITMAP {(READBITMAP)(26 40
"OOOOOOL@"
"OOOOOOL@"
"L@@H@@L@"
"L@AL@@L@"
"MOKN@@L@"
"L@FK@@L@"
"MNNIH@L@"
"LAHHL@L@"
"LA@HD@L@"
"L@@H@@L@"
"L@@H@@L@"
"MOOOOLL@"
"L@LIH@L@"
"LAHHL@L@"
"MKKOFLL@"
"LF@HC@L@"
"LL@HAHL@"
"MOOOOLL@"
"MOOOOLL@"
"LL@HAHL@"
"LGOOODL@"
"LC@HF@L@"
"LAHHL@L@"
"MOOOMLL@"
"L@LIH@L@"
"L@@H@@L@"
"MOOOOLL@"
"L@@H@@L@"
"L@@H@AL@"
"MOOONCL@"
"L@@H@NL@"
"LA@HDLL@"
"MMKNMLH@"
"L@LIK@H@"
"L@FKBAH@"
"L@CNCA@@"
"L@ALAK@@"
"L@@H@O@@"
"OOOOOO@@"
"OOOOOL@@"))) (\TYPE BITMAP PLACEMENT (225 . 49) NAME BLANK.PAGE BITMAP {(READBITMAP)(26 40
"OOOOOOL@"
"OOOOOOL@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
```

```
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@AL@"
"L@@@@CL@"
"L@@@@NL@"
"L@@@@LL@"
"L@@@ALH@"
"L@@@C@H@"
"L@@@BAH@"
"L@@@CA@@"
"L@@@AK@@"
"L@@@@O@@"
"OOOOOO@@"
"OOOOOL@@")}) (\TYPE BLOCK.OF.TEXT PLACEMENT (122 . 164) LIST.OF.LINES (CROPPING) FONT (HELVETICA 10 (
MEDIUM REGULAR REGULAR))) (\TYPE BLOCK.OF.TEXT PLACEMENT (225 . 197) LIST.OF.LINES (TABS) FONT (
HELVETICA 10 (MEDIUM REGULAR REGULAR))) (\TYPE BLOCK.OF.TEXT PLACEMENT (225 . 95) LIST.OF.LINES (
PAGE) FONT (HELVETICA 10 (MEDIUM REGULAR REGULAR))) (\TYPE BLOCK.OF.TEXT PLACEMENT (225 . 107)
LIST.OF.LINES (BLANK) FONT (HELVETICA 10 (MEDIUM REGULAR REGULAR))) (\TYPE BLOCK.OF.TEXT PLACEMENT
 (119 . 60) LIST.OF.LINES (COPIES) FONT (HELVETICA 10 (MEDIUM REGULAR REGULAR))) (\TYPE
BLOCK.OF.TEXT PLACEMENT (119 . 73) LIST.OF.LINES (REPEAT) FONT (HELVETICA 10 (MEDIUM REGULAR
REGULAR))) (\TYPE BITMAP PLACEMENT (224 . 270) NAME INSERTS BITMAP {(READBITMAP)(44 45
"@@COOOOOOH@@"
"@@B@@@@@@H@@"
"@@OOOOOONH@@"
"@@H@@@@@BH@@"
"@COOOOOOBH@@"
"@B@@@@@ABH@@"
"@B@@@OOOOOO@"
"@B@@@H@@@@A@"
"COOOOOO@@@A@"
"B@@@@@A@@@A@"
"OOOOOOM@@@A@"
"H@@@@@E@@@A@"
"H@@@@@E@@@A@"
"H@@@@@E@@@A@"
"H@@@@@E@@@A@"
"H@@@@@E@@@A@"
"H@@@@@E@@@A@"
"H@@@@@E@@@A@"
"H@@@@@E@@@A@"
"H@@@@@E@@@A@"
"H@@@@@E@C@A@"
"H@@@@@E@F@A@"
"H@@@@@E@L@A@"
"H@@@@@EAH@A@"
"H@@@@@ECOOM@"
"H@@@@@ECOOM@"
"H@@@@@EAH@A@"
"H@@@@@E@L@A@"
"H@@@@@E@F@A@"
"H@@@@@E@C@A@"
"H@@@@@E@@@A@"
"H@@@@@E@@@A@"
"H@@@@@E@@@A@"
"H@@@@@E@@@A@"
"H@@@@@E@@@A@"
"H@@@@@E@@@A@"
"H@@@@@E@@@A@"
"H@@@@@E@@@A@"
"H@@@@@E@@@A@"
"H@@@@@E@@@A@"
"H@@@@@E@@@A@"
"H@@@@@EOOOO@"
"H@@@@@G@@@@@"
"H@@@@@D@@@@@"
"OOOOOOL@@@@@")}) (\TYPE BLOCK.OF.TEXT PLACEMENT (225 . 321) LIST.OF.LINES (INSERTS) FONT (HELVETICA 10
(MEDIUM
 REGULAR REGULAR))) (\TYPE STRAIGHT.LINE PLACEMENT (130 304 130 281 NIL) WIDTH 3) (\TYPE
STRAIGHT.LINE PLACEMENT (240 266 240 212 NIL) WIDTH 3) (\TYPE STRAIGHT.LINE PLACEMENT (321 21 369
21 NIL) WIDTH 2) (\TYPE STRAIGHT.LINE PLACEMENT (321 22 321 70 NIL) WIDTH 2) (\TYPE STRAIGHT.LINE
PLACEMENT (368 22 368 70 NIL) WIDTH 2) (\TYPE STRAIGHT.LINE PLACEMENT (323 70 368 70 NIL) WIDTH 2)
 (\TYPE BLOCK.OF.TEXT PLACEMENT (320 . 76) LIST.OF.LINES (PAGE) FONT (HELVETICA 10 (MEDIUM REGULAR
 REGULAR))) (\TYPE BLOCK.OF.TEXT PLACEMENT (320 . 88) LIST.OF.LINES (NEXT) FONT (HELVETICA 10 (
MEDIUM REGULAR REGULAR))) (\TYPE SENSITIVE.REGION.CHANGE.FRAME PLACEMENT (46 395 50 50) FRAME
PROG.SCORE.MAIN.PAPER) (\TYPE SENSITIVE.REGION.CHANGE.FRAME PLACEMENT (187 397 50 50) FRAME
PROG.SCORE.RDH))) (\TYPE FRAME NAME PROG.SCORE.MAIN ITEMS ((\TYPE STRAIGHT.LINE PLACEMENT (17 9 17
396 NIL) WIDTH 2) (\TYPE STRAIGHT.LINE PLACEMENT (19 10 301 10 NIL) WIDTH 2) (\TYPE STRAIGHT.LINE
PLACEMENT (300 11 300 398 NIL) WIDTH 2) (\TYPE STRAIGHT.LINE PLACEMENT (301 398 310 407 NIL) WIDTH
1) (\TYPE STRAIGHT.LINE PLACEMENT (302 11 311 20 NIL) WIDTH 1) (\TYPE STRAIGHT.LINE PLACEMENT (309
 19 309 406 NIL) WIDTH 1) (\TYPE STRAIGHT.LINE PLACEMENT (305 16 305 403 NIL) WIDTH 1) (\TYPE
```

```
STRAIGHT.LINE PLACEMENT  (164 402 302 402 NIL) WIDTH 1)  (\TYPE STRAIGHT.LINE PLACEMENT  (38 397 38
440 NIL) WIDTH 2)  (\TYPE STRAIGHT.LINE PLACEMENT  (38 440 94 440 NIL) WIDTH 2)  (\TYPE STRAIGHT.LINE
PLACEMENT  (93 397 93 440 NIL) WIDTH 2)  (\TYPE STRAIGHT.LINE PLACEMENT  (107 403 107 446 NIL) WIDTH 2
)  (\TYPE STRAIGHT.LINE PLACEMENT  (108 446 164 446 NIL) WIDTH 2)  (\TYPE STRAIGHT.LINE PLACEMENT  (
163 403 163 446 NIL) WIDTH 2)  (\TYPE STRAIGHT.LINE PLACEMENT  (234 406 306 406 NIL) WIDTH 1)  (\TYPE
STRAIGHT.LINE PLACEMENT  (178 407 178 450 NIL) WIDTH 2)  (\TYPE STRAIGHT.LINE PLACEMENT  (178 449 234
449 NIL) WIDTH 2)  (\TYPE STRAIGHT.LINE PLACEMENT  (233 407 233 450 NIL) WIDTH 2)  (\TYPE
STRAIGHT.LINE PLACEMENT  (94 397 299 397 NIL) WIDTH 1)  (\TYPE STRAIGHT.LINE PLACEMENT  (39 397 18 397
 NIL) WIDTH 1)  (\TYPE STRAIGHT.LINE PLACEMENT  (108 403 94 403 NIL) WIDTH 1)  (\TYPE STRAIGHT.LINE
PLACEMENT  (107 408 94 408 NIL) WIDTH 1)  (\TYPE STRAIGHT.LINE PLACEMENT  (178 407 164 407 NIL) WIDTH
1)  (\TYPE STRAIGHT.LINE PLACEMENT  (37 403 24 403 NIL) WIDTH 1)  (\TYPE STRAIGHT.LINE PLACEMENT  (38
408 30 408 NIL) WIDTH 1)  (\TYPE STRAIGHT.LINE PLACEMENT  (20 399 30 407 NIL) WIDTH 1)  (\TYPE
BLOCK.OF.TEXT PLACEMENT  (44 . 430) LIST.OF.LINES  (MAIN))  (\TYPE BLOCK.OF.TEXT PLACEMENT  (43 . 415)
 LIST.OF.LINES  (JOB))  (\TYPE BLOCK.OF.TEXT PLACEMENT  (111 . 432) LIST.OF.LINES  (DIRECT) FONT  (
GACHA 10  (MEDIUM REGULAR REGULAR)))  (\TYPE BLOCK.OF.TEXT PLACEMENT  (112 . 418) LIST.OF.LINES  (PAGE
) FONT  (GACHA 10  (MEDIUM REGULAR REGULAR)))  (\TYPE BLOCK.OF.TEXT PLACEMENT  (184 . 436)
LIST.OF.LINES  (RDH) FONT  (GACHA 10  (MEDIUM REGULAR REGULAR)))  (\TYPE BLOCK.OF.TEXT PLACEMENT  (183
 . 423) LIST.OF.LINES  (PAGE) FONT  (GACHA 10  (MEDIUM REGULAR REGULAR)))  (\TYPE BLOCK.OF.TEXT
PLACEMENT  (154 . 381) LIST.OF.LINES  (SUPPLY) FONT  (HELVETICA 10  (MEDIUM REGULAR REGULAR)))  (\TYPE
 BLOCK.OF.TEXT PLACEMENT  (108 . 381) LIST.OF.LINES  (PAPER) FONT  (HELVETICA 10  (MEDIUM REGULAR
REGULAR)))  (\TYPE STRAIGHT.LINE PLACEMENT  (94 252 57 252 NIL) WIDTH 3)  (\TYPE STRAIGHT.LINE
PLACEMENT  (239 163 239 118 NIL) WIDTH 3)  (\TYPE STRAIGHT.LINE PLACEMENT  (62 149 89 149 NIL) WIDTH 3
)  (\TYPE STRAIGHT.LINE PLACEMENT  (156 319 196 319 NIL) WIDTH 3)  (\TYPE SET.OF.INDICATORS PLACEMENT
 (105 . 316) INDICATORS  ((TRAY1 0)  (TRAY1 1)  (TRAY2 2)  (TRAY3 3)  (TRAYS1&3 4)  (SHADOW.TRAY1 5)
(SHADOW.TRAY2 6)  (SHADOW.TRAY3 7)) CELL CELL.PROG.MAIN.PAPER OFF-COLOR WHITE VERSION 1)  (\TYPE
PRINT.REGION PLACEMENT  (92 362 88 13) FONT  (HELVETICA 10  (MEDIUM REGULAR REGULAR)) CELL
CELL.PROG.MAIN.PAPER.SIZE MARGIN 2 BACKGROUND 0)  (\TYPE PRINT.REGION PLACEMENT  (159 359 112 16) CELL
 CELL.PROG.MAIN.PAPER.WORK.CHOICES BACKGROUND 0 FONT  (GACHA 10  (MEDIUM REGULAR REGULAR)))  (\TYPE
SET.OF.INDICATORS PLACEMENT  (198 . 275) CELL CELL.PROG.MAIN.COVERS INDICATORS  ((SHADOW.NO.COVERS 0)
 (NO.COVERS 1)  (FRONT.COVERS 2)  (BACK.COVERS 3)  (FRONT.COVERS 4)  (BOTH.COVERS 5)  (BACK.COVERS 6)
 (BOTH.COVERS 7)  (BOTH.COVERS 8)  (BOTH.COVERS 9)) VERSION 1)  (\TYPE PRINT.REGION PLACEMENT  (236
335 47 14) CELL CELL.PROG.MAIN.COVERS.TEXT1 BACKGROUND 0)  (\TYPE PRINT.REGION PLACEMENT  (191 260 49
14) CELL CELL.PROG.MAIN.COVERS.TEXT2 BACKGROUND 0)  (\TYPE SET.OF.INDICATORS PLACEMENT  (25 . 231)
CELL CELL.PROG.MAIN.CROPPING INDICATORS  ((CROPPING.SHADOW 0)  (STANDARD 1)  (NO.CROPPING 2)  (
MANUAL.CONTROL.CROPPING 3)) VERSION 1)  (\TYPE BLOCK.OF.TEXT PLACEMENT  (107 . 268) LIST.OF.LINES  (
ENLARGE) FONT  (HELVETICA 10  (MEDIUM REGULAR REGULAR)))  (\TYPE LINE.OF.TEXT PLACEMENT  (107 . 280)
LINE REDUCE/ XALIGNMENT LEFT FONT  (HELVETICA 10  (MEDIUM REGULAR REGULAR)) SOURCE INPUT OPERATION
REPLACE TEXTURE 65535 FIGURE-COLOR BLACK GROUND-COLOR WHITE)  (\TYPE SET.OF.INDICATORS PLACEMENT  (101
 . 221) CELL CELL.PROG.MAIN.RE INDICATORS  ((SHADOW.RE.BOX 0)  (RE.BOX 1)) VERSION 1)  (\TYPE
PRINT.REGION PLACEMENT  (114 229 38 14) CELL CELL.PROG.MAIN.RE.TEXT BACKGROUND 0)  (\TYPE PRINT.REGION
 PLACEMENT  (106 245 75 13) CELL CELL.PROG.MAIN.RE.TEXT.FULLSIZE BACKGROUND 0 MARGIN 0)  (\TYPE
BLOCK.OF.TEXT PLACEMENT  (153 . 232) LIST.OF.LINES  ("%%") FONT  (HELVETICA 10  (BOLD REGULAR REGULAR)
))  (\TYPE SET.OF.INDICATORS PLACEMENT  (98 . 116) CELL CELL.PROG.MAIN.SIDES INDICATORS  ((
SHADOW.1.TO.1 0)  (1.TO.1 1)  (1.TO.2 2)  (2.TO.1 3)  (2.TO.2 4)) VERSION 1)  (\TYPE SET.OF.INDICATORS
 PLACEMENT  (225 . 43) CELL CELL.PROG.MAIN.FINISHING INDICATORS  ((FINISHING 0)  (1.LEFT 1)  (2.LEFT 2
)  (1.TOP 3)  (BOUND1 4)  (BOUND.&.STAPLED 5)  (NO.FINISHING 6)) VERSION 1)  (\TYPE SET.OF.INDICATORS
PLACEMENT  (201 . 179) CELL CELL.PROG.MAIN.COPY INDICATORS  ((COPY.OUTPUT 0)  (TOP.TRAY 1)  (COLLATED
2)  (UNCOLLATED 3)) VERSION 1)  (\TYPE SET.OF.INDICATORS PLACEMENT  (27 . 129) CELL
CELL.PROG.MAIN.MARGIN INDICATORS  ((SHADOW.MARGIN.SHIFT 0)  (MARGIN.SHIFT 1)) VERSION 1)  (\TYPE
SET.OF.INDICATORS PLACEMENT  (101 . 21) CELL CELL.PROG.MAIN.QUALITY INDICATORS  ((COPY.QUALITY 0)  (
QUALITY.STANDARD 1)  (QUALITY.LIGHT 2)  (QUALITY.PHOTO 3)  (QUALITY.COLORED 4)  (QUALITY.GOLDENROD 5)
 (QUALITY.PASTEUP 6)  (QUALITY.HALFTONE 7)) VERSION 1)  (\TYPE IMPLICATION PLACEMENT  (13 . 23) NAME
SET.COPYIMAGE&LIGHTER-DARKER CELL CELL.PROG.MAIN.QUALITY ACTION.FORM  (SELECTQ  (CELL.VALUE
CELL.PROG.MAIN.QUALITY)  (1  (PROG NIL  (CHANGE.CELL CELL.PROG.MAIN.QUALITY.LIGHTER  "LIGHTER")  (
CHANGE.CELL CELL.PROG.MAIN.QUALITY.DARKER  "DARKER")  (CHANGE.CELL CELL.PROG.MAIN.QUALITY.IMAGE
"COPY IMAGE")  (CHANGE.CELL CELL.PROG.MAIN.QUALITY.LIGHTER.TOP  " ")  (CHANGE.CELL
CELL.PROG.MAIN.QUALITY.DARKER.TOP  " ")))  (2  (PROG NIL  (CHANGE.CELL CELL.PROG.MAIN.QUALITY.LIGHTER
 "LIGHTER")  (CHANGE.CELL CELL.PROG.MAIN.QUALITY.DARKER  "DARKER")  (CHANGE.CELL
CELL.PROG.MAIN.QUALITY.IMAGE  "COPY IMAGE")  (CHANGE.CELL CELL.PROG.MAIN.QUALITY.LIGHTER.TOP  " ")  (
CHANGE.CELL CELL.PROG.MAIN.QUALITY.DARKER.TOP  " ")))  (3  (PROG NIL  (CHANGE.CELL
CELL.PROG.MAIN.QUALITY.LIGHTER  "LESS")  (CHANGE.CELL CELL.PROG.MAIN.QUALITY.DARKER  "MORE")  (
CHANGE.CELL CELL.PROG.MAIN.QUALITY.IMAGE  "COPY CONTRAST")  (CHANGE.CELL
CELL.PROG.MAIN.QUALITY.LIGHTER.TOP  " ")  (CHANGE.CELL CELL.PROG.MAIN.QUALITY.DARKER.TOP  " ")))  (4
(PROG NIL  (CHANGE.CELL CELL.PROG.MAIN.QUALITY.LIGHTER  "LIGHTER")  (CHANGE.CELL
CELL.PROG.MAIN.QUALITY.DARKER  "DARKER")  (CHANGE.CELL CELL.PROG.MAIN.QUALITY.IMAGE  "COPY BACKGROUND"
)  (CHANGE.CELL CELL.PROG.MAIN.QUALITY.LIGHTER.TOP  " ")  (CHANGE.CELL
CELL.PROG.MAIN.QUALITY.DARKER.TOP  " ")))  (5  (PROG NIL  (CHANGE.CELL CELL.PROG.MAIN.QUALITY.LIGHTER
 "LIGHTER")  (CHANGE.CELL CELL.PROG.MAIN.QUALITY.DARKER  "DARKER")  (CHANGE.CELL
CELL.PROG.MAIN.QUALITY.IMAGE  "COPY BACKGROUND")  (CHANGE.CELL CELL.PROG.MAIN.QUALITY.LIGHTER.TOP  " "
)  (CHANGE.CELL CELL.PROG.MAIN.QUALITY.DARKER.TOP  " ")))  (6  (PROG NIL  (CHANGE.CELL
CELL.PROG.MAIN.QUALITY.LIGHTER  "LESS")  (CHANGE.CELL CELL.PROG.MAIN.QUALITY.DARKER  "MORE")  (
CHANGE.CELL CELL.PROG.MAIN.QUALITY.IMAGE  "EDGE SUPRESSION")  (CHANGE.CELL
CELL.PROG.MAIN.QUALITY.LIGHTER.TOP  " ")  (CHANGE.CELL CELL.PROG.MAIN.QUALITY.DARKER.TOP  " ")))  (7
(PROG NIL  (CHANGE.CELL CELL.PROG.MAIN.QUALITY.LIGHTER  "LIGHTER")  (CHANGE.CELL
CELL.PROG.MAIN.QUALITY.DARKER  "DARKER")  (CHANGE.CELL CELL.PROG.MAIN.QUALITY.IMAGE  "COPY TONE")  (
CHANGE.CELL CELL.PROG.MAIN.QUALITY.LIGHTER.TOP  "HIGHLIGHTER")  (CHANGE.CELL
CELL.PROG.MAIN.QUALITY.DARKER.TOP  "SHADOW"))) NIL))  (\TYPE OPTION.SENSOR PLACEMENT  (105 316 55 43)
ACTION.FORM  (PROG NIL  (CHANGE.CELL CELL.PROG.MAIN.PAPER.SIZE&COVERS.1  (CELL.VALUE
CELL.GLOBAL.WHATS.IN.TRAY.1))  (CHANGE.CELL CELL.PROG.MAIN.PAPER.SIZE&COVERS.2  (CELL.VALUE
CELL.GLOBAL.WHATS.IN.TRAY.2))  (CHANGE.CELL CELL.PROG.MAIN.PAPER.SIZE&COVERS.3  (CELL.VALUE
CELL.GLOBAL.WHATS.IN.TRAY.3))  (CHANGE.CELL CELL.PROG.MAIN.PAPER.SIZE&COVERS.4  (CELL.VALUE
CELL.GLOBAL.WHATS.IN.TRAY.1&3))  (SELECTQ  (CELL.VALUE CELL.PROG.MAIN.PAPER)  (5  (CHANGE.CELL
CELL.PROG.MAIN.PAPER 0))  (6  (CHANGE.CELL CELL.PROG.MAIN.PAPER 8))  (7  (CHANGE.CELL
CELL.PROG.MAIN.PAPER 9)) NIL)  (FRAME.PUSH PROG.SCORE.MAIN.PAPER T)))  (\TYPE OPTION.SENSOR PLACEMENT
 (195 275 36 47) ACTION.FORM  (COND  ((EQUAL  (CELL.VALUE CELL.PROG.MAIN.COVERS) 0)  (PROG NIL  (
CHANGE.CELL CELL.PROG.MAIN.COVERS 1)  (FRAME.PUSH PROG.SCORE.MAIN.COVERS T)))  (T  (FRAME.PUSH
PROG.SCORE.MAIN.COVERS T))))  (\TYPE OPTION.SENSOR PLACEMENT  (25 231 25 44) ACTION.FORM  (COND  ((
```

```
EQUAL (CELL.VALUE CELL.PROG.MAIN.CROPPING) 0) (PROG NIL (CHANGE.CELL CELL.PROG.MAIN.CROPPING 1) (
FRAME.PUSH PROG.SCORE.MAIN.CROPPING T))) (T (FRAME.PUSH PROG.SCORE.MAIN.CROPPING T)))) (\TYPE
OPTION.SENSOR PLACEMENT (101 221 82 44) ACTION.FORM (PROG NIL (CHANGE.CELL CELL.PROG.MAIN.RE 1) (
FRAME.PUSH PROG.SCORE.MAIN.RE T))) (\TYPE OPTION.SENSOR PLACEMENT (212 184 40 56) ACTION.FORM (COND
 ((EQUAL (CELL.VALUE CELL.PROG.MAIN.COPY) 0) (PROG NIL (CHANGE.CELL CELL.PROG.MAIN.COPY 1) (
FRAME.PUSH PROG.SCORE.MAIN.COPY T))) (T (FRAME.PUSH PROG.SCORE.MAIN.COPY T)))) (\TYPE OPTION.SENSOR
 PLACEMENT (27 130 24 38) ACTION.FORM (COND ((EQUAL (CELL.VALUE CELL.PROG.MAIN.MARGIN) 0) (PROG
NIL (CHANGE.CELL CELL.PROG.MAIN.MARGIN 1) (FRAME.PUSH PROG.SCORE.MAIN.MARGIN T))) (T (FRAME.PUSH
PROG.SCORE.MAIN.MARGIN T)))) (\TYPE OPTION.SENSOR PLACEMENT (104 132 79 35) ACTION.FORM (COND ((
EQUAL (CELL.VALUE CELL.PROG.MAIN.SIDES) 0) (PROG NIL (CHANGE.CELL CELL.PROG.MAIN.SIDES 1) (
FRAME.PUSH PROG.SCORE.MAIN.SIDES T))) (T (FRAME.PUSH PROG.SCORE.MAIN.SIDES T)))) (\TYPE
OPTION.SENSOR PLACEMENT (101 21 75 48) ACTION.FORM (COND ((EQUAL (CELL.VALUE
CELL.PROG.MAIN.QUALITY) 0) (PROG NIL (CHANGE.CELL CELL.PROG.MAIN.QUALITY 1) (FRAME.PUSH
PROG.SCORE.MAIN.QUALITY T))) (T (FRAME.PUSH PROG.SCORE.MAIN.QUALITY T)))) (\TYPE OPTION.SENSOR
PLACEMENT (225 41 30 49) ACTION.FORM (COND ((EQUAL (CELL.VALUE CELL.PROG.MAIN.FINISHING) 0) (PROG
 NIL (CHANGE.CELL CELL.PROG.MAIN.FINISHING 6) (FRAME.PUSH PROG.SCORE.MAIN.FINISHING T))) (T (
FRAME.PUSH PROG.SCORE.MAIN.FINISHING T)))) (\TYPE OPTION.SENSOR PLACEMENT (107 402 56 43)
ACTION.FORM (FRAME.PUSH PROG.SCORE.DIRECT T)) (\TYPE OPTION.SENSOR PLACEMENT (180 408 56 43)
ACTION.FORM (FRAME.PUSH PROG.SCORE.RDH T))) SUPERFRAMES (FRAME.PROGRAMMING)) (\TYPE FRAME NAME
PROG.SCORE.MAIN.COPY SUPERFRAMES (PROG.SCORE.MAIN) ITEMS ((\TYPE SET.OF.INDICATORS PLACEMENT (360
 . 227) CELL CELL.PROG.MAIN.COPY INDICATORS ((TOP.TRAY 1) (GHOST.TOP.TRAY 2) (GHOST.TOP.TRAY 3))
VERSION 1) (\TYPE SET.OF.INDICATORS PLACEMENT (475 . 225) CELL CELL.PROG.MAIN.COPY INDICATORS ((
GHOST.COLLATED 1) (COLLATED 2) (GHOST.COLLATED 3)) VERSION 1) (\TYPE SET.OF.INDICATORS PLACEMENT (
589 . 222) CELL CELL.PROG.MAIN.COPY INDICATORS ((GHOST.UNCOLLATED 1) (GHOST.UNCOLLATED 2) (
UNCOLLATED 3)) VERSION 1) (\TYPE FLASHING.SENSITIVE.REGION PLACEMENT (361 226 56 61) ACTION.FORM (
CHANGE.CELL CELL.PROG.MAIN.COPY 1)) (\TYPE FLASHING.SENSITIVE.REGION PLACEMENT (483 232 56 61)
ACTION.FORM (CHANGE.CELL CELL.PROG.MAIN.COPY 2)) (\TYPE FLASHING.SENSITIVE.REGION PLACEMENT (596
233 56 61) ACTION.FORM (CHANGE.CELL CELL.PROG.MAIN.COPY 3)))) (\TYPE FRAME NAME
PROG.SCORE.MAIN.COVERS SUPERFRAMES (PROG.SCORE.MAIN) ITEMS ((\TYPE IMPLICATION PLACEMENT (323 . 17)
 NAME TEXT.COVERS CELL CELL.PROG.MAIN.COVERS ACTION.FORM (SELECTQ (CELL.VALUE CELL.PROG.MAIN.COVERS)
  (0 (PROG NIL (CHANGE.CELL CELL.PROG.MAIN.COVERS.TEXT1 " ") (CHANGE.CELL
CELL.PROG.MAIN.COVERS.TEXT2 " "))) (1 (PROG NIL (CHANGE.CELL CELL.PROG.MAIN.COVERS.TEXT1 " ") (
CHANGE.CELL CELL.PROG.MAIN.COVERS.TEXT2 " "))) (2 (PROG NIL (CHANGE.CELL
CELL.PROG.MAIN.COVERS.TEXT1 " ") (CHANGE.CELL CELL.PROG.MAIN.COVERS.TEXT2 "TRAY 2"))) (3 (PROG
NIL (CHANGE.CELL CELL.PROG.MAIN.COVERS.TEXT1 "TRAY 2") (CHANGE.CELL CELL.PROG.MAIN.COVERS.TEXT2
" "))) (4 (PROG NIL (CHANGE.CELL CELL.PROG.MAIN.COVERS.TEXT1 " ") (CHANGE.CELL
CELL.PROG.MAIN.COVERS.TEXT2 "TRAY 1"))) (5 (PROG NIL (CHANGE.CELL CELL.PROG.MAIN.COVERS.TEXT1
"TRAY 2") (CHANGE.CELL CELL.PROG.MAIN.COVERS.TEXT2 "TRAY 1"))) (6 (PROG NIL (CHANGE.CELL
CELL.PROG.MAIN.COVERS.TEXT1 "TRAY 1") (CHANGE.CELL CELL.PROG.MAIN.COVERS.TEXT2 " "))) (7 (PROG
NIL (CHANGE.CELL CELL.PROG.MAIN.COVERS.TEXT1 "TRAY 1") (CHANGE.CELL CELL.PROG.MAIN.COVERS.TEXT2
"TRAY 2"))) (8 (PROG NIL (CHANGE.CELL CELL.PROG.MAIN.COVERS.TEXT1 "TRAY 1") (CHANGE.CELL
CELL.PROG.MAIN.COVERS.TEXT2 "TRAY 1"))) (9 (PROG NIL (CHANGE.CELL CELL.PROG.MAIN.COVERS.TEXT1
"TRAY 2") (CHANGE.CELL CELL.PROG.MAIN.COVERS.TEXT2 "TRAY 2"))) NIL)) (\TYPE BLOCK.OF.TEXT PLACEMENT
 (375 . 391) LIST.OF.LINES ("TRAY 1") FONT (HELVETICA 12 (BOLD REGULAR REGULAR))) (\TYPE
BLOCK.OF.TEXT PLACEMENT (570 . 388) LIST.OF.LINES ("TRAY 2") FONT (HELVETICA 12 (BOLD REGULAR
REGULAR))) (\TYPE STRAIGHT.LINE PLACEMENT (378 385 422 385 NIL) WIDTH 2) (\TYPE STRAIGHT.LINE
PLACEMENT (574 382 621 382 NIL) WIDTH 2) (\TYPE STRAIGHT.LINE PLACEMENT (500 380 500 101 NIL) WIDTH
 2) (\TYPE SET.OF.INDICATORS PLACEMENT (321 . 295) CELL CELL.PROG.MAIN.COVERS.WORK.TRAY1 INDICATORS
 ((GHOST.FRONT.COVERS 0) (FRONT.COVERS 1) (GHOST.FRONT.COVERS 2) (FRONT.COVERS 3)) VERSION 1) (
\TYPE SET.OF.INDICATORS PLACEMENT (375 . 296) CELL CELL.PROG.MAIN.COVERS.WORK.TRAY1 INDICATORS ((
GHOST.BACK.COVERS 0) (GHOST.BACK.COVERS 1) (BACK.COVERS 2) (BACK.COVERS 3)) VERSION 1) (\TYPE
SET.OF.INDICATORS PLACEMENT (441 . 300) CELL CELL.PROG.MAIN.COVERS.WORK.TRAY1 INDICATORS ((NO.COVERS
 0) (GHOST.NO.COVERS 1) (GHOST.NO.COVERS 2) (GHOST.NO.COVERS 3)) VERSION 1) (\TYPE
SET.OF.INDICATORS PLACEMENT (524 . 292) CELL CELL.PROG.MAIN.COVERS.WORK.TRAY2 INDICATORS ((
GHOST.FRONT.COVERS 0) (FRONT.COVERS 1) (GHOST.FRONT.COVERS 2) (FRONT.COVERS 3)) VERSION 1) (\TYPE
SET.OF.INDICATORS PLACEMENT (581 . 292) CELL CELL.PROG.MAIN.COVERS.WORK.TRAY2 INDICATORS ((
GHOST.BACK.COVERS 0) (GHOST.BACK.COVERS 1) (BACK.COVERS 2) (BACK.COVERS 3)) VERSION 1) (\TYPE
SET.OF.INDICATORS PLACEMENT (642 . 294) CELL CELL.PROG.MAIN.COVERS.WORK.TRAY2 INDICATORS ((NO.COVERS
 0) (GHOST.NO.COVERS 1) (GHOST.NO.COVERS 2) (GHOST.NO.COVERS 3)) VERSION 1) (\TYPE
SENSITIVE.REGION PLACEMENT (324 298 30 30) ACTION.FORM (COND ((AND (NOT (EQUAL (CELL.VALUE
CELL.PROG.MAIN.COVERS.WORK.TRAY2) 1)) (NOT (EQUAL (CELL.VALUE CELL.PROG.MAIN.COVERS.WORK.TRAY2) 3))
) (COND ((EQUAL (CELL.VALUE CELL.PROG.MAIN.COVERS.WORK.TRAY1) 0) (CHANGE.CELL
CELL.PROG.MAIN.COVERS.WORK.TRAY1 1)) ((EQUAL (CELL.VALUE CELL.PROG.MAIN.COVERS.WORK.TRAY1) 2) (
CHANGE.CELL CELL.PROG.MAIN.COVERS.WORK.TRAY1 3)))))) (\TYPE SENSITIVE.REGION PLACEMENT (441 304 30
30) ACTION.FORM (COND ((NOT (EQUAL (CELL.VALUE CELL.PROG.MAIN.COVERS.WORK.TRAY1) 0)) (CHANGE.CELL
 CELL.PROG.MAIN.COVERS.WORK.TRAY1 0)))) (\TYPE INHIBITOR PLACEMENT (578 . 17) NAME
BLOCK.COVERS.IN.TRAY1 CELL CELL.PROG.MAIN.COVERS.WORK.TRAY1 ACTION.FORM (OR (EQUAL (CELL.VALUE
CELL.GLOBAL.PAPER.IN.TRAY) 1) (EQUAL (CELL.VALUE CELL.GLOBAL.PAPER.IN.TRAY) 4) (EQUAL (CELL.VALUE
CELL.GLOBAL.TABS.IN.TRAY) 1) (EQUAL (CELL.VALUE CELL.GLOBAL.TABS.IN.TRAY) 3) (EQUAL (CELL.VALUE
CELL.GLOBAL.INSERTS.IN.TRAY) 1) (EQUAL (CELL.VALUE CELL.GLOBAL.INSERTS.IN.TRAY) 3))) (\TYPE
INHIBITOR PLACEMENT (578 . 34) NAME BLOCK.COVERS.IN.TRAY2 CELL CELL.PROG.MAIN.COVERS.WORK.TRAY2
ACTION.FORM (OR (EQUAL (CELL.VALUE CELL.GLOBAL.PAPER.IN.TRAY) 2) (EQUAL (CELL.VALUE
CELL.GLOBAL.TABS.IN.TRAY) 2) (EQUAL (CELL.VALUE CELL.GLOBAL.TABS.IN.TRAY) 3) (EQUAL (CELL.VALUE
CELL.GLOBAL.INSERTS.IN.TRAY) 2) (EQUAL (CELL.VALUE CELL.GLOBAL.INSERTS.IN.TRAY) 3))) (\TYPE
SENSITIVE.REGION PLACEMENT (378 299 30 30) ACTION.FORM (COND ((AND (NOT (EQUAL (CELL.VALUE
CELL.PROG.MAIN.COVERS.WORK.TRAY2) 2)) (NOT (EQUAL (CELL.VALUE CELL.PROG.MAIN.COVERS.WORK.TRAY2) 3))
) (COND ((EQUAL (CELL.VALUE CELL.PROG.MAIN.COVERS.WORK.TRAY1) 0) (CHANGE.CELL
CELL.PROG.MAIN.COVERS.WORK.TRAY1 2)) ((EQUAL (CELL.VALUE CELL.PROG.MAIN.COVERS.WORK.TRAY1) 1) (
CHANGE.CELL CELL.PROG.MAIN.COVERS.WORK.TRAY1 3)))))) (\TYPE SENSITIVE.REGION PLACEMENT (526 294 30
30) ACTION.FORM (COND ((AND (NOT (EQUAL (CELL.VALUE CELL.PROG.MAIN.COVERS.WORK.TRAY1) 1)) (NOT
(EQUAL (CELL.VALUE CELL.PROG.MAIN.COVERS.WORK.TRAY1) 3))) (COND ((EQUAL (CELL.VALUE
CELL.PROG.MAIN.COVERS.WORK.TRAY2) 0) (CHANGE.CELL CELL.PROG.MAIN.COVERS.WORK.TRAY2 1)) ((EQUAL (
CELL.VALUE CELL.PROG.MAIN.COVERS.WORK.TRAY2) 2) (CHANGE.CELL CELL.PROG.MAIN.COVERS.WORK.TRAY2 3))))))
  (\TYPE SENSITIVE.REGION PLACEMENT (584 295 30 30) ACTION.FORM (COND ((AND (NOT (EQUAL (
CELL.VALUE CELL.PROG.MAIN.COVERS.WORK.TRAY1) 2)) (NOT (EQUAL (CELL.VALUE
CELL.PROG.MAIN.COVERS.WORK.TRAY1) 3))) (COND ((EQUAL (CELL.VALUE CELL.PROG.MAIN.COVERS.WORK.TRAY2)
0) (CHANGE.CELL CELL.PROG.MAIN.COVERS.WORK.TRAY2 2)) ((EQUAL (CELL.VALUE
```

```
CELL.PROG.MAIN.COVERS.WORK.TRAY2) 1) (CHANGE.CELL CELL.PROG.MAIN.COVERS.WORK.TRAY2 3)))))) (\TYPE
SENSITIVE.REGION PLACEMENT (644 297 30 30) ACTION.FORM (COND ((NOT (EQUAL (CELL.VALUE
CELL.PROG.MAIN.COVERS.WORK.TRAY2) 0)) (CHANGE.CELL CELL.PROG.MAIN.COVERS.WORK.TRAY2 0)))) (\TYPE
IMPLICATION.MULTIPLE.CELLS PLACEMENT (323 . 34) CELLS (CELL.PROG.MAIN.COVERS.WORK.TRAY1
CELL.PROG.MAIN.COVERS.WORK.TRAY2) ACTION.FORM (SELECTQ (CELL.VALUE CELL.PROG.MAIN.COVERS.WORK.TRAY1)
 (0 (SELECTQ (CELL.VALUE CELL.PROG.MAIN.COVERS.WORK.TRAY2) (0 (CHANGE.CELL CELL.PROG.MAIN.COVERS
1)) (1 (CHANGE.CELL CELL.PROG.MAIN.COVERS 2)) (2 (CHANGE.CELL CELL.PROG.MAIN.COVERS 3)) (3 (
CHANGE.CELL CELL.PROG.MAIN.COVERS 9)) NIL)) (1 (SELECTQ (CELL.VALUE
CELL.PROG.MAIN.COVERS.WORK.TRAY2) (0 (CHANGE.CELL CELL.PROG.MAIN.COVERS 4)) (2 (CHANGE.CELL
CELL.PROG.MAIN.COVERS 5)) NIL)) (2 (SELECTQ (CELL.VALUE CELL.PROG.MAIN.COVERS.WORK.TRAY2) (0 (
CHANGE.CELL CELL.PROG.MAIN.COVERS 6)) (1 (CHANGE.CELL CELL.PROG.MAIN.COVERS 7)) NIL)) (3 (
CHANGE.CELL CELL.PROG.MAIN.COVERS 8)) NIL)) (\TYPE IMPLICATION PLACEMENT (323 . 68) NAME
SET.CONFLICT.GLOBAL.TRAY1 CELL CELL.PROG.MAIN.COVERS.WORK.TRAY1 ACTION.FORM (SELECTQ (CELL.VALUE
CELL.PROG.MAIN.COVERS.WORK.TRAY1) (0 (SELECTQ (CELL.VALUE CELL.PROG.MAIN.COVERS.WORK.TRAY2) (0 (
CHANGE.CELL CELL.GLOBAL.COVERS.IN.TRAY 0)) (1 (CHANGE.CELL CELL.GLOBAL.COVERS.IN.TRAY 2)) (2 (
CHANGE.CELL CELL.GLOBAL.COVERS.IN.TRAY 2)) (3 (CHANGE.CELL CELL.GLOBAL.COVERS.IN.TRAY 2)) NIL)) (1
 (SELECTQ (CELL.VALUE CELL.PROG.MAIN.COVERS.WORK.TRAY2) (0 (CHANGE.CELL CELL.GLOBAL.COVERS.IN.TRAY
1)) (2 (CHANGE.CELL CELL.GLOBAL.COVERS.IN.TRAY 3)) NIL)) (2 (SELECTQ (CELL.VALUE
CELL.PROG.MAIN.COVERS.WORK.TRAY2) (0 (CHANGE.CELL CELL.GLOBAL.COVERS.IN.TRAY 1)) (1 (CHANGE.CELL
CELL.GLOBAL.COVERS.IN.TRAY 3)) NIL)) (3 (CHANGE.CELL CELL.GLOBAL.COVERS.IN.TRAY 1)) NIL)) (\TYPE
IMPLICATION PLACEMENT (323 . 85) NAME SET.CONFLICT.GLOBAL.TRAY2 CELL CELL.PROG.MAIN.COVERS.WORK.TRAY2
 ACTION.FORM (SELECTQ (CELL.VALUE CELL.PROG.MAIN.COVERS.WORK.TRAY2) (0 (SELECTQ (CELL.VALUE
CELL.PROG.MAIN.COVERS.WORK.TRAY1) (0 (CHANGE.CELL CELL.GLOBAL.COVERS.IN.TRAY 0)) (1 (CHANGE.CELL
CELL.GLOBAL.COVERS.IN.TRAY 1)) (2 (CHANGE.CELL CELL.GLOBAL.COVERS.IN.TRAY 1)) (3 (CHANGE.CELL
CELL.GLOBAL.COVERS.IN.TRAY 1)) NIL)) (1 (SELECTQ (CELL.VALUE CELL.PROG.MAIN.COVERS.WORK.TRAY1) (0
 (CHANGE.CELL CELL.GLOBAL.COVERS.IN.TRAY 2)) (2 (CHANGE.CELL CELL.GLOBAL.COVERS.IN.TRAY 3)) NIL)) (
2 (SELECTQ (CELL.VALUE CELL.PROG.MAIN.COVERS.WORK.TRAY2) (0 (CHANGE.CELL
CELL.GLOBAL.COVERS.IN.TRAY 2)) (1 (CHANGE.CELL CELL.GLOBAL.COVERS.IN.TRAY 3)) NIL)) (3 (
CHANGE.CELL CELL.GLOBAL.COVERS.IN.TRAY 2)) NIL)) (\TYPE INDICATOR PLACEMENT (559 . 119) BITMAP
OVERSIZED ON-COLOR BLACK OFF-COLOR WHITE CELL CELL.PROG.MAIN.COVERS.WORK.TRAY2 REFERENCE.VALUE 1
CONDITION.OPERATION >=) (\TYPE INDICATOR PLACEMENT (560 . 183) BITMAP TRANSPARENCY ON-COLOR BLACK
OFF-COLOR WHITE CELL CELL.PROG.MAIN.COVERS.WORK.TRAY2 REFERENCE.VALUE 1 CONDITION.OPERATION >=) (
\TYPE INDICATOR PLACEMENT (562 . 38) BITMAP FORMATTED ON-COLOR BLACK OFF-COLOR WHITE CELL
CELL.PROG.MAIN.COVERS.WORK.TRAY2 REFERENCE.VALUE 1 CONDITION.OPERATION >=) (\TYPE INDICATOR PLACEMENT
 (545 . 242) BITMAP OPEN.LINES ON-COLOR BLACK OFF-COLOR WHITE CELL CELL.PROG.MAIN.COVERS.WORK.TRAY2
REFERENCE.VALUE 1 CONDITION.OPERATION >=) (\TYPE INDICATOR PLACEMENT (355 . 119) BITMAP OVERSIZED
ON-COLOR BLACK OFF-COLOR WHITE CELL CELL.PROG.MAIN.COVERS.WORK.TRAY1 REFERENCE.VALUE 1
CONDITION.OPERATION >=) (\TYPE INDICATOR PLACEMENT (356 . 183) BITMAP TRANSPARENCY ON-COLOR BLACK
OFF-COLOR WHITE CELL CELL.PROG.MAIN.COVERS.WORK.TRAY1 REFERENCE.VALUE 1 CONDITION.OPERATION >=) (
\TYPE INDICATOR PLACEMENT (358 . 38) BITMAP FORMATTED ON-COLOR BLACK OFF-COLOR WHITE CELL
CELL.PROG.MAIN.COVERS.WORK.TRAY1 REFERENCE.VALUE 1 CONDITION.OPERATION >=) (\TYPE INDICATOR PLACEMENT
 (341 . 242) BITMAP OPEN.LINES ON-COLOR BLACK OFF-COLOR WHITE CELL CELL.PROG.MAIN.COVERS.WORK.TRAY1
REFERENCE.VALUE 1 CONDITION.OPERATION >=))) (\TYPE FRAME NAME PROG.SCORE.MAIN.CROPPING SUPERFRAMES (
PROG.SCORE.MAIN) ITEMS ((\TYPE SET.OF.INDICATORS PLACEMENT (346 . 216) CELL CELL.PROG.MAIN.CROPPING
INDICATORS ((STANDARD 1) (GHOST.STANDARD 2) (GHOST.STANDARD 3)) VERSION 1) (\TYPE
SET.OF.INDICATORS PLACEMENT (463 . 212) CELL CELL.PROG.MAIN.CROPPING INDICATORS ((GHOST.NO.CROPPING
1) (NO.CROPPING 2) (GHOST.NO.CROPPING 3)) VERSION 1) (\TYPE FLASHING.SENSITIVE.REGION PLACEMENT (
344 221 30 30) ACTION.FORM (CHANGE.CELL CELL.PROG.MAIN.CROPPING 1)) (\TYPE FLASHING.SENSITIVE.REGION
 PLACEMENT (465 220 30 30) ACTION.FORM (CHANGE.CELL CELL.PROG.MAIN.CROPPING 2)) (\TYPE
SET.OF.INDICATORS PLACEMENT (581 . 211) CELL CELL.PROG.MAIN.CROPPING INDICATORS ((
GHOST.MANUAL.CONTROL 1) (GHOST.MANUAL.CONTROL 2) (MANUAL.CONTROL 3)) VERSION 1) (\TYPE
FLASHING.SENSITIVE.REGION PLACEMENT (591 222 30 30) ACTION.FORM (PROG NIL (CHANGE.CELL
CELL.PROG.MAIN.CROPPING 3) (FRAME.PUSH PROG.SCORE.MAIN.CROPPING.1 T))))) (\TYPE FRAME NAME
PROG.SCORE.MAIN.CROPPING.1 SUPERFRAMES (PROG.SCORE.MAIN) ITEMS ((\TYPE PICTURE.VARIABLE.PLACEMENT
PLACEMENT (414 338 61 9) OLD.X -1 OLD.Y -1 PICTURE SMALL.RIGHT.ARROW HORIZONTAL.MINIMUM 0
VERTICAL.MINIMUM 0 CELLS (CELL.PROG.MAIN.CROPPING.WORK.MANUAL.LEFT NULL) OPERATION PAINT
BACKGROUND.TEXTURE 0) (\TYPE LIGHT.BAR.REGION.W/BKGD PLACEMENT (439 . 131) CELLS (
CELL.PROG.MAIN.CROPPING.WORK.MANUAL.TOP CELL.PROG.MAIN.CROPPING.WORK.MANUAL.BOTTOM
CELL.PROG.MAIN.CROPPING.WORK.MANUAL.LEFT CELL.PROG.MAIN.CROPPING.WORK.MANUAL.RIGHT) BACKGROUND.BITMAP
BIG.PAPER&LINES BORDER.THICKNESS 1 MARGIN.TEXTURE 0 MARGIN.OPERATION INVERT VERTICAL.MAXIMUM 30
HORIZONTAL.MAXIMUM 40 WINDOW.OPERATION PAINT WINDOW.TEXTURE 33825 HORIZONTAL.MINIMUM 0
VERTICAL.MINIMUM 0) (\TYPE UP.DOWN.BUTTONS PLACEMENT (544 . 34) UP.PICTURE UP.ARROW DOWN.PICTURE
DOWN.ARROW CELL CELL.PROG.MAIN.CROPPING.WORK.MANUAL.BOTTOM RATE 0 MINIMUM 0 VERSION 1) (\TYPE
UP.DOWN.BUTTONS PLACEMENT (340 . 153) CELL CELL.PROG.MAIN.CROPPING.WORK.MANUAL.LEFT UP.PICTURE
RIGHT.ARROW DOWN.PICTURE LEFT.ARROW RATE 0 MAXIMUM 10 MINIMUM 0 BUTTON.SPACING (51 . 0) VERSION 1) (
\TYPE UP.DOWN.BUTTONS PLACEMENT (663 . 153) CELL CELL.PROG.MAIN.CROPPING.WORK.MANUAL.RIGHT UP.PICTURE
 LEFT.ARROW DOWN.PICTURE RIGHT.ARROW RATE 0 MINIMUM 0 BUTTON.SPACING (-51 . 0) VERSION 1) (\TYPE
SELECTQ.IMPLICATION PLACEMENT (323 . 17) CELL CELL.PROG.MAIN.CROPPING.WORK.MANUAL.LEFT RESULT.CELL
CELL.PROG.MAIN.CROPPING.WORK.MANUAL.LEFT.INCHES ACTION.LIST ((1 "0.1 CROP") (2 "0.2 CROP") (3
"0.3 CROP") (4 "0.4 CROP") (5 "0.5 CROP") (6 "0.6 CROP") (7 "0.7 CROP") (8 "0.8 CROP") (9
"0.9 CROP") (10 "1.0 CROP") (0 "0.0 CROP"))) (\TYPE PRINT.REGION PLACEMENT (458 102 65 17)
BACKGROUND 0 CELL CELL.PROG.MAIN.CROPPING.WORK.MANUAL.BOTTOM.INCHES MARGIN 0 TEXTURE 0) (\TYPE BORDER
 PLACEMENT (455 97 70 26) THICKNESS 2 COLOR 65535) (\TYPE PRINT.REGION PLACEMENT (611 221 65 17)
BACKGROUND 0 CELL CELL.PROG.MAIN.CROPPING.WORK.MANUAL.RIGHT.INCHES MARGIN 0 TEXTURE 0) (\TYPE BORDER
PLACEMENT (608 216 70 26) THICKNESS 2 COLOR 65535) (\TYPE PRINT.REGION PLACEMENT (339 221 65 17)
BACKGROUND 0 CELL CELL.PROG.MAIN.CROPPING.WORK.MANUAL.LEFT.INCHES MARGIN 0 TEXTURE 0) (\TYPE BORDER
PLACEMENT (336 216 70 26) THICKNESS 2 COLOR 65535) (\TYPE SELECTQ.IMPLICATION PLACEMENT (561 . 17)
CELL CELL.PROG.MAIN.CROPPING.WORK.MANUAL.BOTTOM RESULT.CELL
CELL.PROG.MAIN.CROPPING.WORK.MANUAL.BOTTOM.INCHES ACTION.LIST ((1 "0.1 CROP") (2 "0.2 CROP") (3
"0.3 CROP") (4 "0.4 CROP") (5 "0.5 CROP") (6 "0.6 CROP") (7 "0.7 CROP") (8 "0.8 CROP") (9
"0.9 CROP") (10 "1.0 CROP") (0 "0.0 CROP"))) (\TYPE SELECTQ.IMPLICATION PLACEMENT (680 . 153)
CELL CELL.PROG.MAIN.CROPPING.WORK.MANUAL.RIGHT RESULT.CELL
CELL.PROG.MAIN.CROPPING.WORK.MANUAL.RIGHT.INCHES ACTION.LIST ((1 "0.1 CROP") (2 "0.2 CROP") (3
"0.3 CROP") (4 "0.4 CROP") (5 "0.5 CROP") (6 "0.6 CROP") (7 "0.7 CROP") (8 "0.8 CROP") (9
"0.9 CROP") (10 "1.0 CROP") (0 "0.0 CROP"))) (\TYPE PICTURE.VARIABLE.PLACEMENT PLACEMENT (551
132 38 33) OLD.X -1 OLD.Y -1 PICTURE CORNER HORIZONTAL.MINIMUM 0 VERTICAL.MINIMUM 0 CELLS (NULL NULL)
 OPERATION REPLACE BACKGROUND.TEXTURE 0) (\TYPE PICTURE.VARIABLE.PLACEMENT PLACEMENT (551 338 61 9)
```

OLD.X -1 OLD.Y -1 PICTURE SMALL.LEFT.ARROW HORIZONTAL.MINIMUM 10 VERTICAL.MINIMUM 0 CELLS (
CELL.PROG.MAIN.CROPPING.WORK.MANUAL.RIGHT NULL) OPERATION PAINT BACKGROUND.TEXTURE 0
HORIZONTAL.MAXIMUM 0) (\TYPE PICTURE.VARIABLE.PLACEMENT PLACEMENT (422 107 17 90) OLD.X -1 OLD.Y -1
PICTURE SMALL.UP.ARROW HORIZONTAL.MINIMUM 0 VERTICAL.MINIMUM 0 CELLS (NULL
CELL.PROG.MAIN.CROPPING.WORK.MANUAL.BOTTOM) OPERATION PAINT BACKGROUND.TEXTURE 0))) (\TYPE FRAME NAME
PROG.SCORE.MAIN.FINISHING SUPERFRAMES (PROG.SCORE.MAIN) ITEMS ((\TYPE SET.OF.INDICATORS PLACEMENT
(348 . 297) CELL CELL.PROG.MAIN.FINISHING INDICATORS ((1.LEFT 1) (GHOST.1.LEFT 2) (GHOST.1.LEFT 3)
(GHOST.1.LEFT 4) (GHOST.1.LEFT 5) (GHOST.1.LEFT 6)) VERSION 1) (\TYPE SET.OF.INDICATORS PLACEMENT
(459 . 297) CELL CELL.PROG.MAIN.FINISHING INDICATORS ((GHOST.2.LEFT 1) (2.LEFT 2) (GHOST.2.LEFT 3)
(GHOST.2.LEFT 4) (GHOST.2.LEFT 5) (GHOST.2.LEFT 6)) VERSION 1) (\TYPE SET.OF.INDICATORS PLACEMENT
(576 . 306) CELL CELL.PROG.MAIN.FINISHING INDICATORS ((GHOST.1.TOP 1) (GHOST.1.TOP 2) (1.TOP 3)
(GHOST.1.TOP 4) (GHOST.1.TOP 5) (GHOST.1.TOP 6)) VERSION 1) (\TYPE SET.OF.INDICATORS PLACEMENT (
350 . 177) CELL CELL.PROG.MAIN.FINISHING INDICATORS ((GHOST.BOUND 1) (GHOST.BOUND 2) (GHOST.BOUND 3
) (BOUND1 4) (GHOST.BOUND 5) (GHOST.BOUND 6)) VERSION 1) (\TYPE SET.OF.INDICATORS PLACEMENT (460
. 166) CELL CELL.PROG.MAIN.FINISHING INDICATORS ((GHOST.BOUND.&.STAPLED 1) (GHOST.BOUND.&.STAPLED 2
) (GHOST.BOUND.&.STAPLED 3) (GHOST.BOUND.&.STAPLED 4) (BOUND.&.STAPLED 5) (GHOST.BOUND.&.STAPLED 6
)) VERSION 1) (\TYPE SET.OF.INDICATORS PLACEMENT (581 . 172) CELL CELL.PROG.MAIN.FINISHING
INDICATORS ((GHOST.NO.FINISHING 1) (GHOST.NO.FINISHING 2) (GHOST.NO.FINISHING 3) (
GHOST.NO.FINISHING 4) (GHOST.NO.FINISHING 5) (NO.FINISHING 6)) VERSION 1) (\TYPE
FLASHING.SENSITIVE.REGION PLACEMENT (347 300 30 30) ACTION.FORM (CHANGE.CELL
CELL.PROG.MAIN.FINISHING 1)) (\TYPE FLASHING.SENSITIVE.REGION PLACEMENT (460 300 30 30) ACTION.FORM
(CHANGE.CELL CELL.PROG.MAIN.FINISHING 2)) (\TYPE FLASHING.SENSITIVE.REGION PLACEMENT (581 305 30 30
) ACTION.FORM (CHANGE.CELL CELL.PROG.MAIN.FINISHING 3)) (\TYPE FLASHING.SENSITIVE.REGION PLACEMENT
(348 183 30 30) ACTION.FORM (CHANGE.CELL CELL.PROG.MAIN.FINISHING 4)) (\TYPE
FLASHING.SENSITIVE.REGION PLACEMENT (460 170 30 30) ACTION.FORM (CHANGE.CELL
CELL.PROG.MAIN.FINISHING 5)) (\TYPE FLASHING.SENSITIVE.REGION PLACEMENT (580 172 30 30) ACTION.FORM
(CHANGE.CELL CELL.PROG.MAIN.FINISHING 6)))) (\TYPE FRAME NAME PROG.SCORE.MAIN.MARGIN SUPERFRAMES (
PROG.SCORE.MAIN) ITEMS ((\TYPE PRINT.REGION PLACEMENT (559 115 69 14) CELL
CELL.PROG.MAIN.MARGIN.SIDE2 BACKGROUND 0 OPERATION PAINT MARGIN 0) (\TYPE BORDER PLACEMENT (557 111
74 22) THICKNESS 2 COLOR 65535 OPERATION REPLACE) (\TYPE PRINT.REGION PLACEMENT (389 115 69 14) CELL
CELL.PROG.MAIN.MARGIN.SIDE1 BACKGROUND 0 OPERATION PAINT MARGIN 0) (\TYPE BORDER PLACEMENT (387 111
74 22) THICKNESS 2 COLOR 65535 OPERATION REPLACE) (\TYPE UP.DOWN.BUTTONS PLACEMENT (390 . 40)
MAXIMUM 9 UP.PICTURE RIGHT.ARROW DOWN.PICTURE LEFT.ARROW CELL CELL.PROG.MAIN.MARGIN.SIDE1.STORE
BUTTON.SPACING (51 . 0) VERSION 1) (\TYPE UP.DOWN.BUTTONS PLACEMENT (611 . 40) MAXIMUM 9 UP.PICTURE
LEFT.ARROW DOWN.PICTURE RIGHT.ARROW CELL CELL.PROG.MAIN.MARGIN.SIDE2.STORE BUTTON.SPACING (-51 . 0)
VERSION 1) (\TYPE SELECTQ.IMPLICATION PLACEMENT (323 . 17) CELL CELL.PROG.MAIN.MARGIN.SIDE1.STORE
RESULT.CELL CELL.PROG.MAIN.MARGIN.SIDE1 ACTION.LIST ((1 "0.0 RIGHT") (2 "0.1 RIGHT") (3
"0.2 RIGHT") (4 "0.3 RIGHT") (5 "0.4 RIGHT") (6 "0.5 RIGHT") (7 "0.6 RIGHT") (8 "0.7 RIGHT")
(9 "0.8 RIGHT"))) (\TYPE SELECTQ.IMPLICATION PLACEMENT (629 . 17) CELL
CELL.PROG.MAIN.MARGIN.SIDE2.STORE RESULT.CELL CELL.PROG.MAIN.MARGIN.SIDE2 ACTION.LIST ((1 "0.0 LEFT"
) (2 "0.1 LEFT") (3 "0.2 LEFT") (4 "0.3 LEFT") (5 "0.4 LEFT") (6 "0.5 LEFT") (7 "0.6 LEFT"
) (8 "0.7 LEFT") (9 "0.8 LEFT"))) (\TYPE PICTURE.VARIABLE.PLACEMENT.W/BKGD PLACEMENT (343 . 145)
OLD.X 2 OLD.Y 8 CELLS (CELL.PROG.MAIN.MARGIN.SIDE1.STORE NULL) VERTICAL.MINIMUM -8 VERTICAL.MAXIMUM
0 HORIZONTAL.MINIMUM -1 HORIZONTAL.MAXIMUM 15 PICTURE BIG.LINES BACKGROUND.PICTURE BIG.PAPER) (\TYPE
PICTURE.VARIABLE.PLACEMENT.W/BKGD PLACEMENT (522 . 146) OLD.X -14 OLD.Y -8 CELLS (
CELL.PROG.MAIN.MARGIN.SIDE2.STORE NULL) VERTICAL.MINIMUM 8 VERTICAL.MAXIMUM -8 HORIZONTAL.MINIMUM 15
HORIZONTAL.MAXIMUM -1 PICTURE BIG.LINES BACKGROUND.PICTURE BIG.PAPER) (\TYPE
PICTURE.VARIABLE.PLACEMENT PLACEMENT (345 359 65 12) OLD.X -1 OLD.Y -1 VERTICAL.MAXIMUM 1 CELLS (
CELL.PROG.MAIN.MARGIN.SIDE1.STORE NULL) HORIZONTAL.MAXIMUM 9 PICTURE SMALL.RIGHT.ARROW
VERTICAL.MINIMUM 0) (\TYPE BLOCK.OF.TEXT PLACEMENT (342 . 396) LIST.OF.LINES ("SIDE 1")) (\TYPE
BLOCK.OF.TEXT PLACEMENT (524 . 396) LIST.OF.LINES ("SIDE 2")) (\TYPE PICTURE.VARIABLE.PLACEMENT
PLACEMENT (606 359 65 12) OLD.X -1 OLD.Y -1 VERTICAL.MAXIMUM 1 CELLS (
CELL.PROG.MAIN.MARGIN.SIDE2.STORE NULL) HORIZONTAL.MAXIMUM 1 PICTURE SMALL.LEFT.ARROW VERTICAL.MINIMUM
0 HORIZONTAL.MINIMUM 9))) (\TYPE FRAME NAME PROG.SCORE.MAIN.PAPER SUPERFRAMES (PROG.SCORE.MAIN)
ITEMS ((\TYPE SENSITIVE.REGION PLACEMENT (344 321 30 30) ACTION.FORM (COND ((AND (NOT (EQUAL (
CELL.VALUE CELL.PROG.MAIN.PAPER) 5)) (NOT (EQUAL (CELL.VALUE CELL.PROG.MAIN.PAPER) 6)) (NOT (
EQUAL (CELL.VALUE CELL.PROG.MAIN.PAPER) 7))) (CHANGE.CELL CELL.PROG.MAIN.PAPER 1)))) (\TYPE
SET.OF.INDICATORS PLACEMENT (421 . 222) CELL CELL.PROG.MAIN.PAPER.WORK INDICATORS ((TRANSPARENCY 2)
(OVERSIZED 2) (FORMATTED 2)) INDICATOR.SPACING (0 . -66) VERSION 1) (\TYPE INDICATOR PLACEMENT (
461 . 279) CELL CELL.PROG.MAIN.PAPER.WORK REFERENCE.VALUE 2 BITMAP VERTICAL.LINE) (\TYPE
SET.OF.INDICATORS PLACEMENT (510 . 145) CELL CELL.PROG.MAIN.PAPER.WORK INDICATORS ((FORMATTED 3) (
OVERSIZED 3)) INDICATOR.SPACING (0 . 70) VERSION 1) (\TYPE INDICATOR PLACEMENT (551 . 280) CELL
CELL.PROG.MAIN.PAPER.WORK REFERENCE.VALUE 3 BITMAP VERTICAL.LINE) (\TYPE SET.OF.INDICATORS PLACEMENT
(602 . 149) CELL CELL.PROG.MAIN.PAPER.WORK INDICATORS ((FORMATTED 4) (OVERSIZED 4))
INDICATOR.SPACING (0 . 69) VERSION 1) (\TYPE INDICATOR PLACEMENT (638 . 280) CELL
CELL.PROG.MAIN.PAPER.WORK REFERENCE.VALUE 4 BITMAP VERTICAL.LINE) (\TYPE SET.OF.INDICATORS PLACEMENT
(337 . 323) CELL CELL.PROG.MAIN.PAPER INDICATORS ((TRAY1 0) (TRAY1 1) (GHOSTRAY.1 2) (GHOSTRAY.1
3) (GHOSTRAY.1 4) (GHOSTRAY.1 8) (GHOSTRAY.1 9)) VERSION 1) (\TYPE SET.OF.INDICATORS PLACEMENT (
431 . 323) CELL CELL.PROG.MAIN.PAPER INDICATORS ((GHOSTRAY.2 0) (GHOSTRAY.2 1) (TRAY2 2) (
GHOSTRAY.2 3) (GHOSTRAY.2 4) (TRAY2 8) (GHOSTRAY.2 9)) VERSION 1) (\TYPE SET.OF.INDICATORS
PLACEMENT (523 . 323) CELL CELL.PROG.MAIN.PAPER INDICATORS ((GHOSTRAY.3 0) (GHOSTRAY.3 1) (
GHOSTRAY.3 2) (TRAY3 3) (GHOSTRAY.3 4) (GHOSTRAY.3 8) (TRAY3 9)) VERSION 1) (\TYPE
SET.OF.INDICATORS PLACEMENT (611 . 323) CELL CELL.PROG.MAIN.PAPER INDICATORS ((GHOSTRAYS.1&3 0) (
GHOSTRAYS.1&3 1) (GHOSTRAYS.1&3 2) (GHOSTRAYS.1&3 3) (TRAYS1&3 4) (GHOSTRAYS.1&3 8) (
GHOSTRAYS.1&3 9)) VERSION 1) (\TYPE PRINT.REGION PLACEMENT (326 366 84 18) FONT (HELVETICA 10 (
MEDIUM REGULAR REGULAR)) CELL CELL.PROG.MAIN.PAPER.SIZE&COVERS.1 MARGIN 2 BACKGROUND 0) (\TYPE
PRINT.REGION PLACEMENT (422 364 77 21) FONT (HELVETICA 10 (MEDIUM REGULAR REGULAR)) CELL
CELL.PROG.MAIN.PAPER.SIZE&COVERS.2 BACKGROUND 0) (\TYPE PRINT.REGION PLACEMENT (514 367 79 20) FONT
(HELVETICA 10 (MEDIUM REGULAR REGULAR)) CELL CELL.PROG.MAIN.PAPER.SIZE&COVERS.3 BACKGROUND 0) (
\TYPE PRINT.REGION PLACEMENT (597 367 97 18) FONT (HELVETICA 10 (MEDIUM REGULAR REGULAR)) CELL
CELL.PROG.MAIN.PAPER.SIZE&COVERS.4 BACKGROUND 0) (\TYPE SELECTQ.IMPLICATION PLACEMENT (323 . 17)
CELL CELL.PROG.MAIN.PAPER RESULT.CELL CELL.PROG.MAIN.PAPER.WORK ACTION.LIST ((0 0) (1 1) (2 2) (3
3) (4 4) (5 0) (6 0) (7 0) (8 0) (9 0))) (\TYPE IMPLICATION PLACEMENT (323 . 34) NAME
SET.CELL.PROG.MAIN.PAPER.WORK.CHOICES.TO.ZERO CELL CELL.PROG.MAIN.PAPER ACTION.FORM (CHANGE.CELL
CELL.PROG.MAIN.PAPER.WORK.CHOICES " ")) (\TYPE IMPLICATION PLACEMENT (323 . 51) NAME
SET.CELL.PROG.MAIN.PAPER.SIZE CELL CELL.PROG.MAIN.PAPER ACTION.FORM (CHANGE.CELL
CELL.PROG.MAIN.PAPER.SIZE (SELECTQ NEW.VALUE (1 (CELL.VALUE CELL.PROG.MAIN.PAPER.SIZE&COVERS.1)) (

```
2 (CELL.VALUE CELL.PROG.MAIN.PAPER.SIZE&COVERS.2)) (3 (CELL.VALUE
CELL.PROG.MAIN.PAPER.SIZE&COVERS.3)) (4 (CELL.VALUE CELL.PROG.MAIN.PAPER.SIZE&COVERS.4)) (0 (
CELL.VALUE CELL.PROG.MAIN.PAPER.SIZE&COVERS.1)) (5 " ") NIL))) (\TYPE INITIALIZATION PLACEMENT (
323 . 425) NAME INIT.PROG.MAIN.RIGHT.DEFAULTS ACTION.FORM (PROG NIL (COND ((EQUAL (CELL.VALUE
CELL.PROG.MAIN.PAPER) 5) (COND ((OR (EQUAL (CELL.VALUE CELL.GLOBAL.TABS.IN.TRAY) 1) (EQUAL (
CELL.VALUE CELL.GLOBAL.COVERS.IN.TRAY) 1) (EQUAL (CELL.VALUE CELL.GLOBAL.INSERTS.IN.TRAY) 1)) (
CHANGE.CELL CELL.PROG.MAIN.PAPER 6))))) (COND ((EQUAL (CELL.VALUE CELL.PROG.MAIN.PAPER) 6) (COND
((OR (EQUAL (CELL.VALUE CELL.GLOBAL.TABS.IN.TRAY) 2) (EQUAL (CELL.VALUE CELL.GLOBAL.COVERS.IN.TRAY
) 2) (EQUAL (CELL.VALUE CELL.GLOBAL.INSERTS.IN.TRAY) 2)) (CHANGE.CELL CELL.PROG.MAIN.PAPER 7)))))))
 (\TYPE SELECTQ.IMPLICATION PLACEMENT (357 . 17) CELL CELL.PROG.MAIN.PAPER RESULT.CELL
CELL.GLOBAL.PAPER.IN.TRAY ACTION.LIST ((1 1) (2 2) (3 3) (4 4))) (\TYPE INHIBITOR PLACEMENT (561
. 17) NAME INHIBIT.TRAY.CHANGE CELL CELL.PROG.MAIN.PAPER ACTION.FORM (SELECTQ NEW.VALUE (1 (OR (
EQUAL (CELL.VALUE CELL.GLOBAL.COVERS.IN.TRAY) 1) (EQUAL (CELL.VALUE CELL.GLOBAL.COVERS.IN.TRAY) 3)
 (EQUAL (CELL.VALUE CELL.GLOBAL.TABS.IN.TRAY) 1) (EQUAL (CELL.VALUE CELL.GLOBAL.TABS.IN.TRAY) 3) (
EQUAL (CELL.VALUE CELL.GLOBAL.INSERTS.IN.TRAY) 1) (EQUAL (CELL.VALUE CELL.GLOBAL.INSERTS.IN.TRAY) 3
))) (2 (OR (EQUAL (CELL.VALUE CELL.GLOBAL.COVERS.IN.TRAY) 2) (EQUAL (CELL.VALUE
CELL.GLOBAL.COVERS.IN.TRAY) 3) (EQUAL (CELL.VALUE CELL.GLOBAL.TABS.IN.TRAY) 2) (EQUAL (CELL.VALUE
CELL.GLOBAL.TABS.IN.TRAY) 3) (EQUAL (CELL.VALUE CELL.GLOBAL.INSERTS.IN.TRAY) 2) (EQUAL (CELL.VALUE
 CELL.GLOBAL.INSERTS.IN.TRAY) 3))) (4 (OR (EQUAL (CELL.VALUE CELL.GLOBAL.COVERS.IN.TRAY) 1) (
EQUAL (CELL.VALUE CELL.GLOBAL.COVERS.IN.TRAY) 3) (EQUAL (CELL.VALUE CELL.GLOBAL.TABS.IN.TRAY) 1) (
EQUAL (CELL.VALUE CELL.GLOBAL.TABS.IN.TRAY) 3) (EQUAL (CELL.VALUE CELL.GLOBAL.INSERTS.IN.TRAY) 1)
(EQUAL (CELL.VALUE CELL.GLOBAL.INSERTS.IN.TRAY) 3))) NIL)) (\TYPE SENSITIVE.REGION PLACEMENT (437
323 30 30) ACTION.FORM (COND ((AND (NOT (EQUAL (CELL.VALUE CELL.PROG.MAIN.PAPER) 5)) (NOT (
EQUAL (CELL.VALUE CELL.PROG.MAIN.PAPER) 6)) (NOT (EQUAL (CELL.VALUE CELL.PROG.MAIN.PAPER) 7))) (
CHANGE.CELL CELL.PROG.MAIN.PAPER 2)))) (\TYPE SENSITIVE.REGION PLACEMENT (529 323 30 30) ACTION.FORM
 (COND ((AND (NOT (EQUAL (CELL.VALUE CELL.PROG.MAIN.PAPER) 5)) (NOT (EQUAL (CELL.VALUE
CELL.PROG.MAIN.PAPER) 6)) (NOT (EQUAL (CELL.VALUE CELL.PROG.MAIN.PAPER) 7))) (CHANGE.CELL
CELL.PROG.MAIN.PAPER 3)))) (\TYPE SENSITIVE.REGION PLACEMENT (619 325 30 30) ACTION.FORM (COND ((
AND (NOT (EQUAL (CELL.VALUE CELL.PROG.MAIN.PAPER) 5)) (NOT (EQUAL (CELL.VALUE
CELL.PROG.MAIN.PAPER) 6)) (NOT (EQUAL (CELL.VALUE CELL.PROG.MAIN.PAPER) 7))) (CHANGE.CELL
CELL.PROG.MAIN.PAPER 4)))) (\TYPE SENSITIVE.REGION PLACEMENT (450 226 30 30) ACTION.FORM (COND ((
EQUAL (CELL.VALUE CELL.PROG.MAIN.PAPER) 2) (CHANGE.CELL CELL.PROG.MAIN.PAPER.WORK.CHOICES
"TRANSPARENCY")))) (\TYPE SENSITIVE.REGION PLACEMENT (455 152 30 30) ACTION.FORM (COND ((EQUAL (
CELL.VALUE CELL.PROG.MAIN.PAPER) 2) (CHANGE.CELL CELL.PROG.MAIN.PAPER.WORK.CHOICES "OVERSIZED"))))
(\TYPE SENSITIVE.REGION PLACEMENT (445 94 30 30) ACTION.FORM (COND ((EQUAL (CELL.VALUE
CELL.PROG.MAIN.PAPER) 2) (CHANGE.CELL CELL.PROG.MAIN.PAPER.WORK.CHOICES "FORMATTED")))) (\TYPE
SENSITIVE.REGION PLACEMENT (541 226 30 30) ACTION.FORM (COND ((EQUAL (CELL.VALUE
CELL.PROG.MAIN.PAPER) 3) (CHANGE.CELL CELL.PROG.MAIN.PAPER.WORK.CHOICES "OVERSIZED")))) (\TYPE
SENSITIVE.REGION PLACEMENT (536 152 30 30) ACTION.FORM (COND ((EQUAL (CELL.VALUE
CELL.PROG.MAIN.PAPER) 3) (CHANGE.CELL CELL.PROG.MAIN.PAPER.WORK.CHOICES "FORMATTED")))) (\TYPE
SENSITIVE.REGION PLACEMENT (629 228 30 30) ACTION.FORM (COND ((EQUAL (CELL.VALUE
CELL.PROG.MAIN.PAPER) 4) (CHANGE.CELL CELL.PROG.MAIN.PAPER.WORK.CHOICES "OVERSIZED")))) (\TYPE
SENSITIVE.REGION PLACEMENT (626 153 30 30) ACTION.FORM (COND ((EQUAL (CELL.VALUE
CELL.PROG.MAIN.PAPER) 4) (CHANGE.CELL CELL.PROG.MAIN.PAPER.WORK.CHOICES "FORMATTED")))) (\TYPE
SET.OF.INDICATORS PLACEMENT (318 . 220) CELL CELL.PROG.MAIN.PAPER.WORK INDICATORS ((TRANSPARENCY 1)
 (OVERSIZED 1) (FORMATTED 1)) INDICATOR.SPACING (0 . -65) VERSION 1) (\TYPE INDICATOR PLACEMENT (
363 . 279) CELL CELL.PROG.MAIN.PAPER.WORK REFERENCE.VALUE 1 BITMAP VERTICAL.LINE) (\TYPE
SENSITIVE.REGION PLACEMENT (346 226 30 30) ACTION.FORM (COND ((EQUAL (CELL.VALUE
CELL.PROG.MAIN.PAPER) 1) (CHANGE.CELL CELL.PROG.MAIN.PAPER.WORK.CHOICES "TRANSPARENCY")))) (\TYPE
SENSITIVE.REGION PLACEMENT (351 151 30 30) ACTION.FORM (COND ((EQUAL (CELL.VALUE
CELL.PROG.MAIN.PAPER) 1) (CHANGE.CELL CELL.PROG.MAIN.PAPER.WORK.CHOICES "OVERSIZED")))) (\TYPE
SENSITIVE.REGION PLACEMENT (343 92 30 30) ACTION.FORM (COND ((EQUAL (CELL.VALUE
CELL.PROG.MAIN.PAPER) 1) (CHANGE.CELL CELL.PROG.MAIN.PAPER.WORK.CHOICES "FORMATTED")))))) (\TYPE
FRAME NAME PROG.SCORE.MAIN.QUALITY SUPERFRAMES (PROG.SCORE.MAIN) ITEMS ((\TYPE
FLASHING.SENSITIVE.REGION PLACEMENT (323 102 48 36) ACTION.FORM (CHANGE.CELL
CELL.PROG.MAIN.QUALITY.BAR 1)) (\TYPE FLASHING.SENSITIVE.REGION PLACEMENT (377 103 48 36)
ACTION.FORM (CHANGE.CELL CELL.PROG.MAIN.QUALITY.BAR 2)) (\TYPE FLASHING.SENSITIVE.REGION PLACEMENT
(429 103 48 36) ACTION.FORM (CHANGE.CELL CELL.PROG.MAIN.QUALITY.BAR 3)) (\TYPE
FLASHING.SENSITIVE.REGION PLACEMENT (482 104 48 36) ACTION.FORM (CHANGE.CELL
CELL.PROG.MAIN.QUALITY.BAR 4)) (\TYPE FLASHING.SENSITIVE.REGION PLACEMENT (537 105 48 36)
ACTION.FORM (CHANGE.CELL CELL.PROG.MAIN.QUALITY.BAR 5)) (\TYPE PICTURE.VARIABLE.PLACEMENT.W/BKGD
PLACEMENT (320 . 100) OLD.X 2 OLD.Y -1 HORIZONTAL.MAXIMUM 5 PICTURE DARK.SPOT.QUALITY
BACKGROUND.PICTURE COPY.CONTRAST.BAR CELLS (CELL.PROG.MAIN.QUALITY.BAR NULL) OPERATION INVERT) (
\TYPE PICTURE PLACEMENT (616 . 92) BITMAP MANUAL.CONTROL) (\TYPE PRINT.REGION PLACEMENT (415 205
121 20) CELL CELL.PROG.MAIN.QUALITY.IMAGE BACKGROUND 0) (\TYPE PRINT.REGION PLACEMENT (321 146 96 18
) CELL CELL.PROG.MAIN.QUALITY.LIGHTER BACKGROUND 0 MARGIN 0) (\TYPE PRINT.REGION PLACEMENT (491 145
96 18) CELL CELL.PROG.MAIN.QUALITY.DARKER BACKGROUND 0 MARGIN 0) (\TYPE PRINT.REGION PLACEMENT (323
166 96 18) CELL CELL.PROG.MAIN.QUALITY.LIGHTER.TOP BACKGROUND 0 MARGIN 0) (\TYPE PRINT.REGION
PLACEMENT (493 164 96 18) CELL CELL.PROG.MAIN.QUALITY.DARKER.TOP BACKGROUND 0 MARGIN 0) (\TYPE
STRAIGHT.LINE PLACEMENT (423 202 527 202 NIL) WIDTH 1) (\TYPE SENSITIVE.REGION.CHANGE.FRAME
PLACEMENT (616 92 50 50) FRAME PROG.SCORE.MAIN.QUALITY.1) (\TYPE SET.OF.INDICATORS PLACEMENT (327
. 364) CELL CELL.PROG.MAIN.QUALITY INDICATORS ((QUALITY.STANDARD 1) (GHOST.QUALITY.STANDARD 2) (
GHOST.QUALITY.STANDARD 3) (GHOST.QUALITY.STANDARD 4) (GHOST.QUALITY.STANDARD 5) (
GHOST.QUALITY.STANDARD 6) (GHOST.QUALITY.STANDARD 7)) VERSION 1) (\TYPE SET.OF.INDICATORS PLACEMENT
 (429 . 363) CELL CELL.PROG.MAIN.QUALITY INDICATORS ((GHOST.QUALITY.LIGHT 1) (QUALITY.LIGHT 2) (
GHOST.QUALITY.LIGHT 3) (GHOST.QUALITY.LIGHT 4) (GHOST.QUALITY.LIGHT 5) (GHOST.QUALITY.LIGHT 6) (
GHOST.QUALITY.LIGHT 7)) VERSION 1) (\TYPE SET.OF.INDICATORS PLACEMENT (506 . 367) CELL
CELL.PROG.MAIN.QUALITY INDICATORS ((GHOST.QUALITY.PHOTO 1) (GHOST.QUALITY.PHOTO 2) (QUALITY.PHOTO 3
) (GHOST.QUALITY.PHOTO 4) (GHOST.QUALITY.PHOTO 5) (GHOST.QUALITY.PHOTO 6) (GHOST.QUALITY.PHOTO 7))
 VERSION 1) (\TYPE SET.OF.INDICATORS PLACEMENT (598 . 363) CELL CELL.PROG.MAIN.QUALITY INDICATORS (
(GHOST.QUALITY.COLORED 1) (GHOST.QUALITY.COLORED 2) (GHOST.QUALITY.COLORED 3) (QUALITY.COLORED 4)
(GHOST.QUALITY.COLORED 5) (GHOST.QUALITY.COLORED 6) (GHOST.QUALITY.COLORED 7)) VERSION 1) (\TYPE
SET.OF.INDICATORS PLACEMENT (600 . 289) CELL CELL.PROG.MAIN.QUALITY INDICATORS ((
GHOST.QUALITY.GOLDENROD 1) (GHOST.QUALITY.GOLDENROD 2) (GHOST.QUALITY.GOLDENROD 3) (
GHOST.QUALITY.GOLDENROD 4) (QUALITY.GOLDENROD 5) (GHOST.QUALITY.GOLDENROD 6) (
GHOST.QUALITY.GOLDENROD 7)) VERSION 1) (\TYPE SET.OF.INDICATORS PLACEMENT (327 . 290) CELL
CELL.PROG.MAIN.QUALITY INDICATORS ((GHOST.QUALITY.PASTEUP 1) (GHOST.QUALITY.PASTEUP 2) (
```

```
GHOST.QUALITY.PASTEUP 3)  (GHOST.QUALITY.PASTEUP 4)  (GHOST.QUALITY.PASTEUP 5)  (QUALITY.PASTEUP 6)  (
GHOST.QUALITY.PASTEUP 7)) VERSION 1)  (\TYPE SET.OF.INDICATORS PLACEMENT  (428 . 278) CELL
CELL.PROG.MAIN.QUALITY INDICATORS  ((GHOST.QUALITY.HALFTONE 1)  (GHOST.QUALITY.HALFTONE 2)  (
GHOST.QUALITY.HALFTONE 3)  (GHOST.QUALITY.HALFTONE 4)  (GHOST.QUALITY.HALFTONE 5)  (
GHOST.QUALITY.HALFTONE 6)  (QUALITY.HALFTONE 7)) VERSION 1)  (\TYPE STRAIGHT.LINE PLACEMENT  (615 361
615 342 NIL) WIDTH 2)  (\TYPE BLOCK.OF.TEXT PLACEMENT  (423 . 442) LIST.OF.LINES  ("ORIGINAL TYPES")
FONT  (HELVETICA 10  (BOLD REGULAR REGULAR)))  (\TYPE STRAIGHT.LINE PLACEMENT  (424 439 515 439 NIL)
WIDTH 2)  (\TYPE FLASHING.SENSITIVE.REGION PLACEMENT  (344 369 30 30) ACTION.FORM  (CHANGE.CELL
CELL.PROG.MAIN.QUALITY 1))  (\TYPE FLASHING.SENSITIVE.REGION PLACEMENT  (431 366 30 30) ACTION.FORM  (
CHANGE.CELL CELL.PROG.MAIN.QUALITY 2))  (\TYPE FLASHING.SENSITIVE.REGION PLACEMENT  (514 369 30 30)
ACTION.FORM  (CHANGE.CELL CELL.PROG.MAIN.QUALITY 3))  (\TYPE FLASHING.SENSITIVE.REGION PLACEMENT  (601
 365 30 30) ACTION.FORM  (CHANGE.CELL CELL.PROG.MAIN.QUALITY 4))  (\TYPE FLASHING.SENSITIVE.REGION
PLACEMENT  (601 295 30 30) ACTION.FORM  (CHANGE.CELL CELL.PROG.MAIN.QUALITY 5))  (\TYPE
FLASHING.SENSITIVE.REGION PLACEMENT  (326 295 30 30) ACTION.FORM  (CHANGE.CELL CELL.PROG.MAIN.QUALITY
6))  (\TYPE FLASHING.SENSITIVE.REGION PLACEMENT  (428 281 30 30) ACTION.FORM  (CHANGE.CELL
CELL.PROG.MAIN.QUALITY 7))  (\TYPE IMPLICATION PLACEMENT  (323 . 17) NAME SET.COPYIMAGE&LIGHTER-DARKER
 CELL CELL.PROG.MAIN.QUALITY ACTION.FORM  (SELECTQ  (CELL.VALUE CELL.PROG.MAIN.QUALITY)  (1  (PROG NIL
  (CHANGE.CELL CELL.PROG.MAIN.QUALITY.LIGHTER  "LIGHTER")  (CHANGE.CELL CELL.PROG.MAIN.QUALITY.DARKER
 "DARKER")  (CHANGE.CELL CELL.PROG.MAIN.QUALITY.IMAGE  "COPY IMAGE")  (CHANGE.CELL
CELL.PROG.MAIN.QUALITY.LIGHTER.TOP  " ")  (CHANGE.CELL CELL.PROG.MAIN.QUALITY.DARKER.TOP  " ")))  (2
(PROG NIL  (CHANGE.CELL CELL.PROG.MAIN.QUALITY.LIGHTER  "LIGHTER")  (CHANGE.CELL
CELL.PROG.MAIN.QUALITY.DARKER  "DARKER")  (CHANGE.CELL CELL.PROG.MAIN.QUALITY.IMAGE  "COPY IMAGE")  (
CHANGE.CELL CELL.PROG.MAIN.QUALITY.LIGHTER.TOP  " ")  (CHANGE.CELL CELL.PROG.MAIN.QUALITY.DARKER.TOP
" ")))  (3  (PROG NIL  (CHANGE.CELL CELL.PROG.MAIN.QUALITY.LIGHTER  "LESS")  (CHANGE.CELL
CELL.PROG.MAIN.QUALITY.DARKER  "MORE")  (CHANGE.CELL CELL.PROG.MAIN.QUALITY.IMAGE  "COPY CONTRAST")  (
CHANGE.CELL CELL.PROG.MAIN.QUALITY.LIGHTER.TOP  " ")  (CHANGE.CELL CELL.PROG.MAIN.QUALITY.DARKER.TOP
" ")))  (4  (PROG NIL  (CHANGE.CELL CELL.PROG.MAIN.QUALITY.LIGHTER  "LIGHTER")  (CHANGE.CELL
CELL.PROG.MAIN.QUALITY.DARKER  "DARKER")  (CHANGE.CELL CELL.PROG.MAIN.QUALITY.IMAGE  "COPY BACKGROUND"
)  (CHANGE.CELL CELL.PROG.MAIN.QUALITY.LIGHTER.TOP  " ")  (CHANGE.CELL
CELL.PROG.MAIN.QUALITY.DARKER.TOP  " ")))  (5  (PROG NIL  (CHANGE.CELL CELL.PROG.MAIN.QUALITY.LIGHTER
 "LIGHTER")  (CHANGE.CELL CELL.PROG.MAIN.QUALITY.DARKER  "DARKER")  (CHANGE.CELL
CELL.PROG.MAIN.QUALITY.IMAGE  "COPY BACKGROUND")  (CHANGE.CELL CELL.PROG.MAIN.QUALITY.LIGHTER.TOP  " "
)  (CHANGE.CELL CELL.PROG.MAIN.QUALITY.DARKER.TOP  " ")))  (6  (PROG NIL  (CHANGE.CELL
CELL.PROG.MAIN.QUALITY.LIGHTER  "LESS")  (CHANGE.CELL CELL.PROG.MAIN.QUALITY.DARKER  "MORE")  (
CHANGE.CELL CELL.PROG.MAIN.QUALITY.IMAGE  "EDGE SUPRESSION")  (CHANGE.CELL
CELL.PROG.MAIN.QUALITY.LIGHTER.TOP  " ")  (CHANGE.CELL CELL.PROG.MAIN.QUALITY.DARKER.TOP  " ")))  (7
(PROG NIL  (CHANGE.CELL CELL.PROG.MAIN.QUALITY.LIGHTER  "LIGHTER")  (CHANGE.CELL
CELL.PROG.MAIN.QUALITY.DARKER  "DARKER")  (CHANGE.CELL CELL.PROG.MAIN.QUALITY.IMAGE  "COPY TONE")  (
CHANGE.CELL CELL.PROG.MAIN.QUALITY.LIGHTER.TOP  "HIGHLIGHTER")  (CHANGE.CELL
CELL.PROG.MAIN.QUALITY.DARKER.TOP  "SHADOW"))) NIL))  (\TYPE IMPLICATION PLACEMENT  (323 . 34) NAME
ADJUST.MANUAL.CONTROLS.AUTOMATICALLY CELL CELL.PROG.MAIN.QUALITY.BAR ACTION.FORM  (SELECTQ  (
CELL.VALUE CELL.PROG.MAIN.QUALITY.BAR)  (5  (PROG NIL  (CHANGE.CELL CELL.PROG.MAIN.QUALITY.EXPOSURE 2)
  (CHANGE.CELL CELL.PROG.MAIN.QUALITY.CONTRAST 1)  (CHANGE.CELL CELL.PROG.MAIN.QUALITY.PHOTOCONTRAST 2
)))  (4  (PROG NIL  (CHANGE.CELL CELL.PROG.MAIN.QUALITY.EXPOSURE 3)  (CHANGE.CELL
CELL.PROG.MAIN.QUALITY.CONTRAST 3)  (CHANGE.CELL CELL.PROG.MAIN.QUALITY.PHOTOCONTRAST 4)))  (3  (PROG
NIL  (CHANGE.CELL CELL.PROG.MAIN.QUALITY.EXPOSURE 5)  (CHANGE.CELL CELL.PROG.MAIN.QUALITY.CONTRAST 6)
 (CHANGE.CELL CELL.PROG.MAIN.QUALITY.PHOTOCONTRAST 7)))  (2  (PROG NIL  (CHANGE.CELL
CELL.PROG.MAIN.QUALITY.EXPOSURE 7)  (CHANGE.CELL CELL.PROG.MAIN.QUALITY.CONTRAST 8)  (CHANGE.CELL
CELL.PROG.MAIN.QUALITY.PHOTOCONTRAST 7)))  (1  (PROG NIL  (CHANGE.CELL CELL.PROG.MAIN.QUALITY.EXPOSURE
 9)  (CHANGE.CELL CELL.PROG.MAIN.QUALITY.CONTRAST 9)  (CHANGE.CELL
CELL.PROG.MAIN.QUALITY.PHOTOCONTRAST 10))) NIL))))  (\TYPE FRAME NAME PROG.SCORE.MAIN.QUALITY.1
SUPERFRAMES  (PROG.SCORE.MAIN) ITEMS  ((\TYPE SET.OF.INDICATORS PLACEMENT  (327 . 364) CELL
CELL.PROG.MAIN.QUALITY INDICATORS  ((QUALITY.STANDARD 1)  (GHOST.QUALITY.STANDARD 2)  (
GHOST.QUALITY.STANDARD 3)  (GHOST.QUALITY.STANDARD 4)  (GHOST.QUALITY.STANDARD 5)  (
GHOST.QUALITY.STANDARD 6)  (GHOST.QUALITY.STANDARD 7)) VERSION 1)  (\TYPE SET.OF.INDICATORS PLACEMENT
 (429 . 363) CELL CELL.PROG.MAIN.QUALITY INDICATORS  ((GHOST.QUALITY.LIGHT 1)  (QUALITY.LIGHT 2)  (
GHOST.QUALITY.LIGHT 3)  (GHOST.QUALITY.LIGHT 4)  (GHOST.QUALITY.LIGHT 5)  (GHOST.QUALITY.LIGHT 6)  (
GHOST.QUALITY.LIGHT 7)) VERSION 1)  (\TYPE SET.OF.INDICATORS PLACEMENT  (506 . 367) CELL
CELL.PROG.MAIN.QUALITY INDICATORS  ((GHOST.QUALITY.PHOTO 1)  (GHOST.QUALITY.PHOTO 2)  (QUALITY.PHOTO 3
)  (GHOST.QUALITY.PHOTO 4)  (GHOST.QUALITY.PHOTO 5)  (GHOST.QUALITY.PHOTO 6)  (GHOST.QUALITY.PHOTO 7))
 VERSION 1)  (\TYPE SET.OF.INDICATORS PLACEMENT  (598 . 363) CELL CELL.PROG.MAIN.QUALITY INDICATORS  (
(GHOST.QUALITY.COLORED 1)  (GHOST.QUALITY.COLORED 2)  (GHOST.QUALITY.COLORED 3)  (QUALITY.COLORED 4)
(GHOST.QUALITY.COLORED 5)  (GHOST.QUALITY.COLORED 6)  (GHOST.QUALITY.COLORED 7)) VERSION 1)  (\TYPE
SET.OF.INDICATORS PLACEMENT  (600 . 283) CELL CELL.PROG.MAIN.QUALITY INDICATORS  ((
GHOST.QUALITY.GOLDENROD 1)  (GHOST.QUALITY.GOLDENROD 2)  (GHOST.QUALITY.GOLDENROD 3)  (
GHOST.QUALITY.GOLDENROD 4)  (QUALITY.GOLDENROD 5)  (GHOST.QUALITY.GOLDENROD 6)  (
GHOST.QUALITY.GOLDENROD 7)) VERSION 1)  (\TYPE SET.OF.INDICATORS PLACEMENT  (327 . 290) CELL
CELL.PROG.MAIN.QUALITY INDICATORS  ((GHOST.QUALITY.PASTEUP 1)  (GHOST.QUALITY.PASTEUP 2)  (
GHOST.QUALITY.PASTEUP 3)  (GHOST.QUALITY.PASTEUP 4)  (GHOST.QUALITY.PASTEUP 5)  (QUALITY.PASTEUP 6)  (
GHOST.QUALITY.PASTEUP 7)) VERSION 1)  (\TYPE SET.OF.INDICATORS PLACEMENT  (428 . 278) CELL
CELL.PROG.MAIN.QUALITY INDICATORS  ((GHOST.QUALITY.HALFTONE 1)  (GHOST.QUALITY.HALFTONE 2)  (
GHOST.QUALITY.HALFTONE 3)  (GHOST.QUALITY.HALFTONE 4)  (GHOST.QUALITY.HALFTONE 5)  (
GHOST.QUALITY.HALFTONE 6)  (QUALITY.HALFTONE 7)) VERSION 1)  (\TYPE STRAIGHT.LINE PLACEMENT  (613 360
613 333 NIL) WIDTH 2)  (\TYPE BLOCK.OF.TEXT PLACEMENT  (423 . 442) LIST.OF.LINES  ("ORIGINAL TYPES")
FONT  (HELVETICA 10  (BOLD REGULAR REGULAR)))  (\TYPE STRAIGHT.LINE PLACEMENT  (424 439 515 439 NIL)
WIDTH 2)  (\TYPE FLASHING.SENSITIVE.REGION PLACEMENT  (344 369 30 30) ACTION.FORM  (CHANGE.CELL
CELL.PROG.MAIN.QUALITY 1))  (\TYPE FLASHING.SENSITIVE.REGION PLACEMENT  (431 366 30 30) ACTION.FORM  (
CHANGE.CELL CELL.PROG.MAIN.QUALITY 2))  (\TYPE FLASHING.SENSITIVE.REGION PLACEMENT  (514 369 30 30)
ACTION.FORM  (CHANGE.CELL CELL.PROG.MAIN.QUALITY 3))  (\TYPE FLASHING.SENSITIVE.REGION PLACEMENT  (601
 365 30 30) ACTION.FORM  (CHANGE.CELL CELL.PROG.MAIN.QUALITY 4))  (\TYPE FLASHING.SENSITIVE.REGION
PLACEMENT  (599 289 30 30) ACTION.FORM  (CHANGE.CELL CELL.PROG.MAIN.QUALITY 5))  (\TYPE
FLASHING.SENSITIVE.REGION PLACEMENT  (326 295 30 30) ACTION.FORM  (CHANGE.CELL CELL.PROG.MAIN.QUALITY
6))  (\TYPE FLASHING.SENSITIVE.REGION PLACEMENT  (428 281 30 30) ACTION.FORM  (CHANGE.CELL
CELL.PROG.MAIN.QUALITY 7))  (\TYPE PICTURE.VARIABLE.PLACEMENT.W/BKGD PLACEMENT  (338 . 13) OLD.X -1
OLD.Y 0 CELLS  (NULL CELL.PROG.MAIN.QUALITY.EXPOSURE) PICTURE SHADED.BLOCK BACKGROUND.PICTURE
QUALITY.MANUAL OPERATION INVERT)  (\TYPE UP.DOWN.BUTTONS PLACEMENT  (374 . 102) CELL
CELL.PROG.MAIN.QUALITY.EXPOSURE UP.PICTURE UP.ARROW DOWN.PICTURE DOWN.ARROW RATE 0 VERSION 1)  (\TYPE
```

PICTURE.VARIABLE.PLACEMENT.W/BKGD PLACEMENT (473 . 16) OLD.X -1 OLD.Y 0 CELLS (NULL CELL.PROG.MAIN.QUALITY.CONTRAST) PICTURE SHADED.BLOCK BACKGROUND.PICTURE QUALITY.MANUAL OPERATION INVERT) (\TYPE UP.DOWN.BUTTONS PLACEMENT (510 . 102) CELL CELL.PROG.MAIN.QUALITY.CONTRAST UP.PICTURE UP.ARROW DOWN.PICTURE DOWN.ARROW RATE 0 VERSION 1) (\TYPE PICTURE.VARIABLE.PLACEMENT.W/BKGD PLACEMENT (593 . 15) OLD.X -1 OLD.Y 2 CELLS (NULL CELL.PROG.MAIN.QUALITY.PHOTOCONTRAST) PICTURE SHADED.BLOCK BACKGROUND.PICTURE QUALITY.MANUAL OPERATION INVERT) (\TYPE UP.DOWN.BUTTONS PLACEMENT (629 . 102) CELL CELL.PROG.MAIN.QUALITY.PHOTOCONTRAST UP.PICTURE UP.ARROW DOWN.PICTURE DOWN.ARROW RATE 0 VERSION 1) (\TYPE BLOCK.OF.TEXT PLACEMENT (366 . 140) LIST.OF.LINES (EXPOSURE)) (\TYPE BLOCK.OF.TEXT PLACEMENT (502 . 138) LIST.OF.LINES (CONTRAST)) (\TYPE BLOCK.OF.TEXT PLACEMENT (624 . 144) LIST.OF.LINES ("PHOTO" "CONTRAST") FONT (HELVETICA 8 (MEDIUM REGULAR REGULAR))) (\TYPE BLOCK.OF.TEXT PLACEMENT (370 . 15) LIST.OF.LINES (MORE) FONT (HELVETICA 10 (MEDIUM REGULAR REGULAR ))) (\TYPE BLOCK.OF.TEXT PLACEMENT (626 . 18) LIST.OF.LINES (MORE) FONT (HELVETICA 10 (MEDIUM REGULAR REGULAR))) (\TYPE BLOCK.OF.TEXT PLACEMENT (505 . 18) LIST.OF.LINES (DARKER) FONT ( HELVETICA 10 (MEDIUM REGULAR REGULAR))) (\TYPE BLOCK.OF.TEXT PLACEMENT (503 . 257) LIST.OF.LINES ( LIGHTER) FONT (HELVETICA 10 (MEDIUM REGULAR REGULAR))) (\TYPE BLOCK.OF.TEXT PLACEMENT (367 . 253) LIST.OF.LINES (LESS) FONT (HELVETICA 10 (MEDIUM REGULAR REGULAR))) (\TYPE BLOCK.OF.TEXT PLACEMENT (624 . 256) LIST.OF.LINES (LESS) FONT (HELVETICA 10 (MEDIUM REGULAR REGULAR))) (\TYPE PRINT.REGION PLACEMENT (365 64 82 21) CELL CELL.PROG.MAIN.QUALITY.EXPOSURE))) (\TYPE FRAME NAME PROG.SCORE.MAIN.RE SUPERFRAMES (PROG.SCORE.MAIN) ITEMS ((\TYPE UP.DOWN.BUTTONS PLACEMENT (459 . 170 ) UP.PICTURE UP.ARROW DOWN.PICTURE DOWN.ARROW MINIMUM 64 MAXIMUM 155 RATE 0 CELL CELL.PROG.MAIN.RE.TEXT BUTTON.SPACING (0 . 68) VERSION 1) (\TYPE IMPLICATION PLACEMENT (306 . 0) CELL CELL.PROG.MAIN.RE.TEXT ACTION.FORM (COND ((EQUAL (CELL.VALUE CELL.PROG.MAIN.RE.TEXT) 100) ( CHANGE.CELL CELL.PROG.MAIN.RE.TEXT.FULLSIZE "FULL SIZE")) (T (CHANGE.CELL CELL.PROG.MAIN.RE.TEXT.FULLSIZE " ")))) (\TYPE PICTURE PLACEMENT (640 . 378) BITMAP PAGE) (\TYPE PICTURE PLACEMENT (640 . 321) BITMAP PAGE) (\TYPE PICTURE PLACEMENT (641 . 260) BITMAP PAGE) ( \TYPE PICTURE PLACEMENT (642 . 152) BITMAP PAGE) (\TYPE PICTURE PLACEMENT (642 . 83) BITMAP PAGE) (\TYPE PICTURE PLACEMENT (643 . 13) BITMAP PAGE) (\TYPE PICTURE PLACEMENT (569 . 205) BITMAP PAGE) (\TYPE FLASHING.SENSITIVE.REGION PLACEMENT (638 383 30 30) ACTION.FORM (CHANGE.CELL CELL.PROG.MAIN.RE.TEXT 155)) (\TYPE FLASHING.SENSITIVE.REGION PLACEMENT (639 325 30 30) ACTION.FORM (CHANGE.CELL CELL.PROG.MAIN.RE.TEXT 129)) (\TYPE FLASHING.SENSITIVE.REGION PLACEMENT (639 265 30 30 ) ACTION.FORM (CHANGE.CELL CELL.PROG.MAIN.RE.TEXT 116)) (\TYPE FLASHING.SENSITIVE.REGION PLACEMENT (567 210 30 30) ACTION.FORM (CHANGE.CELL CELL.PROG.MAIN.RE.TEXT 100)) (\TYPE FLASHING.SENSITIVE.REGION PLACEMENT (640 156 30 30) ACTION.FORM (CHANGE.CELL CELL.PROG.MAIN.RE.TEXT 98)) (\TYPE FLASHING.SENSITIVE.REGION PLACEMENT (640 88 30 30) ACTION.FORM (CHANGE.CELL CELL.PROG.MAIN.RE.TEXT 74)) (\TYPE FLASHING.SENSITIVE.REGION PLACEMENT (640 16 30 30) ACTION.FORM ( CHANGE.CELL CELL.PROG.MAIN.RE.TEXT 64)) (\TYPE BLOCK.OF.TEXT PLACEMENT (443 . 337) LIST.OF.LINES ( "64 - 155%%") FONT (HELVETICA 10 (BOLD REGULAR REGULAR))) (\TYPE BLOCK.OF.TEXT PLACEMENT (491 . 296) LIST.OF.LINES ("%%") FONT (HELVETICA 10 (BOLD REGULAR REGULAR))) (\TYPE BORDER PLACEMENT ( 443 289 84 39) THICKNESS 2 COLOR 65535) (\TYPE PRINT.REGION PLACEMENT (458 292 32 15) CELL CELL.PROG.MAIN.RE.TEXT BACKGROUND 0) (\TYPE PRINT.REGION PLACEMENT (447 309 75 13) CELL CELL.PROG.MAIN.RE.TEXT.FULLSIZE BACKGROUND 0 MARGIN 0) (\TYPE BLOCK.OF.TEXT PLACEMENT (628 . 445) LIST.OF.LINES ("PRESET %%") FONT (HELVETICA 10 (BOLD REGULAR REGULAR))) (\TYPE BLOCK.OF.TEXT PLACEMENT (639 . 422) LIST.OF.LINES ("155 %%") FONT (HELVETICA 10 (MEDIUM REGULAR REGULAR))) ( \TYPE BLOCK.OF.TEXT PLACEMENT (640 . 363) LIST.OF.LINES ("129 %%") FONT (HELVETICA 10 (MEDIUM REGULAR REGULAR))) (\TYPE BLOCK.OF.TEXT PLACEMENT (641 . 302) LIST.OF.LINES ("116 %%") FONT ( HELVETICA 10 (MEDIUM REGULAR REGULAR))) (\TYPE BLOCK.OF.TEXT PLACEMENT (569 . 248) LIST.OF.LINES ( "100 %%") FONT (HELVETICA 10 (MEDIUM REGULAR REGULAR))) (\TYPE BLOCK.OF.TEXT PLACEMENT (642 . 194) LIST.OF.LINES ("98 %%") FONT (HELVETICA 10 (MEDIUM REGULAR REGULAR))) (\TYPE BLOCK.OF.TEXT PLACEMENT (642 . 125) LIST.OF.LINES ("74 %%") FONT (HELVETICA 10 (MEDIUM REGULAR REGULAR))) ( \TYPE BLOCK.OF.TEXT PLACEMENT (643 . 55) LIST.OF.LINES ("64 %%") FONT (HELVETICA 10 (MEDIUM REGULAR REGULAR))) (\TYPE BLOCK.OF.TEXT PLACEMENT (446 . 216) LIST.OF.LINES ("VARIABLE %%") FONT ( HELVETICA 10 (BOLD REGULAR REGULAR))) (\TYPE BLOCK.OF.TEXT PLACEMENT (329 . 240) LIST.OF.LINES ( AUTOMATIC) FONT (HELVETICA 10 (BOLD REGULAR REGULAR))) (\TYPE BORDER PLACEMENT (329 185 50 50) THICKNESS 2 COLOR 65535) (\TYPE STRAIGHT.LINE PLACEMENT (601 226 654 226 NIL) WIDTH 2) (\TYPE STRAIGHT.LINE PLACEMENT (655 246 655 206 NIL) WIDTH 2))) (\TYPE FRAME NAME PROG.SCORE.MAIN.SIDES SUPERFRAMES (PROG.SCORE.MAIN) ITEMS ((\TYPE SENSITIVE.REGION PLACEMENT (373 303 78 34) ACTION.FORM (CHANGE.CELL CELL.PROG.MAIN.SIDES 1)) (\TYPE SENSITIVE.REGION PLACEMENT (531 306 78 34) ACTION.FORM (CHANGE.CELL CELL.PROG.MAIN.SIDES 2)) (\TYPE SENSITIVE.REGION PLACEMENT (375 204 78 34) ACTION.FORM (CHANGE.CELL CELL.PROG.MAIN.SIDES 3)) (\TYPE SENSITIVE.REGION PLACEMENT (538 209 78 34) ACTION.FORM (CHANGE.CELL CELL.PROG.MAIN.SIDES 4)) (\TYPE SET.OF.INDICATORS PLACEMENT (362 . 290) CELL CELL.PROG.MAIN.SIDES INDICATORS ((1.TO.1 1) (GHOST.1.TO.1 2) (GHOST.1.TO.1 3) (GHOST.1.TO.1 4 )) VERSION 1) (\TYPE SET.OF.INDICATORS PLACEMENT (528 . 289) CELL CELL.PROG.MAIN.SIDES INDICATORS ( (GHOST.1.TO.2 1) (1.TO.2 2) (GHOST.1.TO.2 3) (GHOST.1.TO.2 4)) VERSION 1) (\TYPE SET.OF.INDICATORS PLACEMENT (362 . 193) CELL CELL.PROG.MAIN.SIDES INDICATORS ((GHOST.2.TO.1 1) (GHOST.2.TO.1 2) ( 2.TO.1 3) (GHOST.2.TO.1 4)) VERSION 1) (\TYPE SET.OF.INDICATORS PLACEMENT (526 . 197) CELL CELL.PROG.MAIN.SIDES INDICATORS ((GHOST.2.TO.2 1) (GHOST.2.TO.2 2) (GHOST.2.TO.2 3) (2.TO.2 4)) VERSION 1))) (\TYPE FRAME NAME PROG.SCORE.RDH SUPERFRAMES (FRAME.PROGRAMMING) ITEMS ((\TYPE STRAIGHT.LINE PLACEMENT (21 3 21 390 NIL) WIDTH 2) (\TYPE STRAIGHT.LINE PLACEMENT (23 4 305 4 NIL) WIDTH 2) (\TYPE STRAIGHT.LINE PLACEMENT (304 5 304 392 NIL) WIDTH 2) (\TYPE STRAIGHT.LINE PLACEMENT (305 392 314 401 NIL) WIDTH 1) (\TYPE STRAIGHT.LINE PLACEMENT (306 5 315 14 NIL) WIDTH 1) (\TYPE STRAIGHT.LINE PLACEMENT (313 13 313 400 NIL) WIDTH 1) (\TYPE STRAIGHT.LINE PLACEMENT (309 10 309 397 NIL) WIDTH 1) (\TYPE STRAIGHT.LINE PLACEMENT (42 403 42 446 NIL) WIDTH 2) (\TYPE STRAIGHT.LINE PLACEMENT (43 446 99 446 NIL) WIDTH 2) (\TYPE STRAIGHT.LINE PLACEMENT (100 403 100 446 NIL) WIDTH 2 ) (\TYPE STRAIGHT.LINE PLACEMENT (110 398 110 441 NIL) WIDTH 2) (\TYPE STRAIGHT.LINE PLACEMENT ( 169 397 169 440 NIL) WIDTH 2) (\TYPE STRAIGHT.LINE PLACEMENT (238 400 310 400 NIL) WIDTH 1) (\TYPE STRAIGHT.LINE PLACEMENT (181 391 181 434 NIL) WIDTH 2) (\TYPE STRAIGHT.LINE PLACEMENT (182 434 238 434 NIL) WIDTH 2) (\TYPE STRAIGHT.LINE PLACEMENT (239 392 239 435 NIL) WIDTH 2) (\TYPE STRAIGHT.LINE PLACEMENT (102 403 110 403 NIL) WIDTH 1) (\TYPE STRAIGHT.LINE PLACEMENT (171 402 181 402 NIL) WIDTH 1) (\TYPE STRAIGHT.LINE PLACEMENT (42 402 34 402 NIL) WIDTH 1) (\TYPE STRAIGHT.LINE PLACEMENT (24 393 34 401 NIL) WIDTH 1) (\TYPE BLOCK.OF.TEXT PLACEMENT (186 . 422) LIST.OF.LINES ( RDH) FONT (HELVETICA 10 (MEDIUM REGULAR REGULAR))) (\TYPE BLOCK.OF.TEXT PLACEMENT (186 . 409) LIST.OF.LINES (PAGE) FONT (HELVETICA 10 (MEDIUM REGULAR REGULAR))) (\TYPE BITMAP PLACEMENT (35 . 121) NAME MARGIN.SHIFT BITMAP ((READBITMAP)(26 40

"OOOOOOL@"
"OOOOOOL@"
"L@@@@@L@"
"L@@@@@L@"

```
"MOO@@@L@"
"L@@@@@L@"
"MOO@@@L@"
"L@@@@@L@"
"L@@@@@L@"
"L@@@@@L@"
"L@@@@@L@"
"MOOOOLL@"
"L@L@@@L@"
"LAH@@@L@"
"MKKOOLL@"
"LF@@@@L@"
"LL@@@@L@"
"MOOOGLL@"
"MOOO@@L@"
"LL@@@@L@"
"LGOOOLL@"
"LC@@@@L@"
"LAH@@@L@"
"MOOOOLL@"
"L@L@@@L@"
"L@@@@@L@"
"MOOOOLL@"
"L@@@@@L@"
"L@@@@AL@"
"MOOONCL@"
"L@@@@NL@"
"L@@@@LL@"
"MOOCILH@"
"L@@@C@H@"
"L@@@BAH@"
"L@@@CA@@"
"L@@@AK@@"
"L@@@@O@@"
"OOOOOO@@"
"OOOOOL@@"))) ('TYPE BITMAP PLACEMENT (86 . 308) NAME TRAY1 BITMAP ((READBITMAP)(101 57
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@@@@@@@@@@@@@@@@@@@@"
"@@@@@@@@@OOOOOOOOOOL@@@@@@@@"
"@@@@@@@@@A@@@@@@@@@@D@@@@@@@"
"@@@@@@@@@B@@@@@@@@@@H@@@@@@@"
"@@@@@@@@@D@@@@@@@@@@A@@@@@@@"
"@@@@@@@@@H@@@@@@@@@CL@@@@@@@"
"@@@@@@@@A@@@@@@@@@@@DD@@@@@@"
"@@@@@@@@B@@@@@@@@@@@HH@@@@@@"
"@@@@@@@@D@@@@@@@@@@@AA@@@@@@"
"@@@@@@@@H@@@@@@@@@@BCL@@@@@@"
"@@@@@@@A@@@@@@@@@@@@DDD@@@@@"
"@@@@@GOOOOOOOOOON@HHH@@@@@@@"
"@@@@@GOOOOOOOOOONAAA@@@@@@@@"
"@@@@@F@@@@@@@@@@FBBCL@@@@@@@"
"@@@@@F@@@@@@@@@@FDDDD@@@@@@@"
"@@@@@F@@@@@@@@@@GHHHH@@@@@@@"
"@@@@@F@F@@@@@@@@FAAA@@@@@@@@"
"@@@@@F@N@@@@@@@@FBBCL@@@@@@@"
"@@@@@FAN@@@@@@@@FDDDD@@@@@@@"
"@@@@@F@F@@@@@@@@GHHHH@@@@@@@"
"@@@@@F@F@@@@@@@@FAAA@@@@@@@@"
"@@@@@F@F@@@@@@@@FBBCL@@@@@@@"
"@@@@@F@F@@@@@@@@FDDDD@@@@@@@"
"@@@@@F@F@@@@@@@@GHHHH@@@@@@@"
"@@@@@F@@@@@@@@@@FAAA@@@@@@@@"
"@@@@@F@@@@@@@@@@FBBCL@@@@@@@"
"@@@@@F@@@@@@@@@@FDDDD@@@@@@@"
"@@@@@F@@@@@@@@@@GHHHH@@@@@@@"
"@@@@@F@@@@@@@@@@FAAA@@@@@@@@"
"@@@@@F@@@@@@@@@@FBBB@@@@@@@@"
"@@@@@F@@@@@@@@@@FDDD@@@@@@@@"
"@@@@@F@@@@@@@@@@GHHH@@@@@@@@"
"@@@@@F@@@@@@@@@@FAA@@@@@@@@@"
"@@@@@F@@@@@@@@@@FBB@@@@@@@@@"
"@@@@@F@@@@@@@@@@FDD@@@@@@@@@"
"@@@@@F@@@@@@@@@@GHH@@@@@@@@@"
```

```
"@@@@@F@@@@@@@@@@FA@@@@@@@@@@@@"
"@@@@@F@@@@@@@@@@FB@@@@@@@@@@@@"
"@@@@@G0000000000ND@@@@@@@@@@@@"
"@@@@@G00000000000H@@@@@@@@@@@@"
"@@@@@@@@@@@@@@@@@@@@@@@@@@@@@@"
"@@@@@@@@@@@@@@@@@@@@@@@@@@@@@@")}) (\TYPE BLOCK.OF.TEXT PLACEMENT (158 . 375) LIST.OF.LINES (SUPPLY) FONT
(HELVETICA 10 (MEDIUM
REGULAR REGULAR))) (\TYPE BLOCK.OF.TEXT PLACEMENT (112 . 375) LIST.OF.LINES (PAPER) FONT (
HELVETICA 10 (MEDIUM REGULAR REGULAR))) (\TYPE BLOCK.OF.TEXT PLACEMENT (112 . 360) LIST.OF.LINES (
8.5X11) FONT (HELVETICA 10 (MEDIUM REGULAR REGULAR))) (\TYPE BLOCK.OF.TEXT PLACEMENT (35 . 167)
LIST.OF.LINES (SHIFT) FONT (HELVETICA 10 (MEDIUM REGULAR REGULAR))) (\TYPE BLOCK.OF.TEXT PLACEMENT
 (35 . 179) LIST.OF.LINES (MARGIN) FONT (HELVETICA 10 (MEDIUM REGULAR REGULAR))) (\TYPE
STRAIGHT.LINE PLACEMENT (162 313 221 313 NIL) WIDTH 3) (\TYPE STRAIGHT.LINE PLACEMENT (111 441 169
441 NIL) WIDTH 2) (\TYPE STRAIGHT.LINE PLACEMENT (22 391 182 391 NIL) WIDTH 1) (\TYPE BLOCK.OF.TEXT
 PLACEMENT (48 . 434) LIST.OF.LINES (MAIN) FONT (GACHA 10 (MEDIUM REGULAR REGULAR))) (\TYPE
BLOCK.OF.TEXT PLACEMENT (49 . 419) LIST.OF.LINES (JOB) FONT (GACHA 10 (MEDIUM REGULAR REGULAR)))
(\TYPE BLOCK.OF.TEXT PLACEMENT (116 . 430) LIST.OF.LINES (DIRECT) FONT (GACHA 10 (MEDIUM REGULAR
REGULAR))) (\TYPE BLOCK.OF.TEXT PLACEMENT (116 . 416) LIST.OF.LINES (PAGE) FONT (GACHA 10 (MEDIUM
 REGULAR REGULAR))) (\TYPE GROUP PLACEMENT (153 . 238) MEMBERS ((\TYPE BLOCK.OF.TEXT PLACEMENT (
-45 . -13) LIST.OF.LINES (DARKNESS) FONT (GACHA 10 (BOLD REGULAR REGULAR)) SUBITEMS NIL
BOUNDING.BOX NIL) (\TYPE BLOCK.OF.TEXT PLACEMENT (-45 . 0) LIST.OF.LINES (CONTRAST) FONT (GACHA 10
 (BOLD REGULAR REGULAR)) SUBITEMS NIL BOUNDING.BOX NIL) (\TYPE BLOCK.OF.TEXT PLACEMENT (-45 . 12)
LIST.OF.LINES (STANDARD) FONT (GACHA 10 (BOLD REGULAR REGULAR)) SUBITEMS NIL BOUNDING.BOX NIL) (
\TYPE BLOCK.OF.TEXT PLACEMENT (13 . -13) LIST.OF.LINES (4) FONT (GACHA 10 (BOLD REGULAR REGULAR))
SUBITEMS NIL BOUNDING.BOX NIL) (\TYPE BLOCK.OF.TEXT PLACEMENT (14 . 0) LIST.OF.LINES (4) FONT (
GACHA 10 (BOLD REGULAR REGULAR)) SUBITEMS NIL BOUNDING.BOX NIL) (\TYPE BORDER PLACEMENT (-51 -19 75
 43) THICKNESS 2 BOUNDING.BOX NIL SUBITEMS NIL) (\TYPE BLOCK.OF.TEXT PLACEMENT (-52 . 30)
LIST.OF.LINES (COPY) FONT (HELVETICA 10 (MEDIUM REGULAR REGULAR)) SUBITEMS NIL BOUNDING.BOX NIL) (
\TYPE BLOCK.OF.TEXT PLACEMENT (-12 . 30) LIST.OF.LINES (QUALITY) FONT (HELVETICA 10 (MEDIUM
REGULAR REGULAR)) SUBITEMS NIL BOUNDING.BOX NIL))) (\TYPE BITMAP PLACEMENT (225 . 157) NAME TABS
BITMAP {(READBITMAP)(29 35
"000000L@"
"000000L@"
"L@@@@@L@"
"L@@@@@L@"
"L@@@@@L@"
"L@@@@@L@"
"L@@@@@L@"
"L@@@@@OH"
"L@@@@@OH"
"L@@@@@AH"
"L@@@@@AH"
"L@@@@@AH"
"L@@@@@AH"
"L@@@@@AH"
"L@@@@@AH"
"L@@@@@AH"
"L@@@@@OH"
"L@@@@@OH"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"000000L@"
"000000L@")}) (\TYPE BITMAP PLACEMENT (120 . 14) NAME REPEAT.COPIES BITMAP {(READBITMAP)(30 41
"A000000L"
"A@@@@@@D"
"A@@@@@@D"
"G000000D"
"D@@@@@AD"
"D@@@@@AD"
"000000MD"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
```

```
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@ED"
"H@@@@@EL"
"H@@@@@G@"
"H@@@@@D@"
"OOOOOOL@"))) (\TYPE BITMAP PLACEMENT  (122 . 119) NAME SIMPLE.BUTTON.BITMAP BITMAP  {(READBITMAP)(26 40
"OOOOOOL@"
"OOOOOOL@"
"L@@H@@L@"
"L@AL@@L@"
"MOKN@@L@"
"L@FK@@L@"
"MNNIH@L@"
"LAHHL@L@"
"LA@HD@L@"
"L@@H@@L@"
"L@@H@@L@"
"MOOOOLL@"
"L@LIH@L@"
"LAHHL@L@"
"MKKOFLL@"
"LF@HC@L@"
"LL@HAHL@"
"MOOOOLL@"
"MOOOOLL@"
"LL@HAHL@"
"LGOOOOL@"
"LC@HF@L@"
"LAHHL@L@"
"MOOOMLL@"
"L@LIH@L@"
"L@@H@@L@"
"MOOOOLL@"
"L@@H@@L@"
"L@@H@AL@"
"MOOONCL@"
"L@@H@NL@"
"LA@HDLL@"
"MMKNMLH@"
"L@LIK@H@"
"L@FKBAH@"
"L@CNCA@@"
"L@ALAK@@"
"L@@H@O@@"
"OOOOOO@@"
"OOOOOL@@"))) (\TYPE BITMAP PLACEMENT  (225 . 49) NAME BLANK.PAGE BITMAP  {(READBITMAP)(26 40
"OOOOOOL@"
:OOOOOOL@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
"L@@@@@L@"
```

```
"L@@@@AL@"
"L@@@@CL@"
"L@@@@NL@"
"L@@@@LL@"
"L@@@ALH@"
"L@@@C@H@"
"L@@@BAH@"
"L@@@CA@@"
"L@@@AK@@"
"L@@@@O@@"
"OOOOOO@@"
"OOOOOL@@"))) (\TYPE BLOCK.OF.TEXT PLACEMENT (122 . 164) LIST.OF.LINES (CROPPING) FONT (HELVETICA 10 (
MEDIUM REGULAR REGULAR))) (\TYPE BLOCK.OF.TEXT PLACEMENT (225 . 197) LIST.OF.LINES (TABS) FONT (
HELVETICA 10 (MEDIUM REGULAR REGULAR))) (\TYPE BLOCK.OF.TEXT PLACEMENT (225 . 95) LIST.OF.LINES (
PAGE) FONT (HELVETICA 10 (MEDIUM REGULAR REGULAR))) (\TYPE BLOCK.OF.TEXT PLACEMENT (225 . 107)
LIST.OF.LINES (BLANK) FONT (HELVETICA 10 (MEDIUM REGULAR REGULAR))) (\TYPE BLOCK.OF.TEXT PLACEMENT
  (119 . 60) LIST.OF.LINES (COPIES) FONT (HELVETICA 10 (MEDIUM REGULAR REGULAR))) (\TYPE
BLOCK.OF.TEXT PLACEMENT (119 . 73) LIST.OF.LINES (REPEAT) FONT (HELVETICA 10 (MEDIUM REGULAR
REGULAR))) (\TYPE BITMAP PLACEMENT (224 . 270) NAME INSERTS BITMAP {(READBITMAP)(44 45
"@@COOOOOOH@@"
"@@B@@@@@@H@@"
"@@OOOOOONH@@"
"@@H@@@@@BH@@"
"@COOOOOOBH@@"
"@B@@@@@ABH@@"
"@B@@@OOOOOO@"
"@B@@@H@@@@A@"
"COOOOOO@@@A@"
"B@@@@@A@@@A@"
"OOOOOOM@@@A@"
"H@@@@@E@@@A@"
"H@@@@@E@@@A@"
"H@@@@@E@@@A@"
"H@@@@@E@@@A@"
"H@@@@@E@@@A@"
"H@@@@@E@@@A@"
"H@@@@@E@@@A@"
"H@@@@@E@@@A@"
"H@@@@@E@@@A@"
"H@@@@@E@C@A@"
"H@@@@@E@F@A@"
"H@@@@@E@L@A@"
"H@@@@@EAH@A@"
"H@@@@@ECOOM@"
"H@@@@@ECOOM@"
"H@@@@@EAH@A@"
"H@@@@@E@L@A@"
"H@@@@@E@F@A@"
"H@@@@@E@C@A@"
"H@@@@@E@@@A@"
"H@@@@@E@@@A@"
"H@@@@@E@@@A@"
"H@@@@@E@@@A@"
"H@@@@@E@@@A@"
"H@@@@@E@@@A@"
"H@@@@@E@@@A@"
"H@@@@@E@@@A@"
"H@@@@@E@@@A@"
"H@@@@@E@@@A@"
"H@@@@@E@@@A@"
"H@@@@@EOOOO@"
"H@@@@@G@@@@@"
"H@@@@@D@@@@@"
"OOOOOOL@@@@@")}) (\TYPE BLOCK.OF.TEXT PLACEMENT (225 . 321) LIST.OF.LINES (INSERTS) FONT (HELVETICA 10
(MEDIUM
 REGULAR REGULAR))) (\TYPE STRAIGHT.LINE PLACEMENT (130 304 130 281 NIL) WIDTH 3) (\TYPE
STRAIGHT.LINE PLACEMENT (240 266 240 212 NIL) WIDTH 3) (\TYPE STRAIGHT.LINE PLACEMENT (321 21 369
21 NIL) WIDTH 2) (\TYPE STRAIGHT.LINE PLACEMENT (321 22 321 70 NIL) WIDTH 2) (\TYPE STRAIGHT.LINE
PLACEMENT (368 22 368 70 NIL) WIDTH 2) (\TYPE STRAIGHT.LINE PLACEMENT (323 70 368 70 NIL) WIDTH 2)
 (\TYPE BLOCK.OF.TEXT PLACEMENT (320 . 76) LIST.OF.LINES (RDH) FONT (HELVETICA 10 (MEDIUM REGULAR
REGULAR))) (\TYPE BLOCK.OF.TEXT PLACEMENT (320 . 88) LIST.OF.LINES (CIRCULATE) FONT (HELVETICA 10
 (MEDIUM REGULAR REGULAR))) (\TYPE STRAIGHT.LINE PLACEMENT (239 391 303 391 NIL) WIDTH 1) (\TYPE
STRAIGHT.LINE PLACEMENT (170 397 182 397 NIL) WIDTH 1) (\TYPE STRAIGHT.LINE PLACEMENT (241 396 307
396 NIL) WIDTH 1) (\TYPE STRAIGHT.LINE PLACEMENT (110 398 32 398 NIL) WIDTH 1) (\TYPE
SENSITIVE.REGION.CHANGE.FRAME PLACEMENT (47 399 50 50) FRAME PROG.SCORE.MAIN.PAPER) (\TYPE
SENSITIVE.REGION.CHANGE.FRAME PLACEMENT (115 395 50 50) FRAME PROG.SCORE.DIRECT)))) FIRST.FRAME
FRAME.MAINTAINANCE REGION (92 191 725 565) BACKGROUND.COLOR WHITE)
(DECLARE: DONTCOPY
  (FILEMAP (NIL)))
STOP
```

We claim:

1. In a reproduction machine having plural interactive sub-systems cooperable to produce copies from document originals, the combination of:

a) a screen providing a display of programming selections for programming said machine;

b) touch responsive means to enable programming selections touched to be identified;

c) said display simulating a card file having plural primary file cards, each of said primary file cards when opened displaying a relatively smaller second card file with plural secondary file cards and adjacent work area, each of said secondary file cards when opened displaying discrete first level program touch selections for programming different machine features;

d) each of said primary and secondary file cards having a projecting touch tab for opening said file cards, said touch tabs having data to identify the file card subject matter, whereby touching said touch tabs opens the primary and secondary file cards associated with the tabs touched to display first level program touch selections associated with the primary and secondary file cards opened, touching one of said first level program selections displaying second level touch program selections in said work area for use in programming said machine;

e) memory means for retaining said programming selections for use in operating said machine; and f) control means for operating said machine in response to the program stored in said memory means.

2. The reproduction machine according to claim 1 in which touching of any tab opens the file card associated therewith while automatically closing the file card currently opened.

3. The reproduction machine according to claim 1 including plural soft control buttons for selecting different primary file card combinations.

4. The reproduction machine according to claim 1 in which said file card tabs are offset from one another to enable said tab data to be continuously displayed.

5. In a reproduction machine having plural interactive sub-systems cooperable to produce copies from document originals, the combination of:

a) a screen providing a display of programming selections for programming said machine;

b) touch responsive means to enable programming selections touched to be identified;

c) said display picturing a primary card file composed of plural file cards, each of said primary file cards when opened picturing a secondary card file composed of additional secondary file cards and an adjoining work area for use in making touch programming selections using the additional secondary file card opened, each of said primary and secondary file cards having an identifying tab which when touched opens said card files, whereby touching the identifying tab of one of said primary film cards in said primary card file opens the primary file card associated with the tab touched to display the secondary card file associated therewith for use in programming said machine.

6. Apparatus allowing a user to interactively control a copying/printing machine while concurrently displaying visual images indicating those copying/printing machine programming choices selected, program choices available for selection, and current operating conditions of the copying/printing machine, comprising:

a) a computer with a video screen;

b) computer programming means coupled to the computer for providing a picture on the computer video screen;

c) touchscreen interaction means coupled to the computer for allowing said user to interact with the computer programming means by touching the picture displayed by the video screen at selected points, d) said picture emulating a plurality of file folders, each of said file folders when opened displaying a card file with plural file cards and an adjacent work area on said video screen, each of said file folders being arranged one behind the other starting with a first file folder whereby the contents of said first file folder are displayed to the exclusion of other ones of said file folders, each of said file cards being arranged one behind the other starting with a first file card whereby the contents of said first file card are displayed to the exclusion of other ones of said file cards;

e) each of said file folders and file cards having an identifying touch tab for displaying the contents of said file folders and file cards and allowing touch actuation thereof, said tabs being offset from one another to assure that said tabs are continuously displayed, f) each of said file cards when selected displaying plural first touch selections, actuation of said first touch selections displaying predetermined additional second touch selections associated therewith in said work area.

7. A process for providing program inputs to a reproduction machine in which there is simulated on a touch sensitive CRT screen a first card file with plural file folders, each file folder when opened displaying for touch access a second relatively smaller card file with plural file cards together with an adjacent work area, each of said file folders and file cards having an identifying touch tab;

each of said file cards when opened displaying a plurality of first programming icons which when opened display in said work area a job programming file with plural second programming icons, comprising the steps of:

a) touching a selected file folder tab to open the file folder associated with said file folder tab and display the card file associated with said file folder on said screen;

b) touching a selected file card tab displayed on said screen to open the file card associated with said file card tab and display the first programming icons and work area associated with said card file;

c) touching a selected first programming icon to display in said work area the second programming icons associated with said selected first programming icon;

d) touching selected ones of the second programming icons displayed in said work area to provide program input to said machine;

e) closing said selected first programming icon and storing said program input by touching another one of said first programming icons or another one of said file card tabs or another one of said file folder tabs to enable further program inputs to said machine;

f) where another of said first programming icons is touched, repeating steps d and e to provide further program input to said machine;

g) where another of said file card tabs is touched, repeating steps c–e to provide further program input to said machine; and h) where another of said file folder tabs is touched, repeating steps b–c to provide further program input to said machine.

8. A process for programming a reproduction machine in which there is simulated on a touch sensitive CRT screen a first card file with plural file folders, each file folder when opened displaying for touch access a second relatively smaller card file with plural file cards together with an adjacent work area, each of said file folders and file cards having an identifying touch tab;

each of said file cards when opened displaying a plurality of first level program touch selections which when opened display in said work area a job programming file with plural second level program touch selections for programming said machine, comprising the steps of:

a) touching a selected file folder tab to open the file folder associated with said selected file folder tab and display the file card associated with said file folder on said screen;

b) touching a selected file card tab displayed on said screen to open the file card associated with said selected file card tab and display the first level program touch selections and work area associated with said selected file card;

c) touching a selected first level program touch selection of said selected file card to display in said work area the second level program touch selections associated with said selected first level program touch selection; and d) touching selected ones of the second level program touch selections in said work area to provide program input for said machine.

9. The process according to claim 8 including the step of:

closing said selected first level program touch selection and the second level program touch selections associated therewith by touching a different first level program touch selection, touching said different first level program touch selection displaying the second level program touch selections associated with said different first level program touch selection touched in said work area for use in providing additional program inputs to said machine.

10. The process according to claim 8 including the step of:

closing said selected file card together with the first level program touch selection associated with said selected card file including the second level program touch selections displayed in said work area by touching a different file card tab, touching said different file card tab displaying the first level touch selections and work area associated with said different file card for use in providing additional program inputs to said machine.

* * * * *